United States Patent [19]
Winter et al.

[11] Patent Number: 5,884,042
[45] Date of Patent: Mar. 16, 1999

[54] DATA IDENTIFICATION IN AN INTELLIGENT VIDEO INFORMATION MANAGEMENT SYSTEM

[75] Inventors: Gerhard Josef Winter; Harry Eric Klein; Sen Lin-Liu; David Ross MacCormack, all of San Diego; Charles Park Wilson, Santee; Alex Kamlun Auyeung, Poway; Lyn Nguyen, San Diego; Patrick O. Nunally, Delmar, all of Calif.

[73] Assignee: Sensormatic Electronics Corporation, Boca Raton, Fla.

[21] Appl. No.: 740,627

[22] Filed: Oct. 31, 1996

[51] Int. Cl.⁶ ..................................................... H04N 9/79
[52] U.S. Cl. ................... 395/200.61; 345/334; 345/339; 348/262; 382/107; 382/123; 382/203; 382/206
[58] Field of Search ........................ 395/200.61, 200.63; 345/334, 339, 340; 360/22, 24, 27, 32; 348/262, 588, 590, 840; 382/107, 123, 190, 203, 206

[56] References Cited

U.S. PATENT DOCUMENTS

| | | | |
|---|---|---|---|
| 4,943,854 | 7/1990 | Shiota et al. | 358/108 |
| 5,109,278 | 4/1992 | Erickson et al. | 358/108 |
| 5,119,205 | 6/1992 | Lemelson | 348/94 |
| 5,272,527 | 12/1993 | Watanabe | 358/108 |
| 5,321,396 | 6/1994 | Lamming et al. | 340/825.49 |
| 5,463,565 | 10/1995 | Cookson et al. | 711/113 |
| 5,576,950 | 11/1996 | Tonomura et al. | 364/514 |
| 5,666,157 | 9/1997 | Aviv | 348/152 |
| 5,703,966 | 12/1997 | Astle | 382/236 |
| 5,724,475 | 3/1998 | Kirsten | 386/109 |

OTHER PUBLICATIONS

Geutebrück, "MultiScop Video Disc Recorder," (brochure).
Robot (A Sensormatic Company), "Multivision Optima II," (brochure), 1995.
Robot Research, Inc. (A Sensormatic Company), *Multivision Optima II Multiplexers, Installation and Operation Manual*, 1995.
M. Cagigal et al., "Object Movement Characterization from Low–Light–Level Images," Optical Engineering, vol. 33, No. 8, Aug. 1994, pp. 2810–2812.
S.J. Nowlan et al., "Filter Selection Model for Motion Segmentation and Velocity Integration," J. Opt. Soc. Am. A, vol. 11, No. 12, Dec. 1994, pp. 3177–3199.
T.G. Allen et al., "Multiscale Approaches to Moving Target Detection in Image Sequences," Optical Engineering, vol. 33, No. 7, Jul. 1994, pp. 2248–2254.
Marie–Pierre Dubuisson et al., "Contour Extraction of Moving Objects in Complex Outdoor Scenes," International Journal of Computer Vision, 14, 83–105 (1995).
M. Bichsel, "Segmenting Simply Connected Moving Objects in a Static Scene," IEEE Transactions on Pattern Analysis and Machine Intelligence, vol. 16, No. 11, Nov. 1994, pp. 1138–1142.
M. Irani et al., "Computing Occluding and Transparent Motions," International Journal of Computer Vision, 12:1, 5–16 (1994), pp. 5–16.
I.J. Cox, "A Review of Statistical Data Association Techniques for Motion Correspondence," International Journal of Computer Vision 10:1, 53–66 (1993).
D. Koller et al., "Model–Based Object Tracking in Monocular Image Sequences of Road Traffic Scenes," International Journal of Computer Vision, 10:3, 257–281 (1993).

(List continued on next page.)

*Primary Examiner*—Thomas Peeso
*Attorney, Agent, or Firm*—Robin, Blecker & Daley

[57] ABSTRACT

Video data storage apparatus stores on a hard disk plural fields of video data and header data associated with each field of video data. The video data is reproduced from the hard disk and the reproduced video data is processed by an image analysis algorithm. Data indicative of the outcome of the image analysis is then recorded on the hard disk as part of the header data.

53 Claims, 158 Drawing Sheets

OTHER PUBLICATIONS

J.H. Lee et al., "A VLSI Chip for Motion Estimation of HDTV Signals," IEEE Transactions on Consumer Electronics, vol. 40 No. 2, May 1994, pp. 154–160.

T. Koivunen, "Motion–Detection of an Interlaced Video Signal," IEEE Transactions on Consumer Electronics, vol. 40, No. 3, Aug. 1994, pp. 753–760.

Seong–lk Jang et al., "A Real–Time Identification Method on Motion and Out–Of–Focus Blur for a Video Camera," IEEE Transactions on Consumer Electronics, vol. 40, No. 2, May 1994, pp. 145–153.

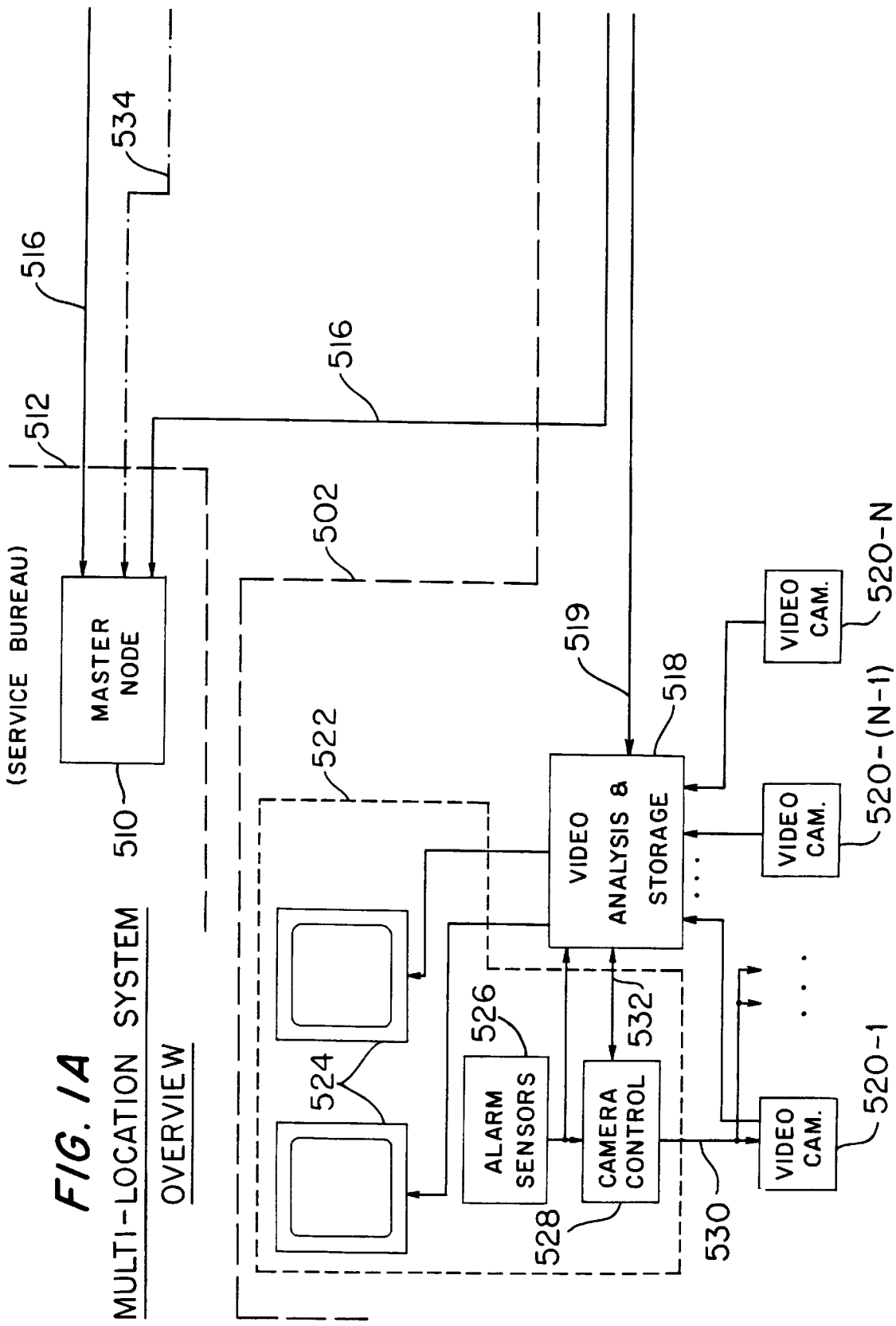

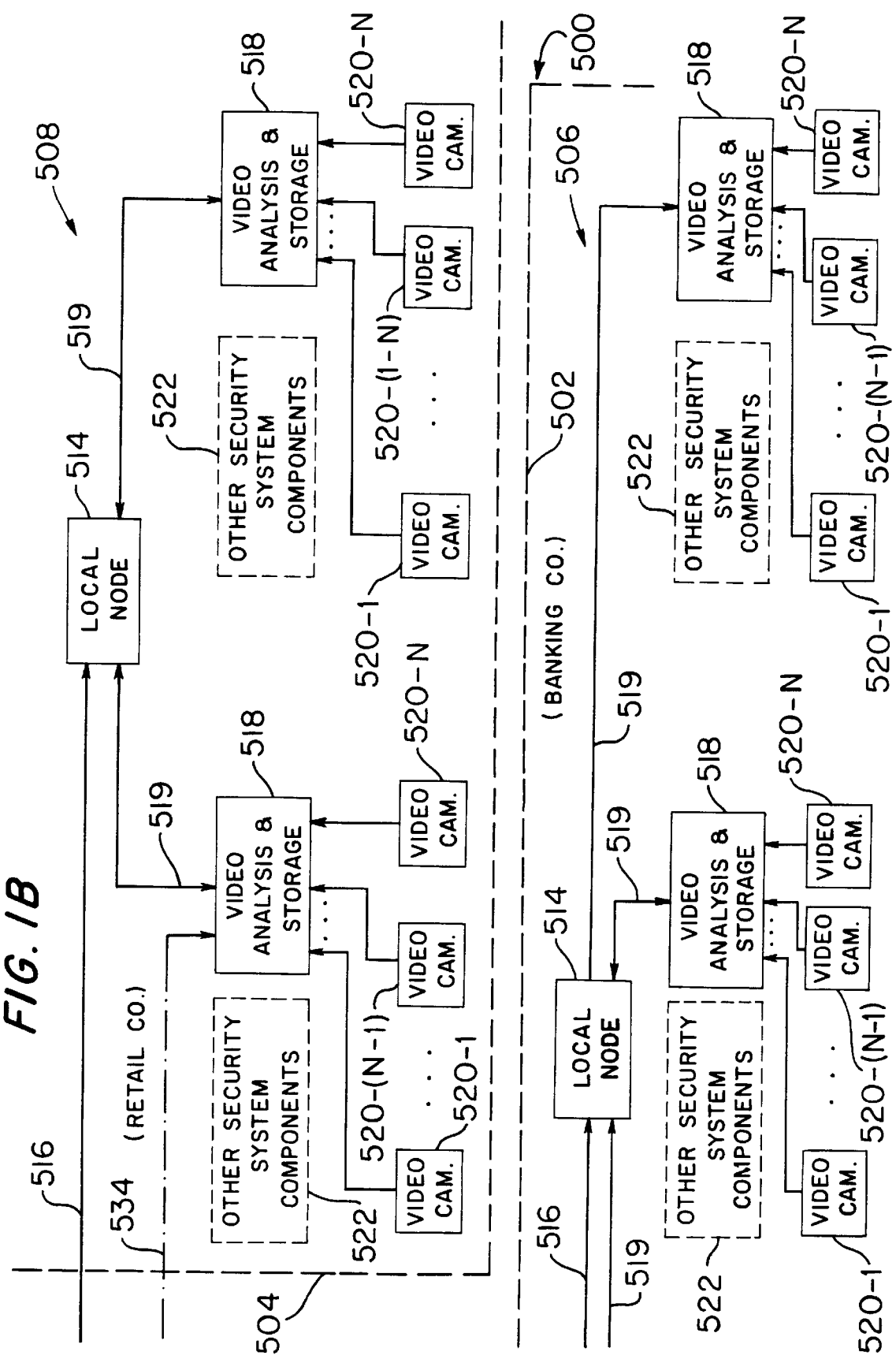

VIDEO ANALYSIS & STORAGE

VR/PC HARDWARE OVERVIEW

CIRCUIT BOARD ARCHITECTURE

VR/PC

FRONT PANEL

REAR ELEVATION

MEDIA DRIVE SUPPORT ASSEMBLY

MEDIA DRIVE SUPPORT ASSEMBLY

MEDIA DRIVE ASSEMBLY

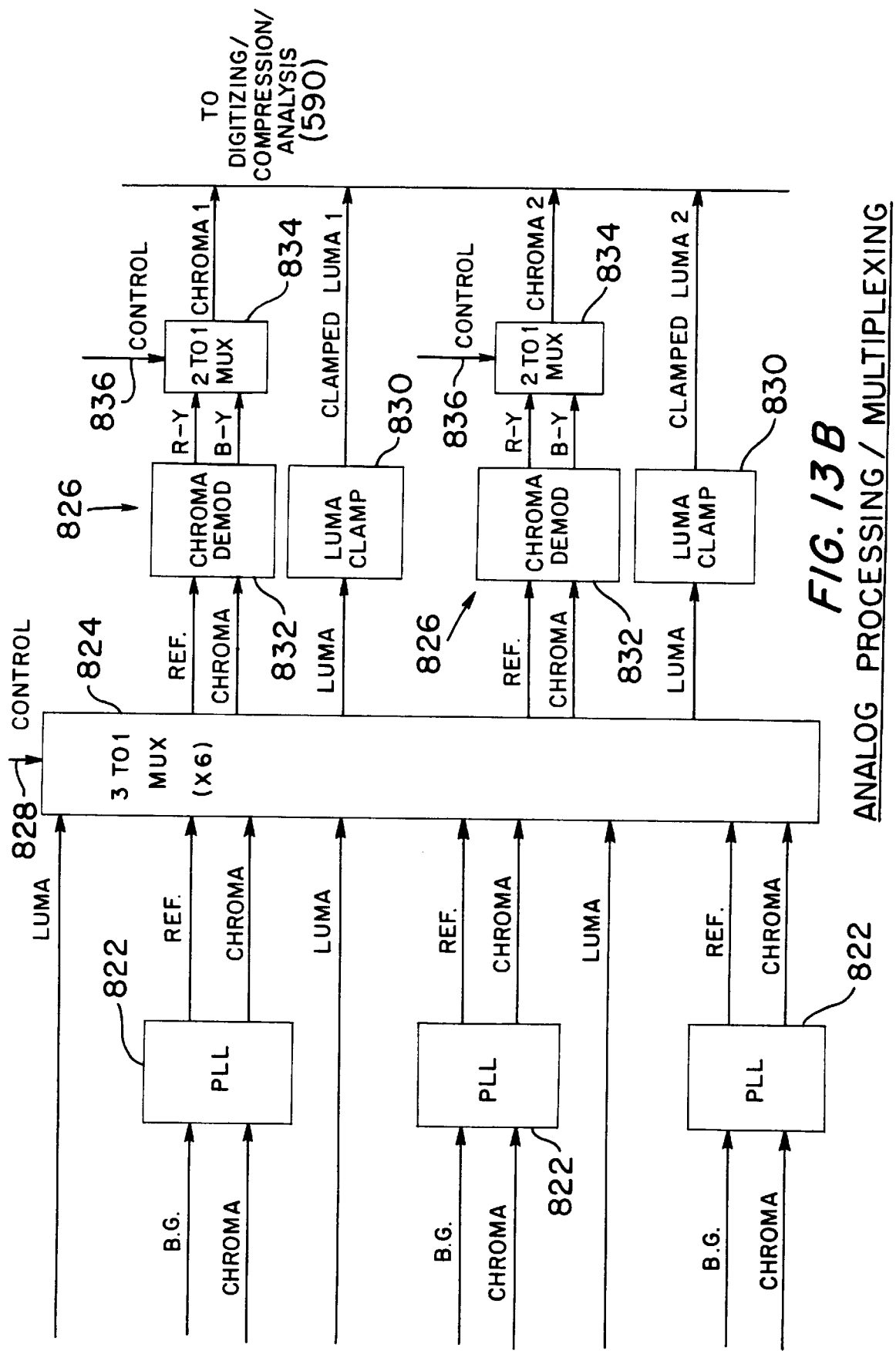
FIG. 13B ANALOG PROCESSING / MULTIPLEXING

DIGITIZING/COMPRESSION/ANALYSIS

A/D CONVERSION/FIELD BUFFERING/VIDEO BUS CONTROL

A/D CONVERSION

VIDEO DIGITIZING CONTROLLER

CONTROLLER LOGIC
(VIDEO DIGITIZING CONTROLLER)

FIELD BUFFERING

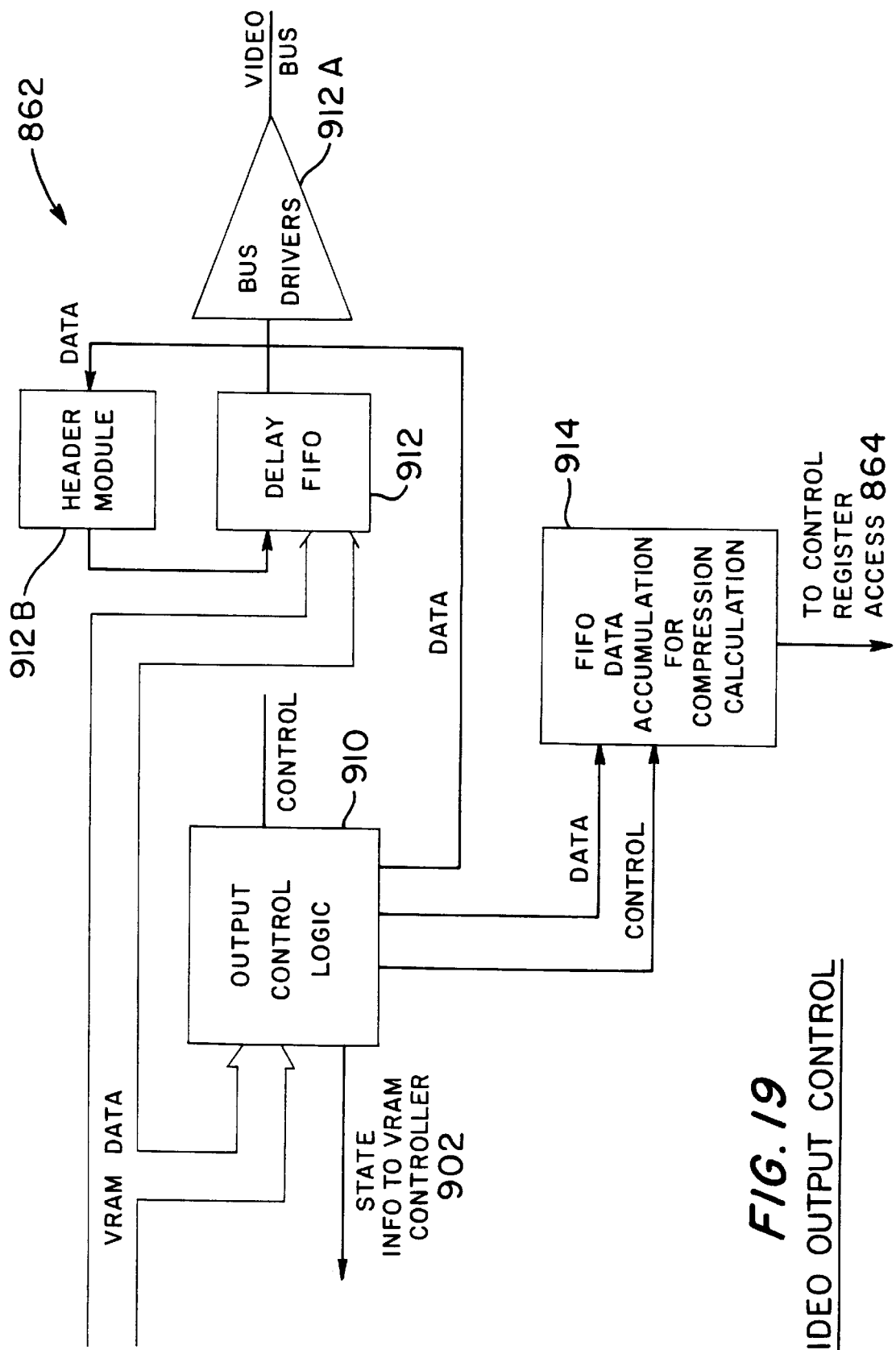
FIG. 19 VIDEO OUTPUT CONTROL

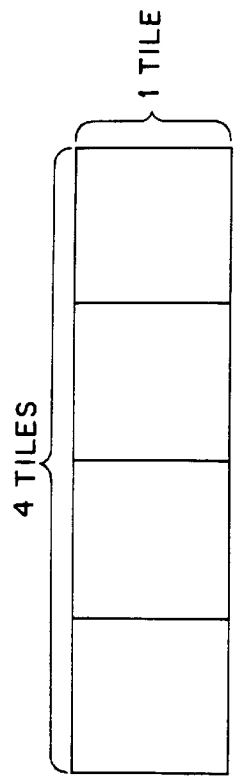
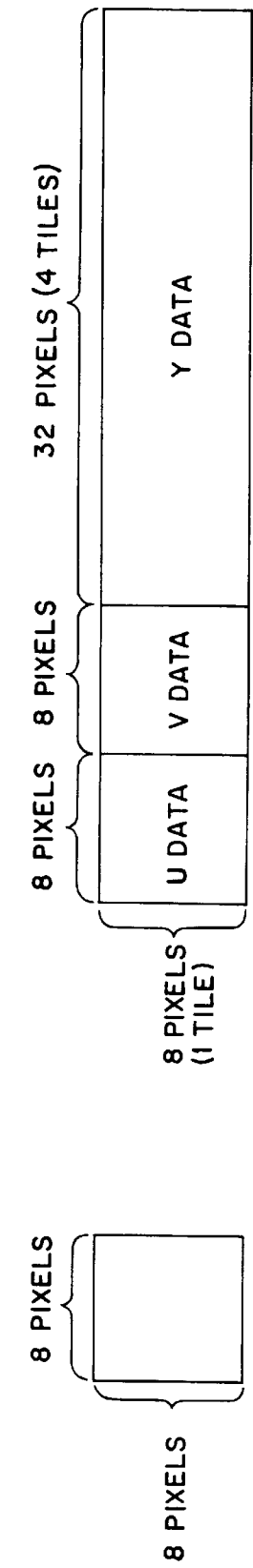
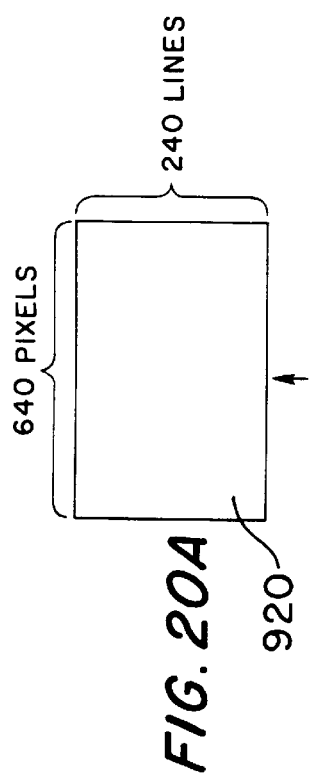
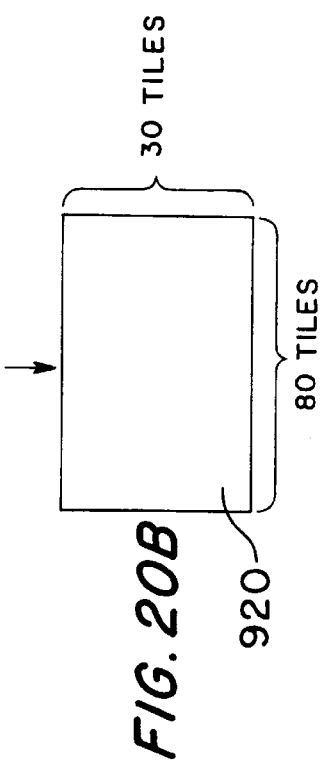

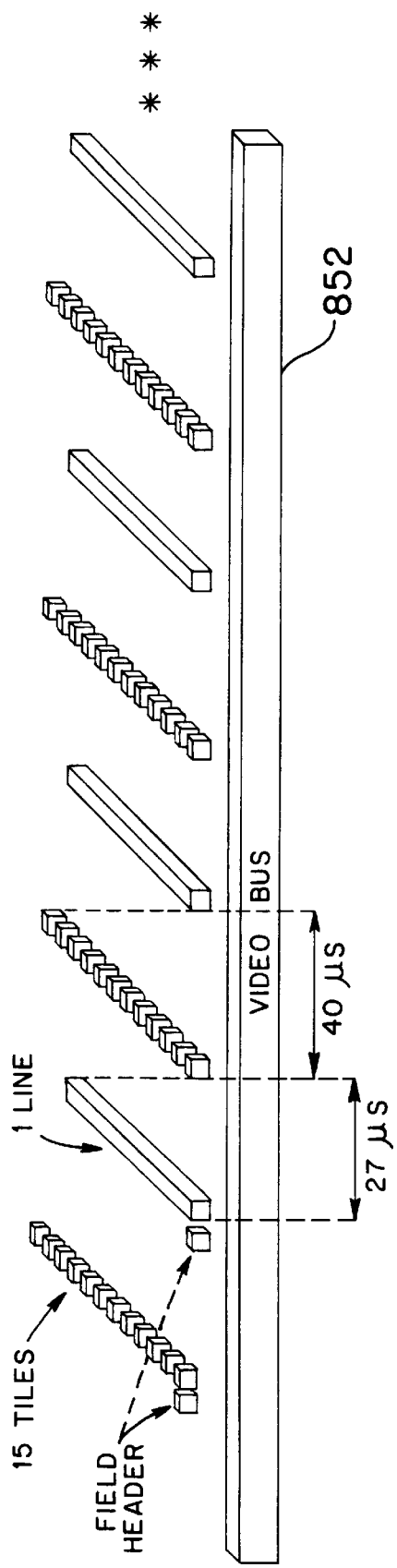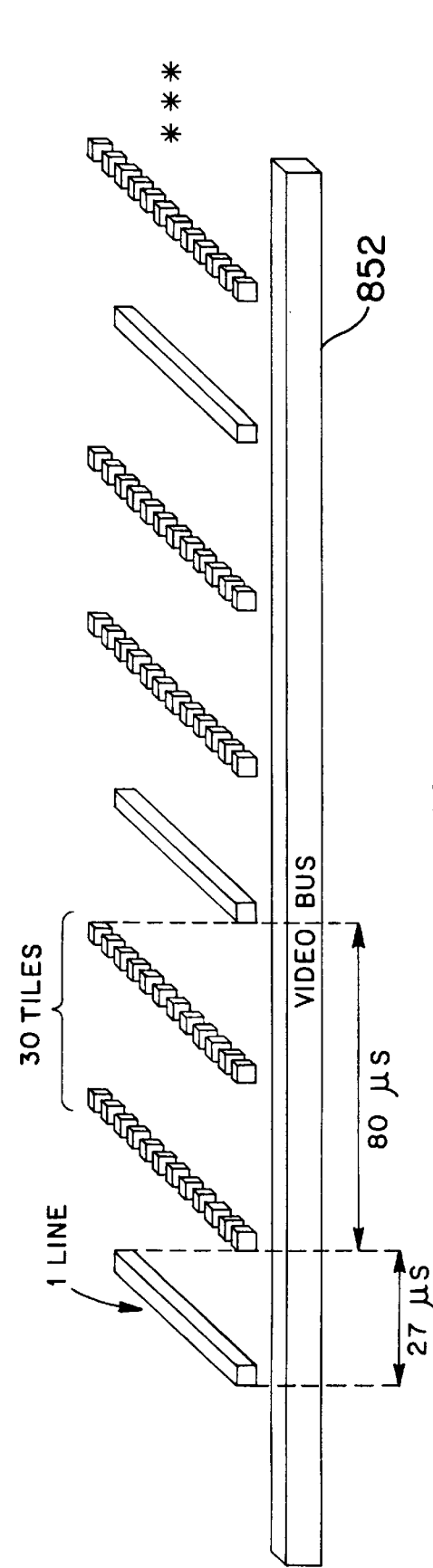
FIG. 25
FIG. 26

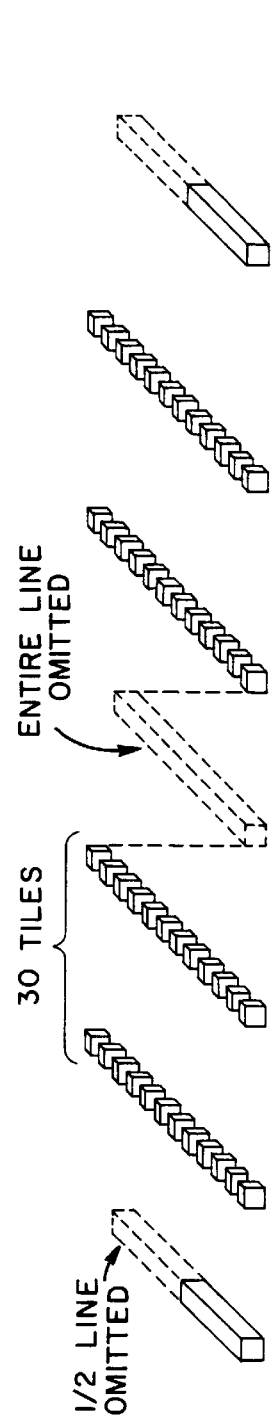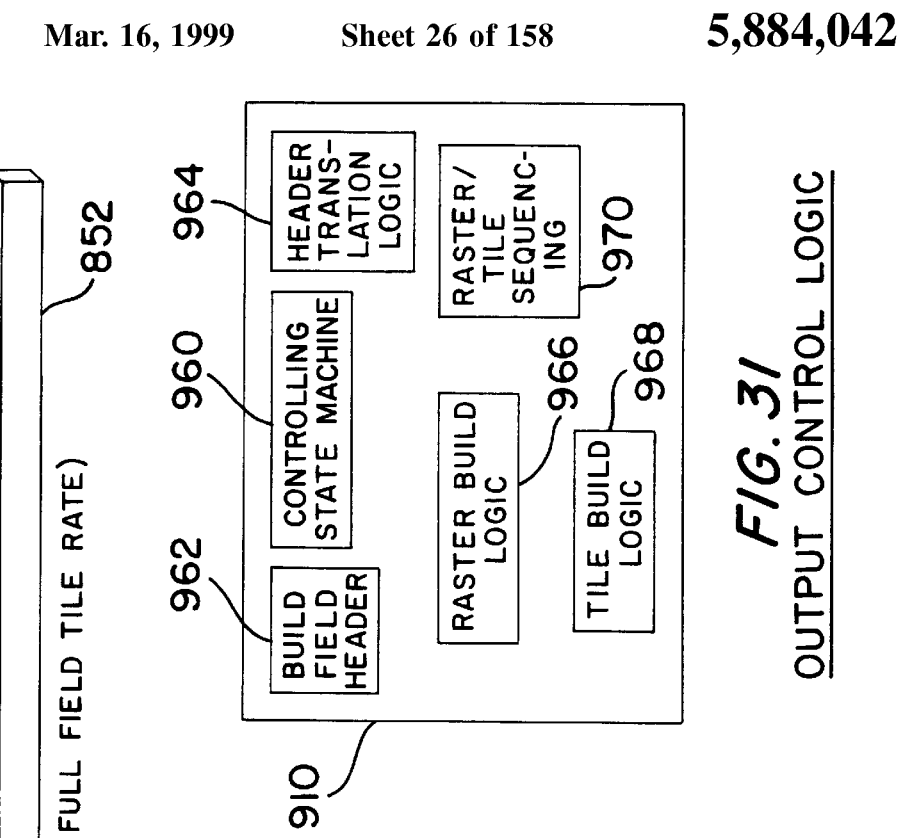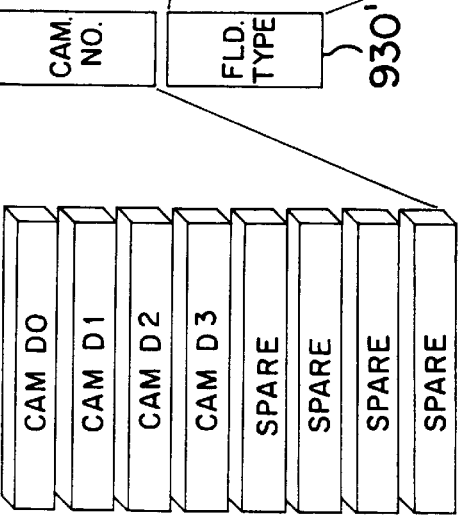

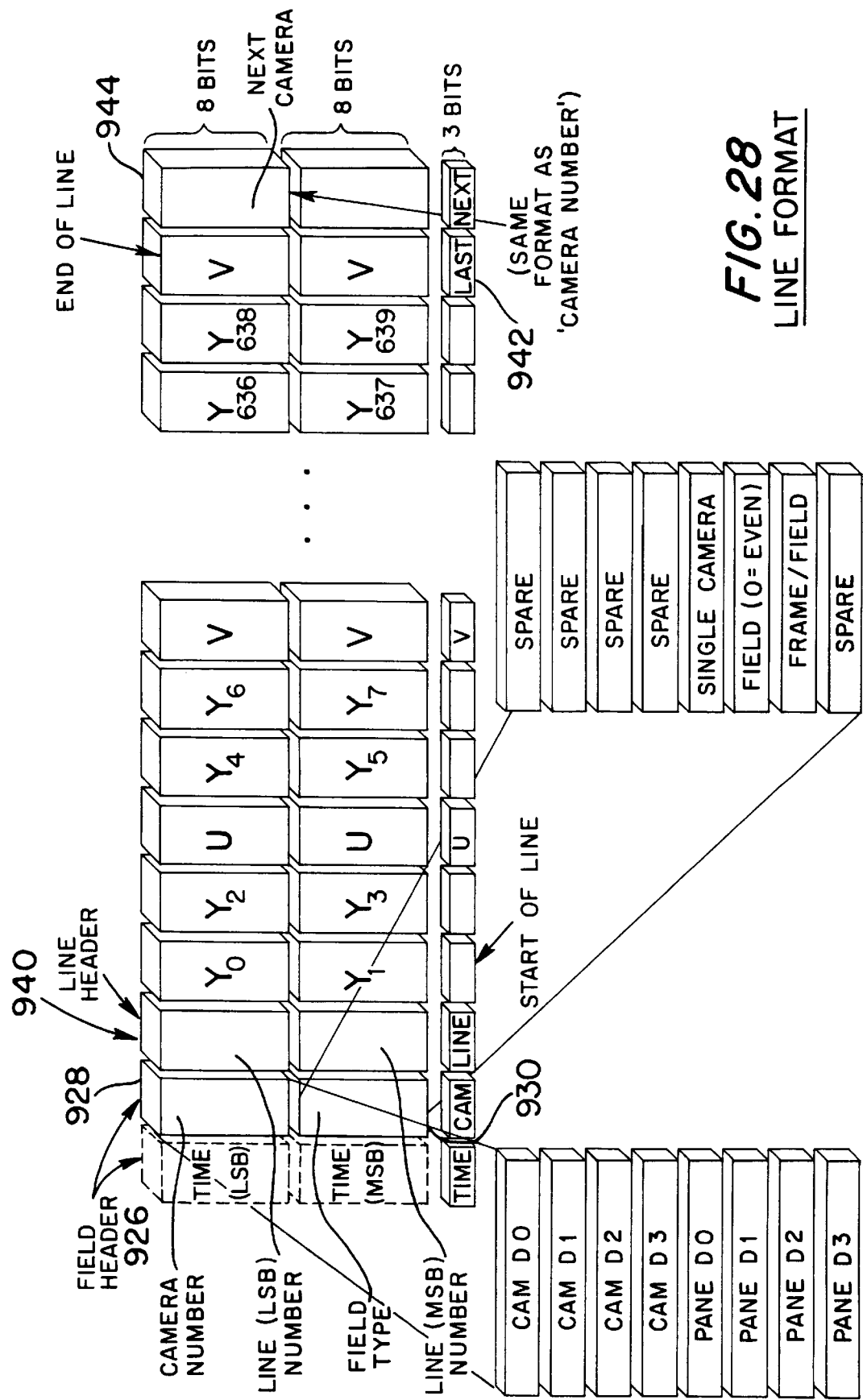
FIG. 28 LINE FORMAT

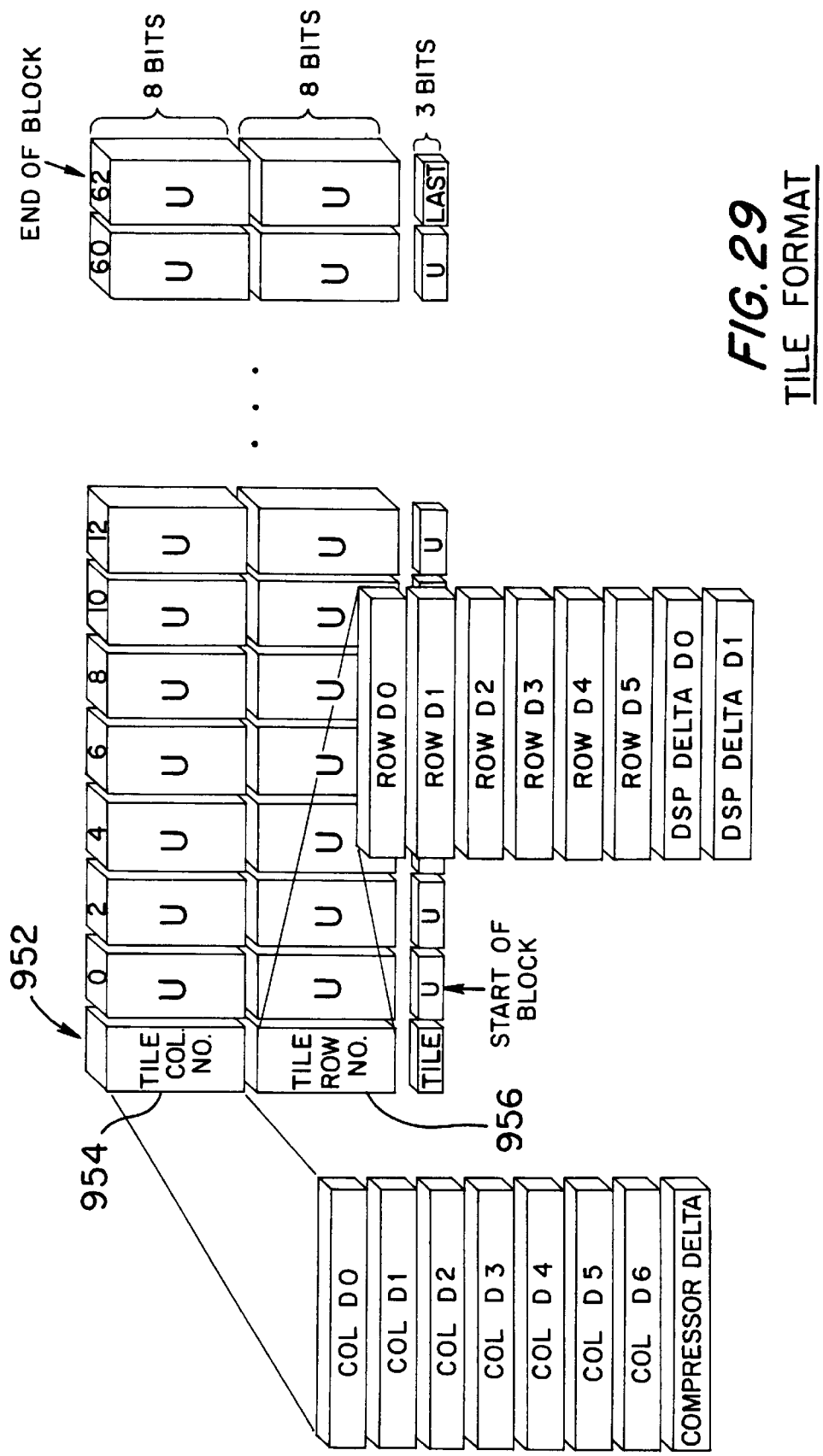
FIG. 29 TILE FORMAT

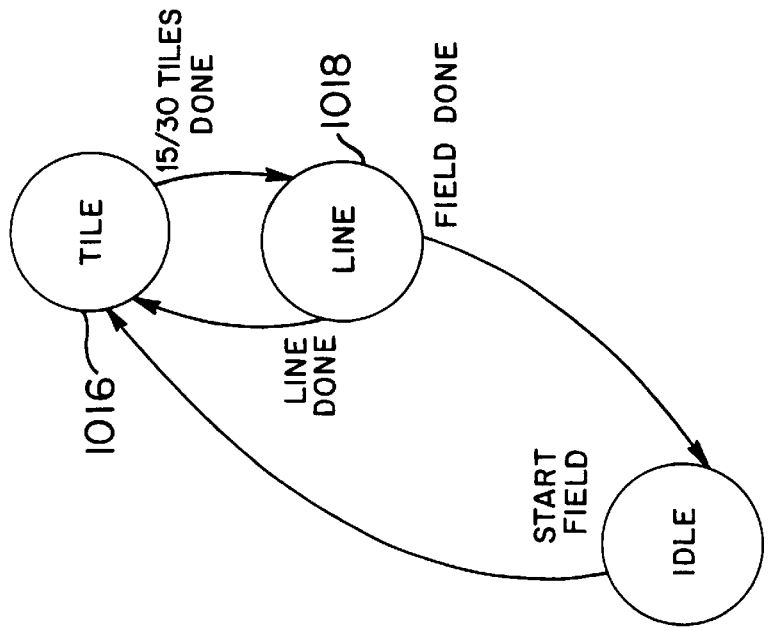
FIG. 35 CONTROLLING STATE MACHINE (VIDEO BUS CONTROL)
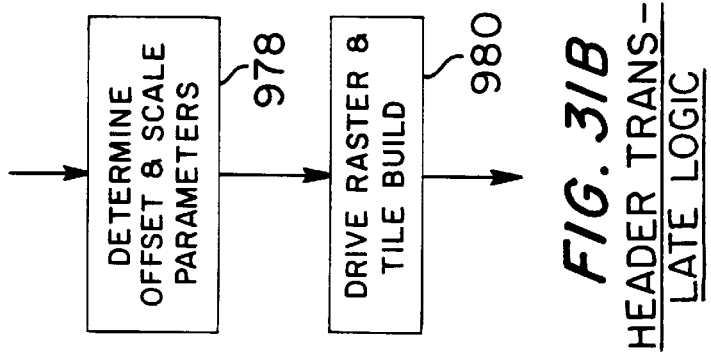
FIG. 31B HEADER TRANSLATE LOGIC
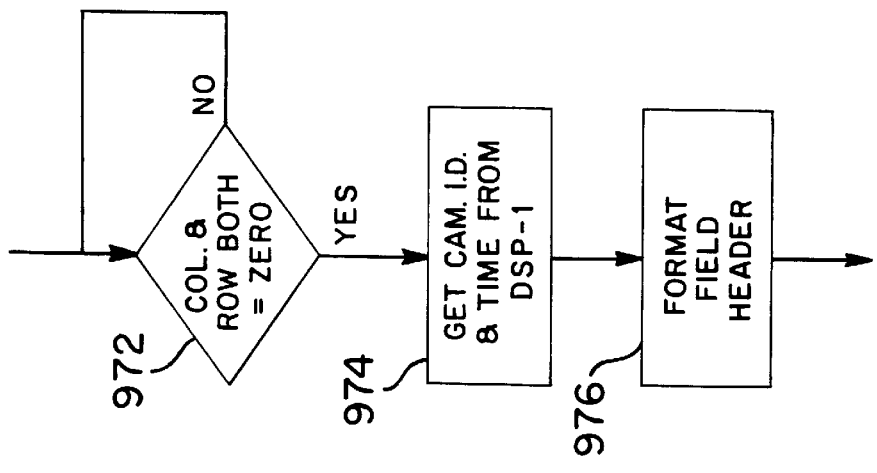
FIG. 31A BUILD FIELD HEADER

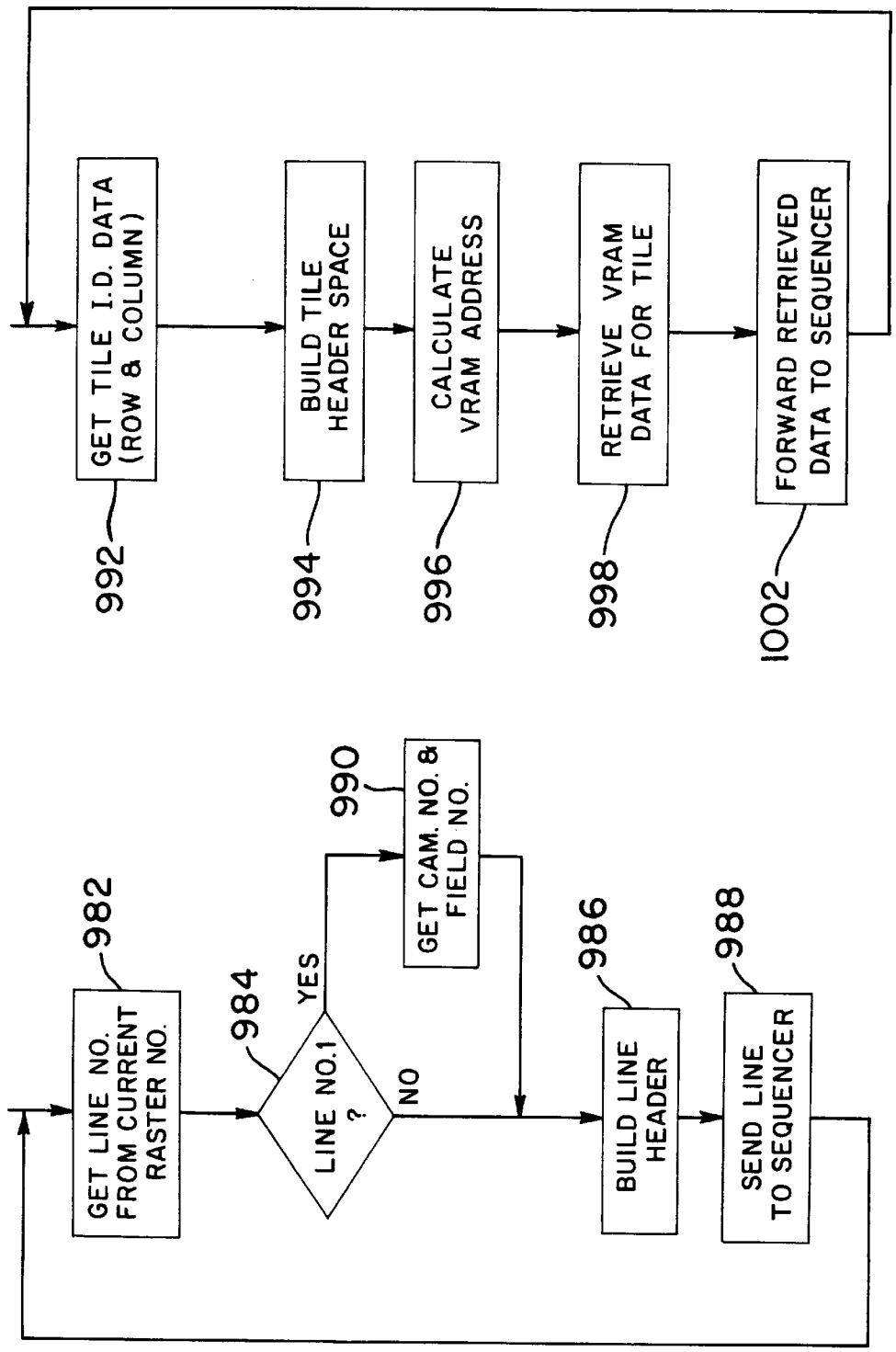

RASTER/TILE SEQUENCING

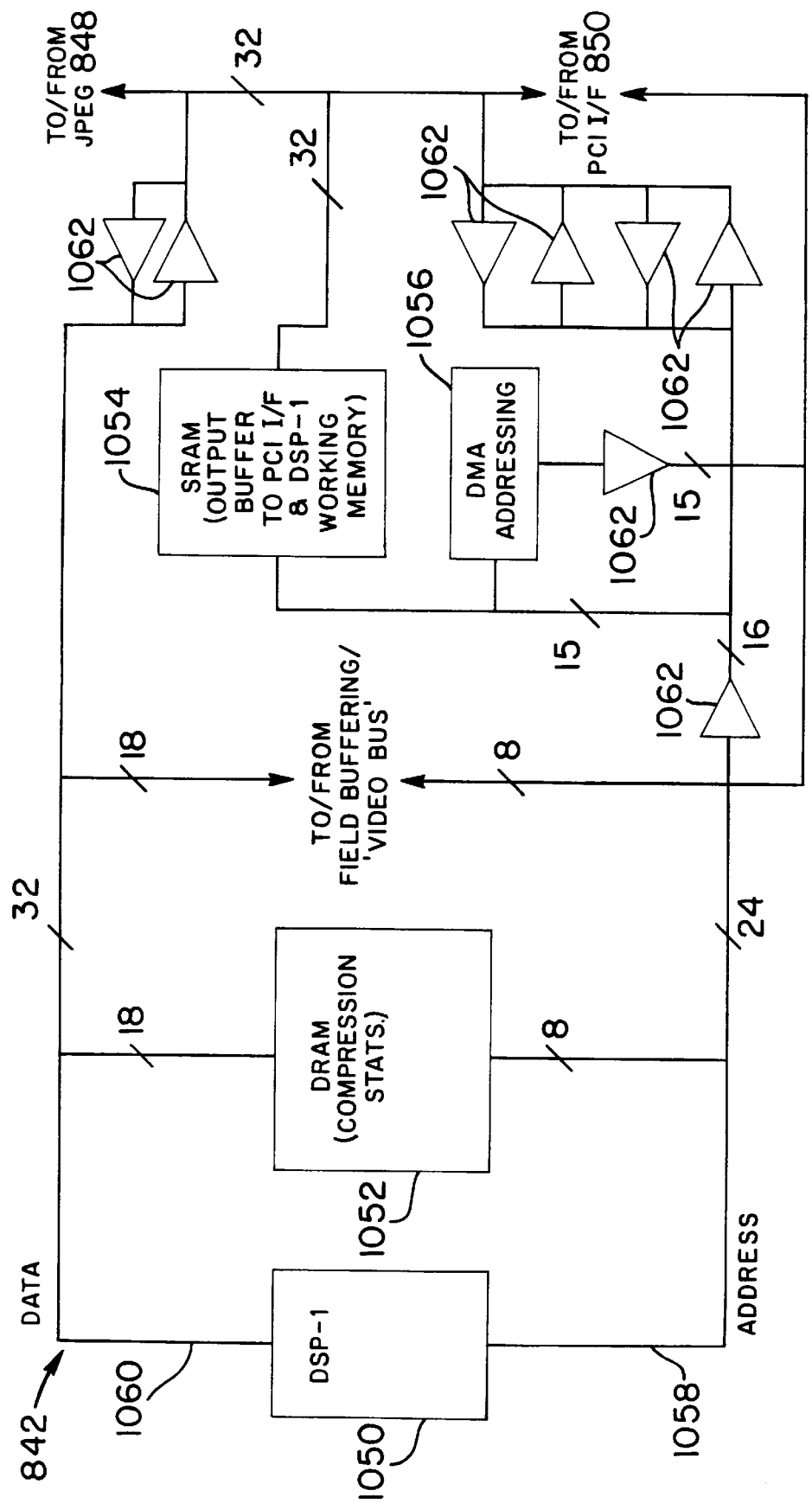
FIG. 36 CONTROL/COMPRESSION FRONT END

LIVE VIDEO DATA ANALYSIS

LIVE DISPLAY PROCESSING

DSP-1 (VIDEO BOARD CONTROLLER)
SOFTWARE OVERVIEW

MAP GENERATOR

PCI INTERFACE DRIVER

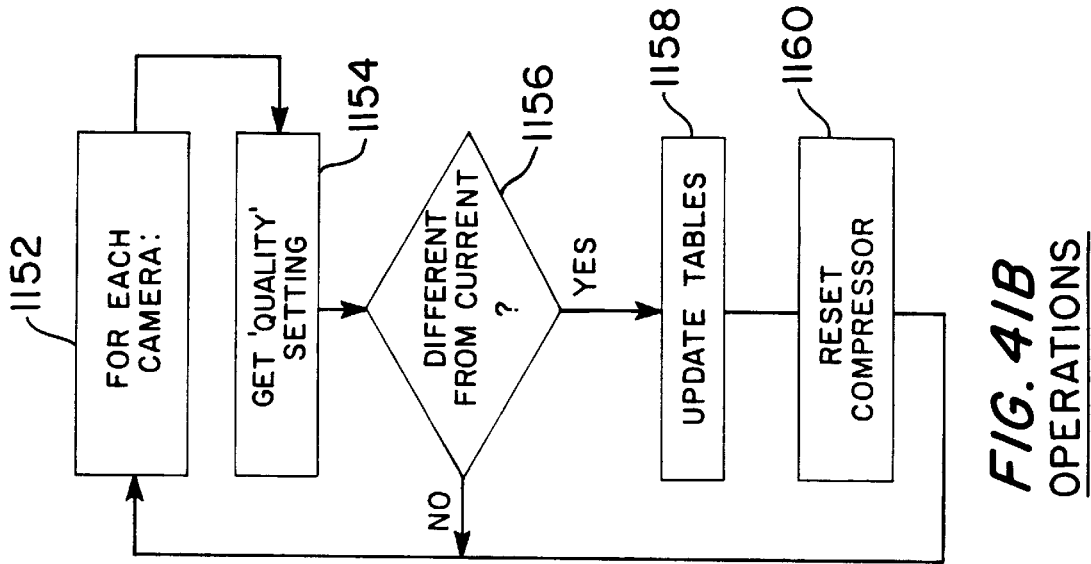
FIG. 41B OPERATIONS
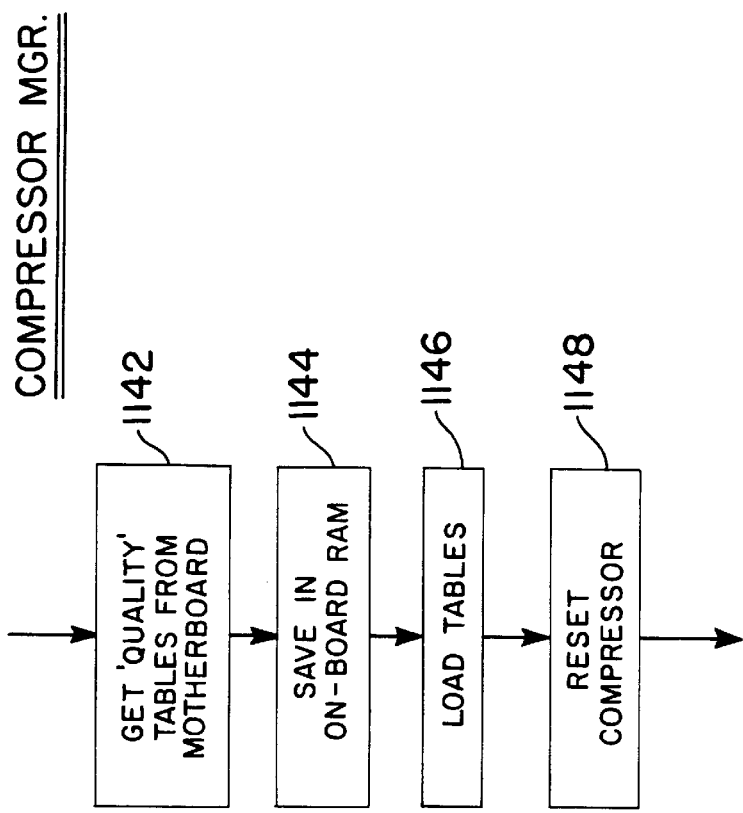
FIG. 41A SET-UP

TILE COMPARING

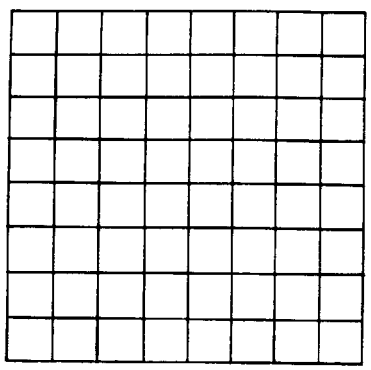
FIG. 43A
TILE
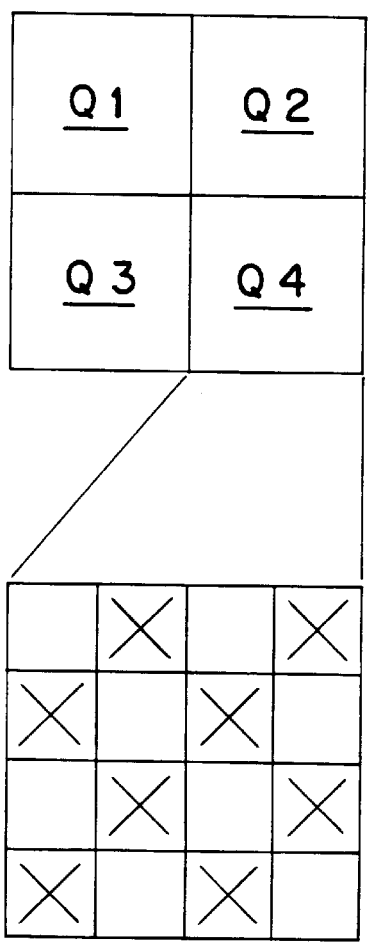
FIG. 43B
TILE QUADRANTS
FIG. 43C
'CHECKER-BOARD'
SUBSAMPLING

DIFFERENCE DATA FORMAT

CPU SOFTWARE OVERVIEW

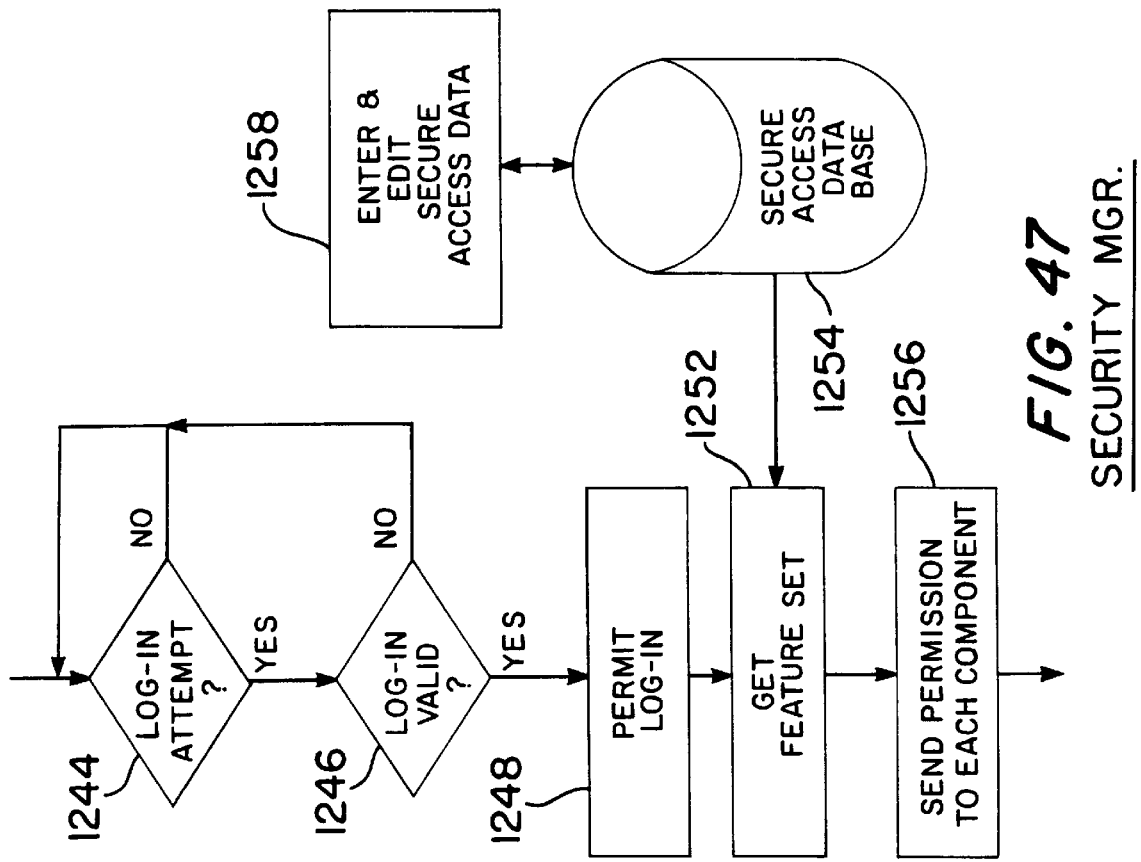
FIG. 47
SECURITY MGR.
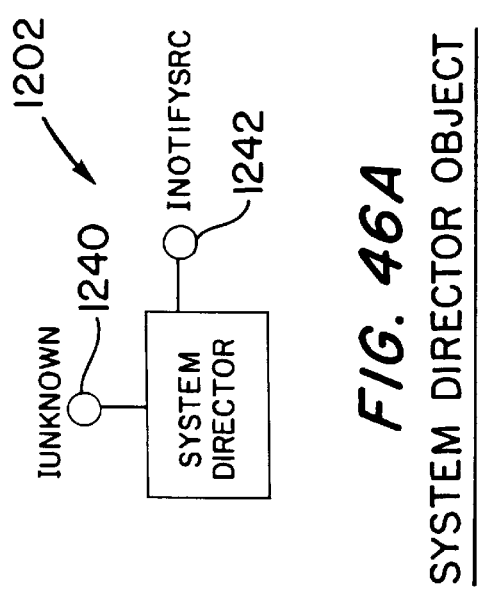
FIG. 46A
SYSTEM DIRECTOR OBJECT
FIG. 46B
OTHER S/W COMPONENTS

REMOTE OBJECT INSTANCE

FRONT PANEL
(SOFTWARE OBJECT)

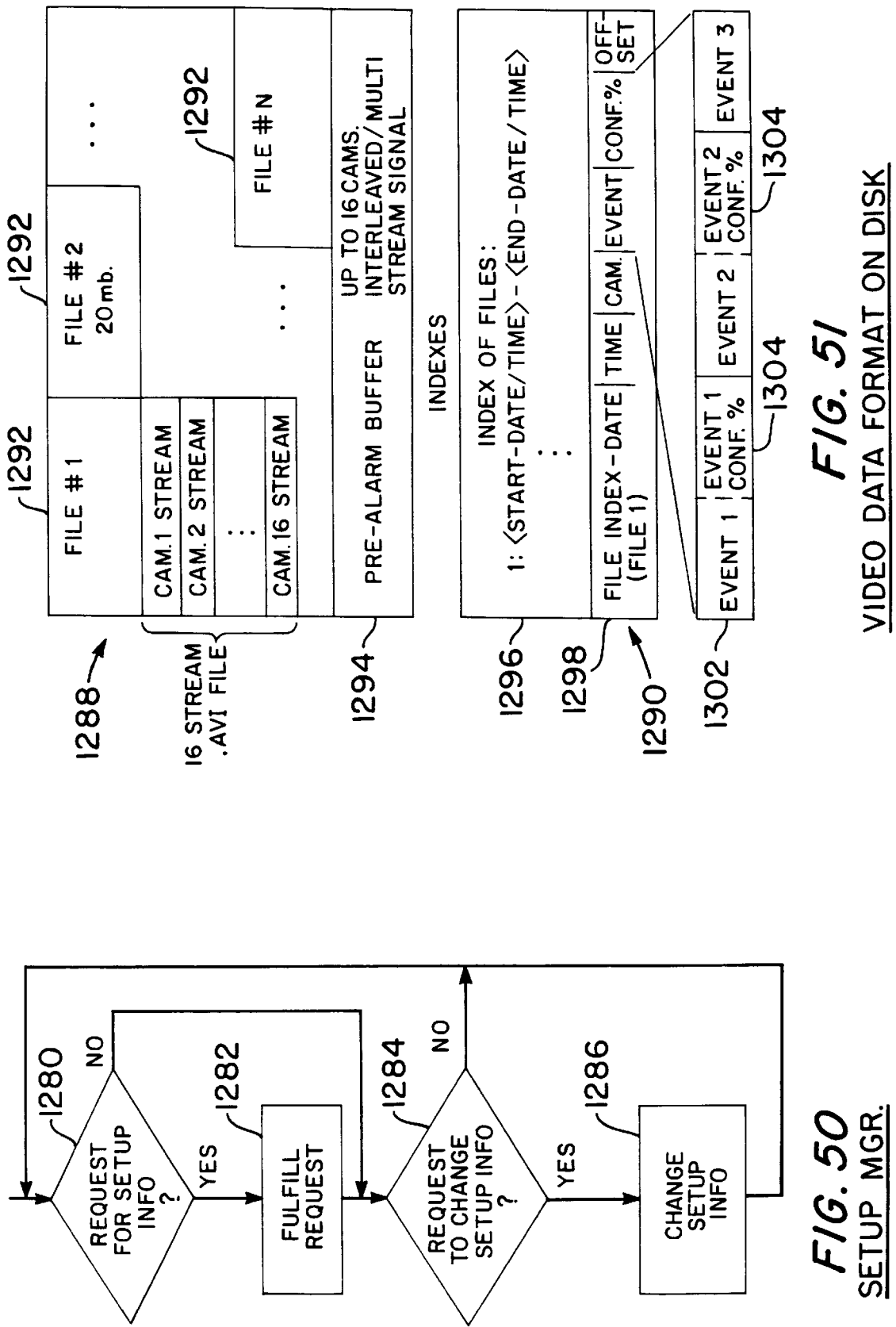

VIDEO STORAGE

VIDEO SEARCH

PERFORM SEARCH

VIDEO PLAY

RESTART DECOMPRESSION ENGINE

DECOMPRESS REFERENCE IMAGE

STOP DECOMPRESSOR

DECOMPRESS DIFFERENCE IMAGE

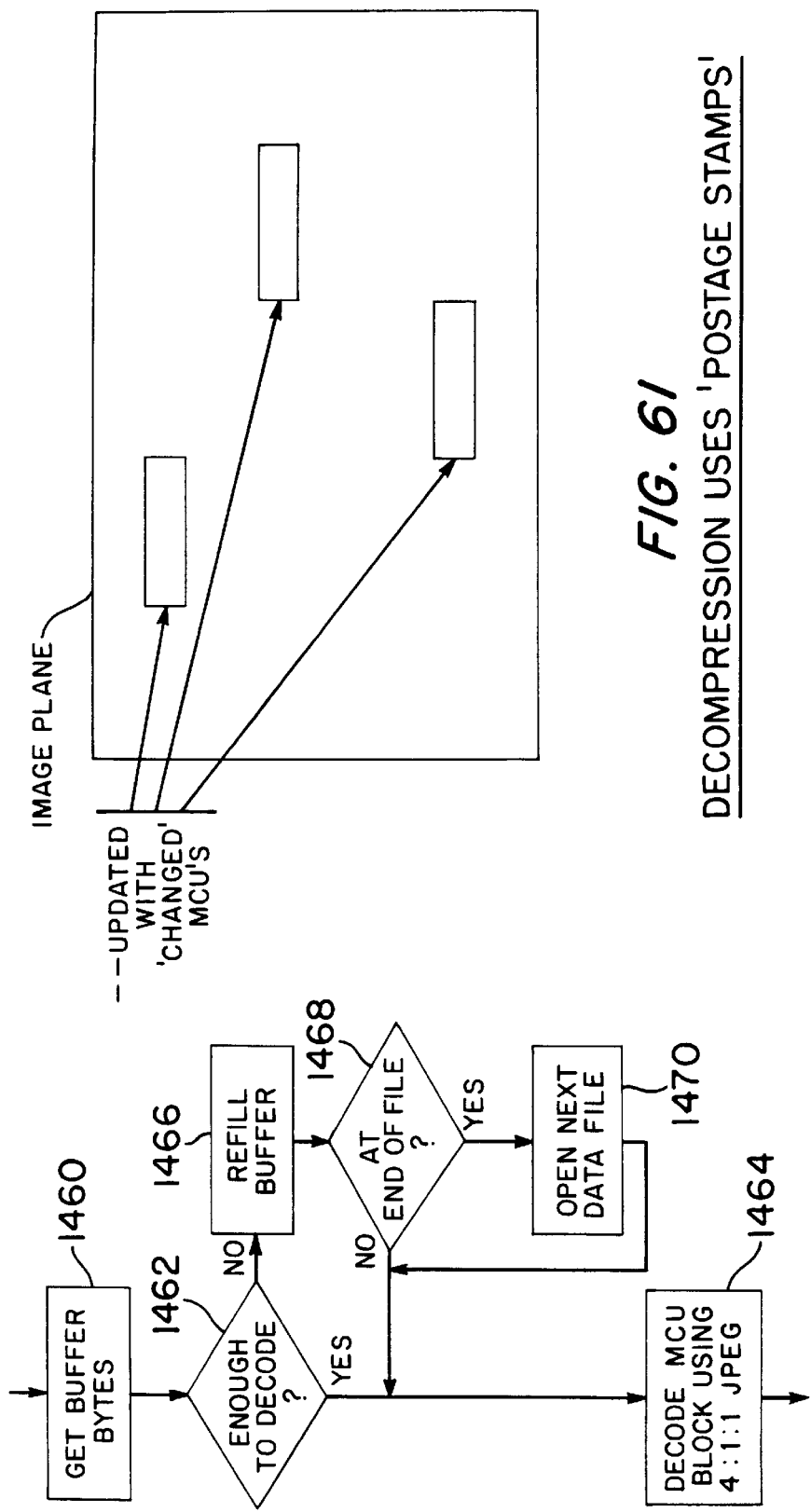

VIDEO DATA REFRESH – PLAYBACK

VERTICAL RESOLUTION
OPTIONS-PLAYBACK

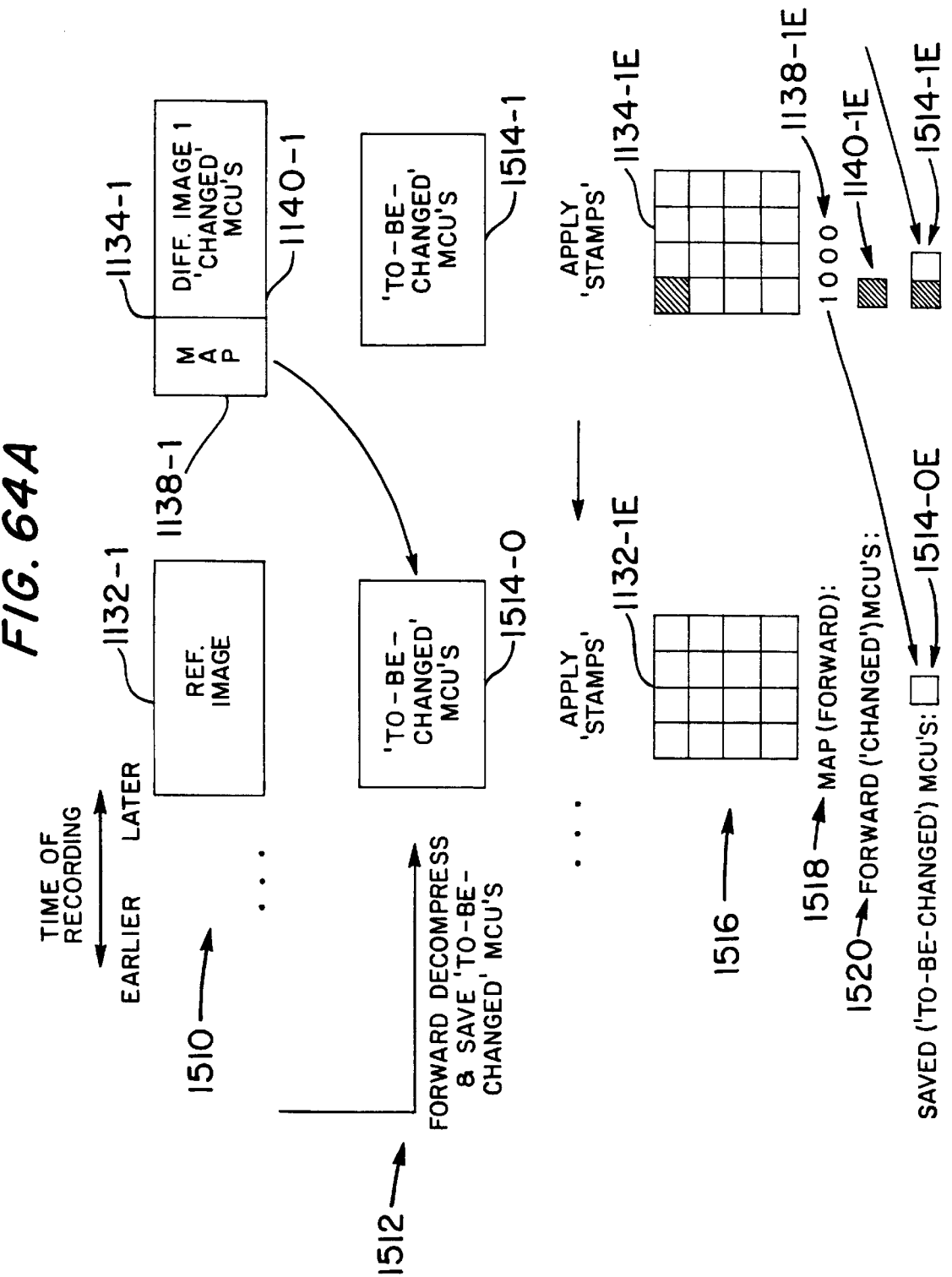

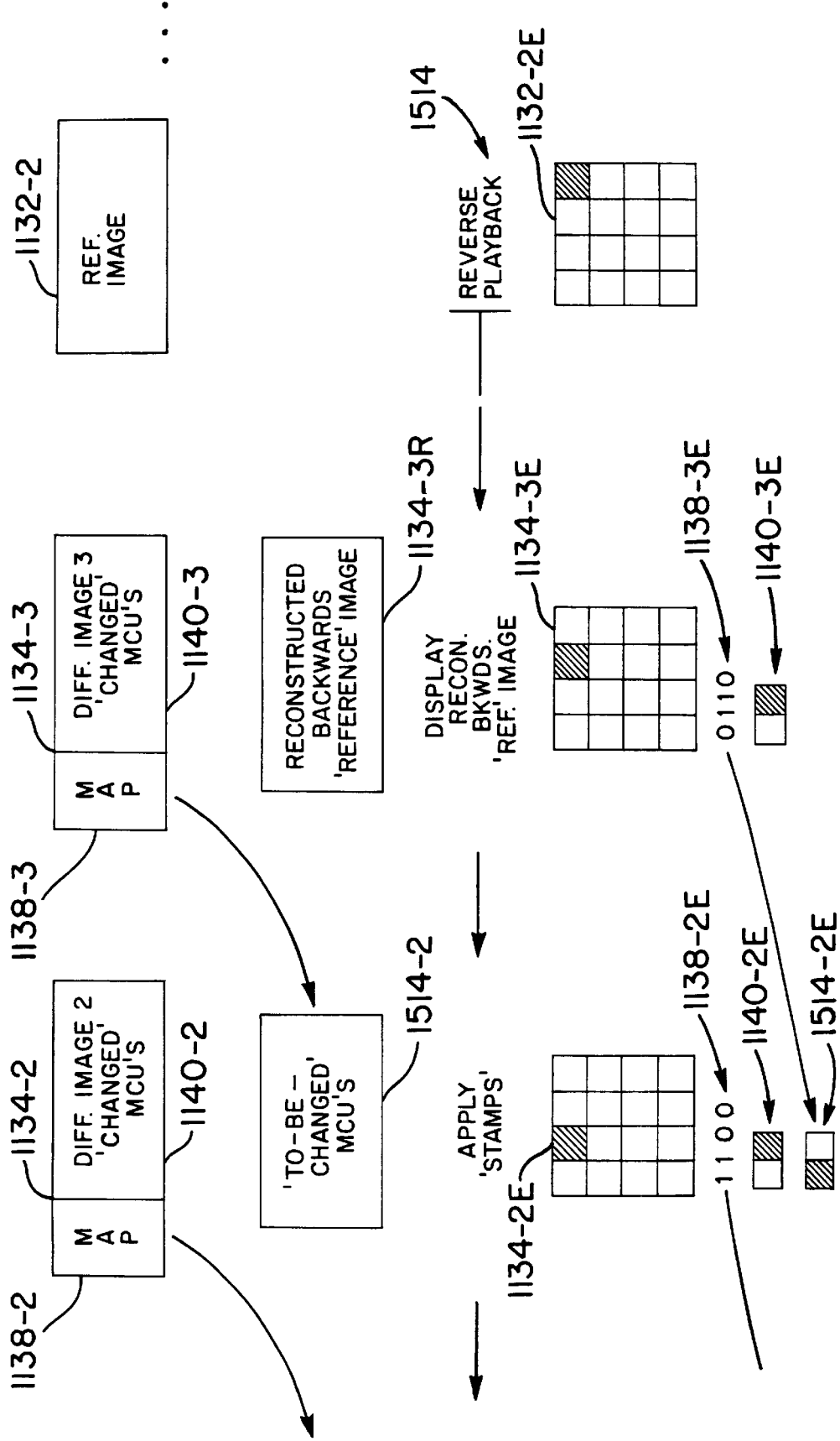

BACKWARD DECOMPRESSION

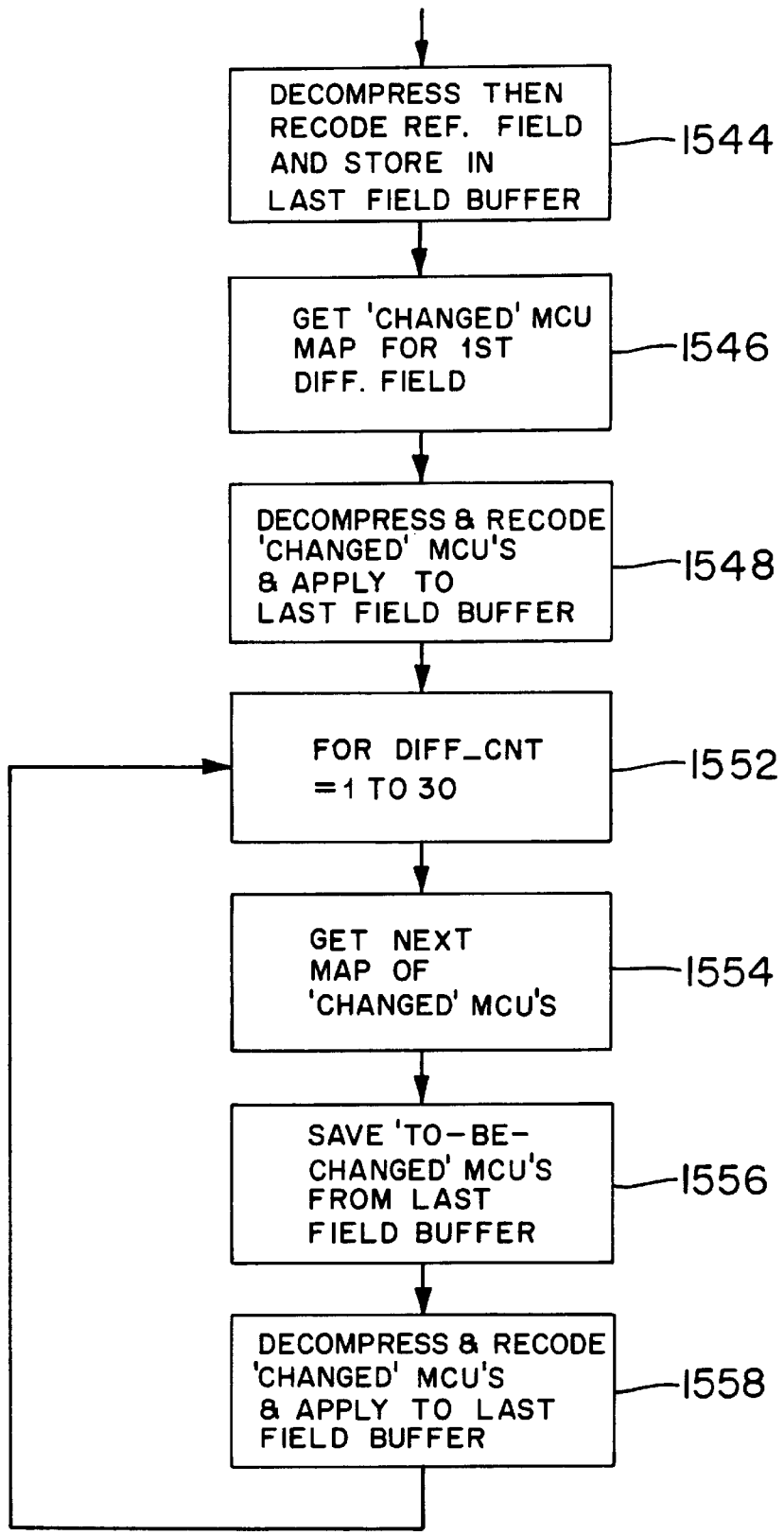
FIG. 66 BUILD BACKWARD HISTORY BUFFER

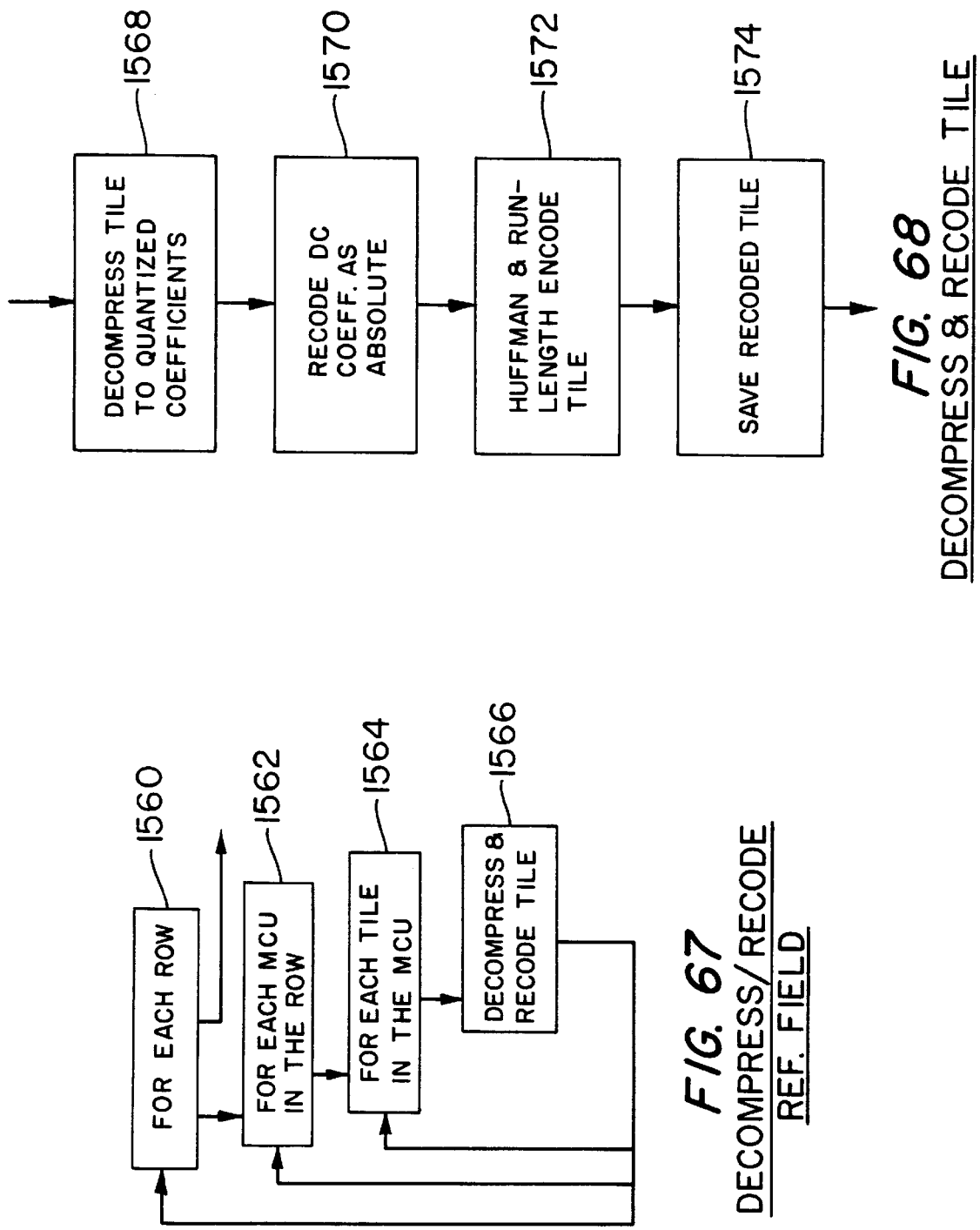
FIG. 68 DECOMPRESS & RECODE TILE
FIG. 67 DECOMPRESS/RECODE REF. FIELD

COMPRESSOR MGR.
(COMMAND HANDLING)

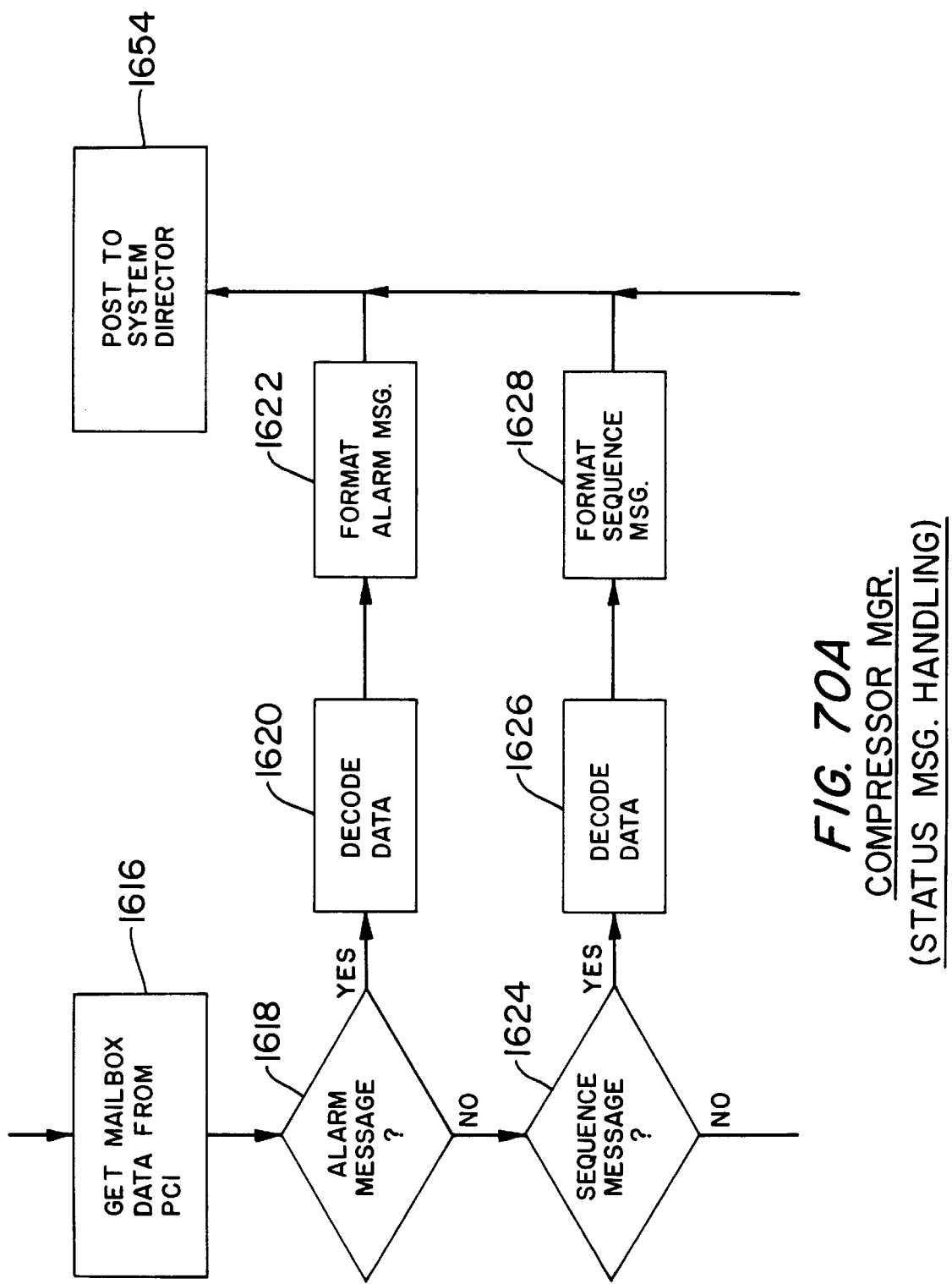
FIG. 70A COMPRESSOR MGR.
(STATUS MSG. HANDLING)

COMPRESSOR MGR.
(VIDEO DATA HANDLING)

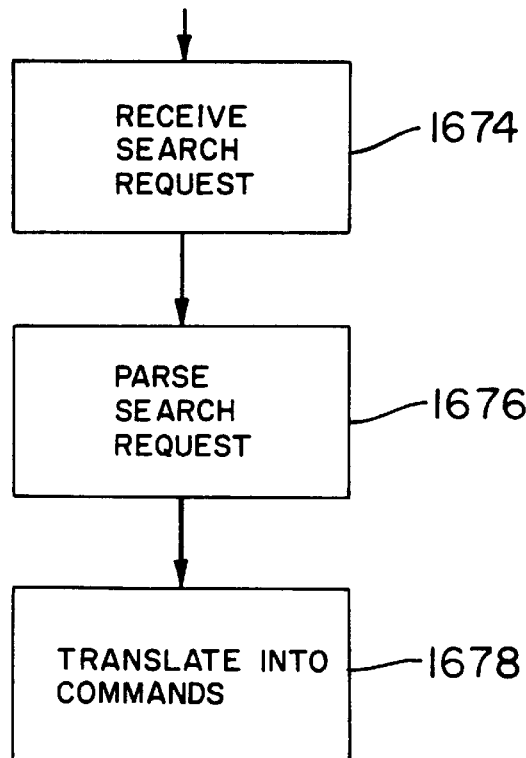
FIG. 73 ARCHIVE MGR. (SEARCH REQ. HANDLING)
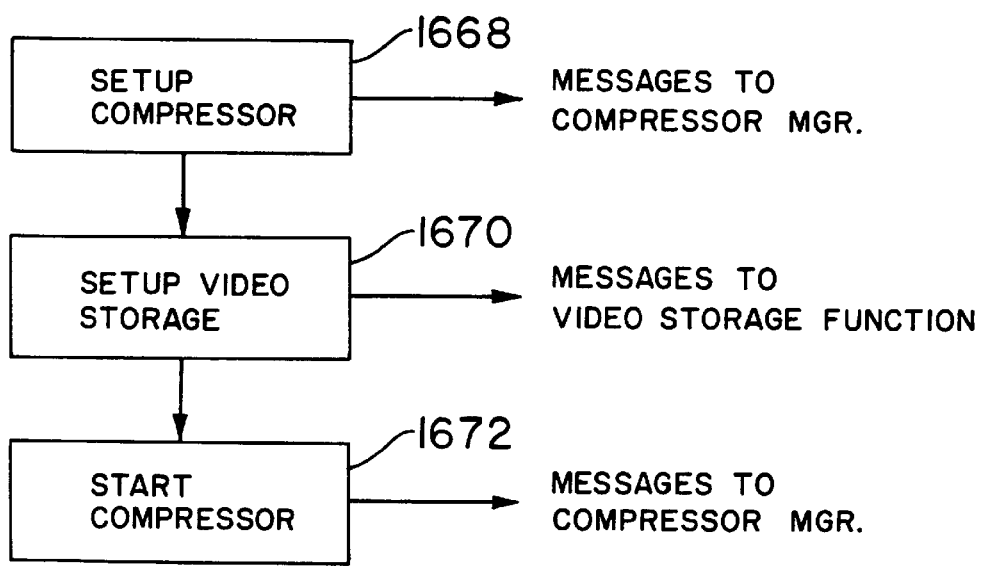
FIG. 72 VIDEO RECORD FUNCTION

ARCHIVE MGR.
(COMMAND HANDLING)

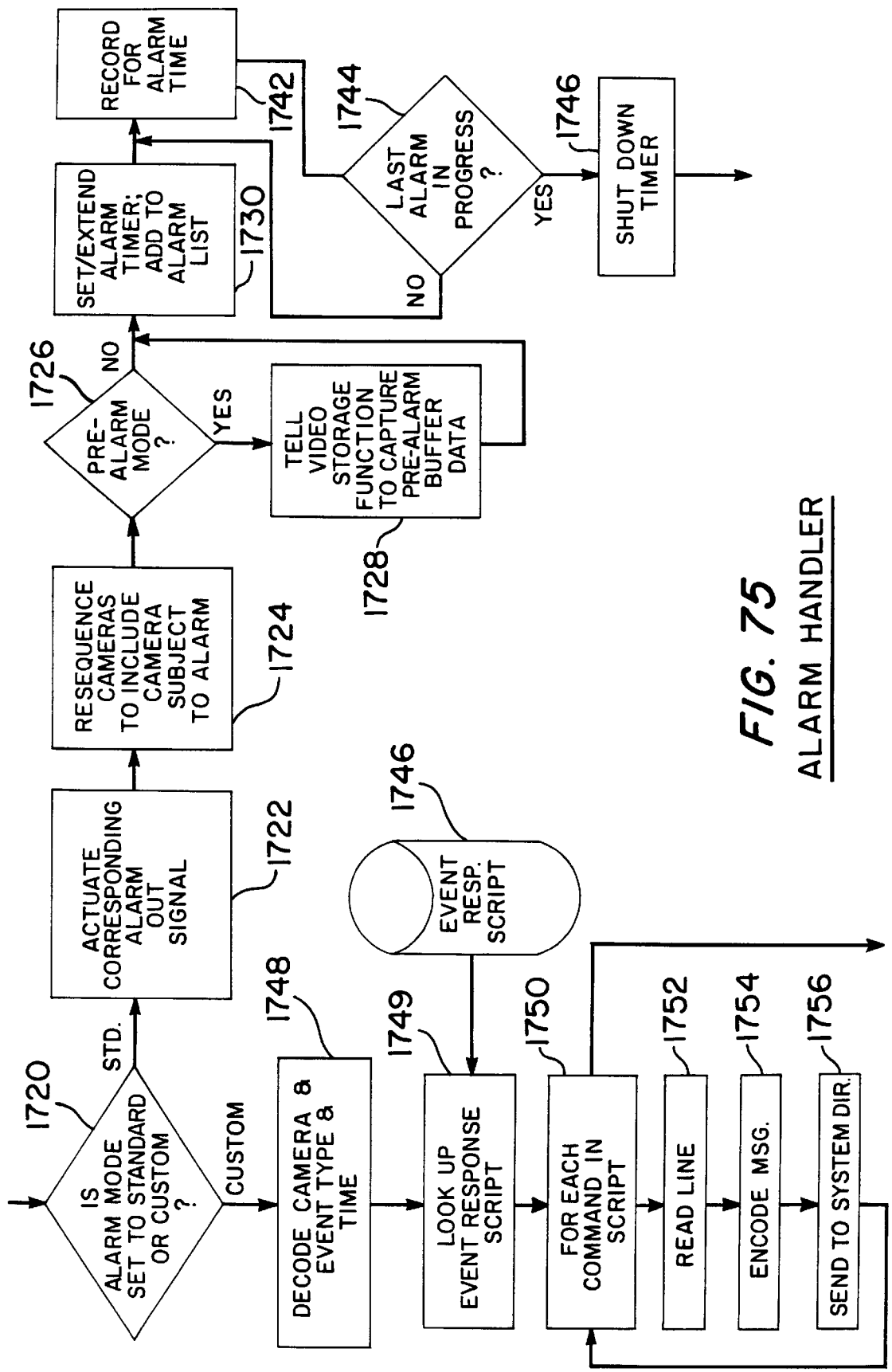
FIG. 75 ALARM HANDLER

USER INTERFACE

STANDARD FIELD
RECORDING SEQUENCE FOR ALARM CONDITION

IMAGE PROCESSING UTILITIES MGR.

SCHEDULING: SETUP: MAIN OPTIONS

SCHEDULING: HOLIDAY SETUP

DAY/NIGHT PARTITION

SCHEDULE QUEUE

SCHEDULE SCRIPT/TABLE

DAY/NIGHT PARTITION

SCHEDULING SETUP: OPTION SELECTION

GET OPERATING PARAMETERS
(SCHEDULING SETUP)

SCHEDULE EXECUTION

IMAGE ANALYSIS TOOLS-OVERVIEW

SELECT & SETUP ANALYSIS TOOL

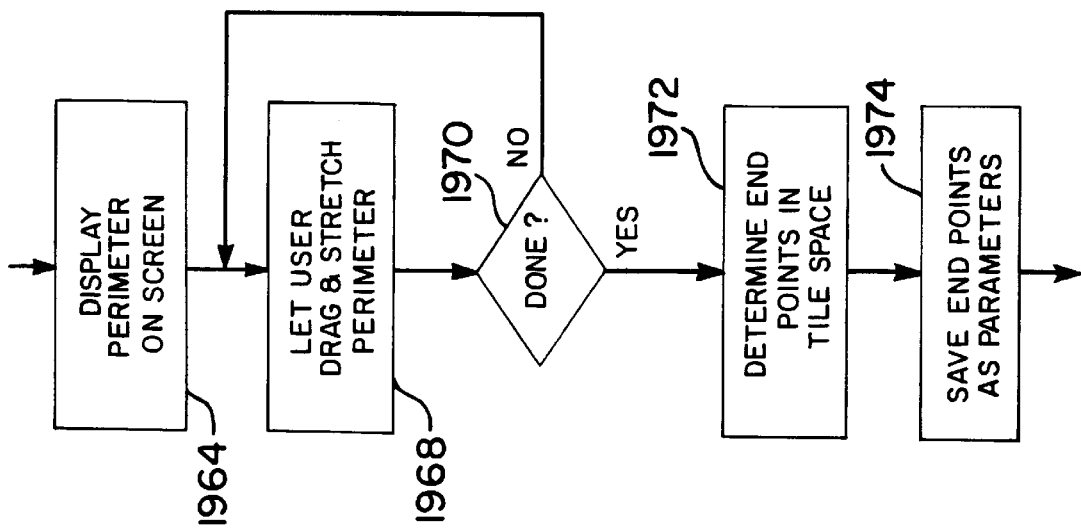
FIG. 90B PERIMETER TOOL: PARAMETER SETTING: CROSSING DIRECTION
FIG. 90A PERIMETER TOOL: PARAMETER SETTING: PERIMETER SIZE & LOCATION

PERIMETER TOOL:
PARAMETER SETTING:

PERIMETER TOOL:
PARAMETER SETTING:
OBJECT SIZE

LOADING ANALYSIS ENGINE

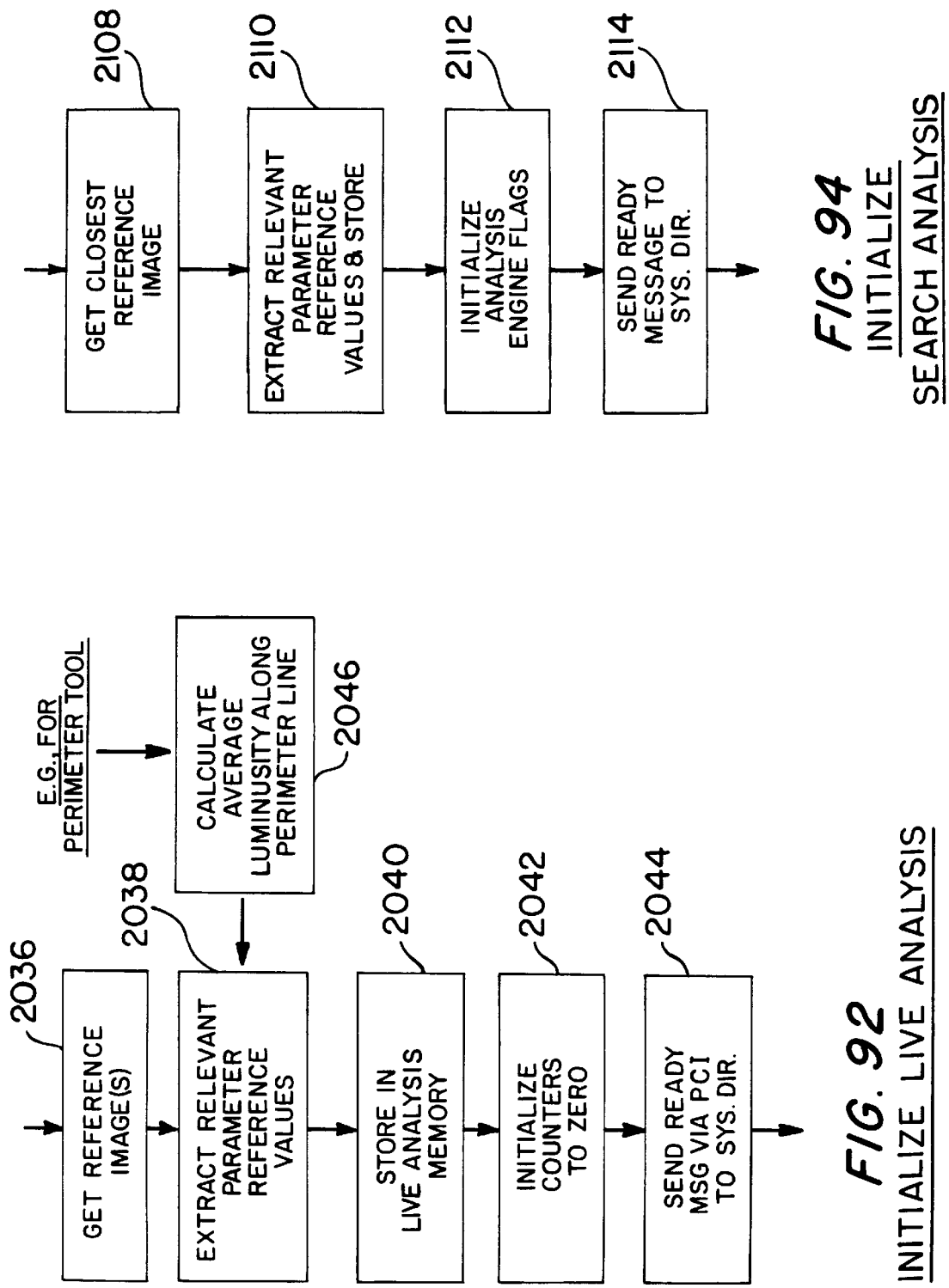

LIVE ANALYSIS OPERATION (PERIMETER TOOL)

(DSP-1)

(DSP-1)

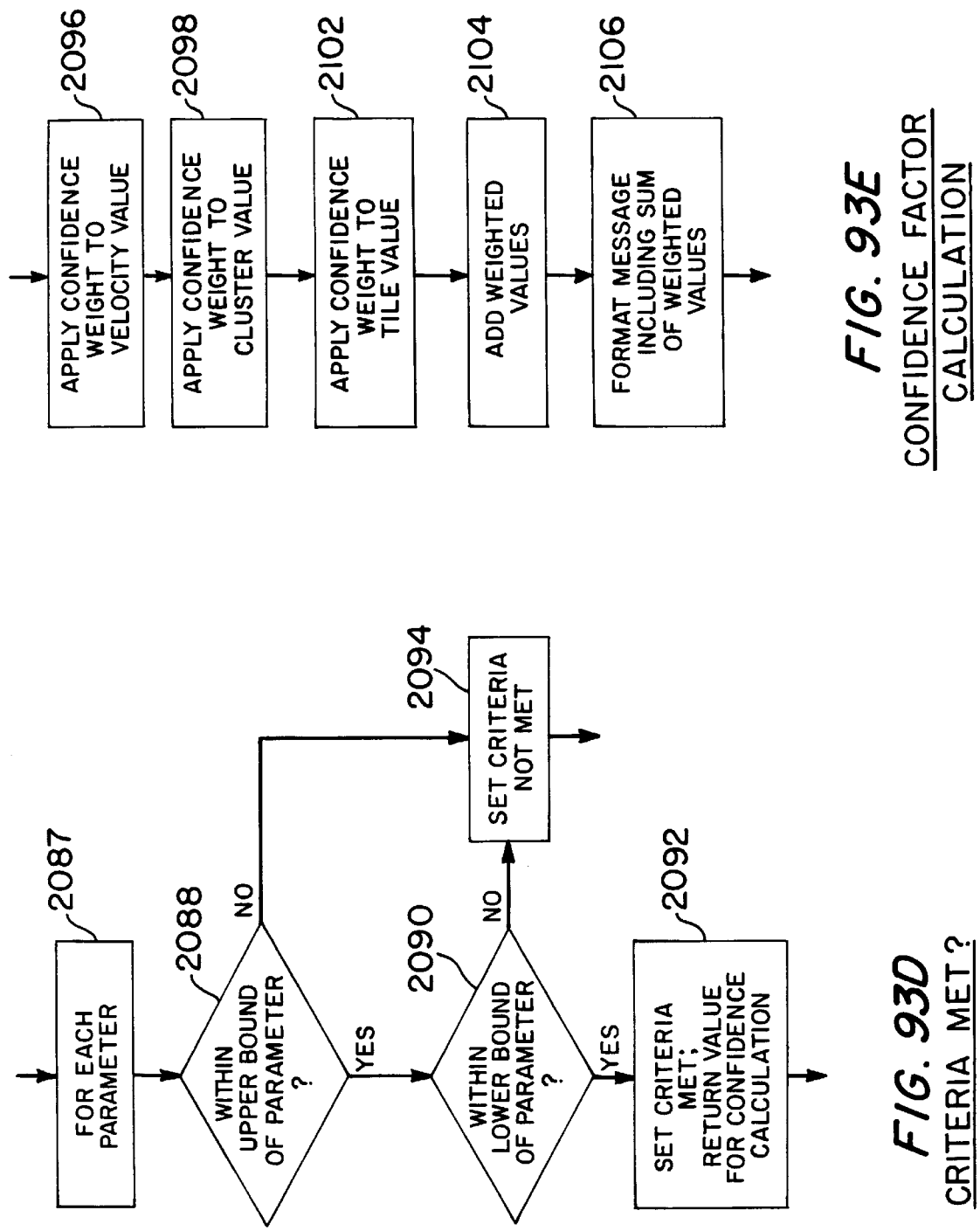

PLAYBACK ANALYSIS OPERATION

FEED 'CHANGED' TILE DATA

PLAYBACK ANALYSIS --
CURVE-FITTING EXAMPLE

PROCESSING THE 'MAYBE' CASE

PLAYBACK ANALYSIS: PERIMETER TOOL OPERATION

EVENT-ACTUATED LIVE ANALYSIS TOOL

'BLACK FILL' DECOMPRESSION

FIG. 101B VIDEO RESOLUTION – OPERATION

FIG. 101A VIDEO RESOLUTION – SETUP

SETTING COMPRESSION PARAMETERS

DOWNLOADING SEARCH TOOLS TO MULTIPLE SITES

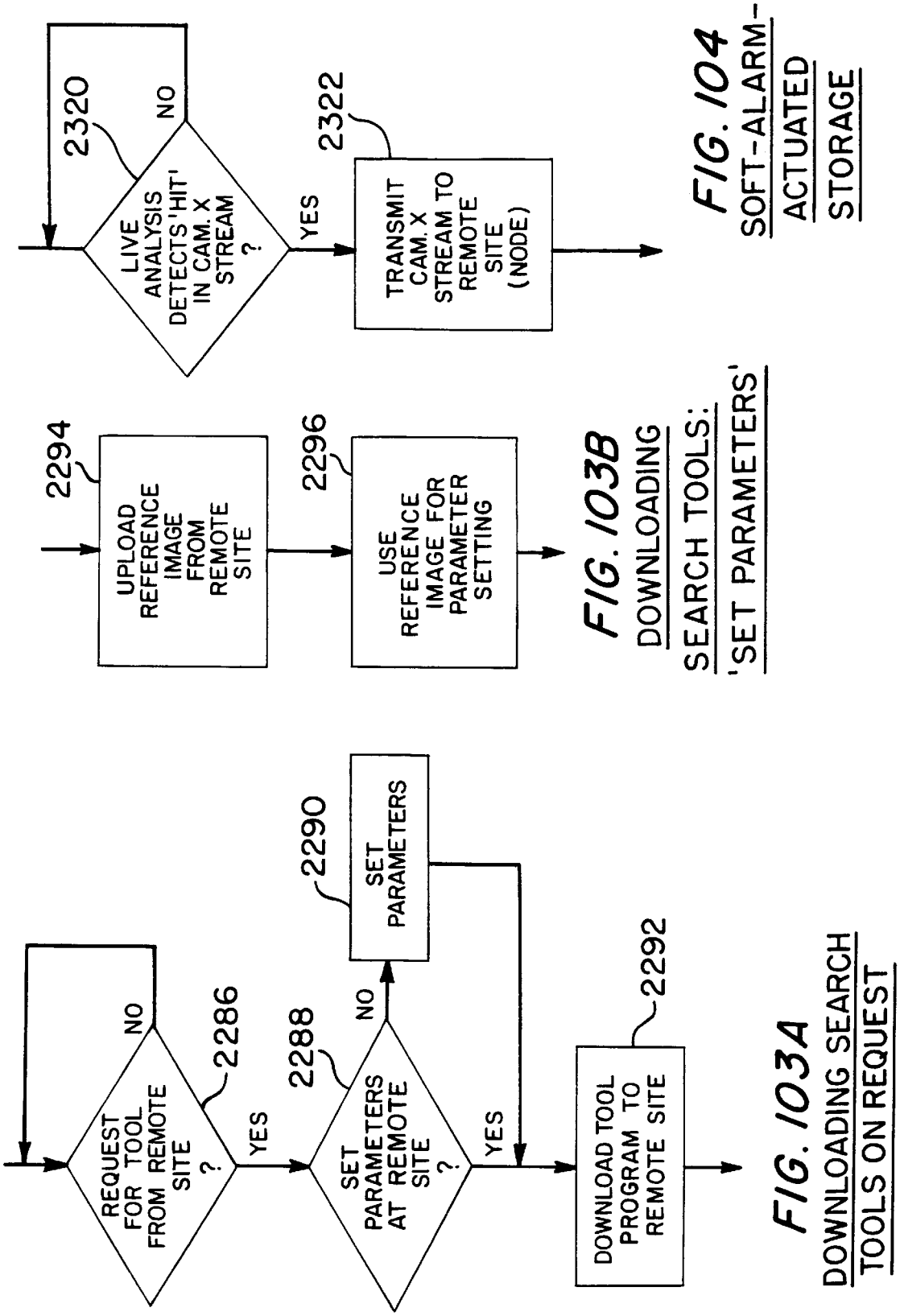

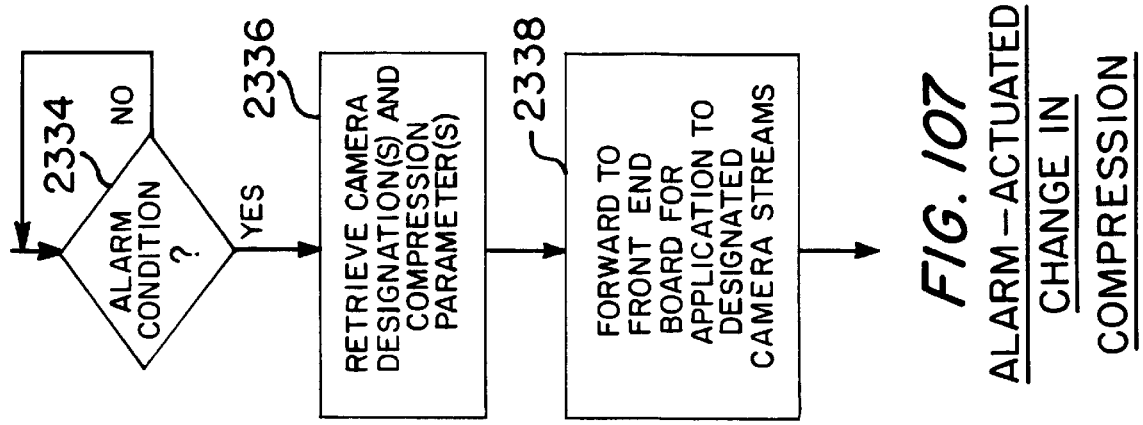
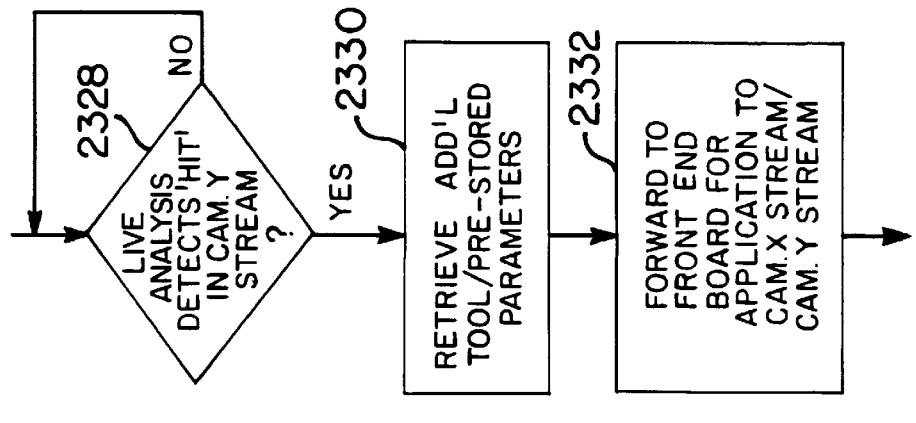
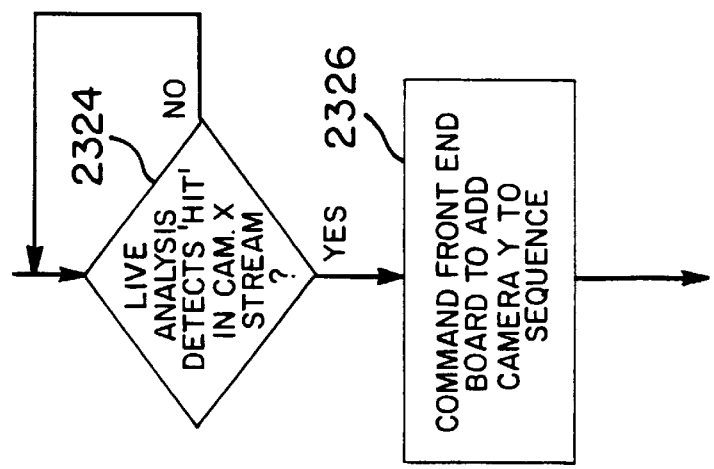

SOFT-ALARM-ACTUATED
CAMERA TARGETING

SOFT-ALARM-ACTUATED
ZOOM-IN

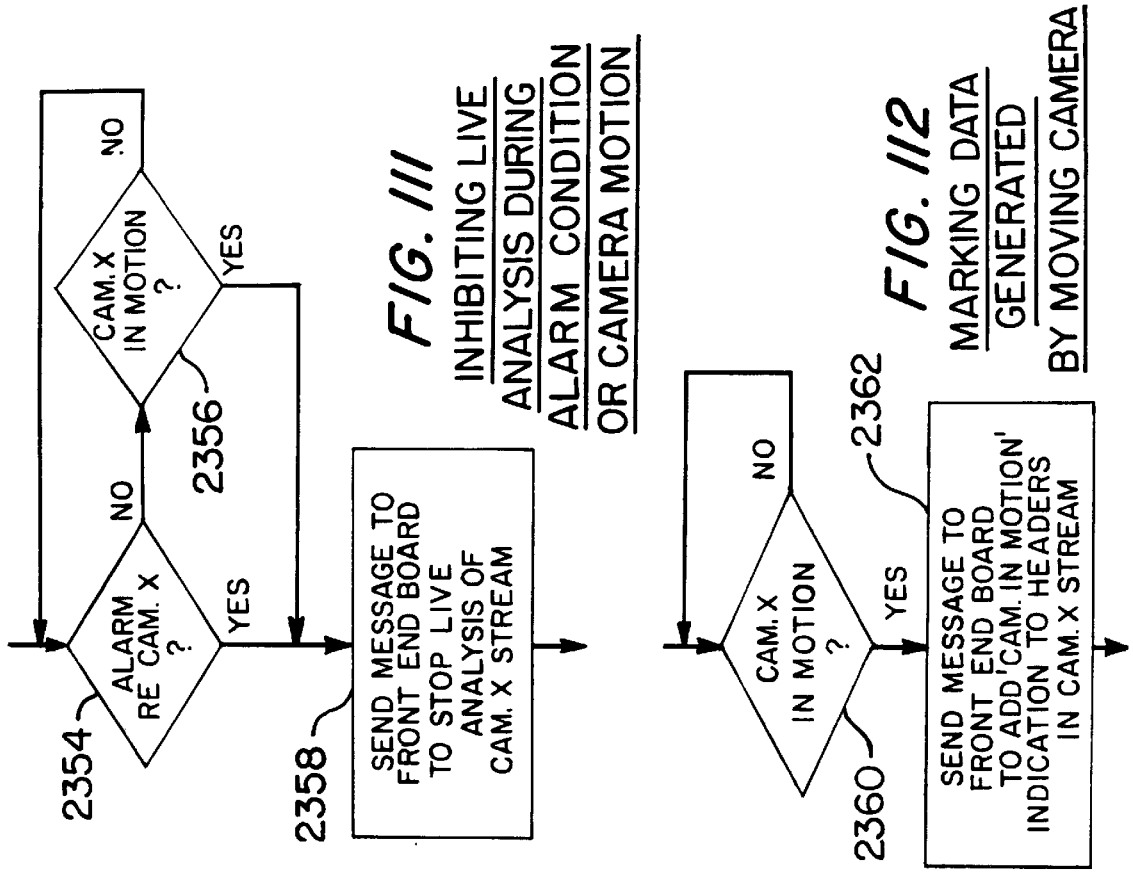
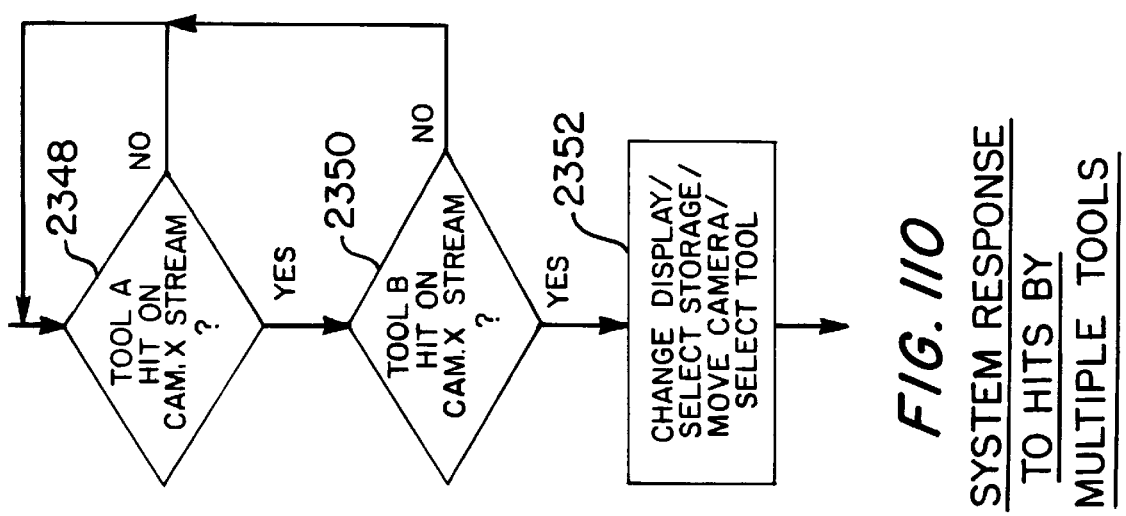

INHIBITING PLAYBACK ANALYSIS OF DATA GENERATED BY MOVING CAMERA

EVENT-SENSITIVE DISPLAY BUFFER UPDATING

VARYING COMPRESSION STREAM-BY-STREAM

ALARM-ACTUATED INCREASE IN AGGREGATE FIELD CAPTURE RATE

PRIORITIZING AMONG RECORDING/PLAYBACK/ ARCHIVING

BUILDING ARCHIVE TAPE DATABASE

ARCHIVING SEQUENCE

ARCHIVING SEQUENCE (ALTERNATIVE)

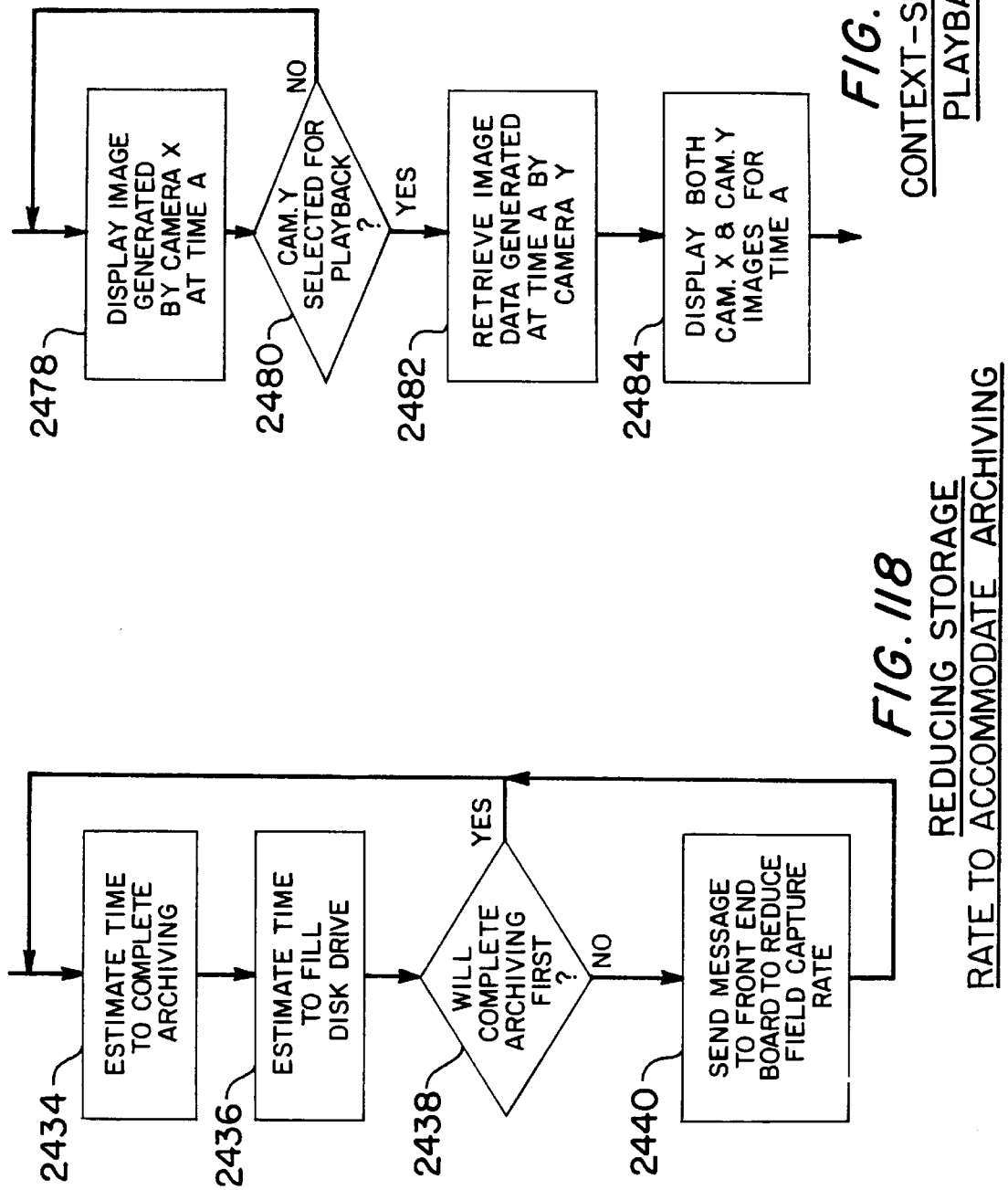

CAMERA AUTO-DIAGNOSIS

BUILD STATUS DISPLAY

SIMULTANEOUS RECORDING AND PLAYBACK

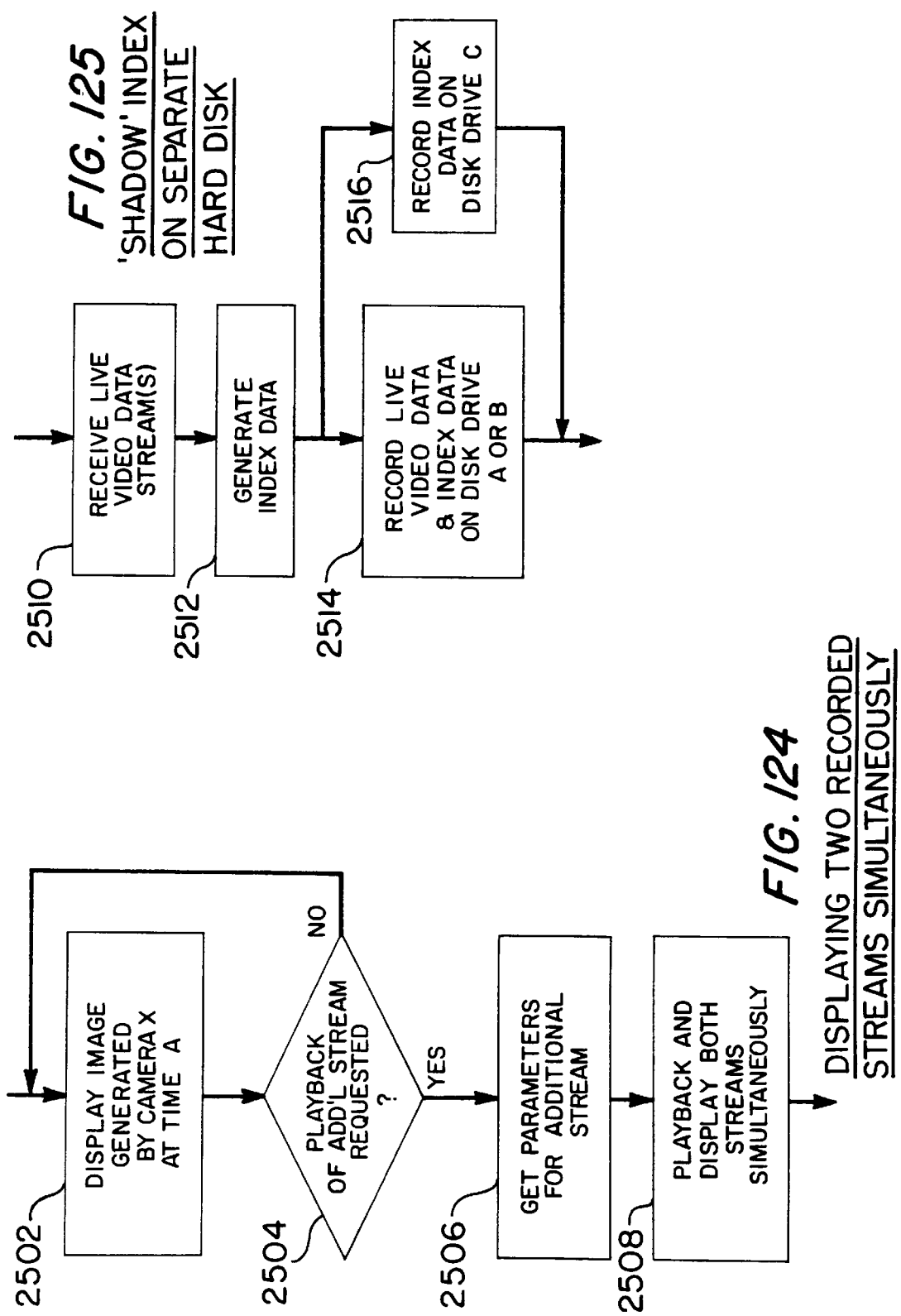

FULL-RATE PRE-ALARM BUFFERING DURING TIME-LAPSE RECORDING

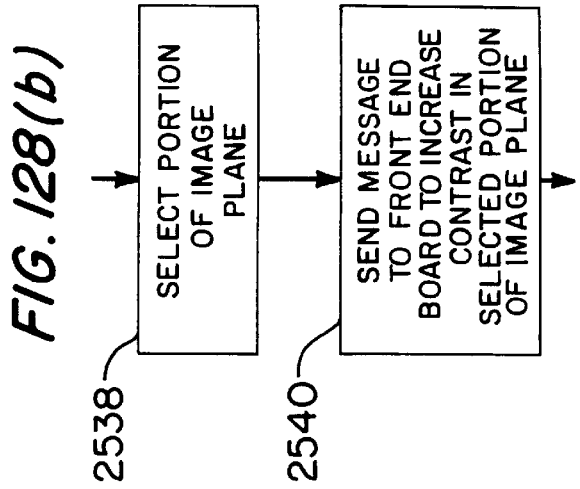
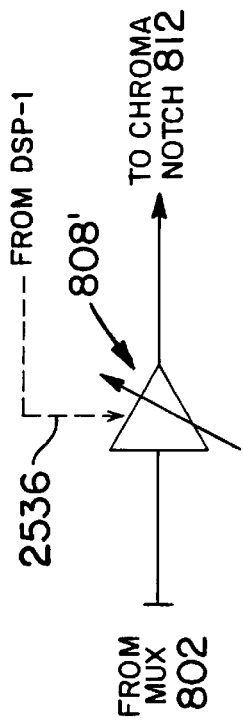
FIG. 128(a)
SELECTIVE CONTRAST ENHANCEMENT
FIG. 128(b)
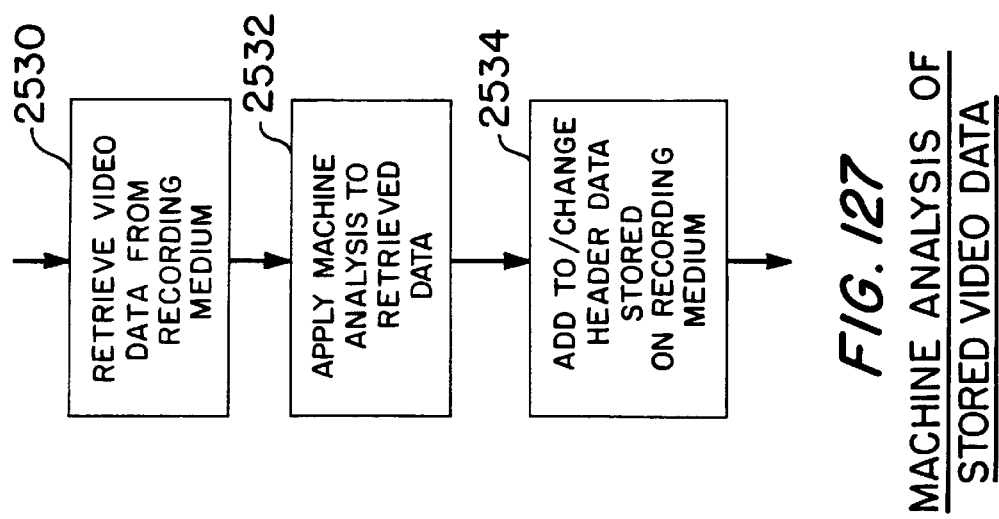
FIG. 127
MACHINE ANALYSIS OF STORED VIDEO DATA

Status

- Hard disk space available: 80 %
- Archive space available: 2 hours
- Alarms (reviewed today): 1
- Alarms (unreviewed today): 4
- Cameras connected: 16
- Cameras recording: 16

OK   Help

*FIG. 149*

Utilities

Select an Option:

- Transmit Data
- Create Reports
- Control Cameras

Cancel   Help

*FIG. 148*

MOTION DETECTION TOOL SETUP SCREEN

PERIMETER VIOLATION TOOL SETUP SCREEN

MUSEUM TOOL SETUP SCREEN

IMAGE PROCESSING UTILITY SCREEN

DATA IDENTIFICATION IN AN INTELLIGENT VIDEO INFORMATION MANAGEMENT SYSTEM

FIELD OF THE INVENTION

The present invention is related to closed circuit video security surveillance systems, but also is more generally concerned with application of machine intelligence to management, interpretation and use of video information. The system disclosed herein can therefore be referred to as an "intelligent video information management" (IVIM) system. The IVIM field has not hitherto been recognized as distinct from other related endeavors, and it is among the primary purposes of the present disclosure to teach fundamental principles of general application to the emerging art of intelligent video information management. The invention as claimed herein is particularly concerned with data identification techniques employed to support sophisticated information management capabilities.

BACKGROUND OF THE INVENTION

It is well known to provide video security systems in which video cameras are used to generate video signals representative of locations for which security surveillance is desired. In a typical system, some or all of the video signals are displayed on video screens for monitoring by security personnel. It is also known to record some or all of the video signals on videotape, either to provide evidentiary support for the observations of security personnel or in cases where "real-time" human monitoring of the signals is impractical or is not desired.

However, videotape suffers from serious drawbacks as a storage medium, particularly in view of the large quantity of video information generated by video security systems. A major concern is the sheer quantity of tapes to be stored, especially when it is desired to record signals generated by a large number of surveillance cameras. Moreover, in a large system many videotape recorders may be required, resulting in a large capital expenditure, and also the need for allocate space for the recorders. Another problem is the need to frequently change tape cassettes.

Retrieving information of interest from recorded tapes presents additional challenges. It is the nature of video surveillance that a large part of the tape-recorded video surveillance signal is of no interest whatsoever, since it typically represents a static image of a hall-way or the like. Finding a particular sequence representing a significant event can be extremely difficult and time-consuming, requiring tedious human review of hours or days of tape-recorded signals.

There have been a number of attempts to overcome these disadvantages, but so far with limited success, or at the cost of additional drawbacks. For example, it is known to use "quad multiplexers" to combine signals from four video cameras into a single dynamic image, having four quadrants each dedicated to a respective one of the cameras. The resultant space-multiplexed signal can then be recorded, realizing a four-to-one compression ratio in terms of required storage capacity. However, the multiplexed image suffers from a corresponding loss of spatial resolution, which may impair the value of the recorded images as evidence or may interfere with subsequent review. Also, recording of multiplexed images does not address the problems involved in finding sequences of interest on the recorded tapes.

It is also known to record the surveillance video signals selectively in response to input from a human operator who is monitoring the signals or in response to signals generated by sensor devices arranged to detect events such as opening of doors or windows. This technique reduces the total information to be recorded, while preventing storage of much uninteresting information, but at the risk of failing to record significant events which cannot readily or timely be detected by sensors or human operators. Also, reliance on external input can result in unreliability and increased expense, particularly where human operators are to initiate recording.

The OPTIMA II video surveillance multiplexer introduced by the assignee of the present application employs a more sophisticated technique for culling out uninteresting information prior to storage. In the OPTIMA II multiplexer respective streams of video image information are received from a plurality of cameras and a combined stream of images is formed by time-division multiplexing of the images from the cameras. The combined stream is then output to a conventional videotape recorder for storage on tape. The OPTIMA II multiplexer applies motion detection analysis to the respective input streams and adaptively allocates the "time slots" in the output stream by allocating a larger number of slots to images from an input stream in which motion is detected. In this way, a relatively large portion of the system's storage capacity is allocated to image streams which contain moving objects and are therefore more likely to include useful information.

The OPTIMA II multiplexer represents a significant advance over conventional tape-based surveillance video storage techniques, but still greater efficiency and flexibility are to be desired.

The "MultiScop" video disc recorder sold by Geutebruck GmbH is an application of digital recording to the problem of storing video surveillance information. The MultiScop system employs the above-mentioned selective recording technique to minimize recording of "uninteresting" information. In addition, some redundant information is excluded from recording by use of a conventional digital image compression technique. Random access to stored information, based on date and time indexing, or based on indexing indicative of an externally sensed alarm condition, provides a modest improvement over conventional tape-based systems in terms of convenience in retrieving stored video.

However, greater efficiency and flexibility than are provided by the MultiScop system are to be desired. In particular, it would be most useful to exclude uninteresting information from recording while minimizing the chance of missing significant information. Also more efficient information retrieval techniques are needed.

OBJECTS AND SUMMARY OF THE INVENTION

It is an object of the invention to provide techniques for identifying, marking and indexing respective portions of video information to support flexible and efficient storage and retrieval of the video information.

According to an aspect of the invention, there is provided a video information analysis apparatus, including a storage device for storing a video information database, and an analysis circuit for analyzing video information in the database in accordance with a predetermined analysis algorithm, the algorithm being for assigning to respective portions of the video information analysis scores each indicative of a degree to which the respective portion of the video information represents a predetermined analysis feature, each analysis score being a value within a predetermined range of values which may encompass 256 values (indicated by an eight-bit analysis score). The apparatus may also include a selection mechanism for selecting a specific one of the range of values, and a search circuit for identifying portions of the video information having analysis scores greater than or equal to the selected one of the range of values.

According to another aspect of the invention there is provided a video information storage apparatus, including circuitry for receiving video information, a circuit for analyzing the received video information to detect a predetermined feature in the received video information, and for generating a detection signal indicative of the detected feature, a memory device for storing the received video information, and circuitry for storing the detection signal as an index signal in association with the stored video information. The memory device may include a facility for storing the received video information in the form of digital data, with the stored video information being in the form of plural frames of video data, each frame of video data having header data stored in association with the frame of video data, and the index signal being included in the header data. The apparatus may also include a facility for reading the stored index signal, and a facility for retrieving from the memory device a selected portion of the stored video information in accordance with the index signal read by the reading facility.

According to still another aspect of the invention, there is provided a video information storage apparatus, including a storage device for storing video information, circuitry for retrieving the stored video information from the storage device, circuitry for analyzing the retrieved video information to detect a predetermined feature in the retrieved video information, and for generating a detection signal indicative of the detected feature, and circuitry for transmitting the detection signal to the storage device to store the detection signal as an index signal in association with the stored video information. Assuming that the video information is stored in the form of digital data, and includes plural frames of video data, header data is stored with each frame of video data and includes an index signal generated by the analysis circuitry. The header may include separate index signals generated by analyzing the video information both before and after storage.

According to still a further aspect of the invention, there is provided a method of operating an apparatus for storing and retrieving video data, the method including the steps of storing a plurality of frames of video data on a first hard disk, storing index data on the first hard disk, the index data including data indicative of respective times at which the frames of video data were generated and respective locations on the first hard disk at which frames of video data are stored, and storing the index data on a second hard disk. A desired frame of video data stored on the first hard disk may be searched on the basis of index data read out from the second hard disk. Further, a quantity of video data read out from the first hard disk may be cached (i.e., temporarily stored) on the second hard disk.

The above described storage and retrieval techniques may be applied to plural streams of video signals each generated by a different respective video cameras and stored together on the first hard disk, in which case the index data is indicative of the respective camera which generated each frame of video data.

According to yet another aspect of the invention, there is provided a video data storage apparatus, including a video data source for providing a dynamic stream of video data frames, a data memory device for storing the dynamic stream of video data frames provided by the video data source, and a control device for designating a main portion of the data memory device, the main portion being for recording the dynamic stream of video data frames at a first frame rate, the control device also designating a buffer portion on the data memory device, the buffer portion being for recording the dynamic stream of video data frames at a second frame rate that is higher than the first frame rate. The data memory device may be a hard disk drive including a hard disk, and the apparatus may further include a detection device for detecting an alarm condition. The control device may designate the buffer portion of the data memory device by maintaining a pointer indicative of where the buffer portion is located in the data memory device, and may respond to detection of the alarm condition by the detection device by changing a value of the pointer, so that the buffer portion is thereby moved to a new location in the data memory device.

According to yet a further aspect of the invention, there is provided a data storage medium on which is stored video data representing a plurality of video image frames, frame identification data indicative of respective times at which the video image frames were generated, and characteristic data indicative of respective characteristics of the video image frames represented by the video data, the respective characteristics having been detected by applying an image analysis algorithm to the video data. The characteristic data may include first sub-data indicative of a type of characteristic represented by the characteristic data, and second sub-data indicative of a degree to which a respective video image frame exhibits the type of characteristic represented by the characteristic data. The image analysis algorithm may have been applied to the video data before the data was stored on the storage medium or may have been applied to the video data by reading the video data from the storage medium. The characteristic data may include first characteristic data generated by applying a first image analysis algorithm to the video data and second characteristic data generated by applying a second image analysis algorithm, different from the first image analysis algorithm, to the video data. There may also be stored on the data storage medium audio data indicative of audio signals generated at times when the video image frames were generated. Video data representative of respective streams of video image frames generated by a plurality of video cameras may also be stored on the data storage medium, together with data identifying the respective one of the plurality of video cameras which generated each of the video image frames. The storage medium may be a hard disk, a magnetic tape (including a helical-scan magnetic tape) or other types of data storage media.

According to still another aspect of the invention, there is provided a video information storage apparatus, including a video camera for generating a stream of dynamic images, a storage device for storing respective video data portions each of which represents an image from the stream of dynamic images, each video data portion including header data, a mechanism for moving the video camera to change a field of view of the video camera, and a control device for providing control signals to the movement mechanism to control movement of the video camera, the control device being connected to the storage device to provide to the storage device signals indicative of times when the control device is causing the camera to be moved, the storage device responding to the signals provided thereto, by including a motion signal in the header data included in the video data portions corresponding to images generated at the times when the camera is being moved, the motion signal indicating that the respective image was taken by the camera when the camera was moving.

The apparatus provided in accordance with this aspect of the invention may further include circuitry for retrieving the stored video data portions from the storage device, an analysis circuit for analyzing the retrieved video data portions to detect a predetermined feature in the images represented by the retrieved video data portions, and for generating a detection signal indicative of the detected feature, circuitry for transmitting the detection signal to the storage device to store the detection signal as an index signal in association with the stored video data portions, and inhibit circuitry for reading the movement signal included in the header data of respective ones of the stored video data portions and for inhibiting the analysis circuitry from analyzing the respective ones of the stored video data portions for which the movement signal is included in the respective header data. The predetermined feature to be detected by the analysis circuitry may be a moving object represented by the stream of dynamic images.

According to still another aspect of the invention there is provided a method of transmitting and displaying video information, including the steps of receiving a plurality of streams of video information each generated by a respective video camera, transmitting the plural streams of video information to a display device field-by-field, and displaying each of the plural streams of video information in a respective display window on a display screen, the transmitting step including appending, to each field of the plural streams of video information, header data which includes data indicative of the one of the display windows in which the field is to be displayed. The appended header data may also include data for identifying the one of the video cameras which generated the field.

According to still another aspect of the invention, there is provided a method of storing video information, including the steps of recording plural fields of video data on a recording medium, each of the fields of video data representing a respective image, recording on the recording medium, in association with each of the fields of video data, header data including data indicative of a source of the image represented by the respective field, reproducing from the recording medium the recorded fields of video data, processing the reproduced fields of video data to obtain a processing result, and, on the basis of the processing result, recording processed result data on the recording medium in the header data for at least one of the reproduced fields of video data.

The processing step may include applying a moving image content analysis algorithm to the reproduced fields of video data, in which case the analysis algorithm may be for detecting moving objects represented by the reproduced fields of video data, and the processed result data would constitute data indicative of detection of the moving object. The recording medium may be a hard disk, and the header data may include data for identifying a camera which generated the respective field of video data, and data indicative of a time at which the field of video data was generated.

The foregoing and other objects, features and advantages of the invention will be further understood from the following detailed description of preferred embodiments and practices thereof and from the drawings, wherein like reference numerals identify like components and parts throughout.

BRIEF DESCRIPTION OF THE DRAWINGS

FIG. 1 presents in block diagram form an overview of a distributed intelligent video information management system provided in accordance with the invention.

FIG. 8 is an isometric view of a structural support assembly provided within the VR/PC unit for the purpose of supporting disk drive units and the like.

FIG. 19 shows some details of a video output control function shown in FIG. 15.

FIGS. 20A and 20B represent, respectively, raster-scan and rectangular tile formats of an image plane (field) of video data formed in the VR/PC unit.

FIG. 21 illustrates a rectangular tile format employed in the VR/PC unit.

FIG. 22 represents the format of a minimum coding unit (MCU) employed in the VR/PC unit.

FIG. 23 represents a 4:1:1 color video data format employed in the VR/PC unit.

FIG. 24 is indicative of a color data format used for each MCU.

FIG. 25 is a pictorial representation of a first mode of transmitting video data on a video bus shown in FIG. 14.

FIG. 26 pictorially represents a second mode of transmitting video data on the video bus.

FIG. 27 pictorially represents a third mode of transmitting video data on the video bus.

FIG. 28 pictorially represents a data format for raster-scan lines of video data transmitted on the video bus.

FIG. 29 is a pictorial representation of a format for video data tiles transmitted on the video bus.

FIG. 30 indicates a format for header data bits included in headers for fields of video data transmitted on the video data bus.

FIG. 31 indicates in functional block form processing performed by an output control logic block shown on FIG. 19.

FIG. 31A represents, as a flow diagram, processing performed by the output control logic block of FIG. 31 for the purpose of forming field header data.

FIG. 31B illustrates in flow diagram form processing performed by the output control logic block of FIG. 31 for the purpose of using line and tile header data to control line and tile output operations.

FIG. 32 illustrates in flow diagram form processing performed by the output control logic block of FIG. 31 for the purpose of generating raster-scan lines of video data.

FIG. 33 illustrates in flow diagram form processing performed by the output control logic block of FIG. 31 for the purpose of forming rectangular tiles of video data.

FIG. 35 is a state machine diagram which represents operation of the output control logic block of FIG. 31.

FIG. 36 is a schematic block diagram representation of a digital signal processing chip, and associated circuitry, which together perform control functions for the video front end processing, and initial processing with respect to video data compression.

FIGS. 41A and 41B together form a flow-chart representation of the compressor manager module of the software for the control DSP.

FIG. 43A is a pictorial representation of a video data tile format utilized in the present invention.

FIGS. 43B and 43C pictorially represent division of the video data tile format of FIG. 42A into quadrants, and a checker-board subsampling pattern applied to the data elements in each quadrant.

FIG. 46A is a COM (Component Object Model) representation of the system director module of the motherboard CPU software.

FIG. 46B is a COM representation of a generalized form of other components of the CPU software.

FIG. 47 is a flow-chart representation of the security manager software module for the motherboard CPU.

FIG. 50 shows in flow-chart form a setup manager software module for the motherboard CPU.

FIG. 51 illustrates video data and index data formats utilized by the VR/PC unit in storing video data on the hard disk provided therein.

FIG. 60 illustrates in flow-chart form the portion of the process of FIG. 59 which relates to decoding of certain blocks of video data.

FIG. 61 is a pictorial representation of a technique used in the VR/PC unit for reconstituting a field of compressed video data.

FIG. 64 is a pictorial illustration of a technique used for reconstituting compressed video data when the VR/PC is operated to provide a reverse-direction playback function.

FIG. 66 illustrates in flow-chart form the "build backward history buffer" blocks of FIG. 65.

FIG. 67 is a flow-chart representation of the processing employed to decompress and re-code reference image data as part of the reverse direction decompression process.

FIG. 68 illustrates in flow-chart form the "decompress & re-code tile" block of FIG. 67.

FIG. 72 illustrates processing carried out by the motherboard CPU in connection with initiating recording of incoming video data on a hard disk of the VR/PC unit.

FIG. 73 illustrates processing carried out by the archive manager software module in connection with handling search requests.

FIG. 75 illustrates processing carried on by the motherboard CPU in response to an indication of an alarm condition.

FIGS. 90A–90D are flow-charts representing parameter setting operations in connection with a perimeter violation detection image analysis tool provided in the system disclosed herein.

FIG. 92 illustrates in flow-chart form an initialization phase of an image analysis algorithm performed on an incoming video image.

FIG. 94 is a flow-charts illustrating initialization steps carried on in connection with image analysis applied to a reproduced video image stream.

FIGS. 102A and 101B illustrate in flow-chart form system operations which permit a user to adjust video display time resolution and/or space resolution settings.

FIGS. 103A–103C are flow-charts illustrating system operations in connection with downloading of image analysis algorithms from one system device to another.

FIG. 104 is a flow-chart illustrating selective transmission of an incoming video stream in response to a condition detected by a live video analysis algorithm.

FIG. 105 is a flow-chart illustrating a change in camera-stream storage sequencing in response to detection of a predetermined characteristic by a live video analysis algorithm.

FIG. 106 illustrates in flow-chart form actuation of a second live video stream analysis algorithm in response to detection of a predetermined characteristic by a first live video analysis algorithm.

FIG. 107 is a flow-chart which illustrates an automatic change in a video data compression parameter in response to detection of an alarm condition.

FIG. 110 is a flow-chart which illustrates operation of the system to take a predetermined action when respective predetermined conditions are detected by two different live video analysis algorithms.

FIG. 111 is a flow-chart which illustrates operation of the system to inhibit live video stream analysis when the camera providing the video stream is in motion or an alarm condition is detected.

FIG. 112A is a flow-chart illustrating operation of the system to inhibit application of an image analysis algorithm to a reproduced video stream that was generated by a moving camera.

FIG. 113 is a flow-chart which illustrates operation of the system to increase aggregate field through-put rate when an alarm condition is detected.

FIG. 114 is a flow-chart illustrating operation of the system to provide for compression parameters that vary among different incoming video data streams.

FIG. 115 is a flow-chart illustrating operation of the system to vary a display-buffer updating technique in dependence upon whether an alarm condition is detected.

FIG. 116 is a flow-chart which illustrates system priorities with respect to recording, reproduction and archiving of video data streams.

FIGS. 117A and 117B are flow-charts which respectively illustrate alternative archiving operational modes of the system.

FIG. 118 is a flow-chart illustrating operation of the system to reduce the rate at which incoming video signals are stored in order to prevent over-running of an archiving operation.

FIG. 119 is a flow-chart illustrating operation of the system to store data relating to previously archived video signals.

FIG. 120 is a flow-chart illustrating operation of an automatic camera diagnosis function.

FIG. 121 is a flow-chart which illustrates operation of the system to provide a system status display to the user.

FIG. 122 is a flow-chart illustrating operation of the system to automatically search for and display a reproduced video stream generated contemporaneously with a currently displayed reproduced video stream.

FIG. 123 illustrates, in the form of a flow-chart, operation of the system for simultaneously recording incoming video signals while displaying a reproduced video image stream.

FIG. 124 is a flow-chart illustrating operation of the system to simultaneously display two reproduced video image streams.

FIG. 125 is a flow-chart illustrating operation of the system to record video data indexing information simultaneously on two different hard disks.

Figure 126:
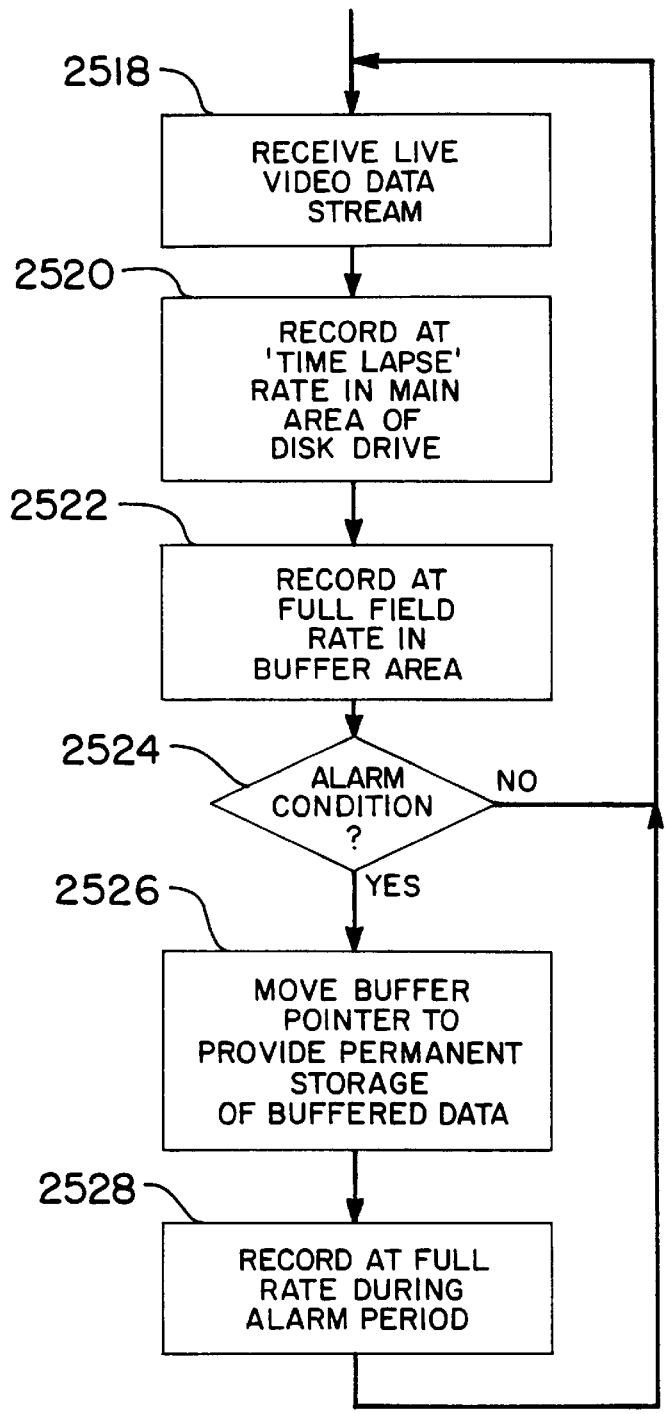

FIG. 126 is a flow-chart illustrating operation of the system to provide pre-alarm buffering with respect to a video image stream that is being recorded at a time-lapse rate.

FIG. 127 is a flow-chart showing operation of the system to change and/or supplement video data header information on the basis of a machine analysis of reproduced video information.

FIGS. 128(a) and (b) are together illustrative of a user-operable image enhancement utility.

Figure 129:
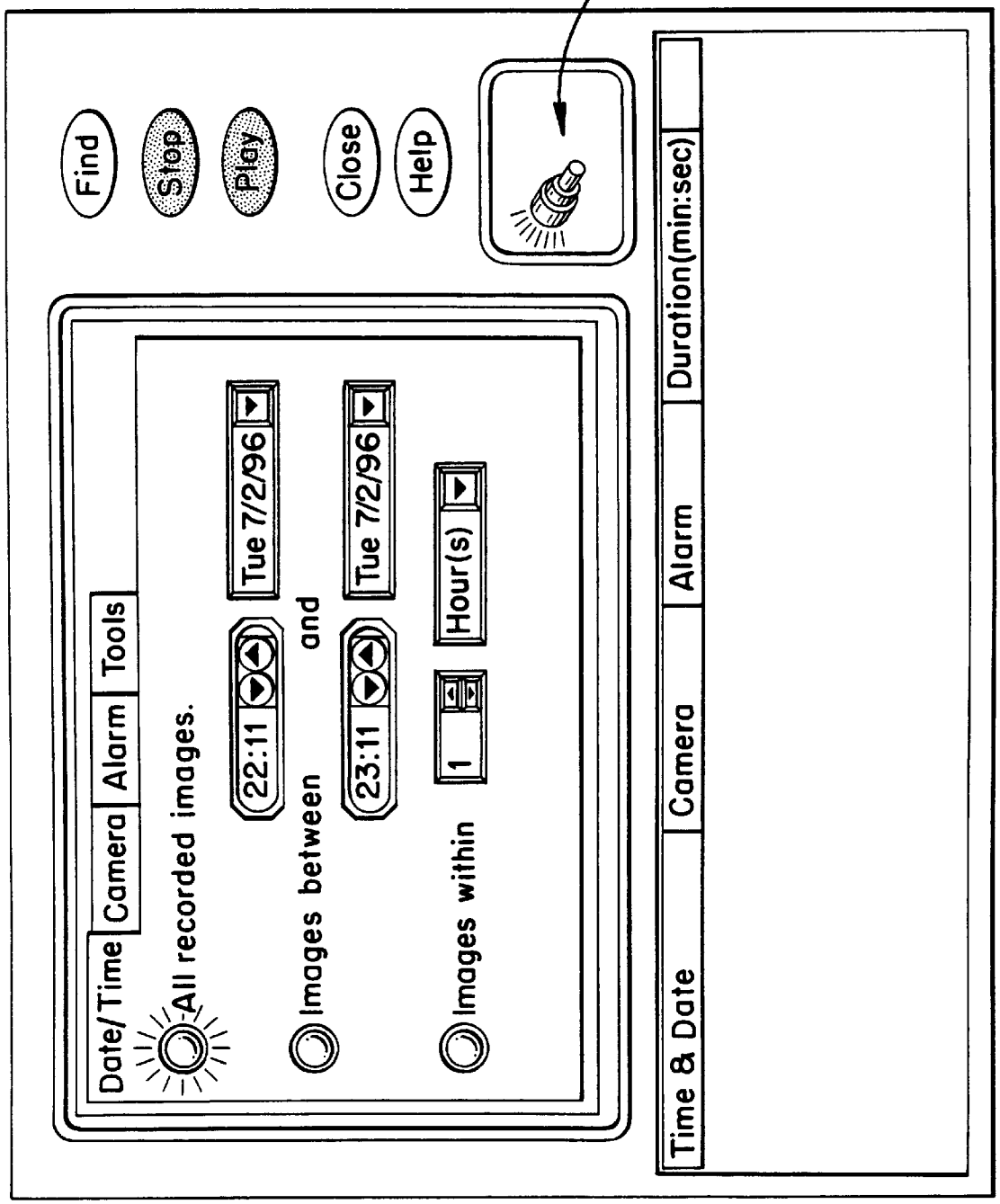

FIG. 129 is a screen display presented to a user in connection with searching for recorded video information.

Figure 130:
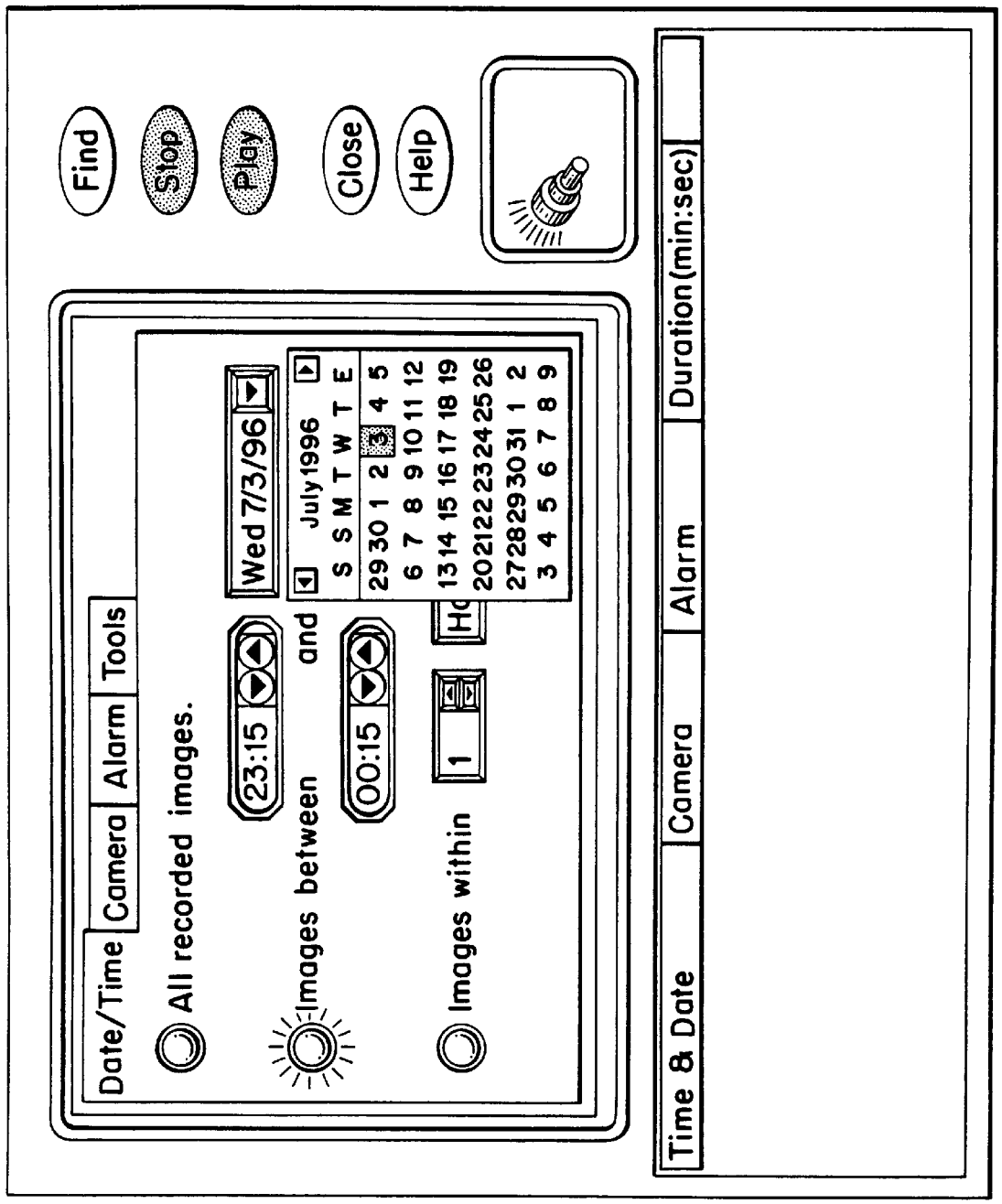

FIG. 130 is a screen display presented to a user in connection with searching for recorded video information.

Figure 131:
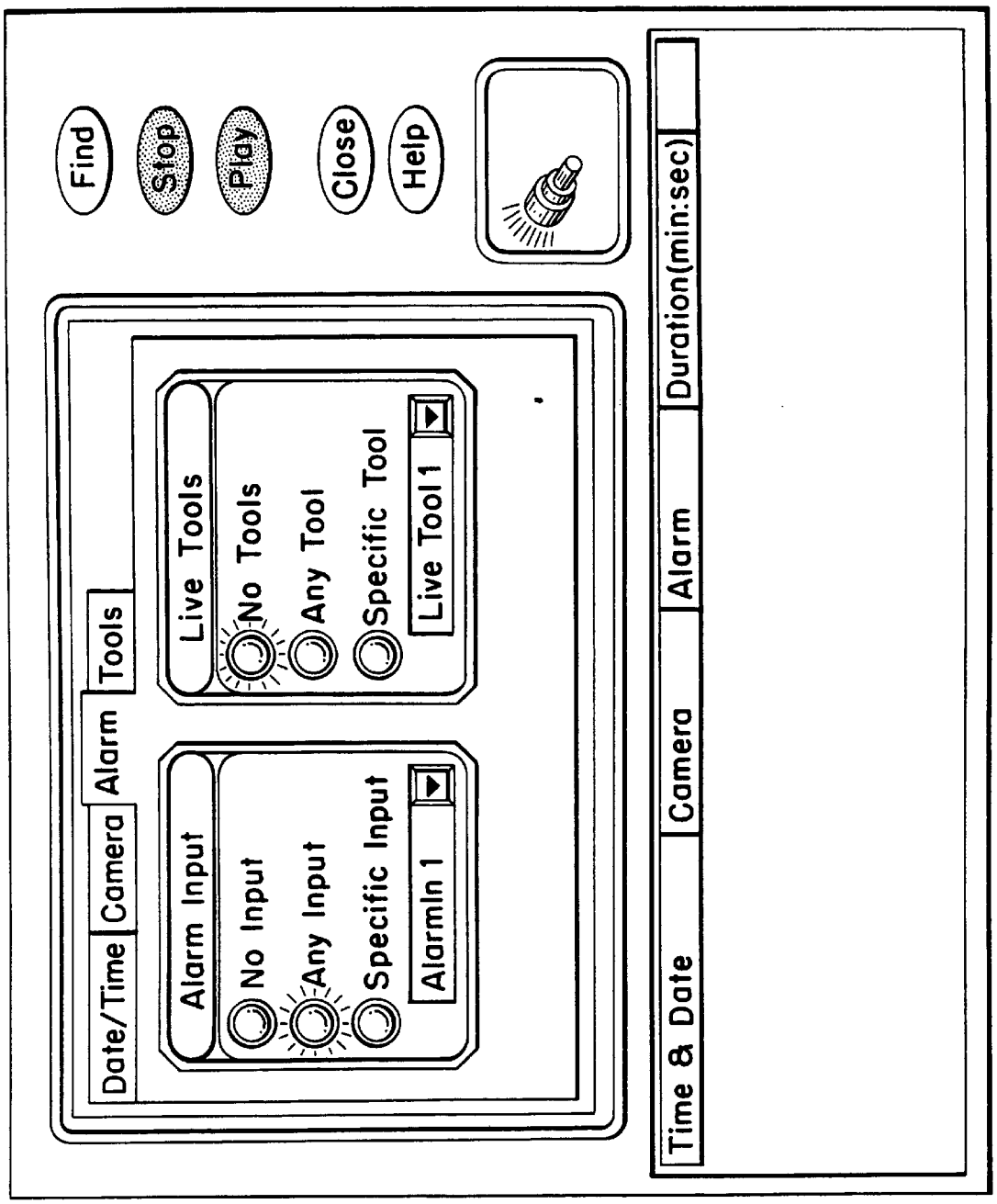

FIG. 131 is a screen display presented to a user in connection with searching for recorded video information.

Figure 132:
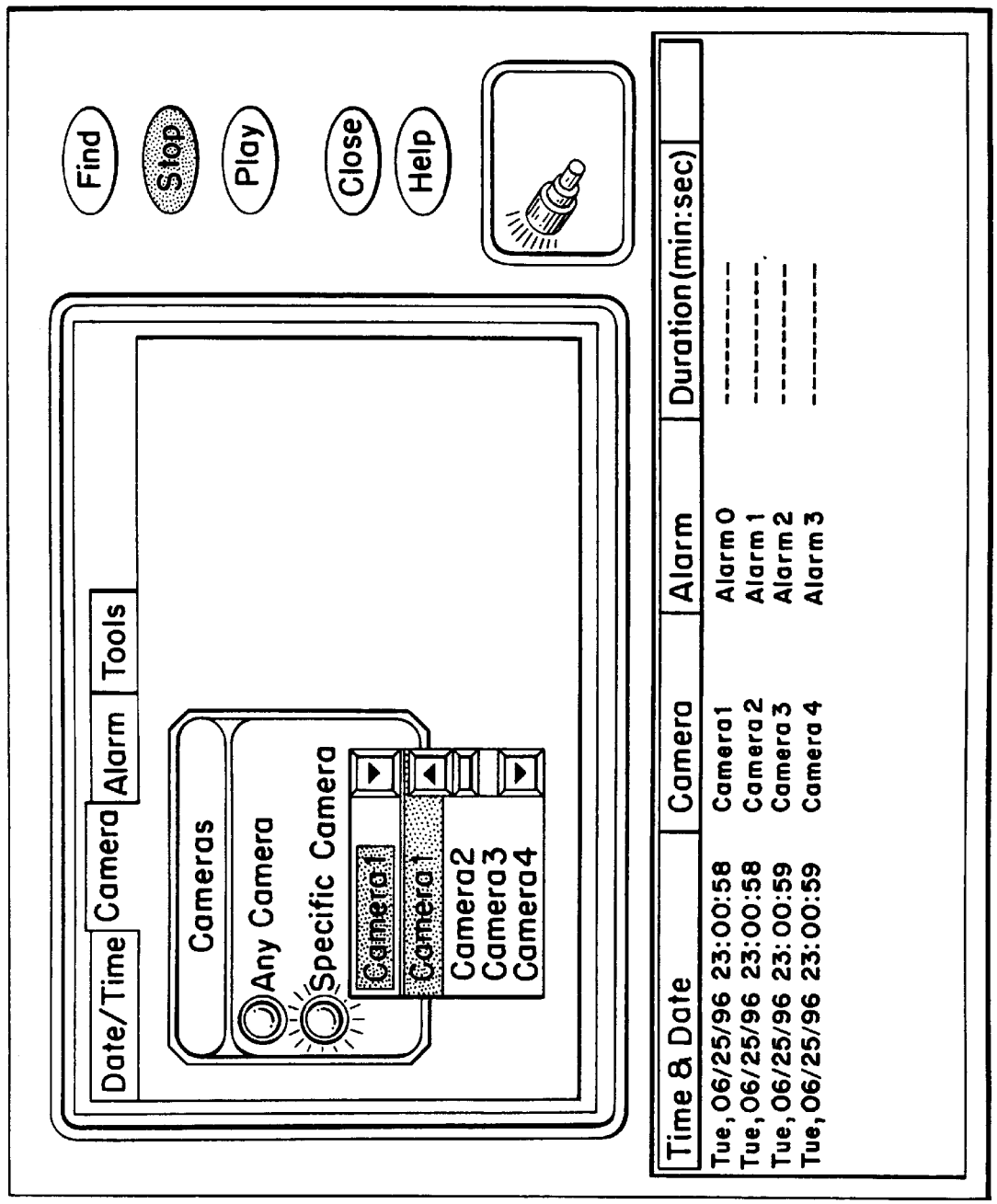

FIG. 132 is a screen display presented to a user in connection with searching for recorded video information.

Figure 133:
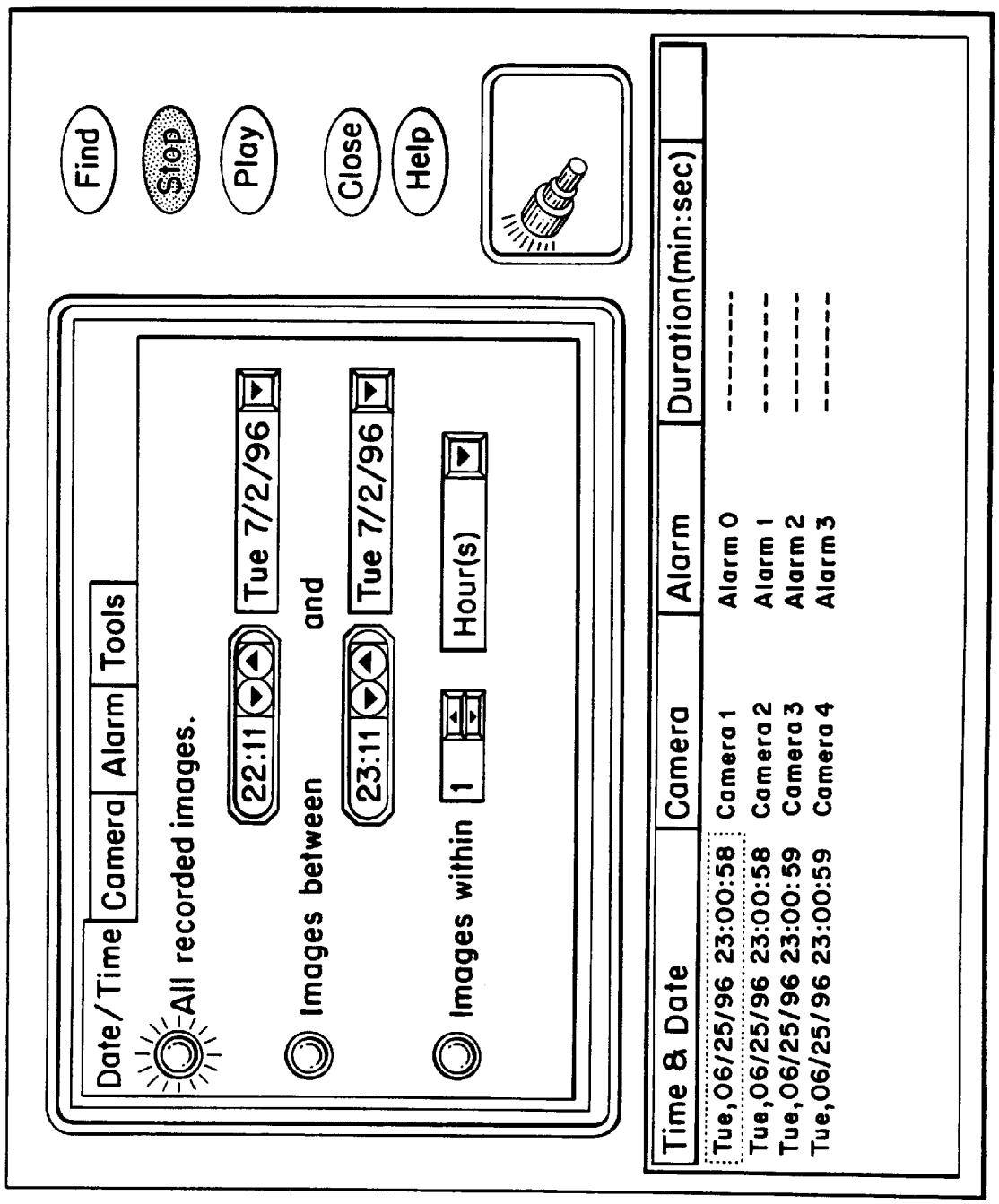

FIG. 133 is a screen display presented to a user in connection with searching for recorded video information.

Figure 134:
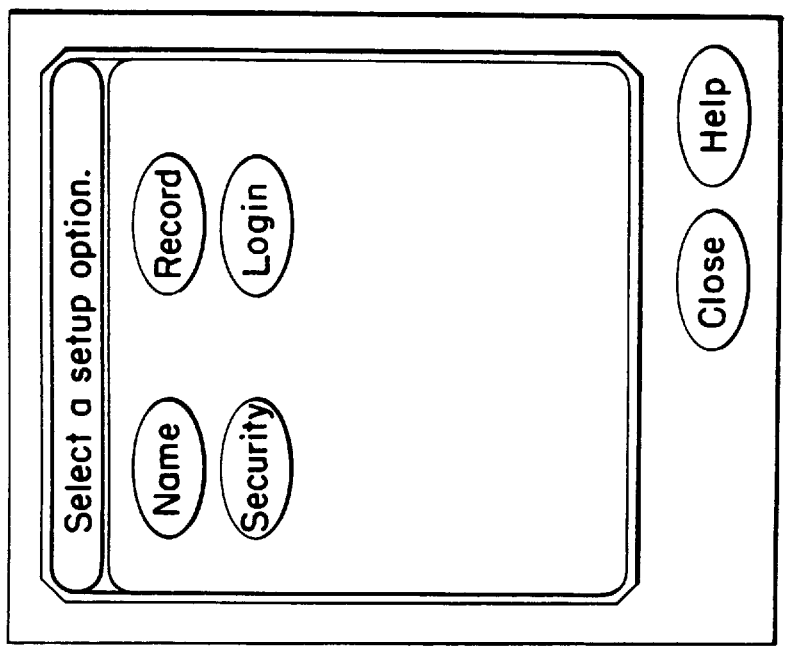

FIG. 134 is a screen display presented to the user to allow the user to select a setup operation.

Figure 135:
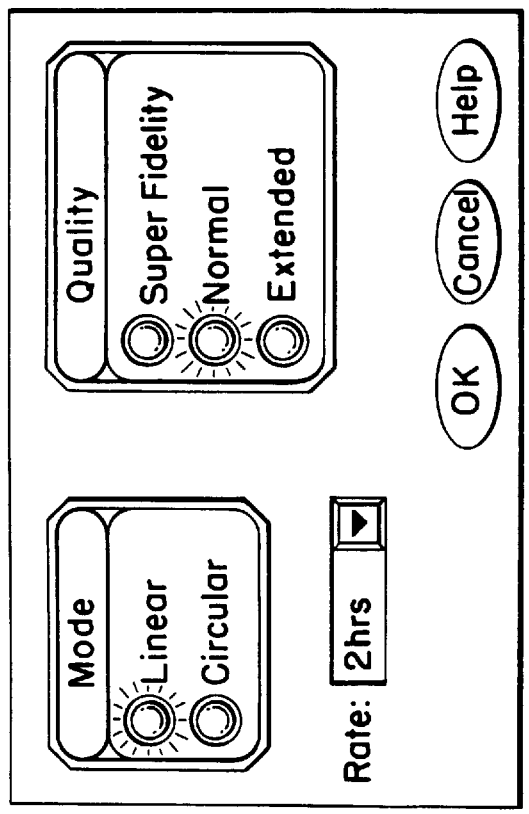

FIG. 135 is a screen display presented to the user to permit the user to select a video data recording mode.

Figure 136:
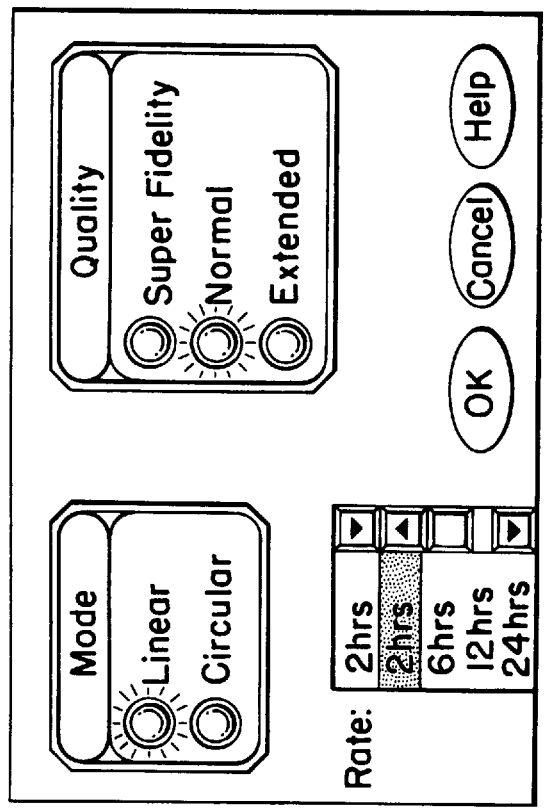

FIG. 136 is a screen display presented to the user to permit the user to select a video data recording mode.

Figure 137:
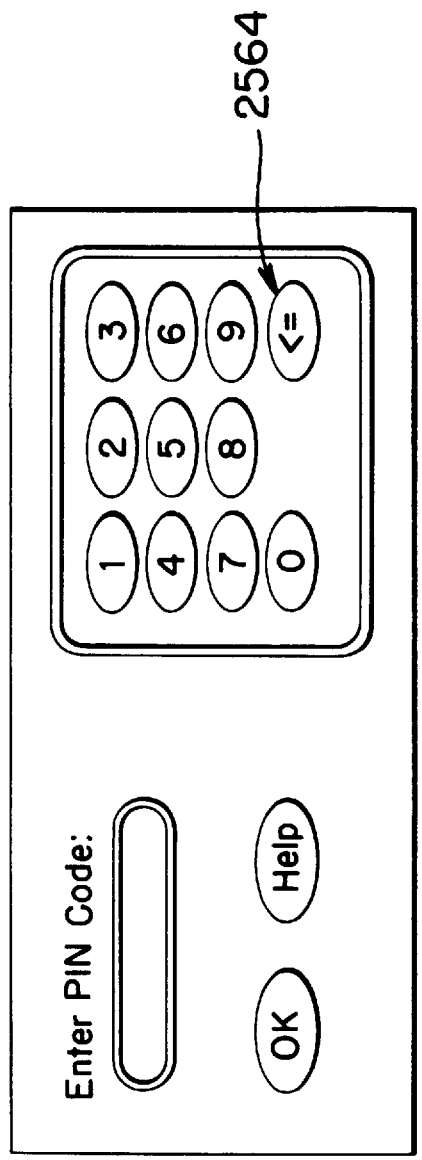

FIG. 137 is a screen display presented to the user to permit the user to login to the system.

Figure 138:
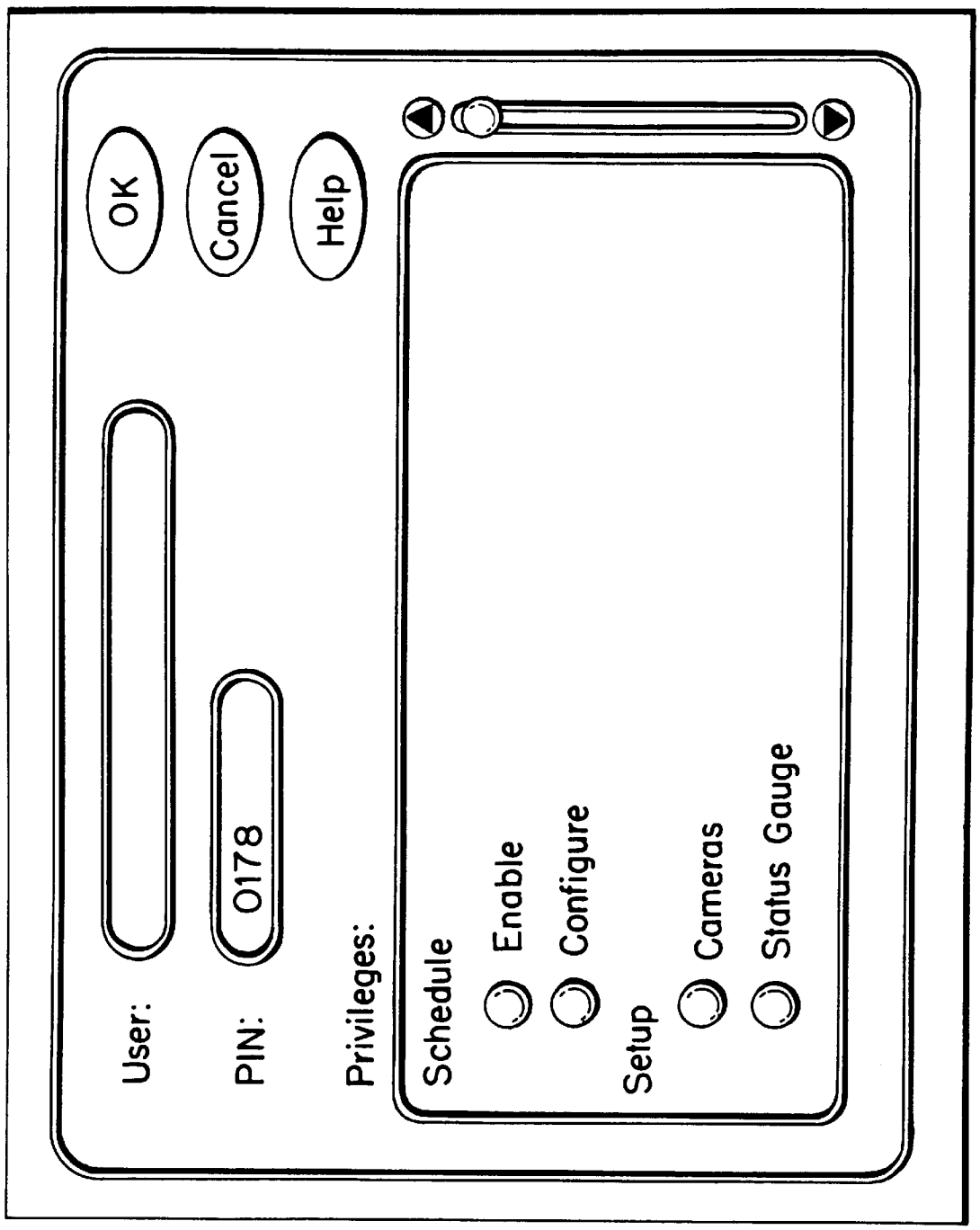

FIG. 138 is a screen display presented to a user to permit the user to add an authorized user to the system.

Figure 139:
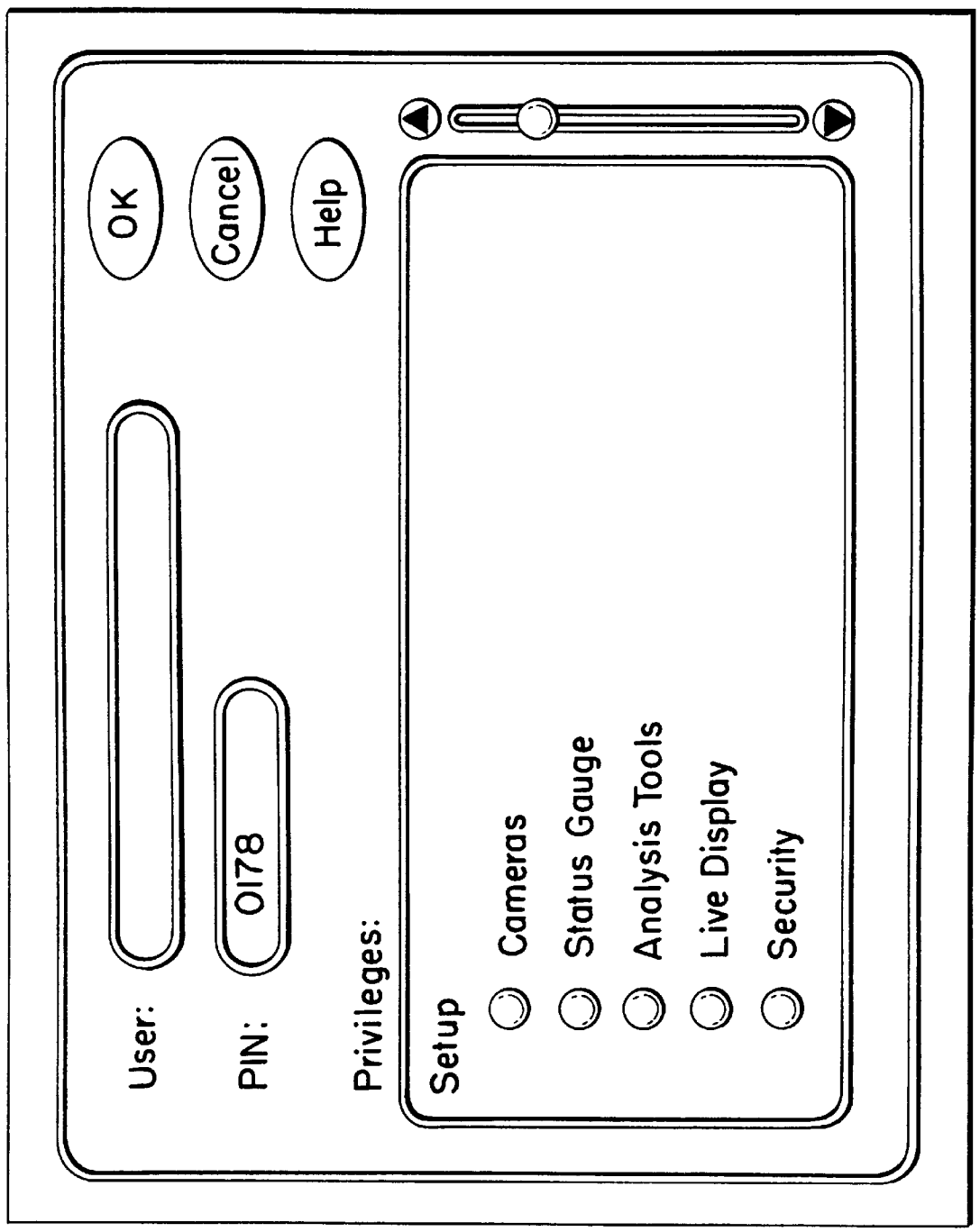

FIG. 139 is a screen display presented to a user to permit selection of system functionality that is to be accessible to an authorized user.

Figure 140:
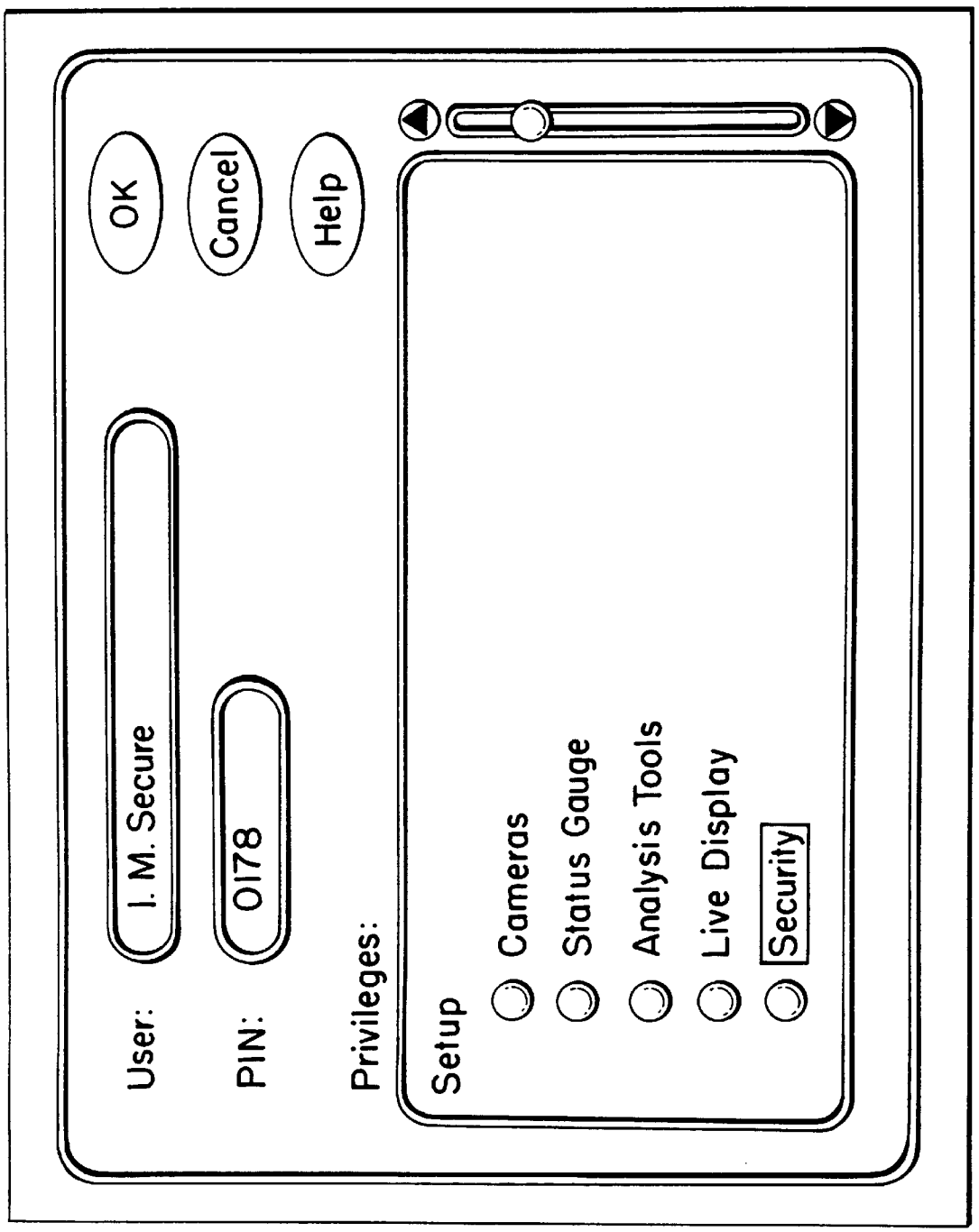

FIG. 140 is a screen display presented to a user topermit selection of system functionality that is to be accessible to an authorized user.

Figure 141:
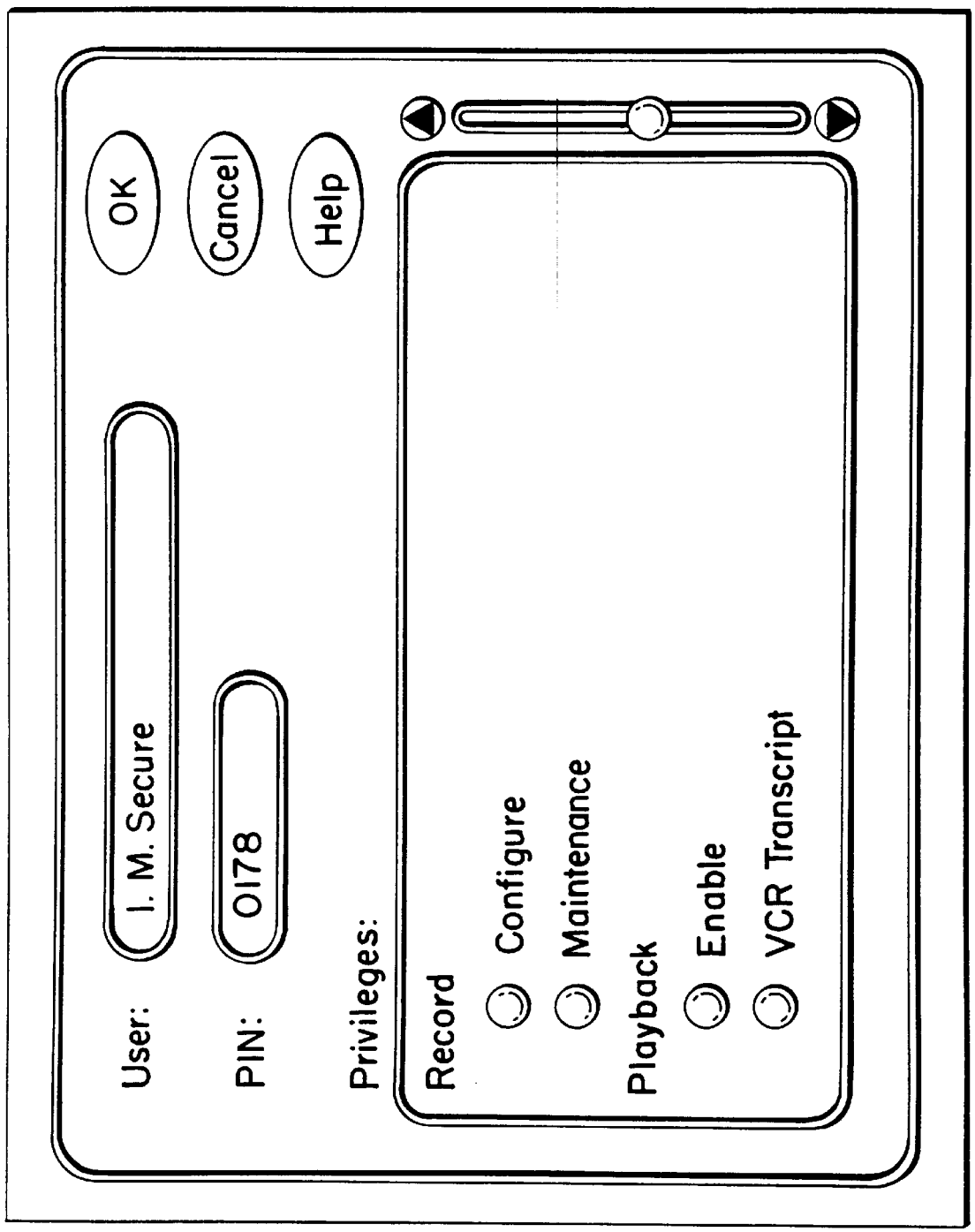

FIG. 141 is a screen display presented to a user to permit selection of system functionality that is to be accessible to an authorized user.

Figure 142:
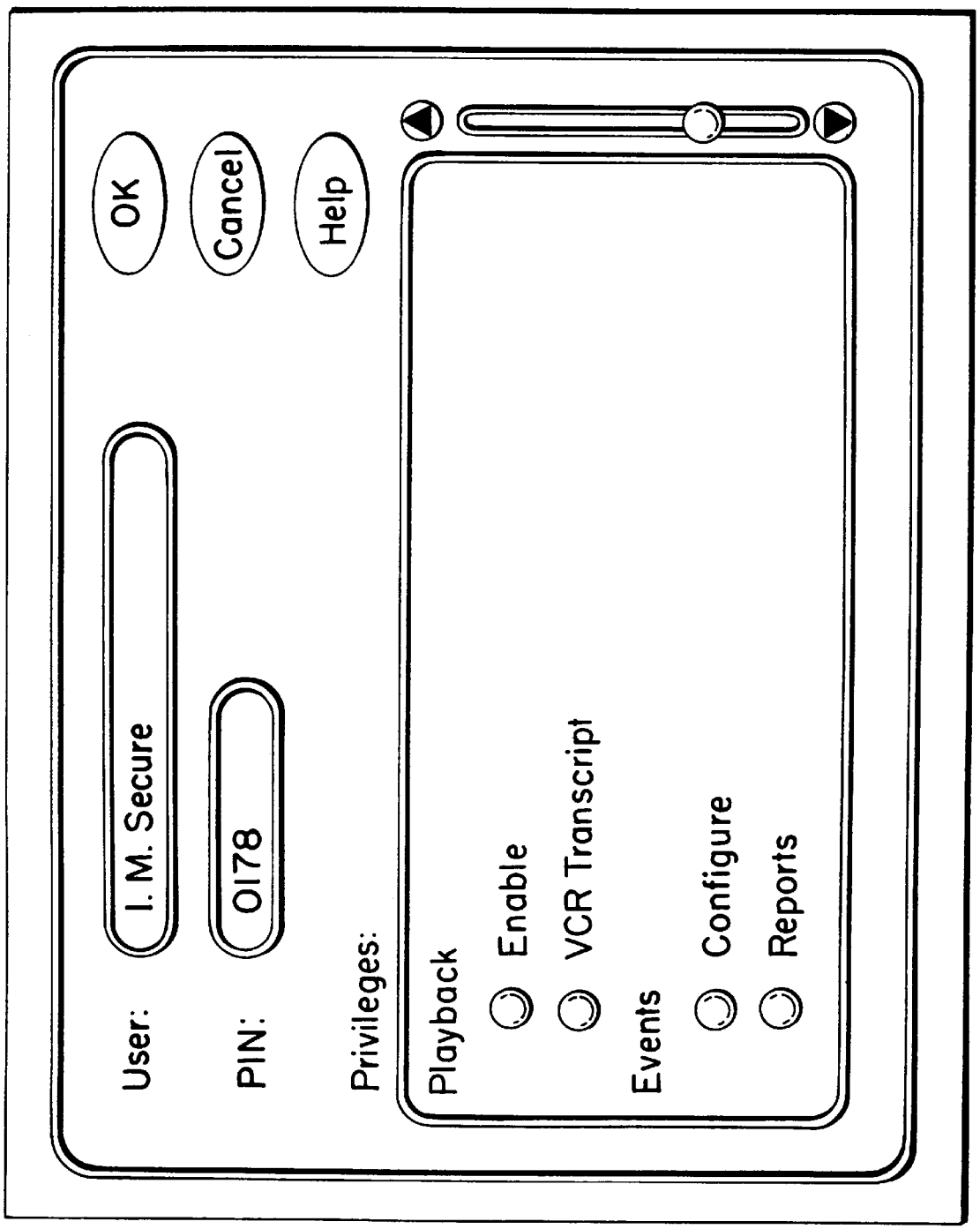

FIG. 142 is a screen display presented to a user to permit selection of system functionality that is to be accessible to an authorized user.

Figure 143:
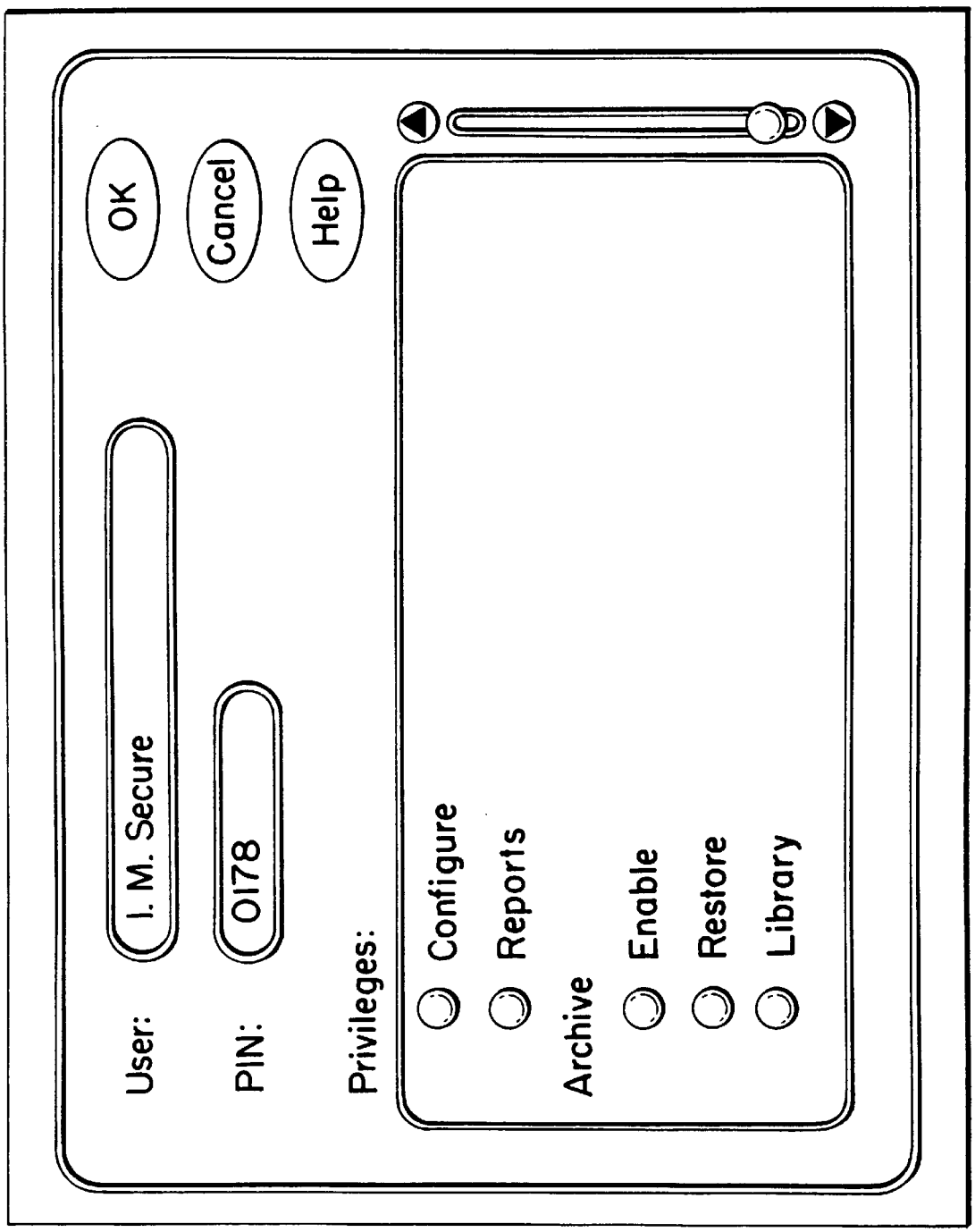

FIG. 143 is a screen display presented to a user to permit selection of system functionality that is to be accessible to an authorized user.

Figure 144:
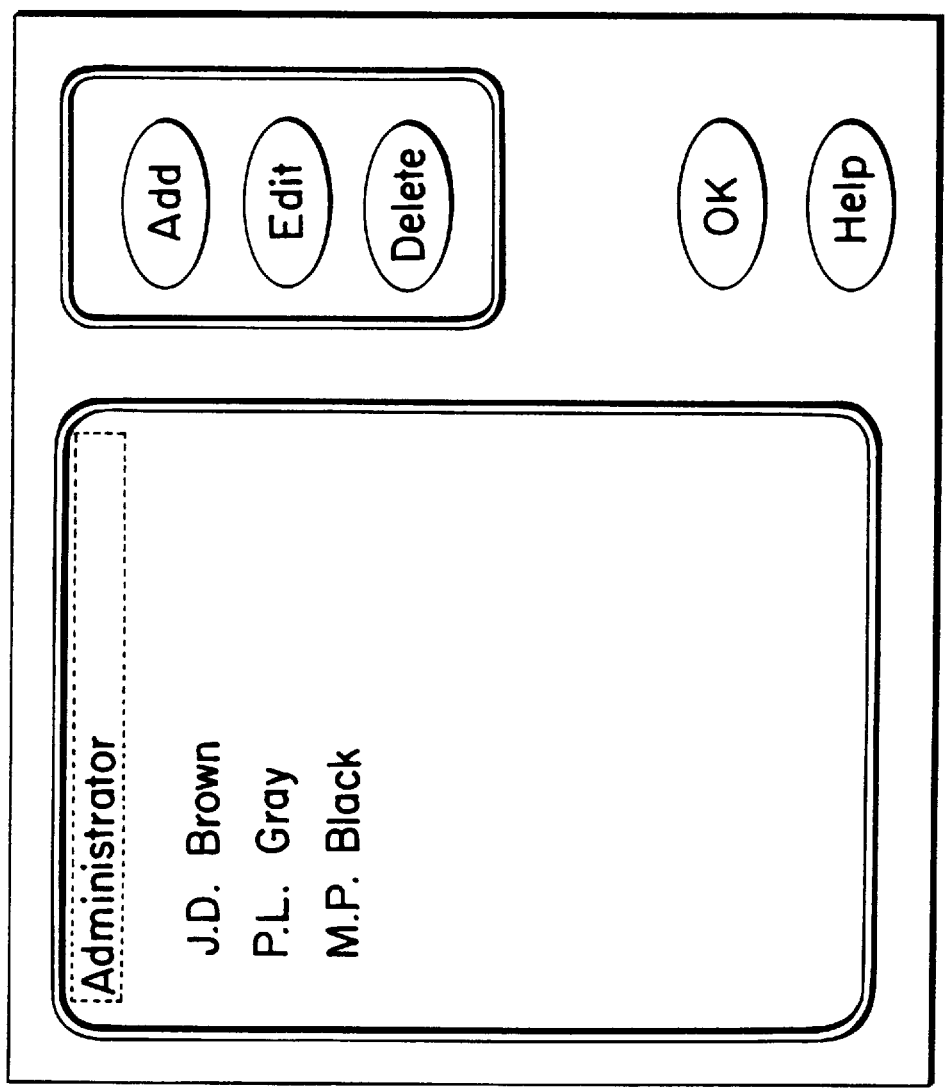

FIG. 144 is a screen display presented to the user to configure security functions of the system.

Figure 145:
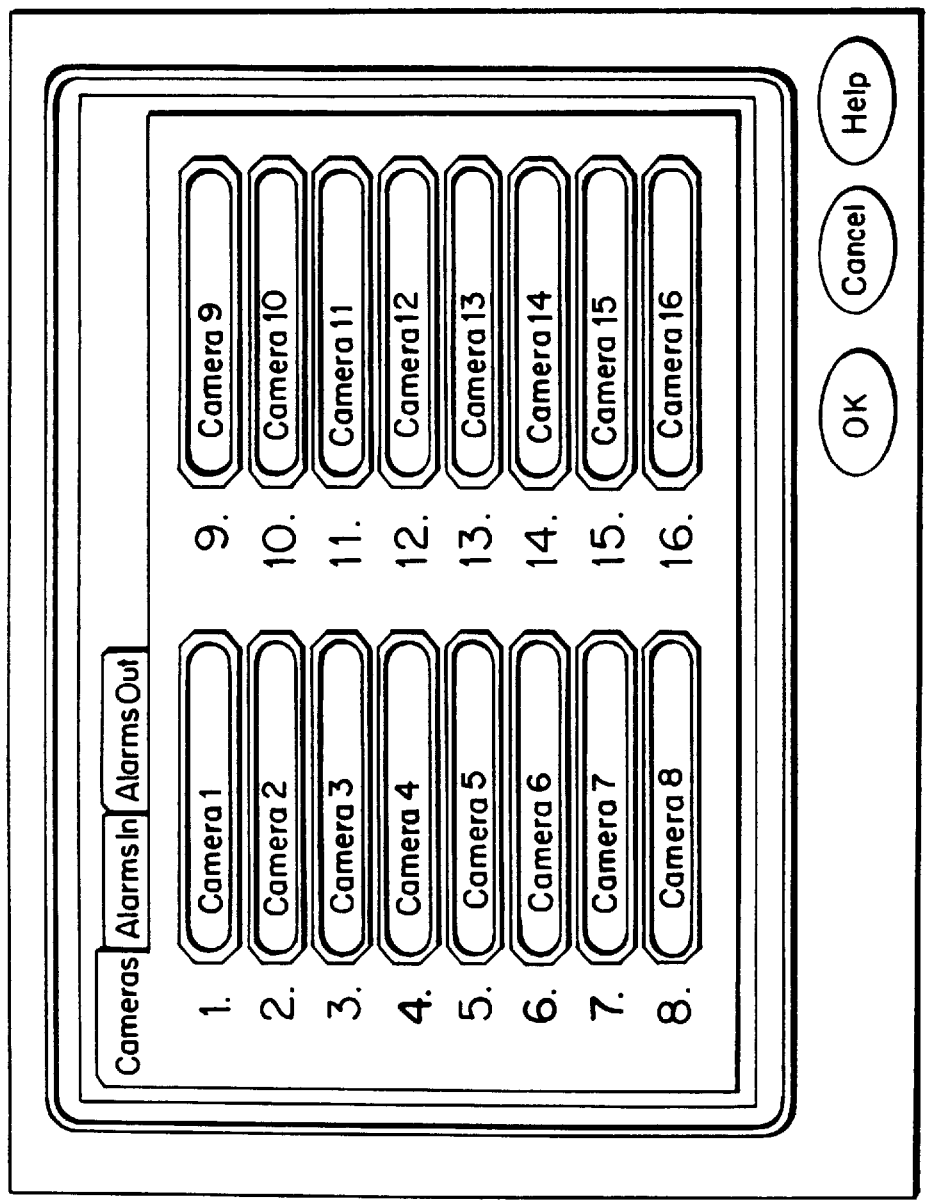

FIG. 145 is a screen display presented to a user to permit the user to assign names to cameras connected to the system.

Figure 146:
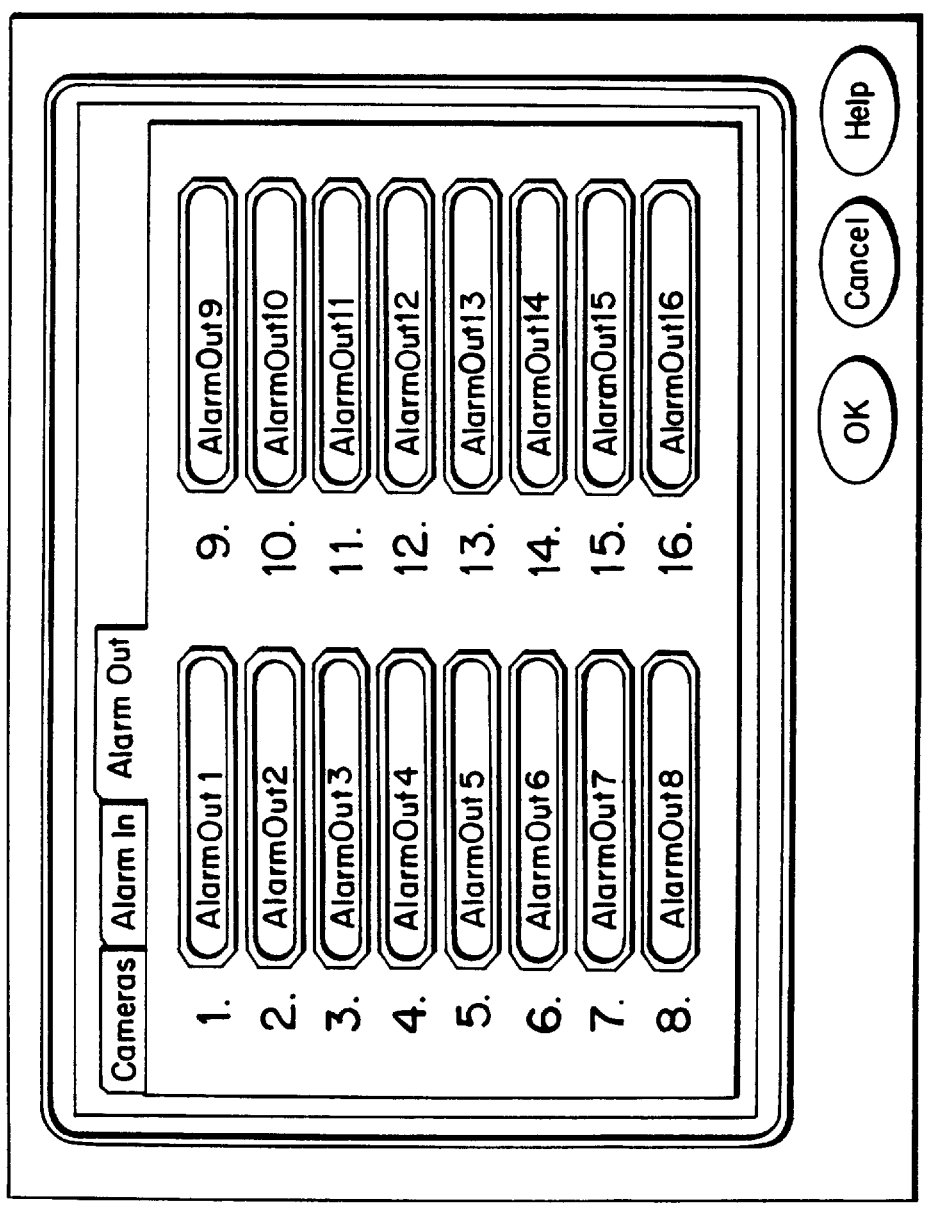

FIG. 146 is a screen display presented to the user to permit the user to assign names to alarm signal outputs provided by the system.

Figure 147:
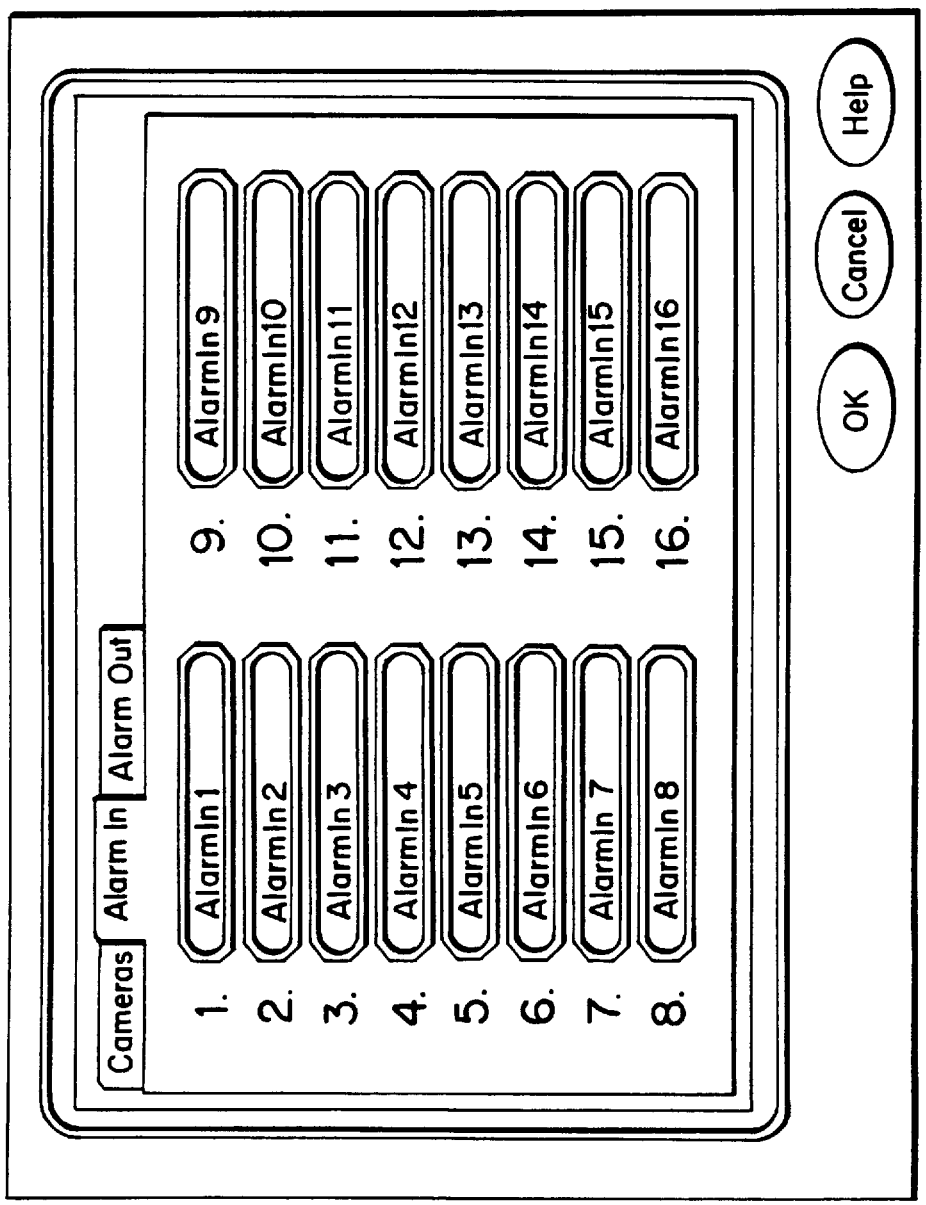

FIG. 147 is a screen display presented to a user to permit the user to assign names to alarm signal inputs that may be received by the system.

FIG. 148 is a screen display presented to the user to permit the user to select among a number of utility functions which the system is capable of performing.

FIG. 149 is a screen display which presents to the user system status information.

Figure 150:
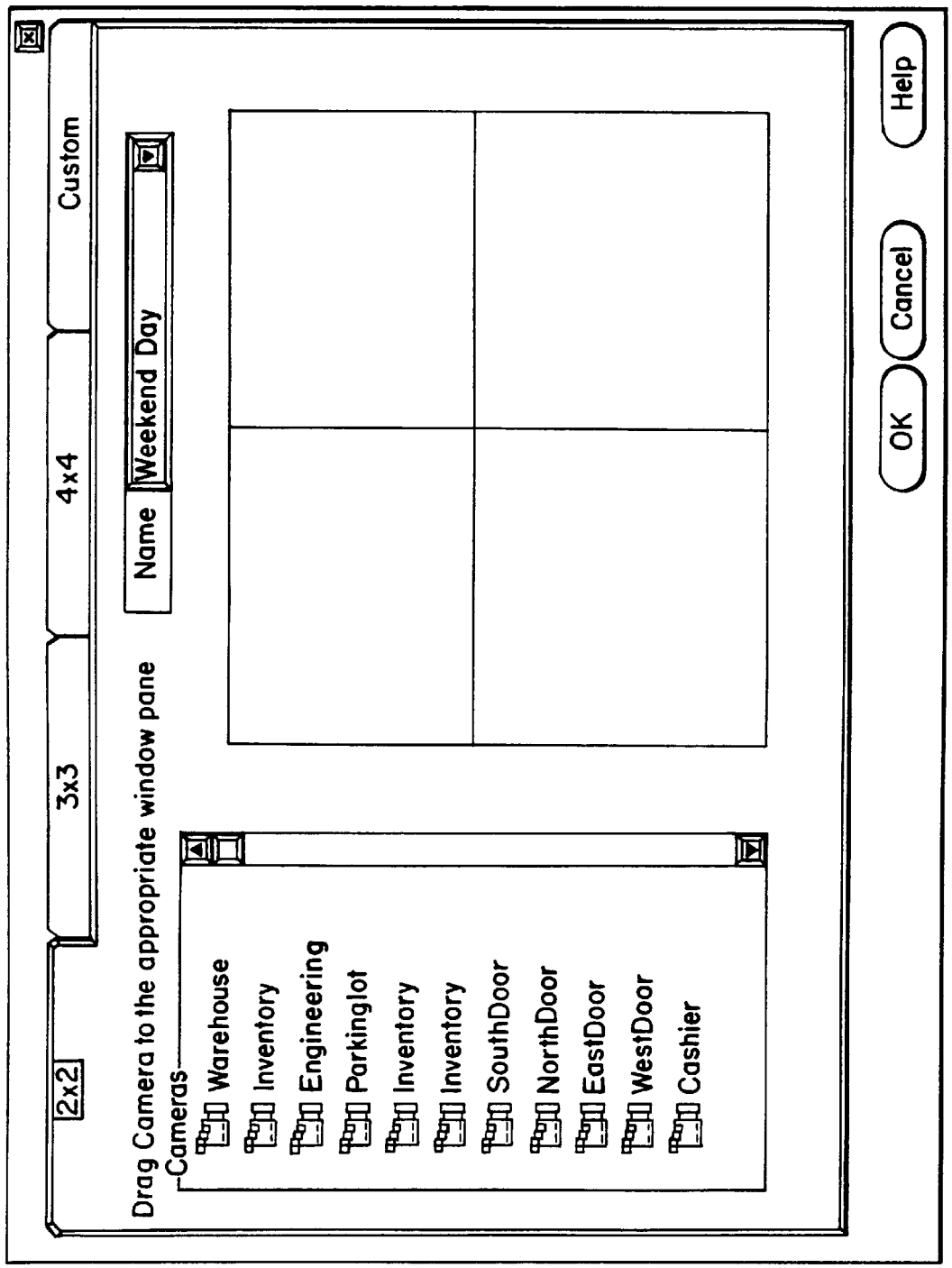
Figure 151:
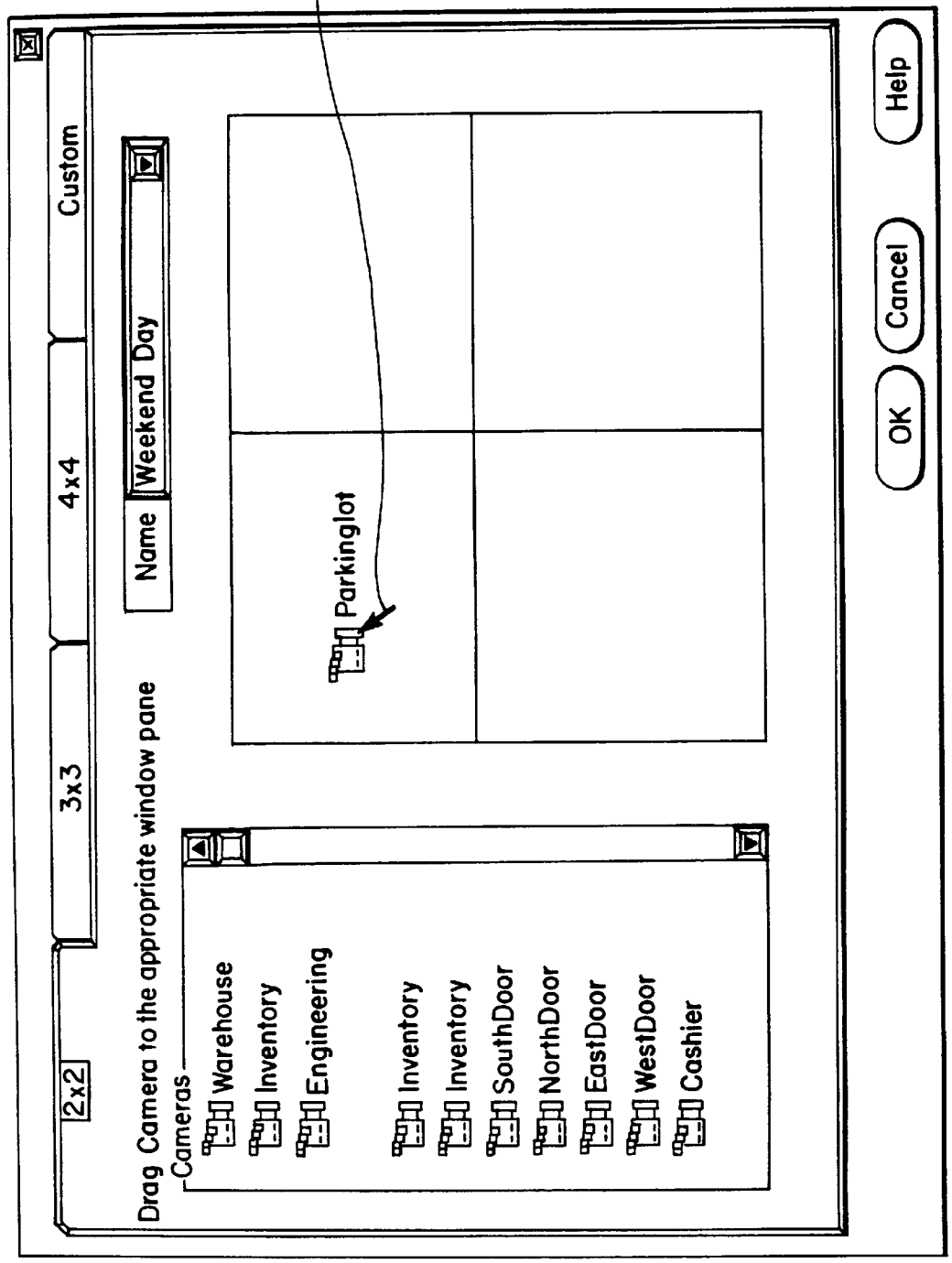

FIGS. 150 and 151 are screen displays presented to the user to permit the user to assign video display windows among a plurality of cameras connected to the system.

Figure 152:
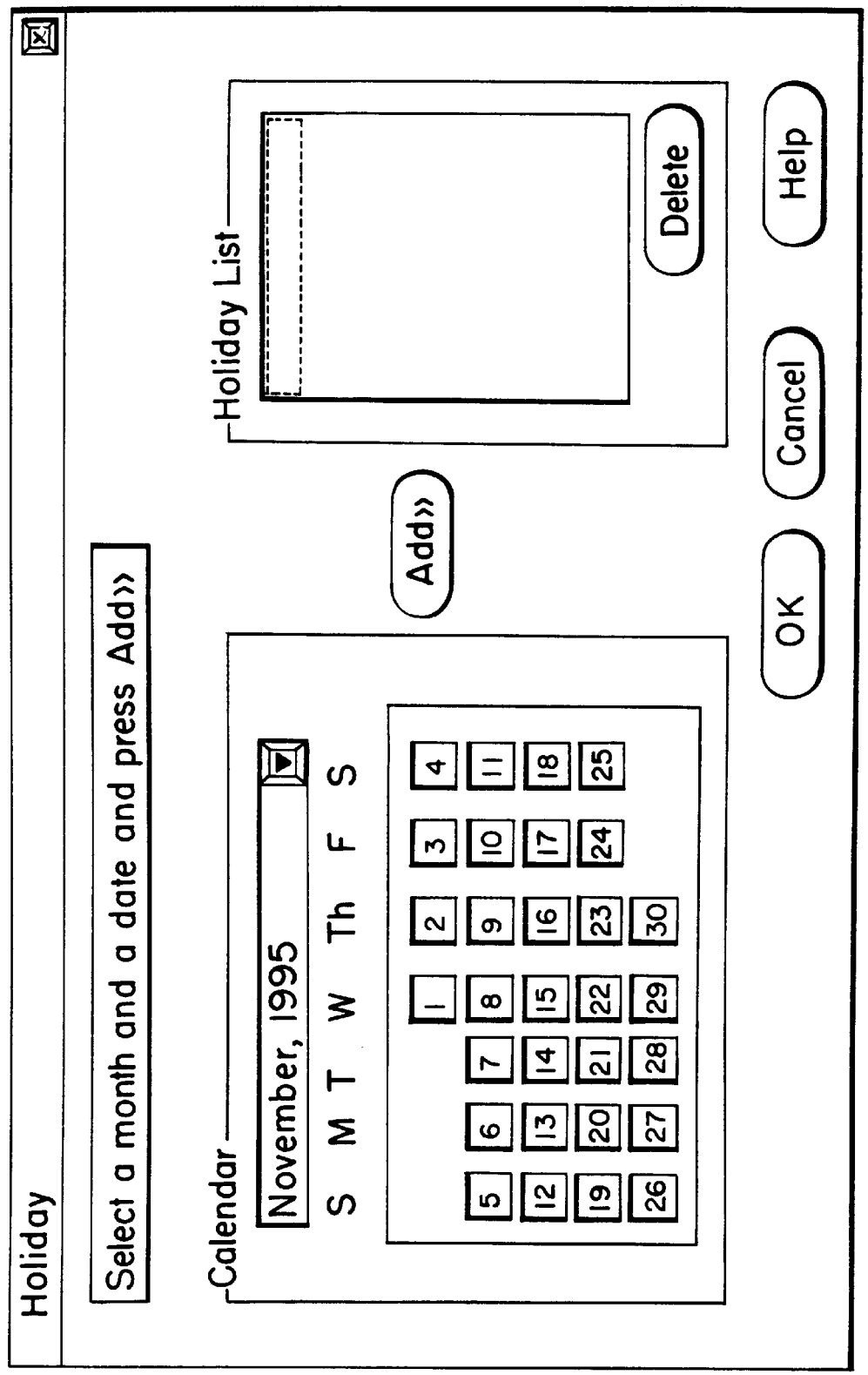

FIG. 152 is a screen display presented to the user to permit the user to designate calendar dates as holidays for the purpose of scheduling system operating modes.

Figure 153:
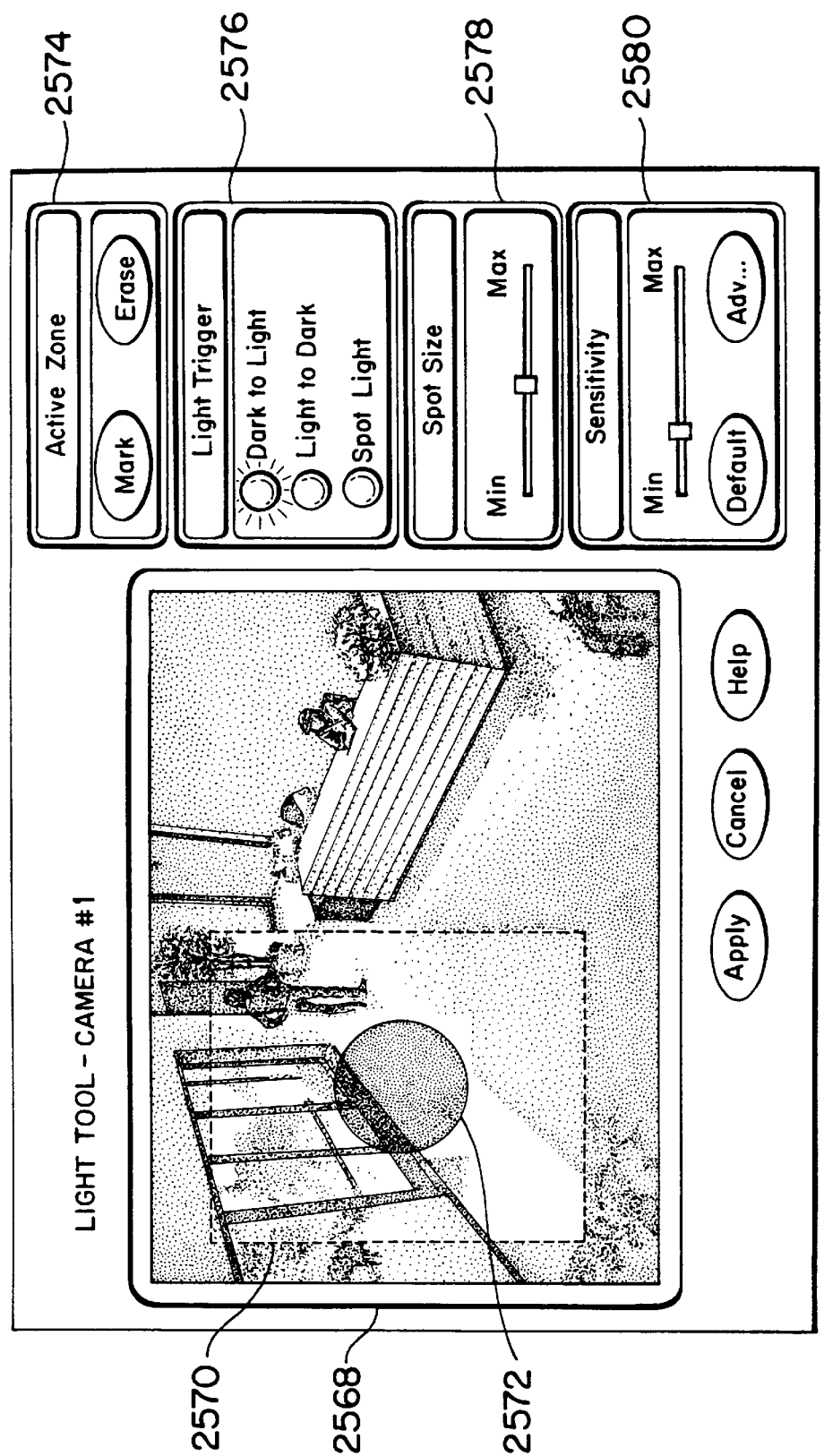

FIG. 153 is a screen display presented to the user to permit the user to adjust parameters with respect to an image analysis algorithm which detects changes in lighting in a scene represented by a video image stream.

Figure 154:
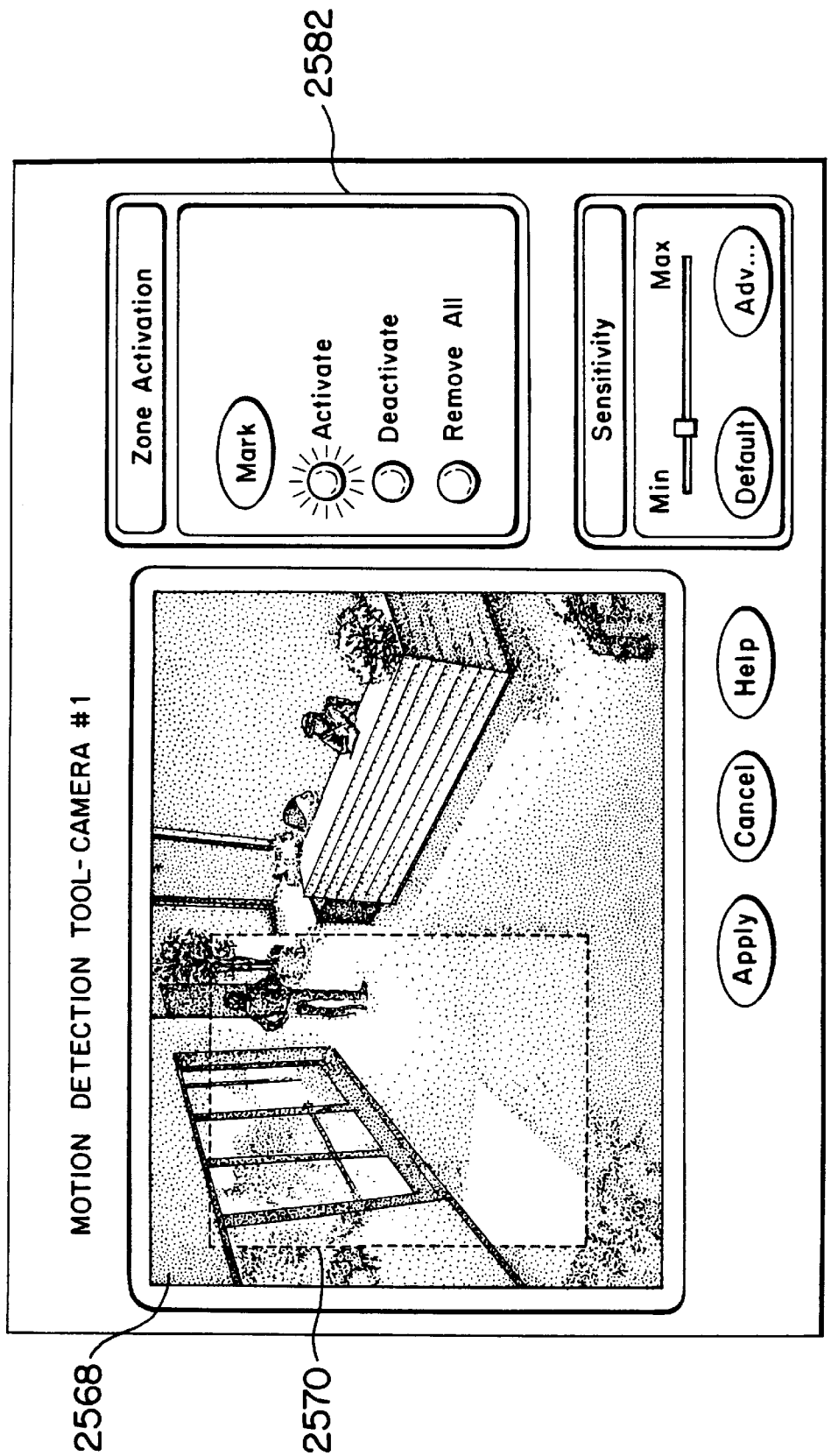

FIG. 154 is a screen display presented to the user to permit the user to adjust parameters of an image analysis algorithm which detects motion in a scene represented by a video image stream.

Figure 155:
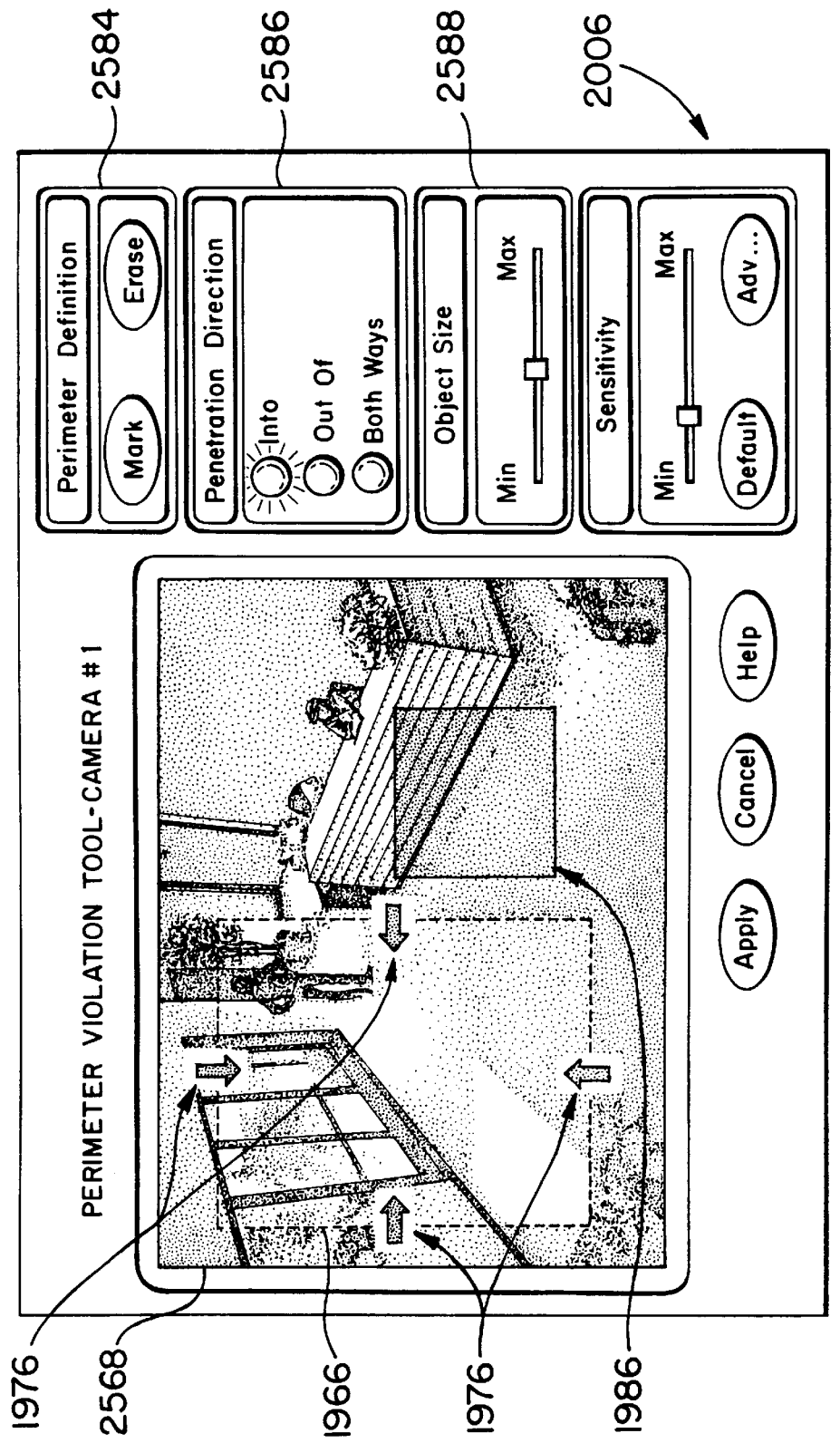

FIG. 155 is a screen display presented to a user to permit the user to adjust parameters of an image analysis algorithm which determines whether a perimeter boundary has been crossed by a moving object.

Figure 156:
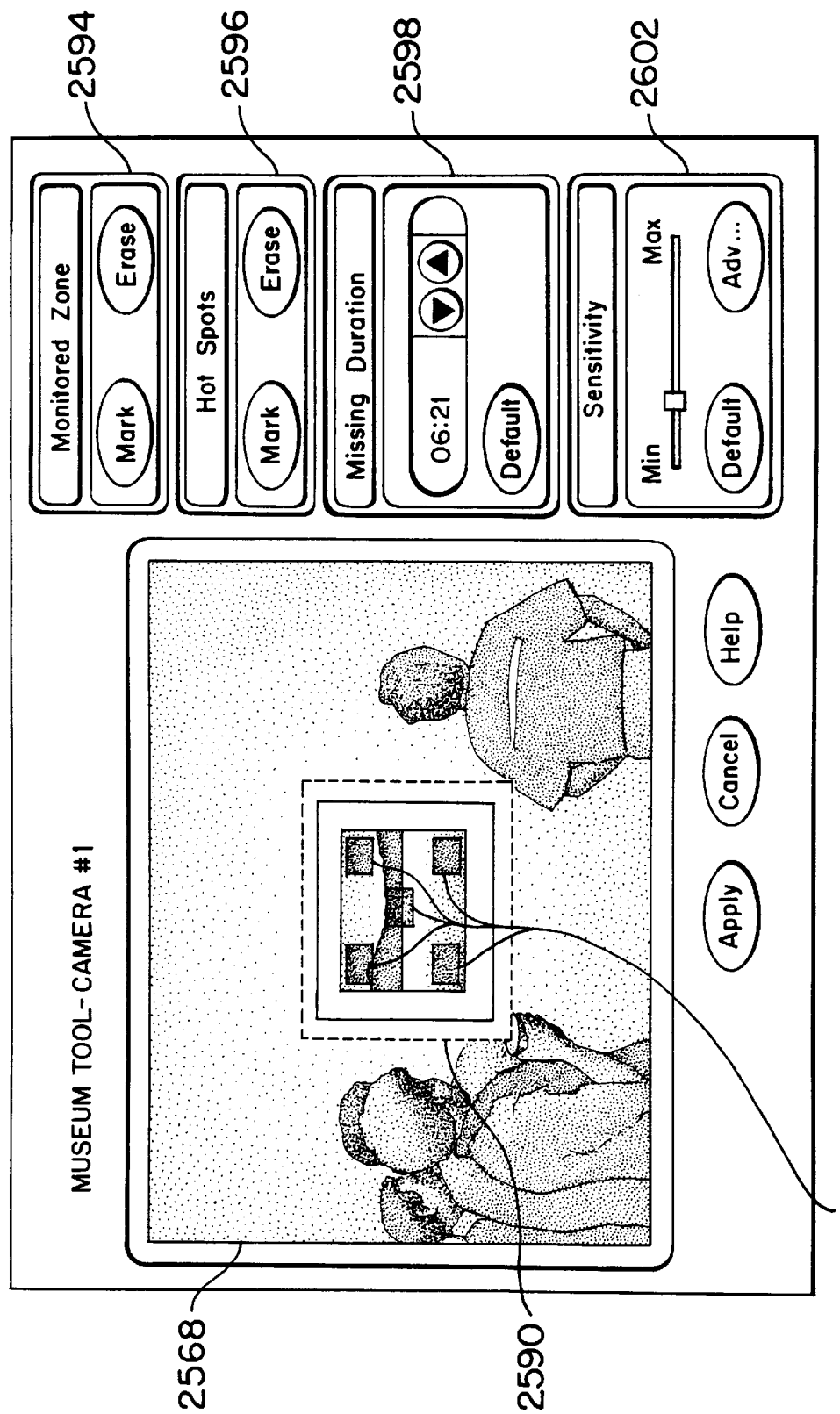

FIG. 156 is a screen display presented to a user to permit the user to adjust parameters of an image analysis algorithm which detects removal of an object of interest.

Figure 157:
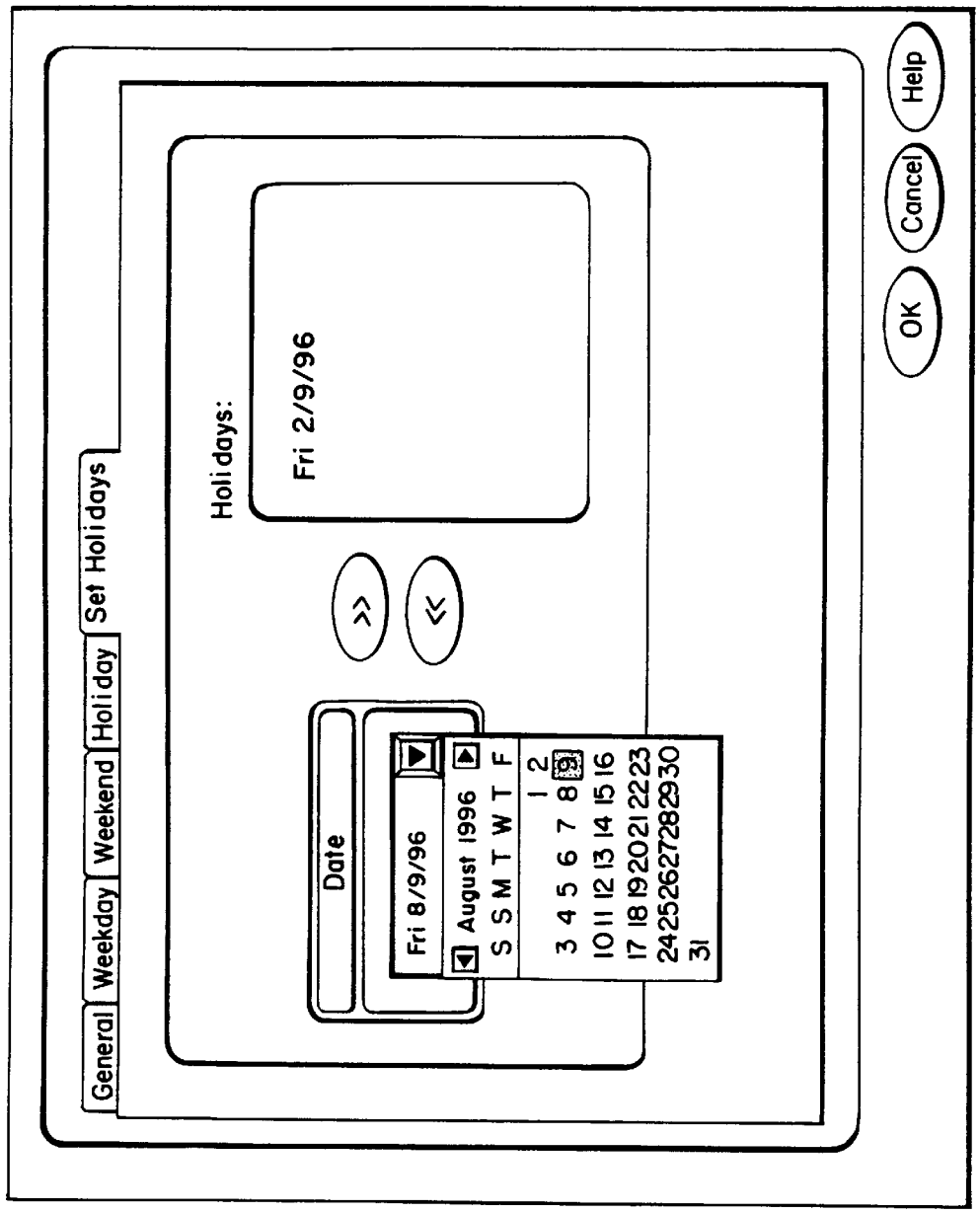

FIG. 157 is a screen display presented to a user to permit the user to define a list of holidays for the purpose of pre-scheduling system operating modes.

Figure 158:
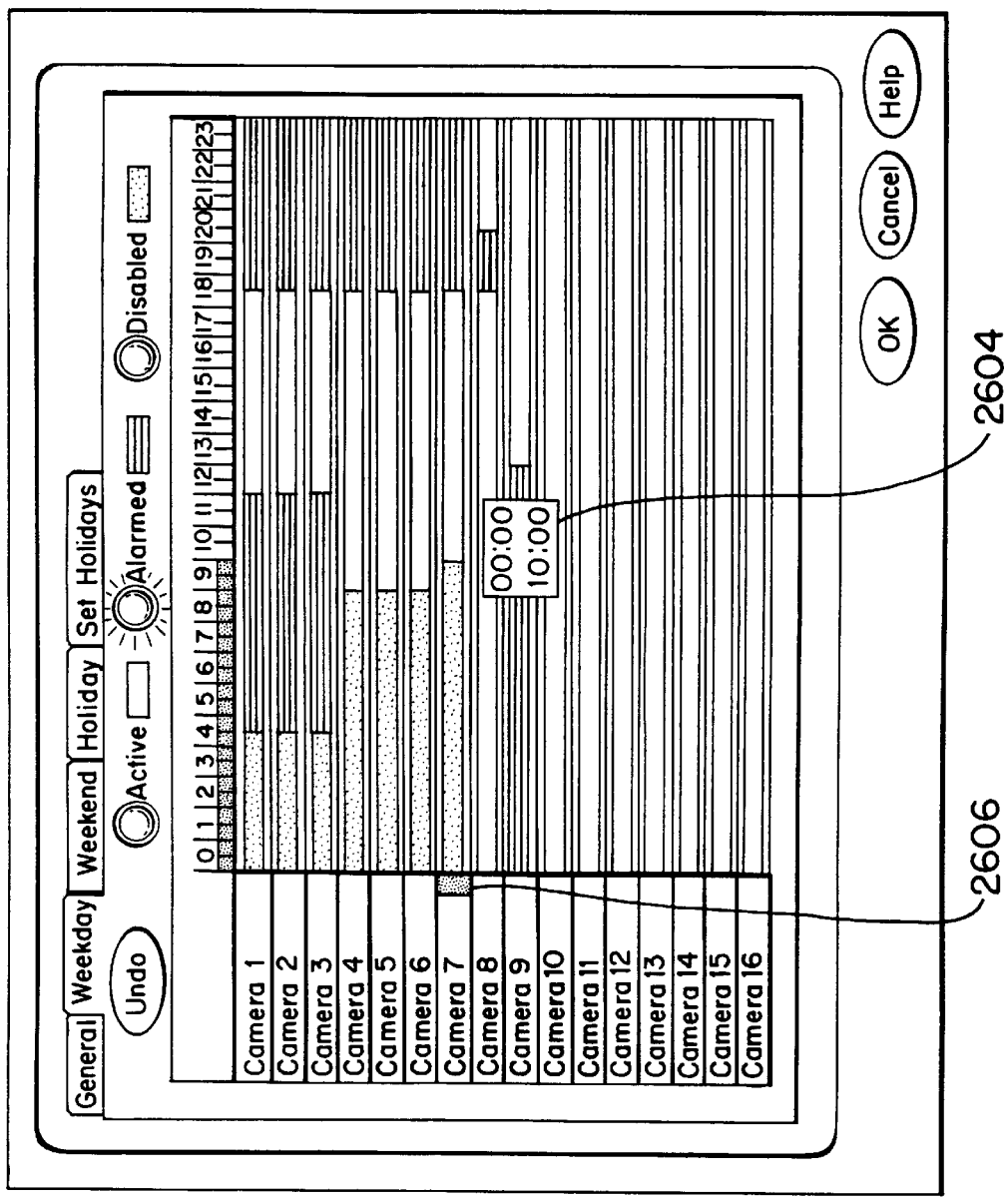

FIG. 158 is a screen display presented to the user to permit the user to schedule recording modes for each of a plurality of cameras.

Figure 159:
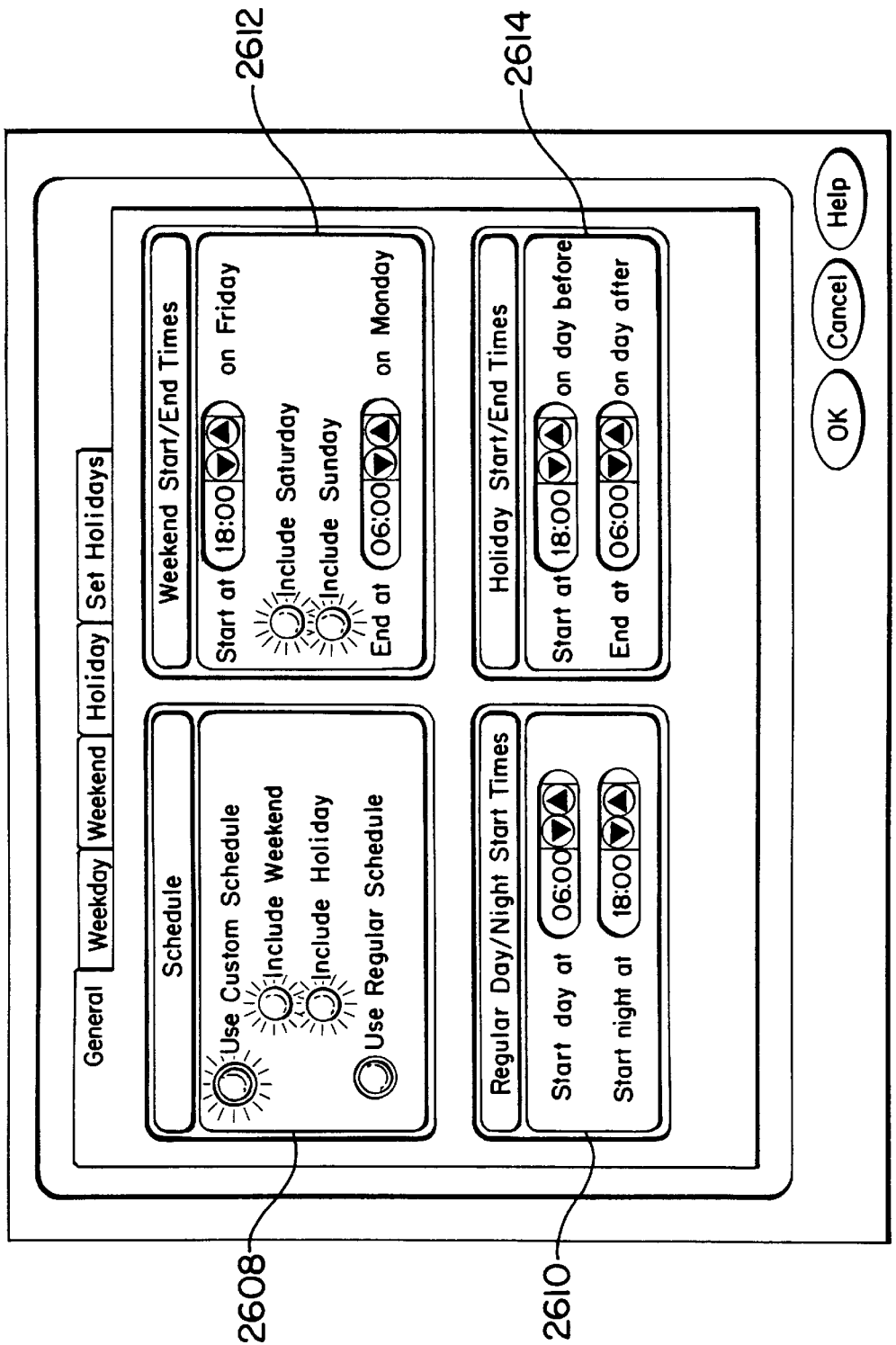

FIG. 159 is a screen display presented to a user to permit the user to define scheduling periods with regard to pre-scheduled system operating modes.

Figure 160:
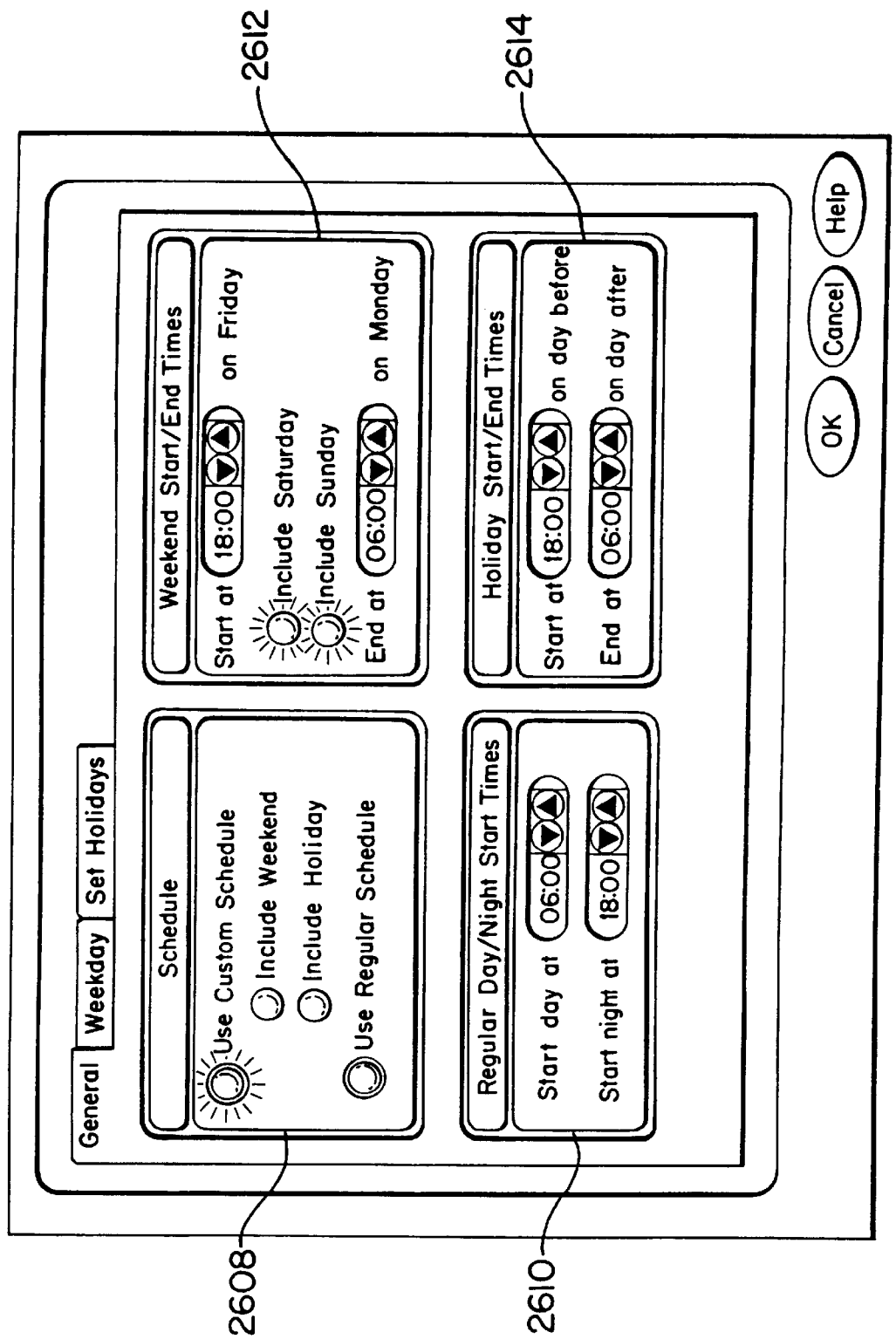

FIG. 160 is a screen display presented to a user to permit the user to define scheduling periods with regard to pre-scheduled system operating modes.

Figure 161:
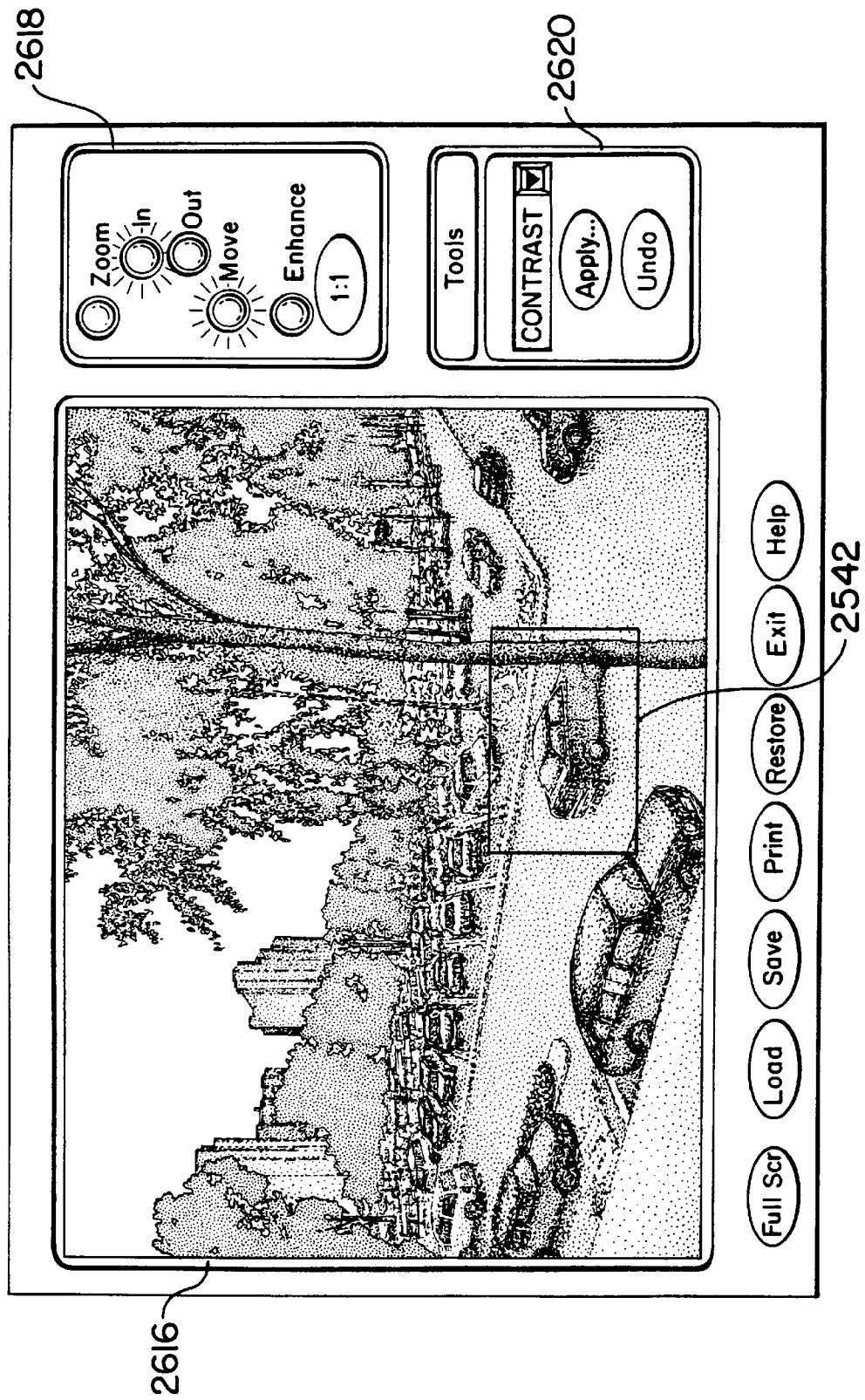

FIG. 161 is a screen display presented to a user in connection with operation of the image enhancement utility illustrated in FIGS. 128(a) and (b).

Figure 162:
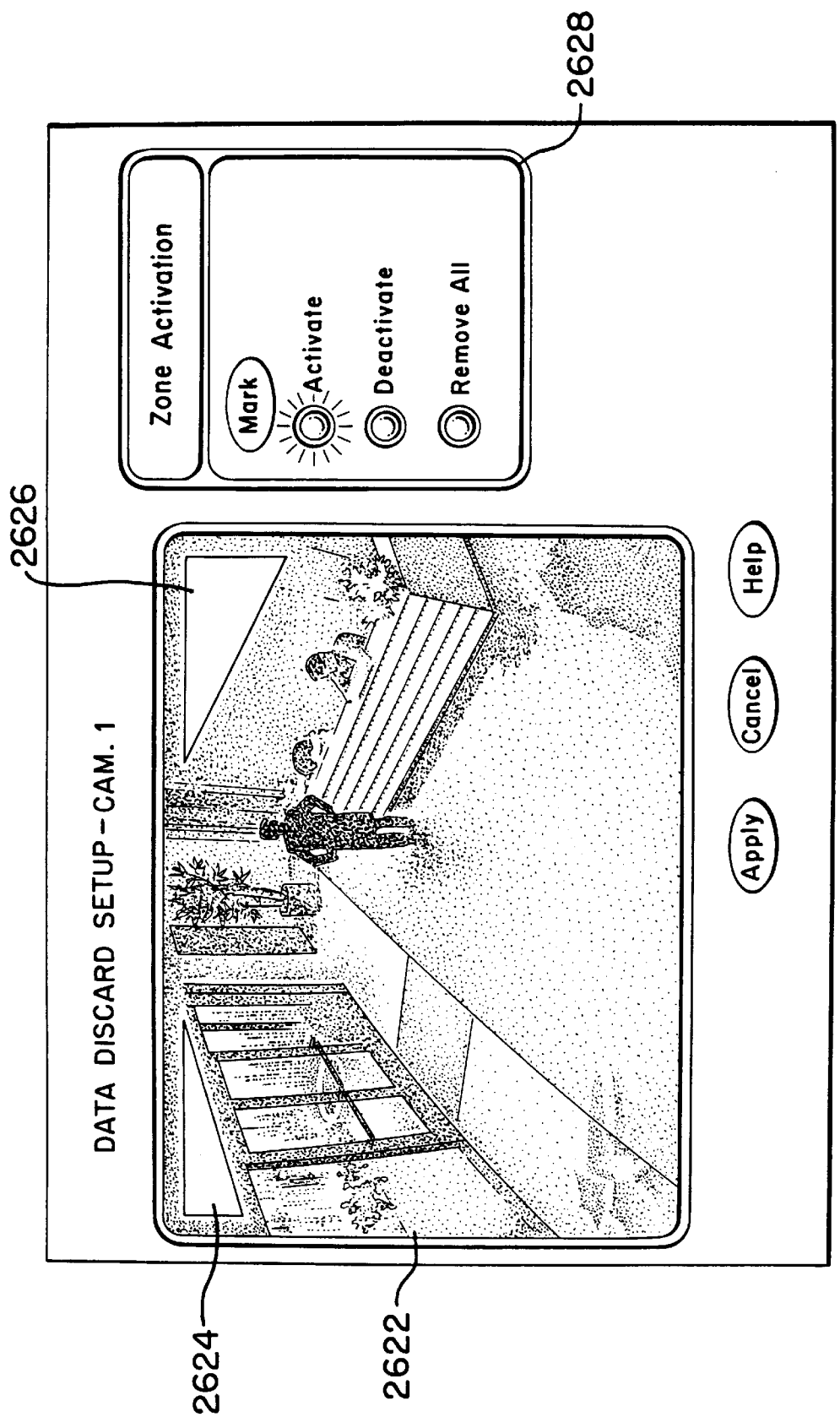

FIG. 162 is a screen display presented to the user to permit the user to instruct the system to discard video data corresponding to a user-selected portion of an image plane.

Figure 11:
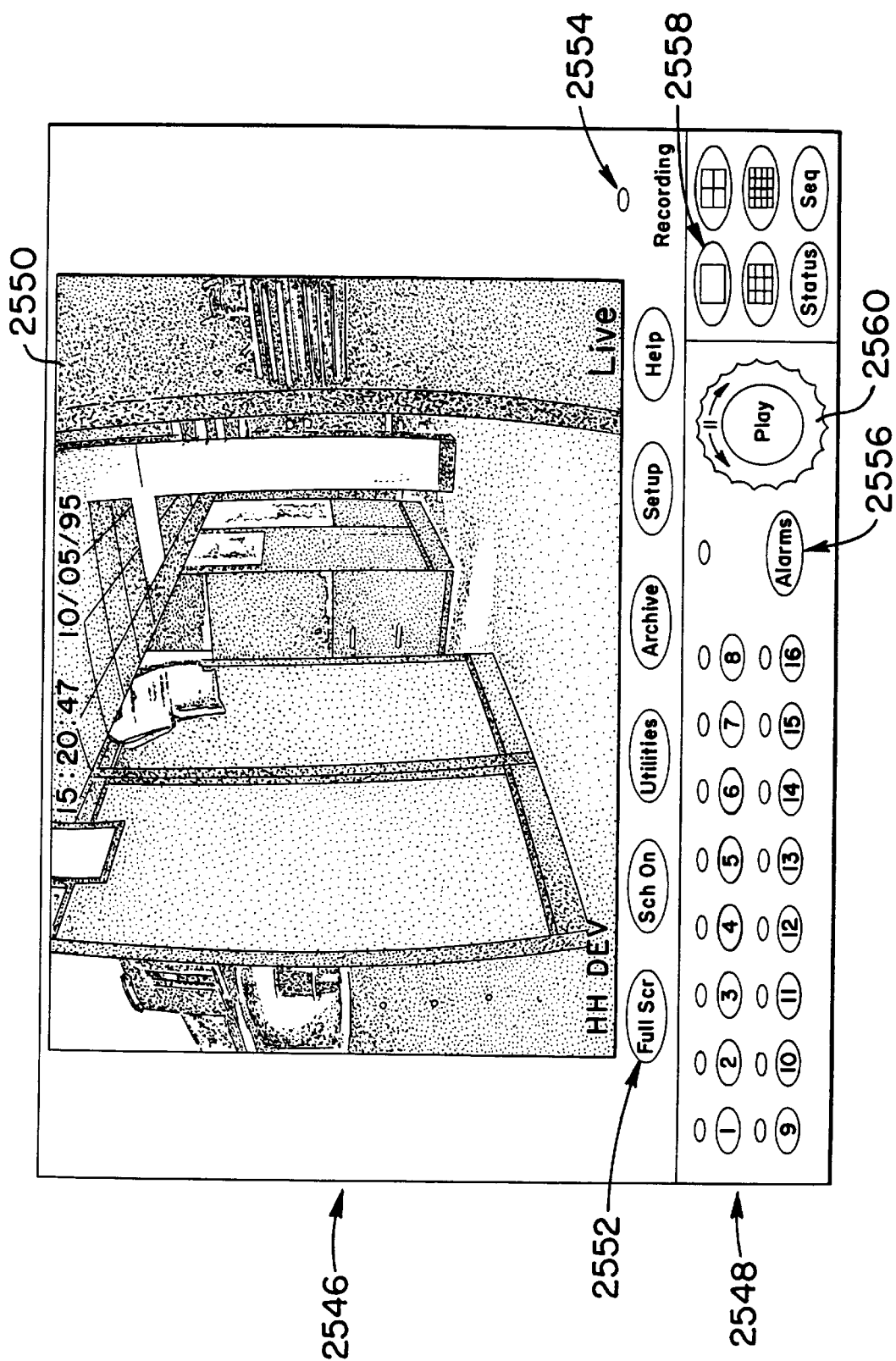
FIG. 11 is a print of a screen display generated by the VR/PC unit when operating in a live display mode, and including cursor-actuatable control regions.
Figure 163:
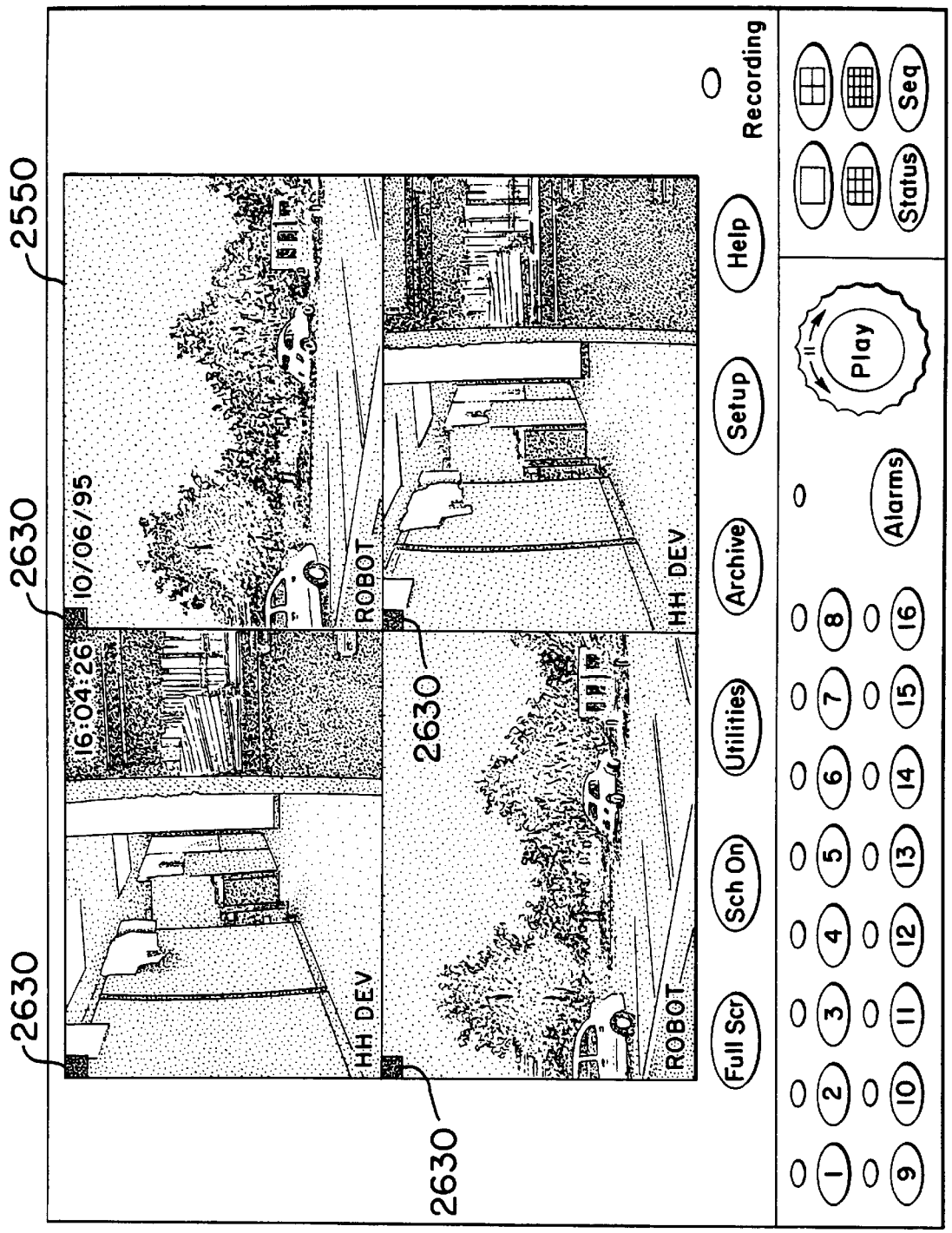

FIG. 163 is a live display screen format similar to FIG. 11, except that a live video region of the screen is divided in a quad configuration with recording indications for each display window.

Figure 164:
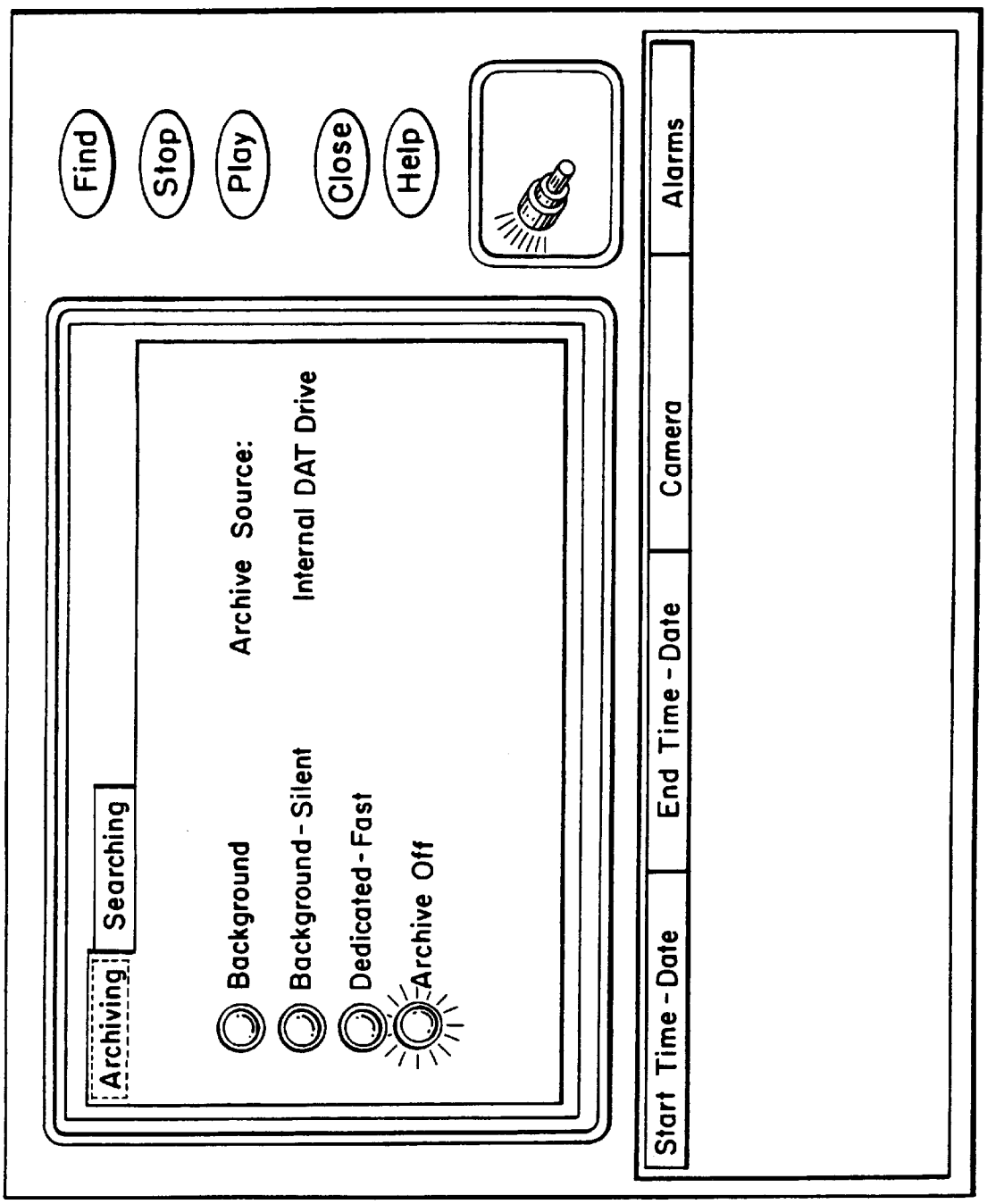

FIG. 164 is a screen display presented to a user in connection with selecting an archiving operation mode.

Figure 165:
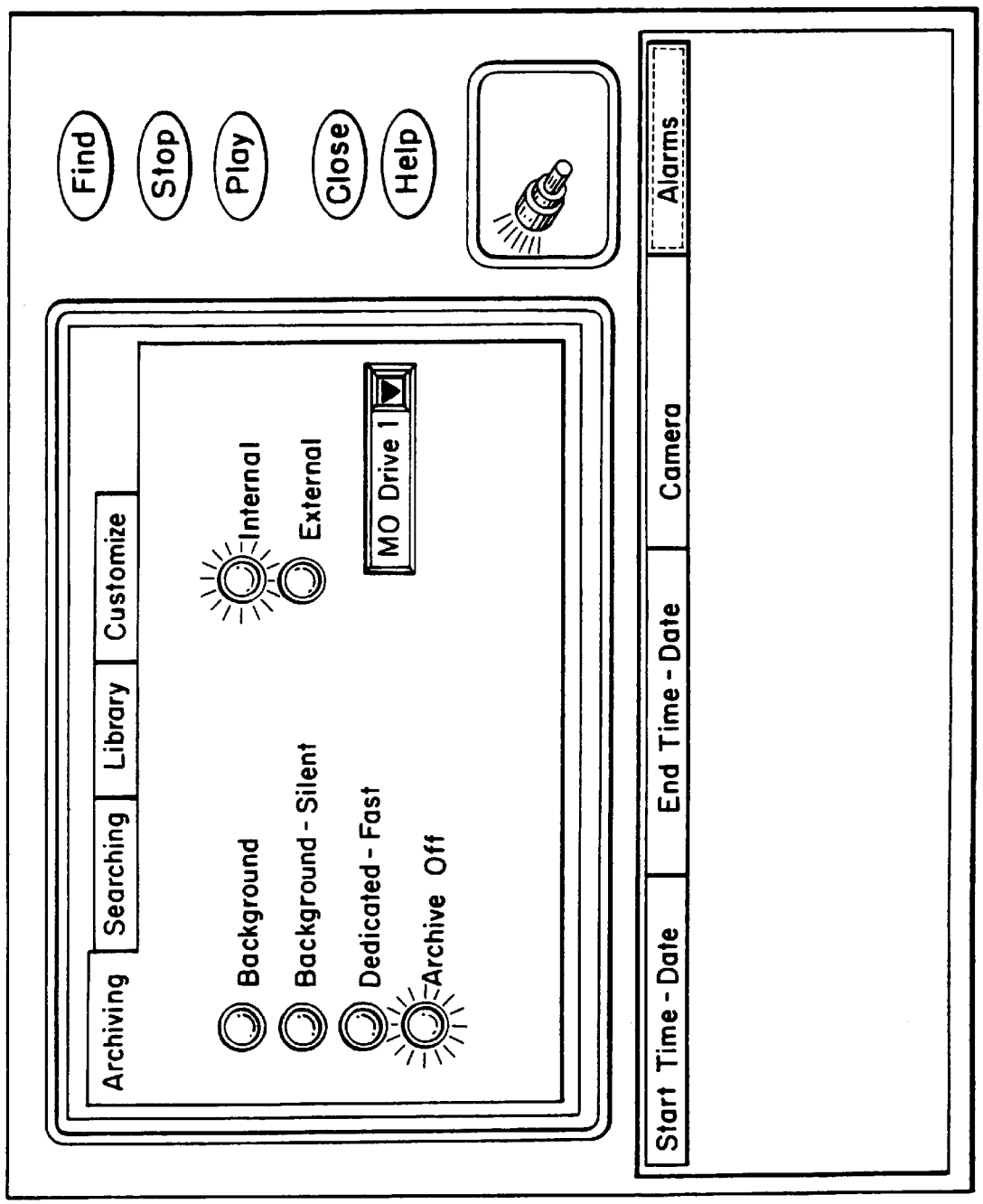

FIG. 165 is an alternative format of the display of FIG. 164.

Figure 166:
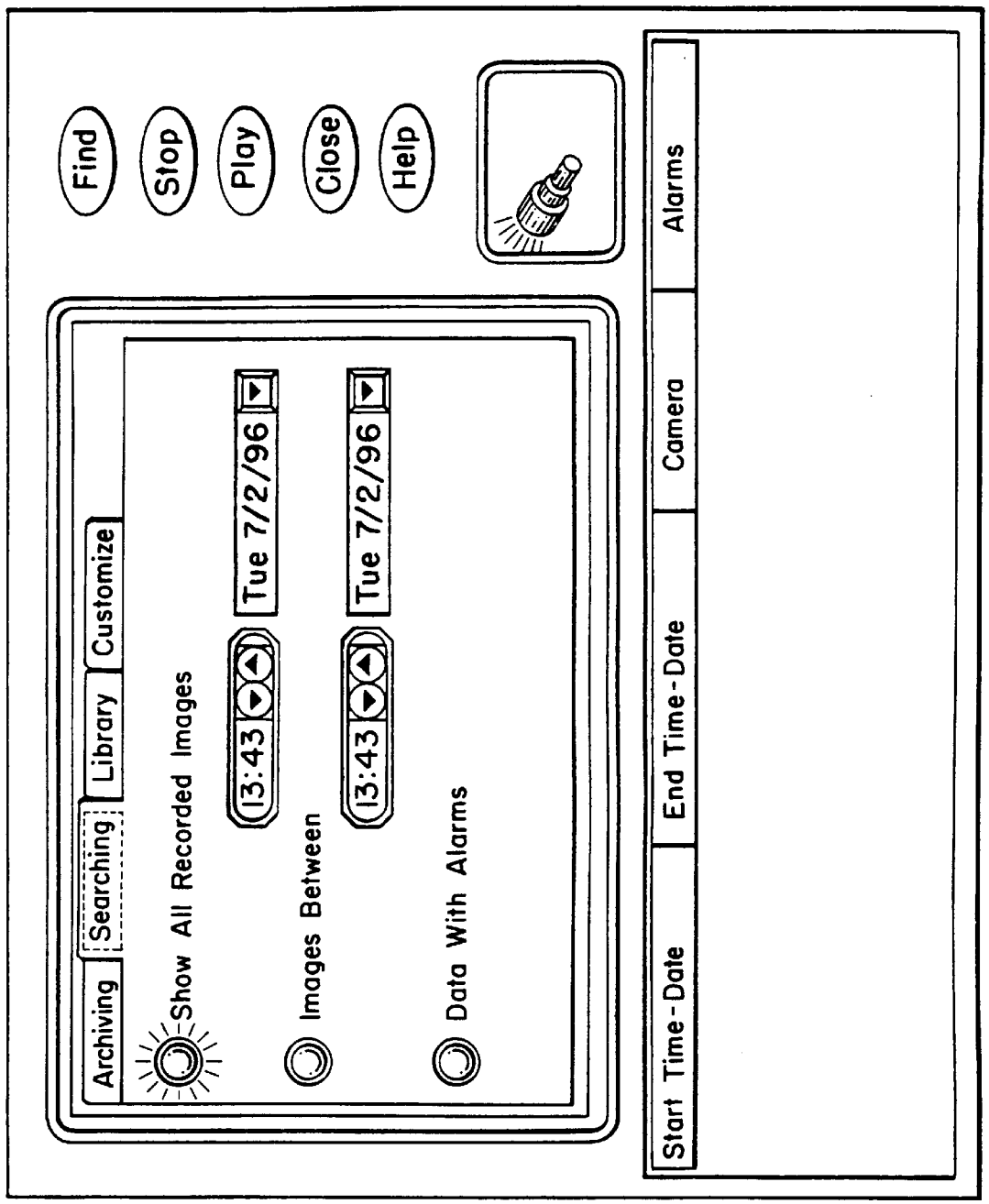

FIG. 166 is a screen display presented to the user in connection with searching for video data recorded on a removable archive recording medium.

Figure 167:
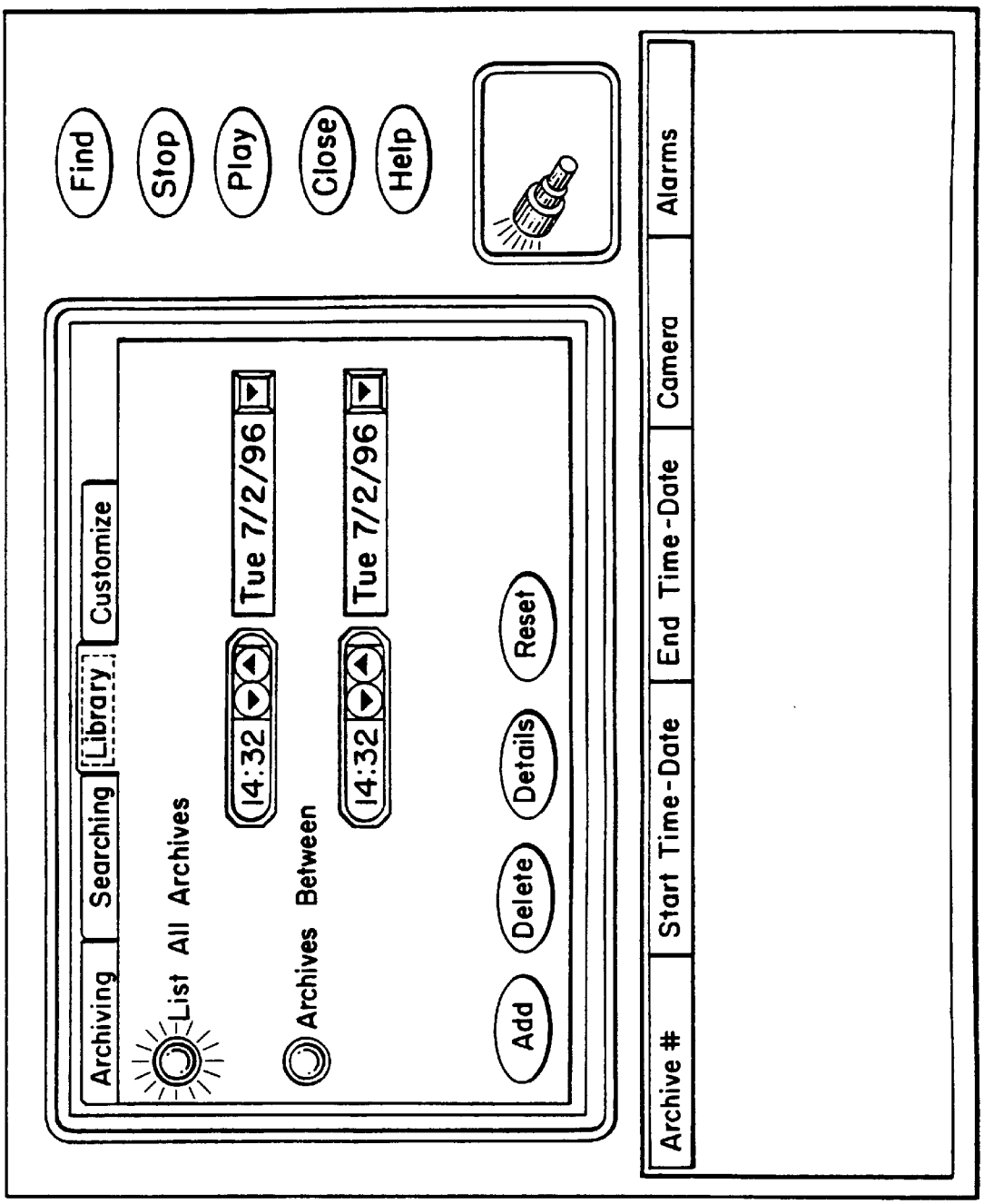

FIG. 167 is a screen display presented to the user to permit access to a database of index information for previously recorded removable archive recording media.

Figure 168:
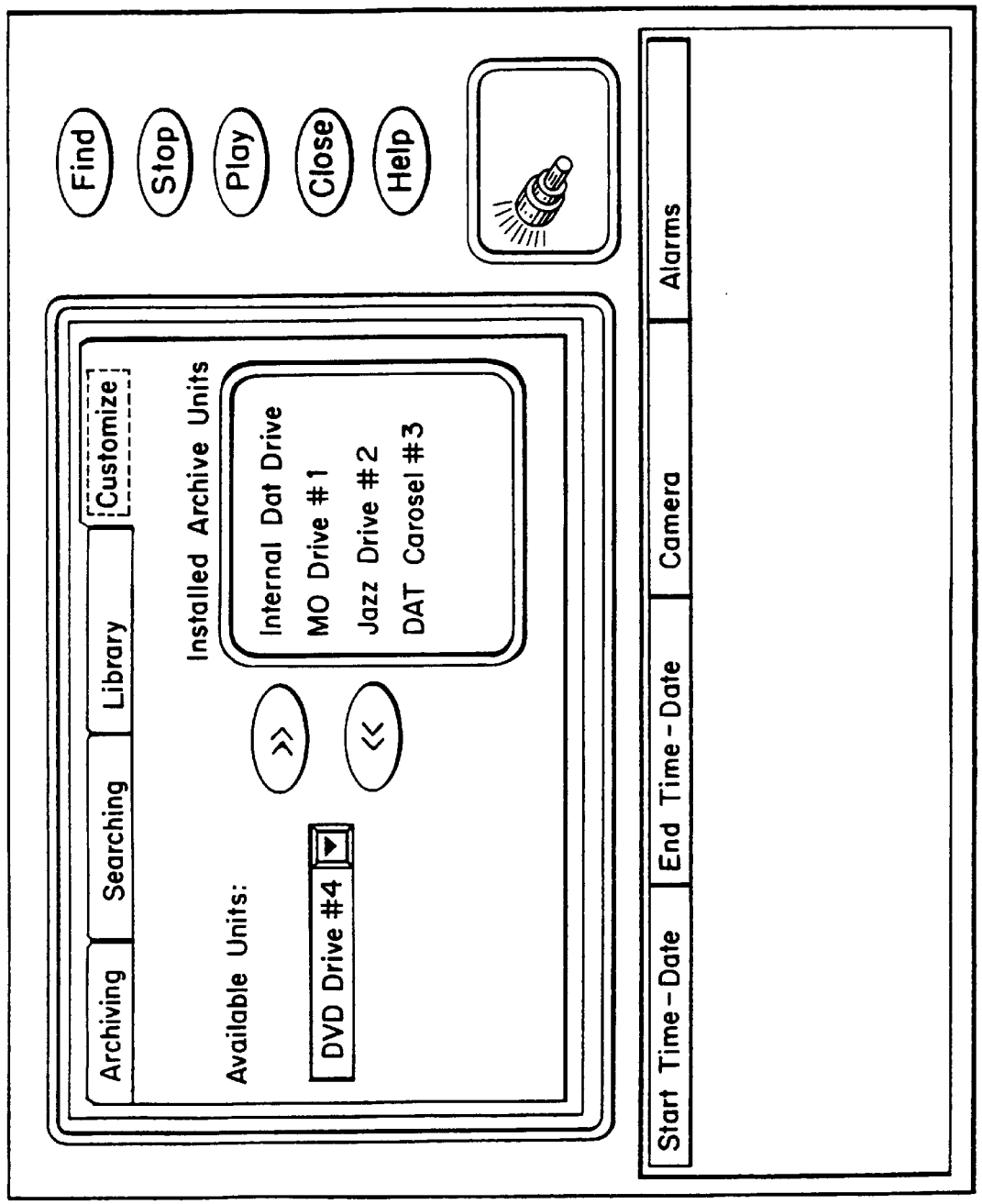

FIG. 168 is a screen display presented to the user to update a listing of archive media drive devices installed with the VR/PC unit.

Figure 169:
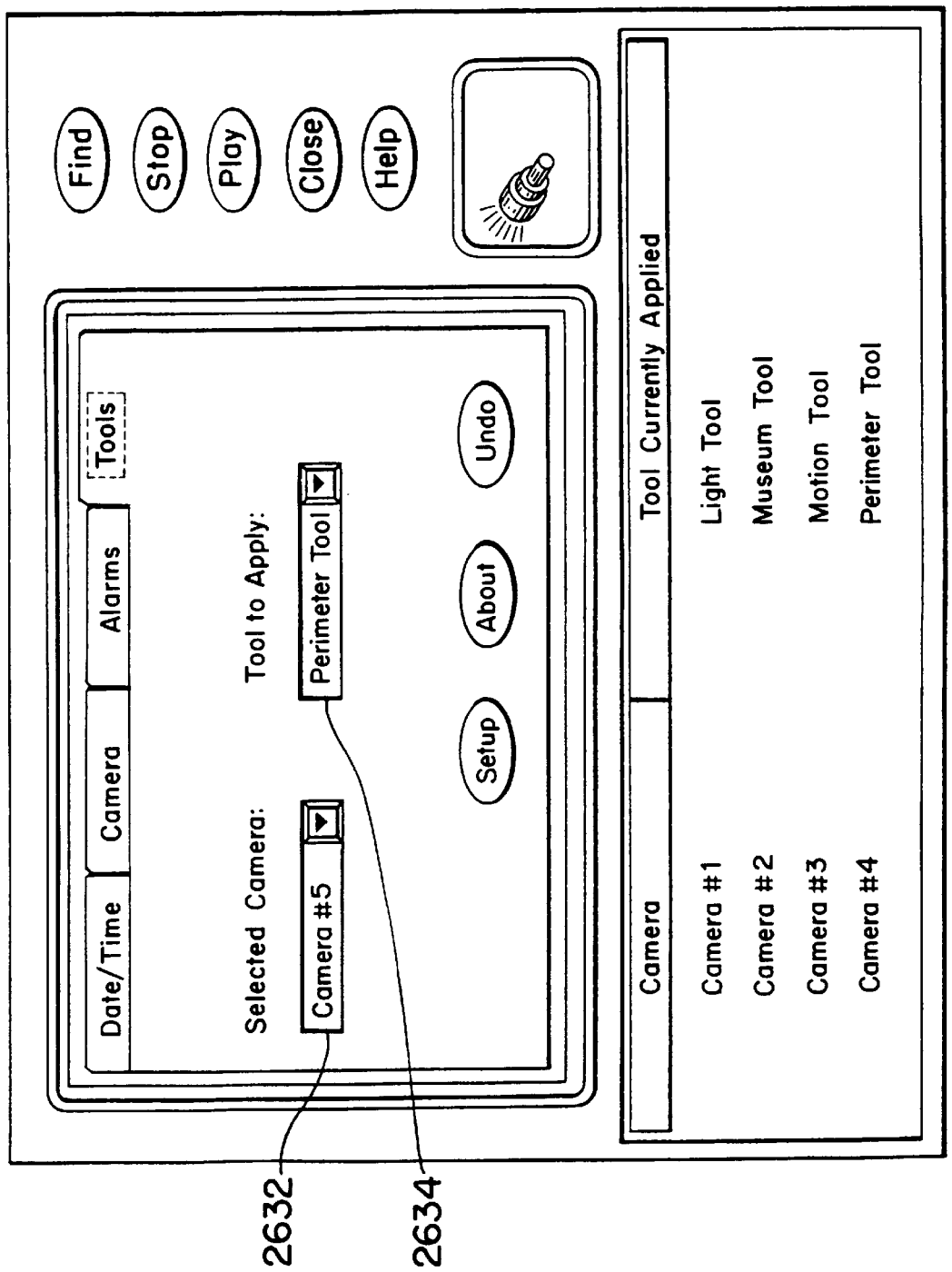

FIG. 169 is a screen display presented to the user to permit selection of an image analysis algorithm to be used in searching the video database stored in the VR/PC unit.

Figure 170:
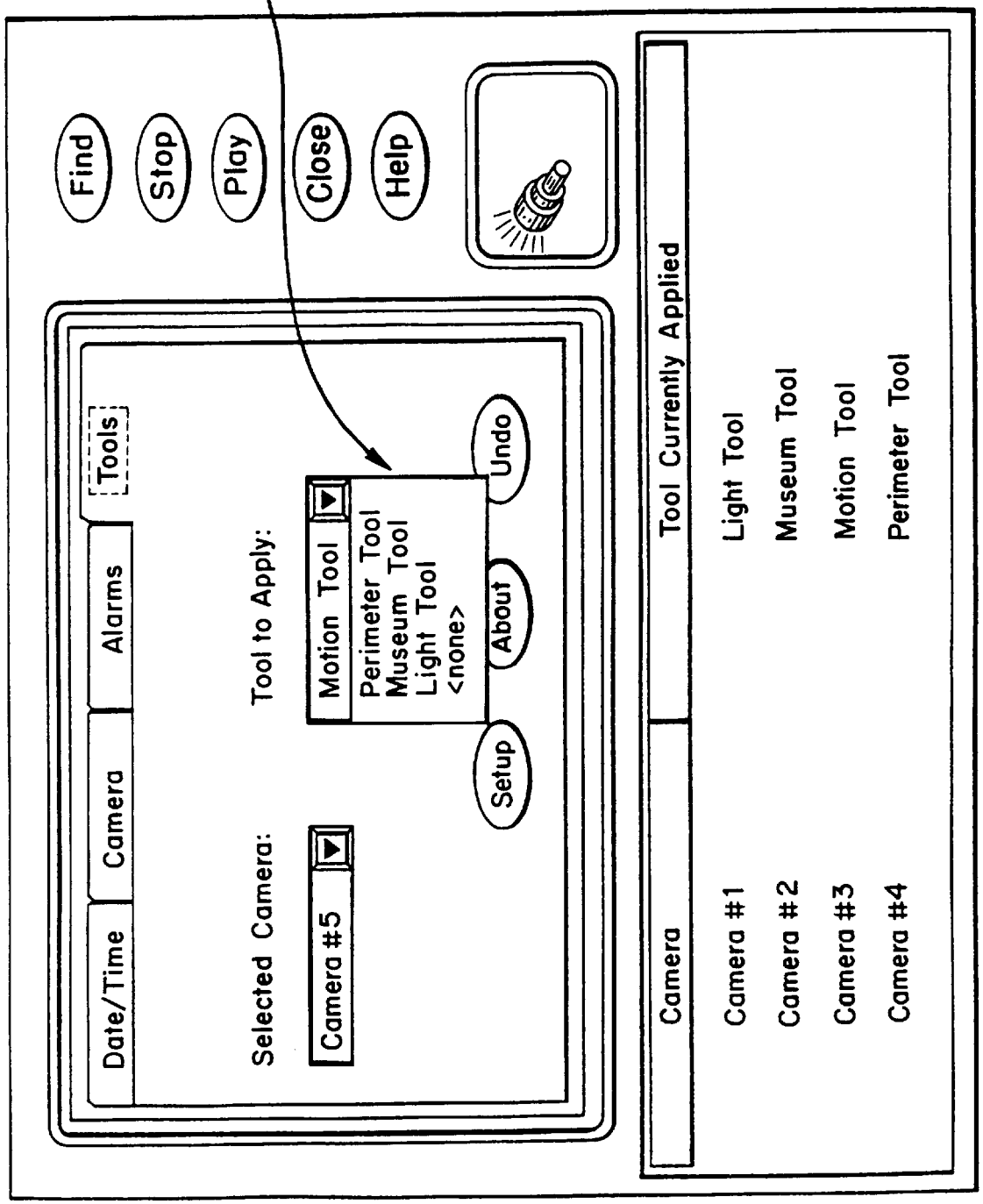

FIG. 170 is a screen display like that shown in FIG. 169, but also showing a pull-down menu listing image analysis algorithms available for selection by the user.

Figure 171:
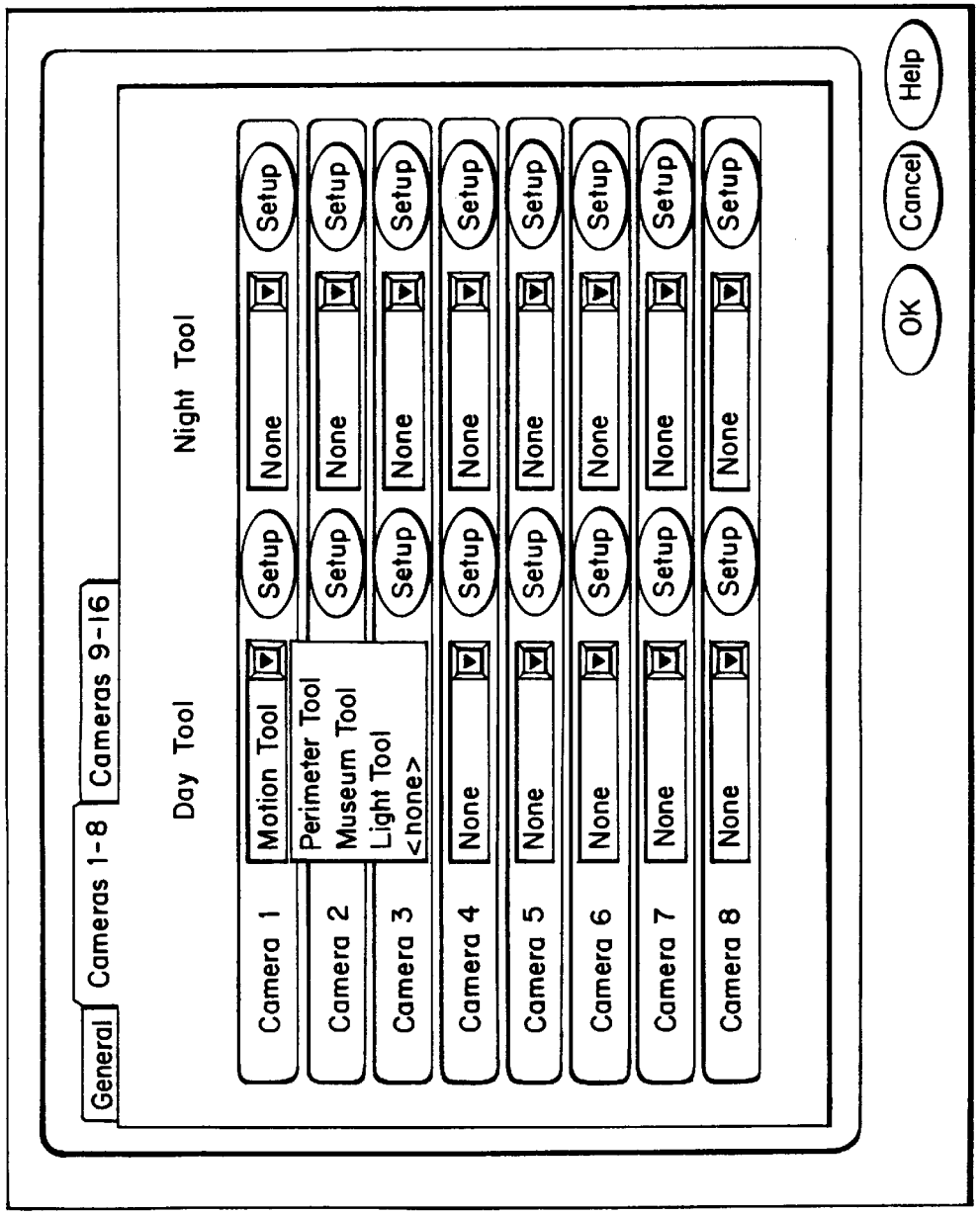
Figure 172:
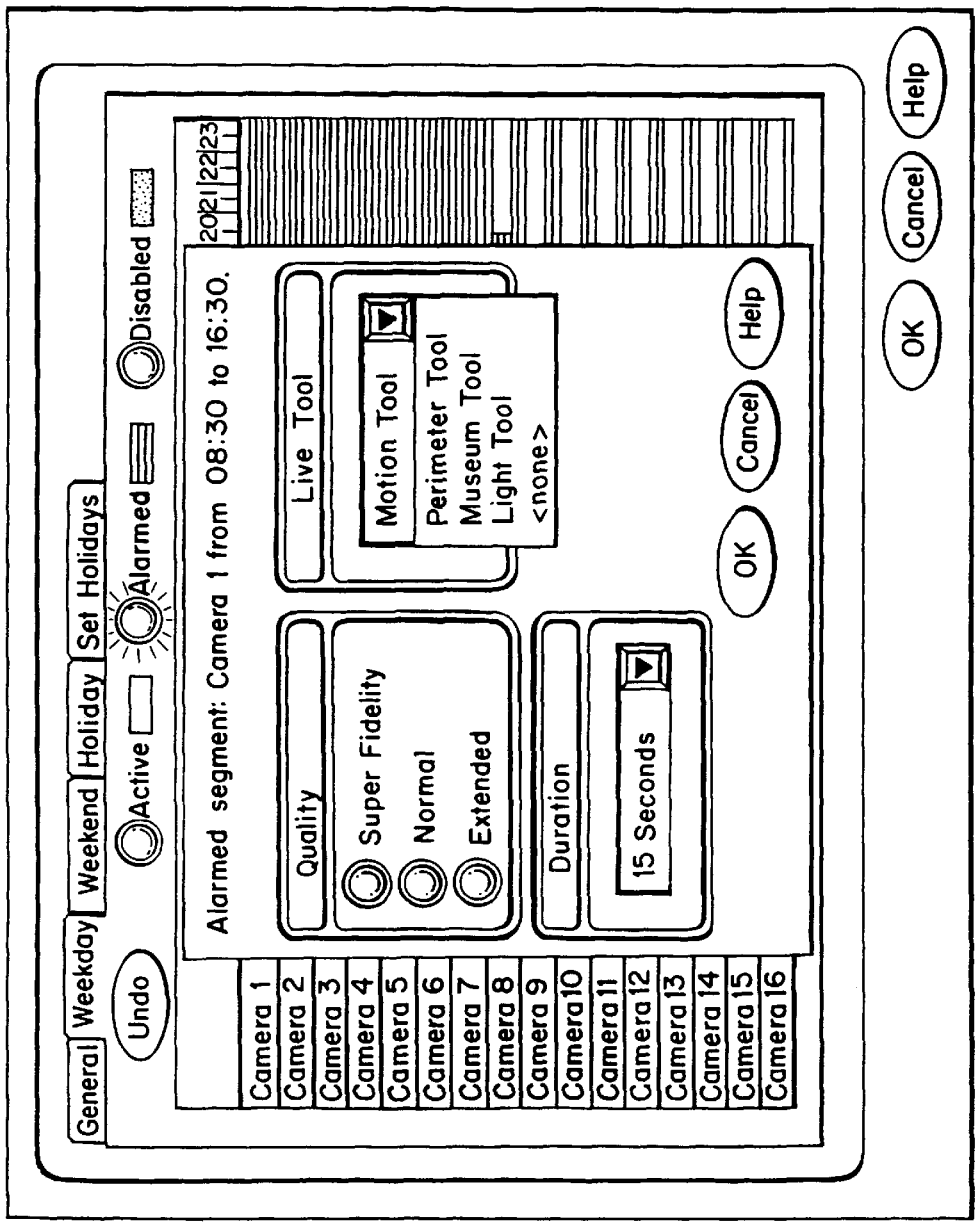

FIG. 171 and 172 are screen displays which permit the user to select, in connection with pre-scheduled system operating modes, an image analysis algorithm to be applied to a live incoming video stream.

Figure 173:
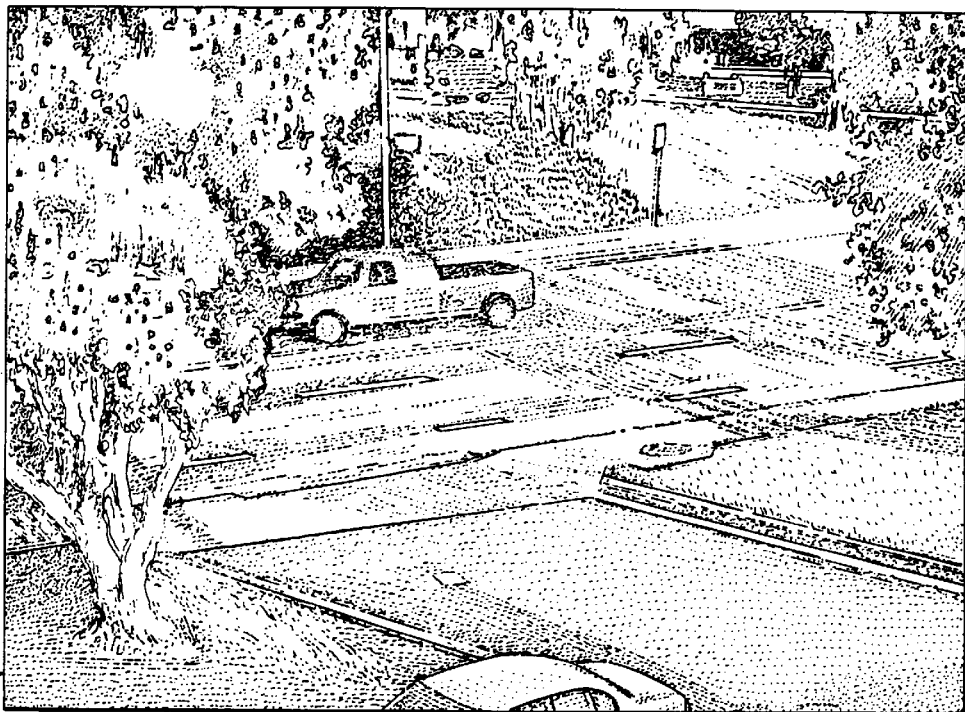

FIG. 173 is an example of a hard-copy screen print generated in response to actuation of a "print" option provided at FIG. 161.

DESCRIPTION OF PREFERRED EMBODIMENTS

IVIM SYSTEM OVERVIEW

FIG. 1 presents an overview of an intelligent video information management (IVIM) system, generally indicated by reference numeral 500. The system 500 is shown as extending over multiple locations and a plurality of business enterprises. For example, the business enterprises may include a multi-branch bank 502 and a multi-location retailer 504. The bank 502 and retailer 504 are, respectively, served by IVIM systems 506 and 508, which are quasi-independent from each other, but are at least selectively interactive with a master node facility 510 provided by a security service organization 512. For example, the service organization 512 may provide, install and service intelligent video information management systems and other video security systems.

The master node 510 is preferably in the form of a host computer which provides support functions and downloadable software resources to the IVIM systems 506 and 508. Although only two business enterprise IVIM's are shown in FIG. 1, it is contemplated that the master node 510 may provide support for a large number of businesses each maintaining its own IVIM system. The business enterprises may be located and have branches across the United States (for example), and in other countries as well. It is contemplated that the system disclosed herein will be used in many other types of enterprises in addition to banks and retailers.

As shown in FIG. 1, each of the IVIM systems 506 and 508 includes a local node 514 which provides oversight and management functions for the respective IVIM system. Each of the local nodes 514 is connected via a respective data communication channel 516 to the master node 510. Each data communication channel 516 may, for example, be constituted by a dedicated telecommunication channel, or the channel 516 may be implemented upon demand on a dial-up basis. The local nodes 514 are preferably implemented using standard personal computer hardware and software, augmented with novel software capabilities which will be described below.

Key components of each IVIM system are video analysis and storage units 518 connected by data communication paths 519 to the respective local node 516. Each unit 518 has connected thereto one or more video cameras, indicated as cameras 520-1 through 520-N. Each video analysis and storage unit 518 provides storage, analysis and selective retrieval of video information streams generated by the video cameras 520 connected thereto.

The number of video cameras connected to each unit 518 may vary from one analysis and storage unit to another. For example, the number of cameras may vary from one to more than a dozen. As will be seen, a preferred embodiment of the unit 518 supports up to 16 video cameras.

It should also be recognized that the number of analysis and storage units 518 in each IVIM system may vary. Although only 2 or 3 of the units 518 are shown per IVIM system in FIG. 1, the actual number of analysis and storage units in each enterprise may number in the dozens or higher.

Associated with each analysis and storage unit 518 are other components typically found in video security systems, as indicated by dotted-line boxes 522. The other security components 522 associated with each unit 518 may vary from unit to unit. An example of such other components is shown in the lower left hand corner of FIG. 1 as including two video display monitors 524, mechanically actuatable alarm sensors 526, and a camera control device 528.

Streams of video signals respectively generated by the video cameras 520 and received at the analysis and storage unit 518 are selectively directed from the unit 518 for display on the monitors 524. As will be seen, the signals may be displayed in a variety of formats including full screen, or in windows taking up only a portion of the image plane. Plural display windows may be formed on one or both of the displays 524 so that plural video streams are displayed simultaneously on a single video display 524. Preferably, the displays 524 are conventional items such as the NTSC monitor model JC-1215MA available from NEC and/or the SVGA monitor model C1591E available from Panasonic.

One advantage provided by the analysis and storage units 518 of the novel system disclosed herein is that the units 518 perform the video stream distribution function which is performed in conventional video surveillance systems by a video switch. Therefore, in a practical embodiment of the IVIM system, no video switch is required to be included in the "other security system components" 522.

The alarm sensors 526 are preferably conventional items which detect events such as opening or closing of doors, windows, display cases, etc., and generate signals indicative of such events and alarm signals. The alarm signals are provided to the analysis and storage unit 518 and to the camera control device 528.

The camera control unit 528 may be, for example, a conventional device such as the "TOUCHTRACK'R" camera control pad commercially available from the assignee of this application. The camera control device 528 and the analysis and storage unit 518 are connected for exchange of data messages therebetween.

It is assumed that some of the video cameras 520 are movable. That is, some of the cameras 520 are conventional items, such as dome cameras marketed by the assignee of this application, which have a direction of view that is adjusted in response to control signals. Movable ones of the video cameras 520 may also include cameras movable along a rail. Typically in movable cameras the zoom and focus settings thereof are also controllable by control signals. As indicated at 530, the camera control device 528 is arranged to supply control signals to the movable ones of the video cameras 520.

It is also assumed that some of the video cameras 520 are fixed as to field of view. It should be understood that it is contemplated that all cameras connected to a particular analysis and storage unit 518 may be movable, or all may be fixed.

As indicated at 532, the analysis and storage unit 518 and the camera control device 528 are connected for exchange of data therebetween. The control device 528 may be arranged so that, in response either to outputs from alarm sensors 526 or in response to a data message from the analysis and storage unit 518, control signals are automatically transmitted over the control signal path 530 to a selected one of the movable cameras 520 so that the movable camera is automatically positioned in response to an event detected by the alarm sensor 520 or by the analysis and storage unit 518.

The additional component configuration 522 described above is only exemplary, and may be subject to numerous variations. For example, the number of monitors may be reduced to one or increased to a number larger than two. As another possibility, both the alarm sensors 526 and the camera control device 528 may be omitted. Particularly, it will be understood that if all of the cameras 520 are fixed, no camera control device 528 would be required. Other peripheral devices, such as printers, may be present, and there may also be alarm enunciating devices such as flashing lights, sirens or the like. There may also be auxiliary data storage devices in addition to those included within the analysis and storage unit 518.

There may also be included in the additional components 522 a Point Of Sale Exception Monitoring system of the type marketed by the assignee of this application under the trademark POS/EM.

In addition to the communication links that have previously been described as being in place between the local nodes 514 and associated analysis and storage units 518, there may be direct communication links, as indicated at 534, between the master node 510 and the analysis and storage units 518. The data links may be formed by conventional dedicated lines, dial-up connections, satellite, LAN, WAN and/or via the Internet. If the Internet is used, the nodes and storage units are preferably arranged to support "streaming" protocols for efficient data transmission.

VR/PC UNIT OVERVIEW

Figure 2:
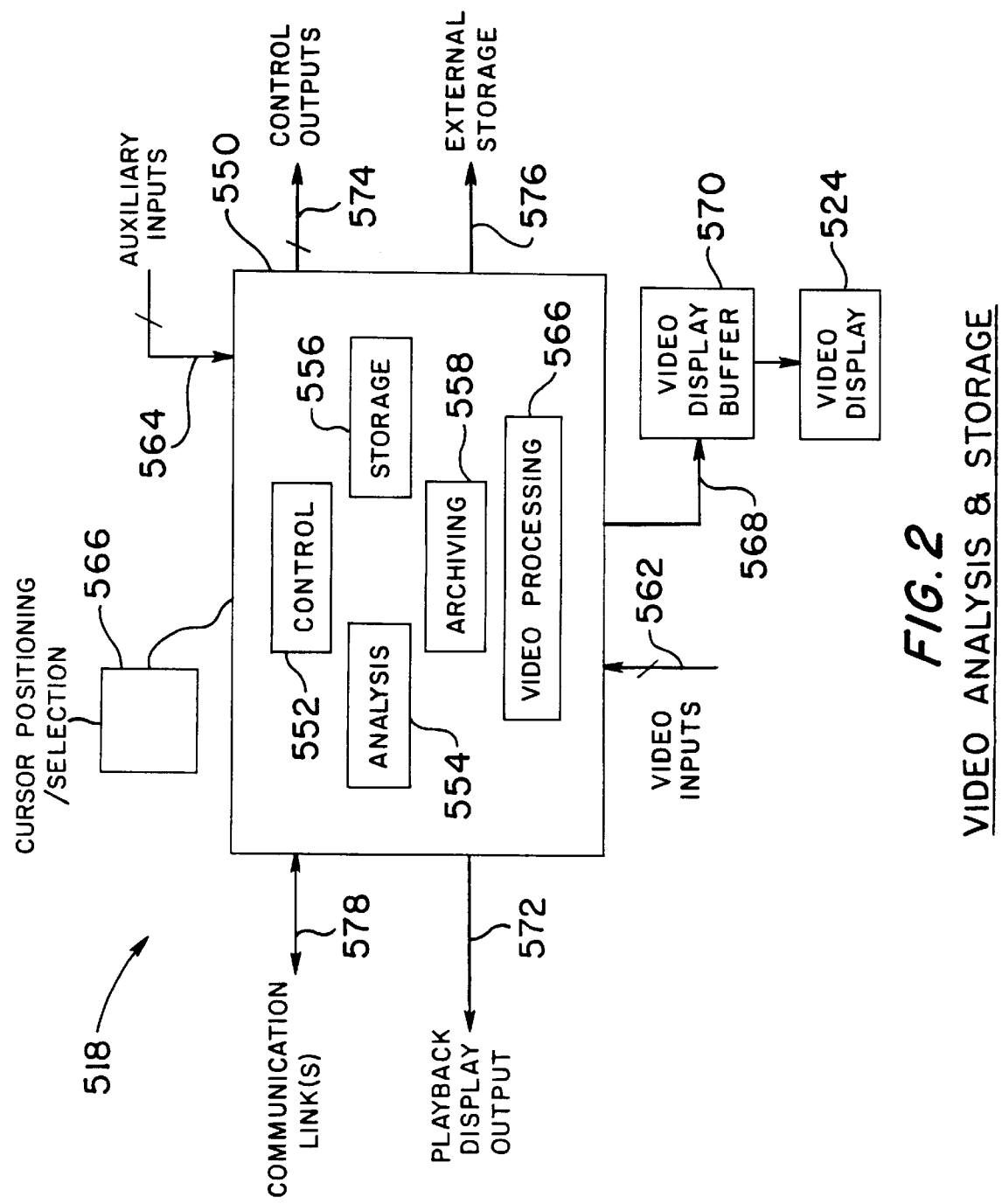
FIG. 2 represents, in functional block form, a video analysis and storage apparatus forming a functional part of the system of FIG. 1.

FIG. 2 provides a functional overview of the video analysis and storage block 518. A main unit 550, which will be described in detail below, provides a control function 552, an analysis function 554, a storage function 556, an archiving function 558, and a video processing function 560.

Inputs to the unit 550 include video inputs 562 from the cameras 520 (FIG. 1) and auxiliary inputs 564 such as the alarm condition detection signals provided from alarm sensors 526 (FIG. 1).

Continuing to refer to FIG. 2, user control signals for the main unit 550 may be provided from a cursor positioning and feature selection device 566. The device 566 is preferably a conventional mouse, such as those commercially available from Microsoft, but may alternatively be a track ball, touch screen, light pen, and so forth. A preferred embodiment of the unit 550 also includes a front panel (not shown in FIG. 2) including switches for manipulation by the user.

Outputs from the unit 550 include live video data 568, provided through a video display buffer 570 to a display unit 524. Another output of the unit 550 is a reproduced video signal as indicated at 572. Although the reproduced video output 572 is shown as separate from the live video output 568, it should be understood that the reproduced video may be transmitted through video display buffer 570 for display on the video display unit 524. Further outputs from the unit 550 include control signals 574 and reproduced video data and accompanying indexing information, as indicated at 576, for storage on external storage devices. Such devices, which are not shown, may include digital or analog tape recorders, write-once or re-writable video disk recorders, and/or DVD recorders, whether connected by dedicated lines or on a dial up basis to the main unit 550.

Data communication links 578 provide for data communication between the main unit 550 and other computing devices, and include, for example, the communication channels 516, 519 and 534 shown in FIG. 1. Although not shown in the drawing, a conventional modem may be incorporated in or attached to the VR/PC unit.

Figure 3:
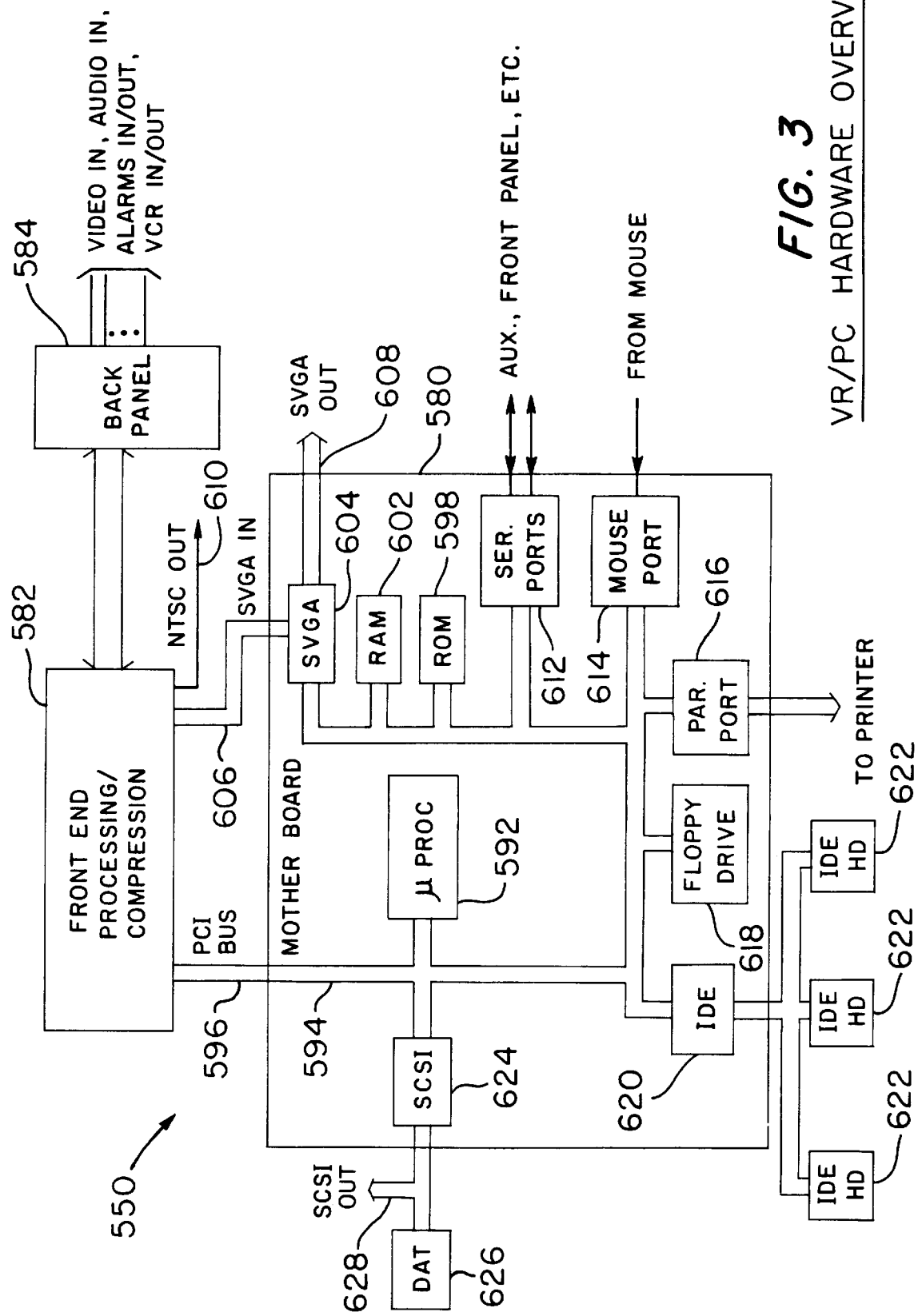
FIG. 3 is a block diagram of electronic components of a video recording/personal computer (VR/PC) unit provided in accordance with the invention and used in the system of FIG. 1.

FIG. 3 illustrates the hardware architecture of the main unit 550. The unit 550 shown in FIG. 3 incorporates unique hardware and software features that provide an unprecedented fusion of PC and video recording capabilities, and will therefore be referred to as a 'VR/PC' (Video Recorder/PC) unit. In addition to novel video data compression and recording techniques, the VR/PC unit 550 performs data management, routing and analysis functions that have not previously been proposed. The VR/PC unit 550 also implements unique user interface features that make the unit's capabilities conveniently available for selection and operation by the user.

Figure 5:
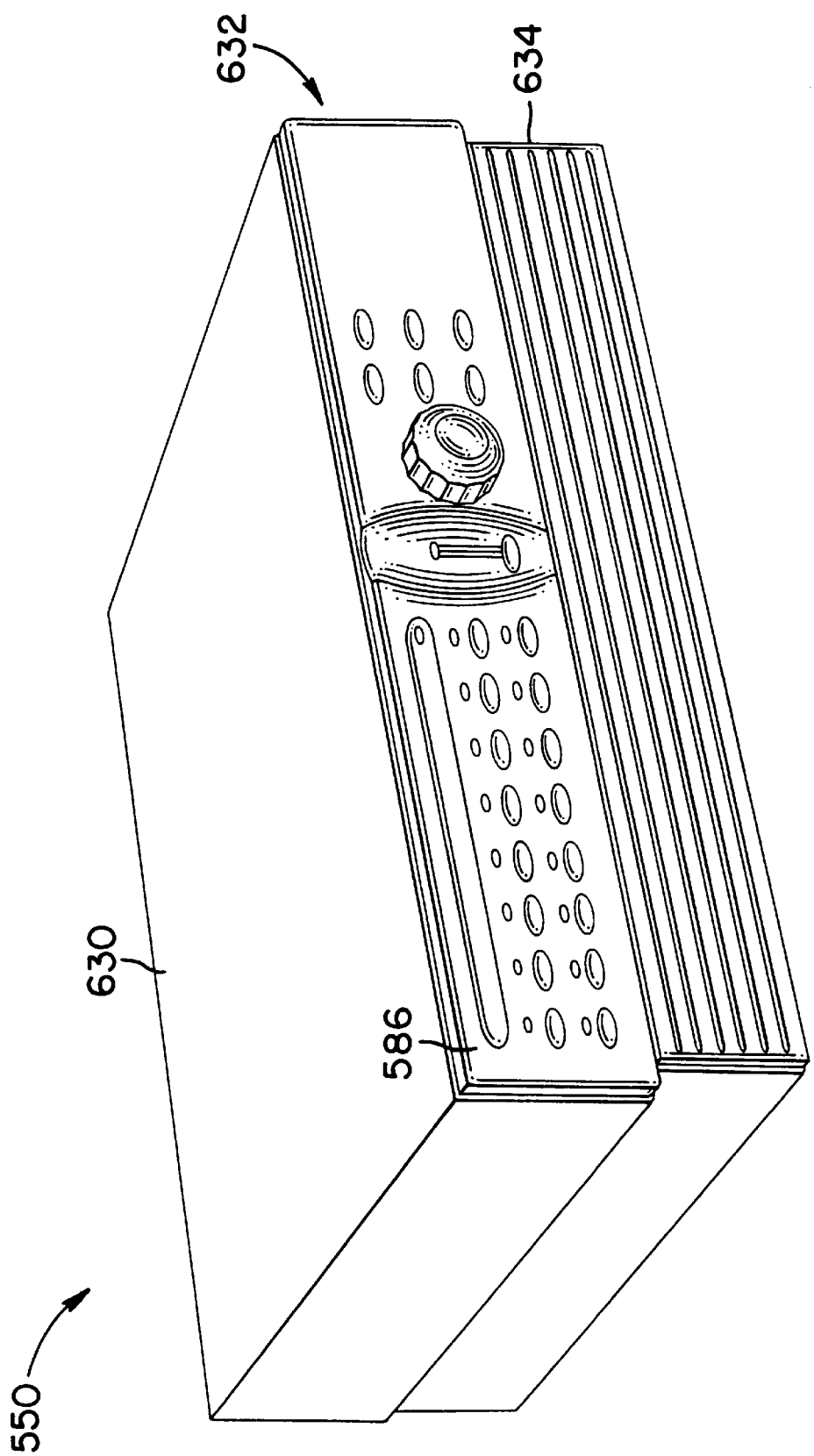
FIG. 5 is a perspective view showing the housing and front panel of the VR/PC unit.
Figure 6:
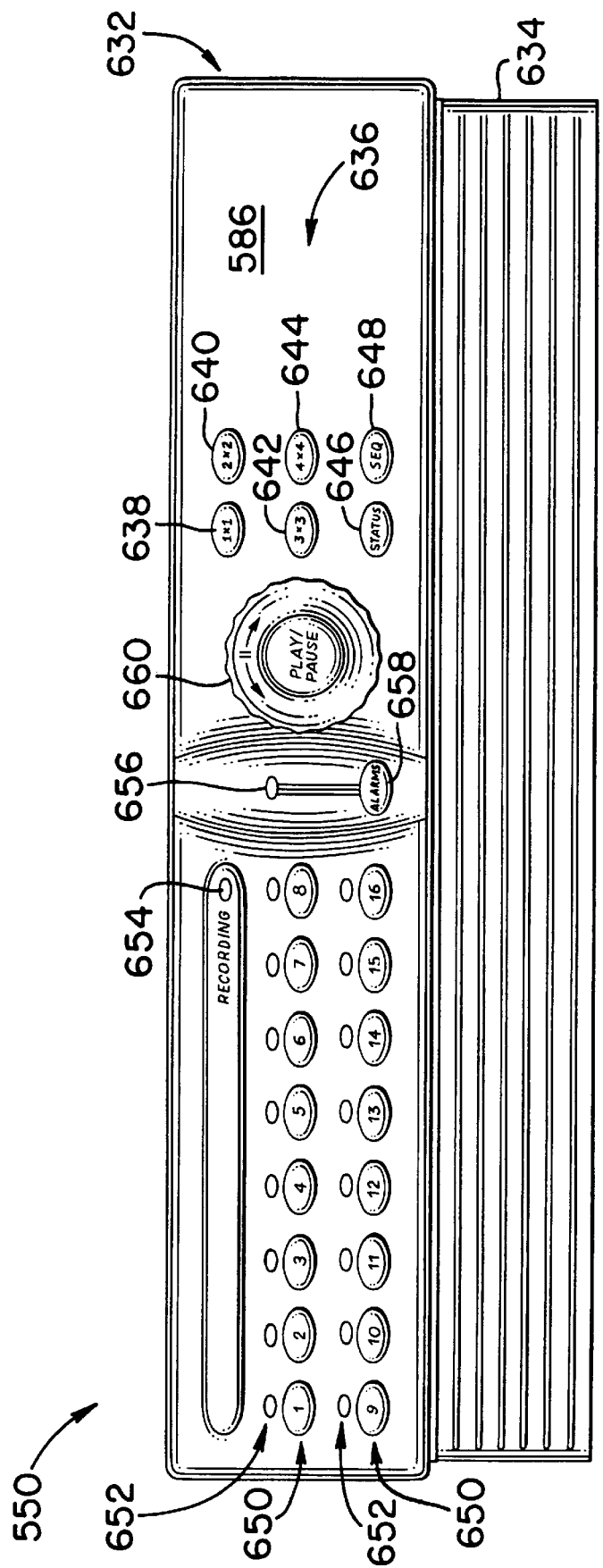
FIG. 6 is an elevational view of the front panel of the VR/PC unit.

The VR/PC unit 550 includes a motherboard 580, front end video processing and video data compression hardware 582, a back panel 584 and a front panel 586 (FIGS. 5 and 6).

Figure 4:
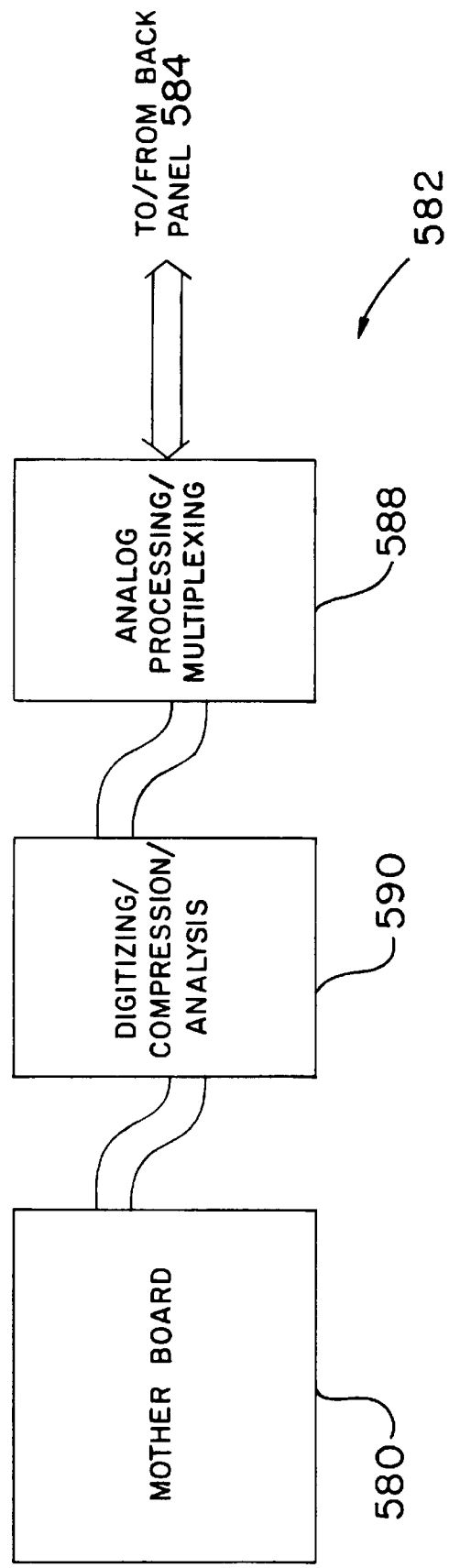
FIG. 4 is a pictorial representation of a circuit board architecture employed in the VR/PC unit of FIG. 3.

As somewhat schematically illustrated on FIG. 4, the front end processing and compression hardware 582 is made up of two separate printed wiring boards: an analog processing/multiplexing board 588, which receives video signals directly from the back panel 584, and a digitizing/compression/analysis board 590 connected between the analog board 588 and the motherboard 580.

In an alternative embodiment of the invention, the digitizing/compression/analysis components of board 590 are arranged on two separate PWB's connected between the analog board 588 and the motherboard 580.

Referring again to FIG. 3, the motherboard 580 preferably is similar in architecture to standard personal computer motherboards and is populated entirely with standard, commercially available components. Thus, the VR/PC hardware is essentially implemented as a standard PC platform, although with novel front end electronics, as described in detail below. The components on the motherboard 558 include a microprocessor 592, functioning as a CPU. The microprocessor 592 is preferably a Pentium P5-120C from Intel, operating at 100 megahertz with the Windows 95 operating system. Other processors, including those operating at higher speed, may be used. A bus 594, provided in accordance with the PCI standard, interconnects the CPU 592 with other components on the motherboard 580. As indicated at 596, the PCI bus 594 is extended to interconnect the motherboard 580 with the front end electronics 582. Other components on the motherboard 580 include a program memory ROM 598, and a working memory 602. In a preferred embodiment, the working memory 602 is constituted by 16 megabytes of RAM.

Also provided on the motherboard 580 is an SVGA chip set 604, which may be the "Alpine" chip set marketed by Cirrus Logic. An SVGA video data input path 606 is provided directly from the front end electronics 582 to the SVGA chip set 604. The SVGA chip set provides an output 608 to drive one or more SVGA monitors. (An NTSC output is provided directly from the front end electronics 582 for driving NTSC monitors. If the presence of an NTSC monitor is sensed (by conventional means, not shown), then the SVGA output may be disabled.)

The motherboard 580 also includes a number of serial ports 612, to handle data communication between the motherboard and auxiliary devices. The auxiliary devices may include the above-mentioned alarm sensors, as well as alarm enunciators, electronically controlled door locks, conventional POSEM (point of sale exception monitoring) devices, and so forth. A mouse port 614 is included on the motherboard 580 for the purpose of receiving user-actuated control signals from the mouse 566 (FIG. 2). Continuing to refer to FIG. 3, a parallel port 616 is provided on the motherboard 580 as a source of data used to drive a report printer (not shown). Also connected to the motherboard 580 is a conventional floppy disk drive 618, which preferably is arranged to accept 3½ inch disks.

Also provided on the motherboard 580 is an IDE (integrated drive electronics) controller 620 which provides an interface to a plurality of IDE hard drives 622, mounted within the VR/PC unit 550. The hard drives 622 provide mass storage for video data, indexing information, programs and so forth. Preferred embodiments of the VR/PC unit include two, three or more hard drives 622. A suitable hard drive unit for use in the VR/PC 550 is the "Caviar" 2 or 2.5 gigabyte drive available from Western Digital. Hard drives from Seagate or other suppliers may also be used.

A SCSI interface 624 is also present on the motherboard 580. A DAT (digital audio tape) drive 626 is connected to the motherboard 580 through the SCSI interface 624, and constitutes the primary archive medium drive device for the VR/PC unit. The DAT drive may, for example. be a Sony model SDT-7000/BM, which stores 2 gigabytes of data on a 4 mm×90 m magnetic tape. Other known DAT recorders may also be used. It is contemplated to use other archive medium drive devices in addition to or instead of the DAT drive 626. For instance, a digital video disk (DVD) drive or a linear digital tape drive may be employed.

Also provided through the SCSI interface 624 is a SCSI output port 628.

The outward physical appearance of the VR/PC unit 550 is illustrated by FIGS. 5 and 6. FIG. 5 shows a molded plastic housing 630 having a front elevation 632, which includes the front panel 586 and a hinged dust-shield 634. The dust-shield 634, shown in a closed position in FIGS. 5 and 6, may selectively be opened by the user to permit access to the floppy and DAT drives, which are contained within the housing 630.

As an alternative to the stand alone housing configuration shown in FIG. 5, it is contemplated to provide a housing configured with suitable hardware for rack mounting.

Switches 636, provided on the front panel 586, permit the user to control much of the functionality of the VR/PC unit. The switches 636 include display format switches 638, 640, 642 and 644. As indicated by the labels on these four switches, the user may use these switches to select among display formats in which 1, 4, 9 or 16 video image streams are displayed on the monitor or monitors. Switch 646 allows the user to select a display screen which provides information indicative of the status of the VR/PC unit, and switch 648 permits the user to select a mode of operation in which a plurality of video streams are presented one at a time, but in accordance with a predetermined sequence.

The front panel 586 also has mounted thereon camera selection switches 650, labeled from "1" to "16". Each of the camera selection switches 650, when actuated, calls up for display on the monitor the video signal currently generated by the corresponding video camera. Associated with each one of the camera selection switches 650 is a respective LED 652, which is illuminated when the live signal from the corresponding camera is being displayed. Also mounted on the front panel 586 is an LED 652 which is illuminated when the VR/PC unit is recording one or more incoming video signals generated by the cameras 520.

Another LED 656 is mounted on the front panel 586 to indicate that an alarm condition has been detected (either through the alarm sensors 526 or by image analysis carried on within the VR/PC unit itself). An alarm switch 658 is near the alarm indicator 656 and may be actuated by the user to cause the system to display information concerning the detected alarm or alarms.

Another notable feature mounted on the front panel 586 is a jog-shuttle switch 660. The jog-shuttle 660 is similar in appearance, operability and functionality to switches provided on conventional VCR's, and is provided for controlling playback of video image streams that have been stored on the hard drive or drives within the VR/PC unit 550.

The jog-shuttle 660 is arranged to allow the user to control such well-known playback features as forward playback, reverse playback and pause (still image) playback. Preferably, at least two forward and reverse playback rates are provided, corresponding to different amounts by which the jog-shuttle switch is rotated clockwise or counterclockwise. Preferably, the jog-shuttle switch 660 automatically returns to a "neutral" position after being released by the user and playback or rewind continues at the rate selected by the latest manipulation of the switch 660.

To summarize the overall layout of the front panel 586, four areas may be defined, proceeding from left to right:

Area 1: two rows of camera selection switches 650 (eight switches per row) with associated camera selection indicators 652 (also forming two rows), and also including the recording indicator 650;

Area 2: alarm indicator 656 and selection switch 658;

Area 3: jog-shuttle switch 660; and

Area 4: display control switches 638–648.

Figure 12:
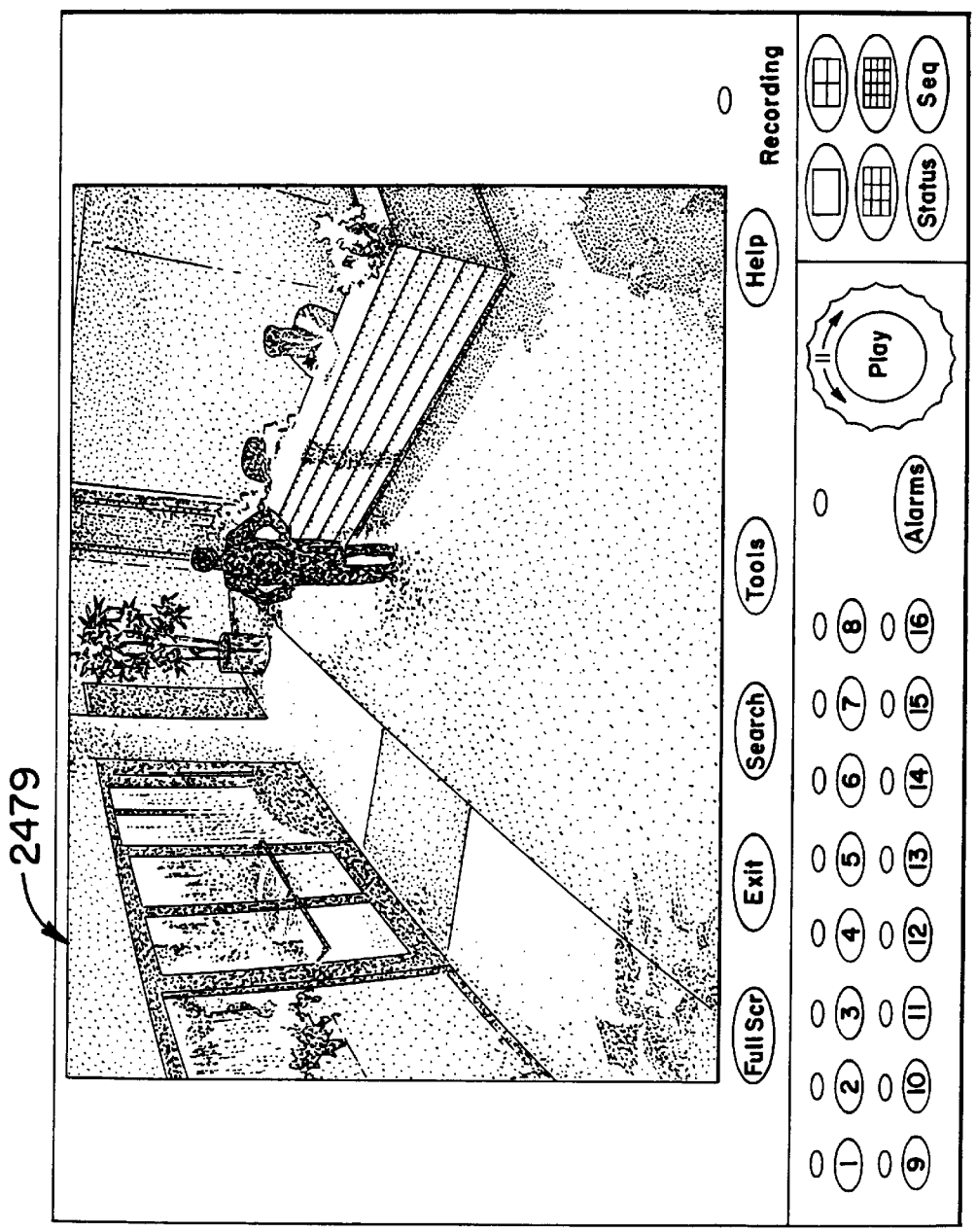
FIG. 12 is a print of a screen display generated by the VR/PC unit when operating in a playback mode, and also having cursor-actuatable control regions.

As will be seen, a substantially similar switch and indicator layout, which emulates the front panel 586, is provided in mouse-actuatable screen displays which form part of the graphical user interface (GUI) supported by the VR/PC unit 550. Examples of such screen displays are shown at FIGS. 11 and 12 and will be discussed further below.

According to another embodiment at the VR/PC unit all of the switches, LEDs and other features shown on the front panel 586 may be omitted, so that the VR/PC unit is controlled only through mouse-actuatable screen displays.

Figure 7:
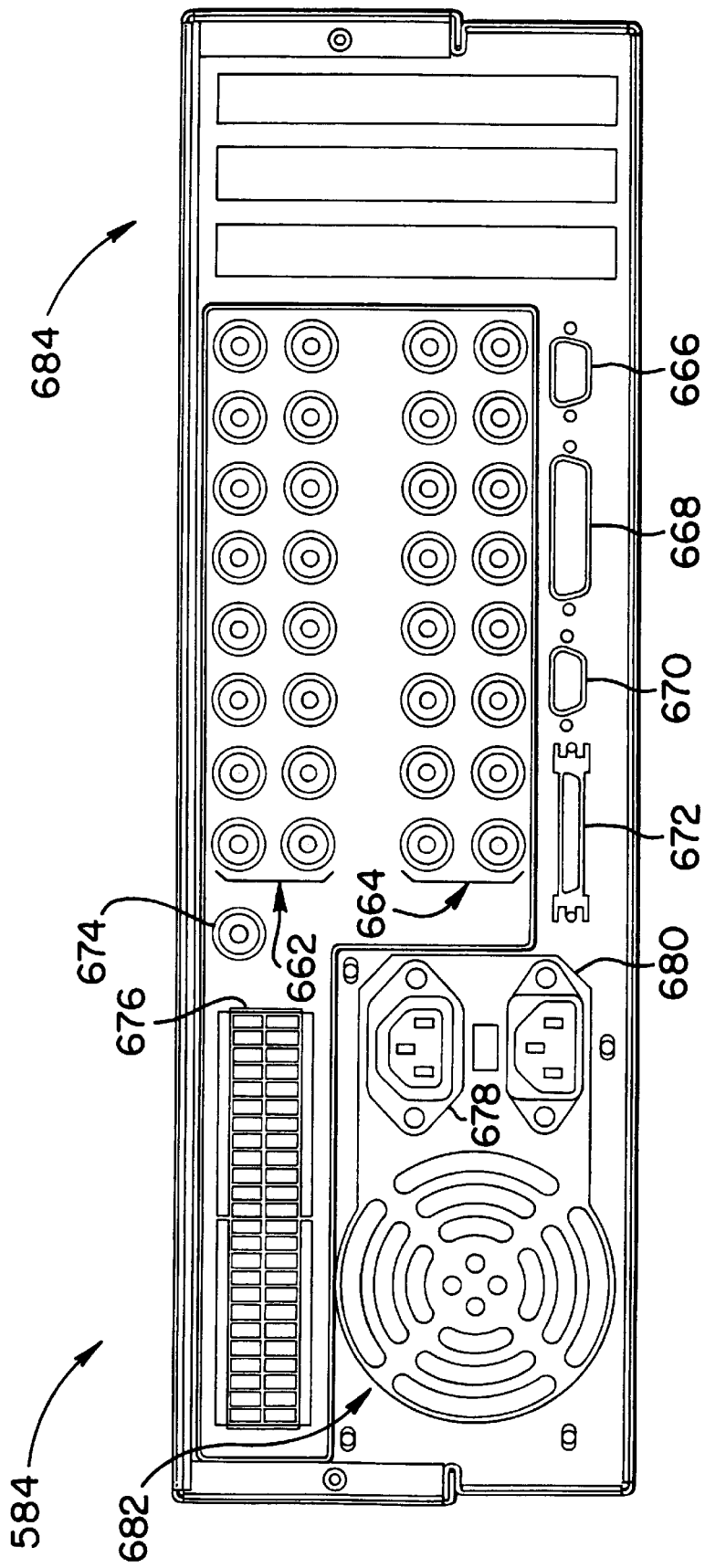
FIG. 7 is a rear elevational view of the VR/PC unit.

Turning now to FIG. 7, details of the back panel 584 of the VR/PC unit will now be described.

In an upper central region of the back panel 584 are provided 16 video input ports arranged in two rows of eight ports each, and indicated by reference numeral 662. Below the video input ports 662 are provided 16 loop-through output ports (also in two rows of eight apiece), indicated by reference numeral 664. Both the input ports 662 and output ports 664 are for analog video. In a lower tier underneath the ports 662 and 664 are provided, from right to left, a serial port 666, a printer (parallel) port 668, an SVGA (digital video) output port 670 and an SCSI port 672. An additional (analog) video output port 674 is provided adjacent to the input video ports 662.

At an upper left portion of the back panel 584 there is a multi-position connector jack 676 to permit the VR/PC unit to be connected for digital communication with other devices. Below the data communication port 676 are provided a power-in receptacle 678 and a loop-through power-out receptacle 680. Adjacent the power receptacles 678 and 680 is a ventilation aperture 682. At the right side of the back panel 584 are three expansion slots 684.

MEDIA DRIVE SUPPORT STRUCTURE

A compact and efficient media drive support structure is mounted within the housing 630 of the VR/PC unit 550. The medium drive support structure will now be described with reference to FIGS. 8–10 and is indicated generally by reference numeral 700 in FIG. 8.

The major components of the support structure 700 are a base member 702, an intermediate member 704 and a top member 706.

Figure 9A:
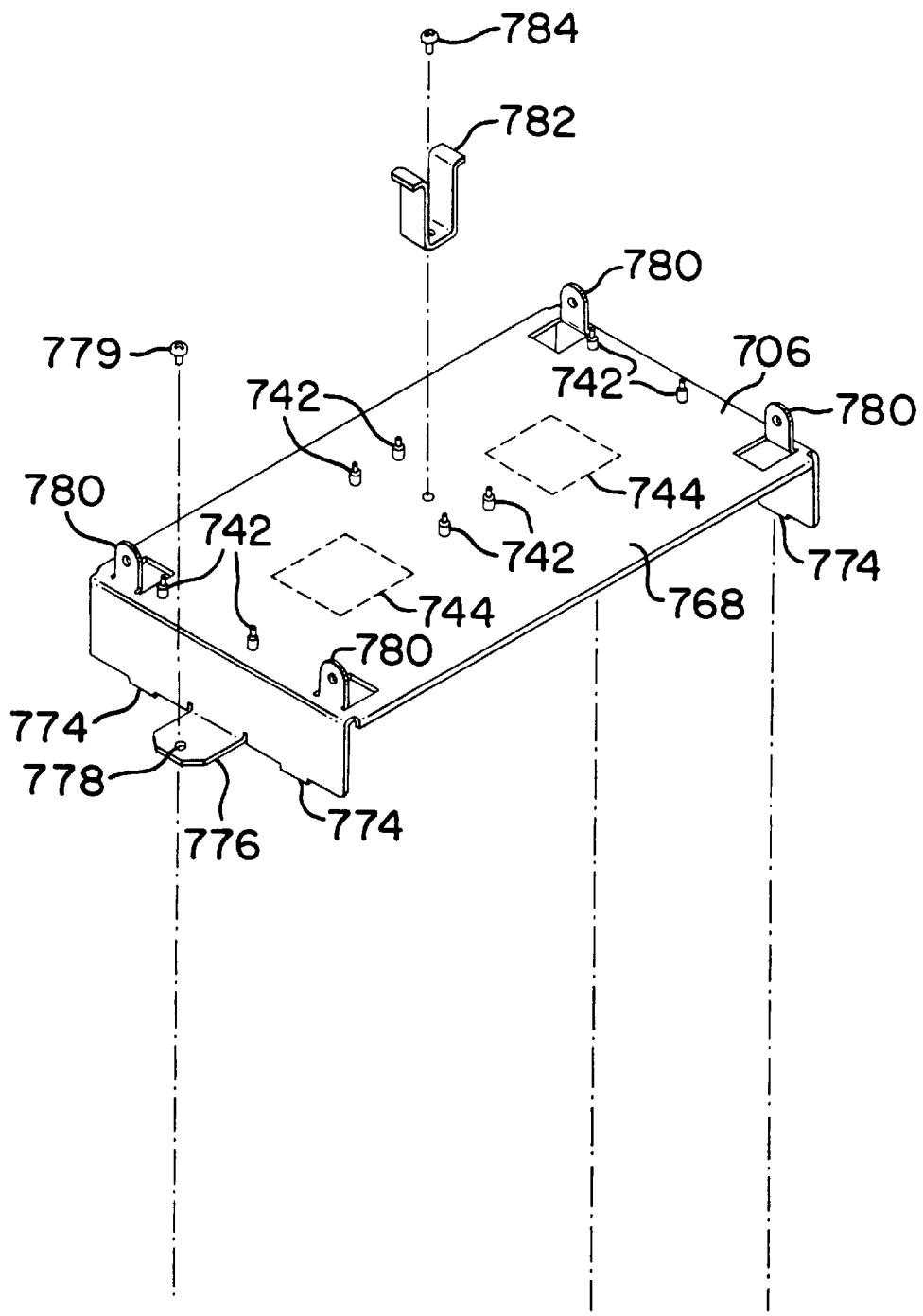
FIG. 9 is an exploded representation of the disk drive support structure of FIG. 8.
Figure 9B:
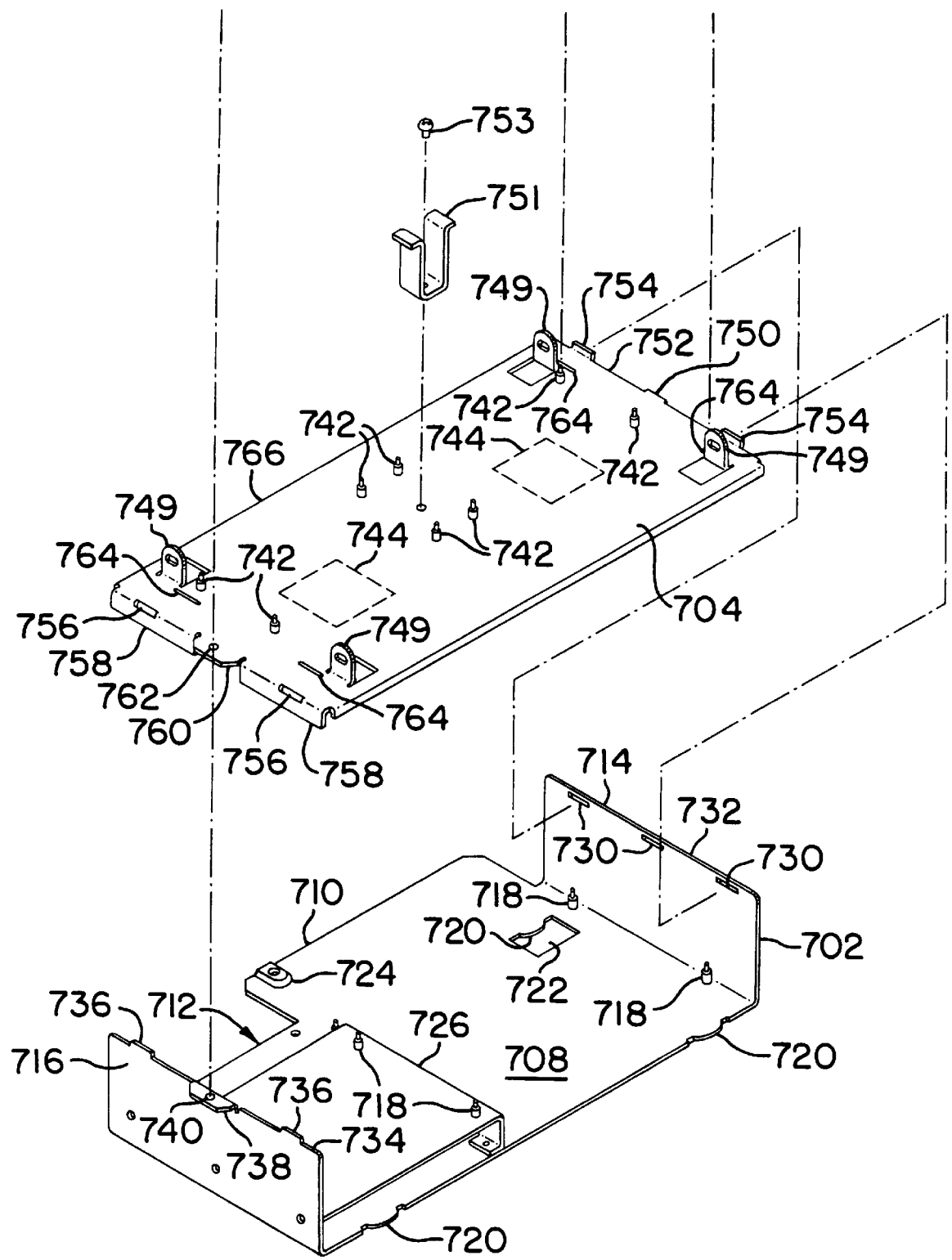

As best seen from the exploded view shown in FIG. 9, the base member 702 is substantially unshaped in cross-section, the intermediate member 704 is essentially planar, and the top member 706 is substantially an inverted u-shape. When the support structure 700 is assembled, the intermediate member 704 is supported on the base member 702, and the top member 706 is, in turn, supported on the intermediate member 704. All of the members, 702, 704 and 706 are preferably formed by applying bending and punching operations to sheet metal.

The base member 702 includes a substantially planar base plate section 708. The base plate 708 is substantially rectangular, except for an extension portion 710 which extends rearwardly in the plane of the plate 708 from a portion of a rear side 712 of the base plate 708. At opposed end sides of the plate 708, vertical side walls 714 and 716 are formed and extend upwardly from the base plate 708. Positioning studs 718 are mounted in a right-ward region of base plate 708. The studs 718 are provided to define a position for a DAT drive unit to be mounted on base member 702. At a front side of the base plate 708, curved tabs 720 are formed. Additional tabs 720 are formed at respective rear portions of the base plate 708 by means of cutouts 722. (One of the additional tabs 720 and its corresponding cutout 722 is occluded by the side wall 716 and riser member 726 in the view provided in FIG. 9). The tabs 720 are shaped for insertion into bridge lances formed on the chassis (not shown) of the VR/PC unit. By means of these bridge lances and the tabs 720, the base member 702, and consequently the entire media drive support structure (with drives installed therein) is secured within the housing 630 of the VR/PC unit.

A raised access hole 724 is formed in a left-ward portion of the extension portion 710 of the base plate 708. The access hole 724 is provided to permit insertion of a fastener such as a screw used to secure the base plate 708 to a pin nut (not shown) provided on the chassis of the VR/PC unit. A riser member 726 is secured to the base plate 708 at a left-ward portion of the base plate. A plurality of positioning studs 728 (of which only one is shown, FIG. 8) are provided on the riser member 726 to arrange for positioning of a floppy disk drive unit to be supported on the riser member 726. When the drive support structure 700 is assembled, as seen from FIGS. 8 and 10, the space provided between the upper surface of the riser member 726 and the lower surface of the intermediate member 704 provides a form factor corresponding to one-half of a standard drive unit form factor, suitable for accommodating a standard floppy disk drive.

Referring again to FIG. 9, the right side wall 714 of the base member 702 has three slots 730 formed therein, extending horizontally adjacent to a top edge 732 of the side wall 714. The left side wall 716 of the base member 702 has a top edge 734, from which short tabs 736 extend vertically upward from, respectively, front and rear portions of the top edge 734. A fastener tab 738 extends horizontally outwardly from a central portion of the top edge 734 of the side wall 716. A hole 740 is formed in the tab 738 to permit insertion of a fastener through the tab 738.

Still referring to FIG. 9, the intermediate member 704 carries eight positioning studs 742, arranged in two groups of four, each group for positioning a respective hard disk drive unit.

Figure 10:
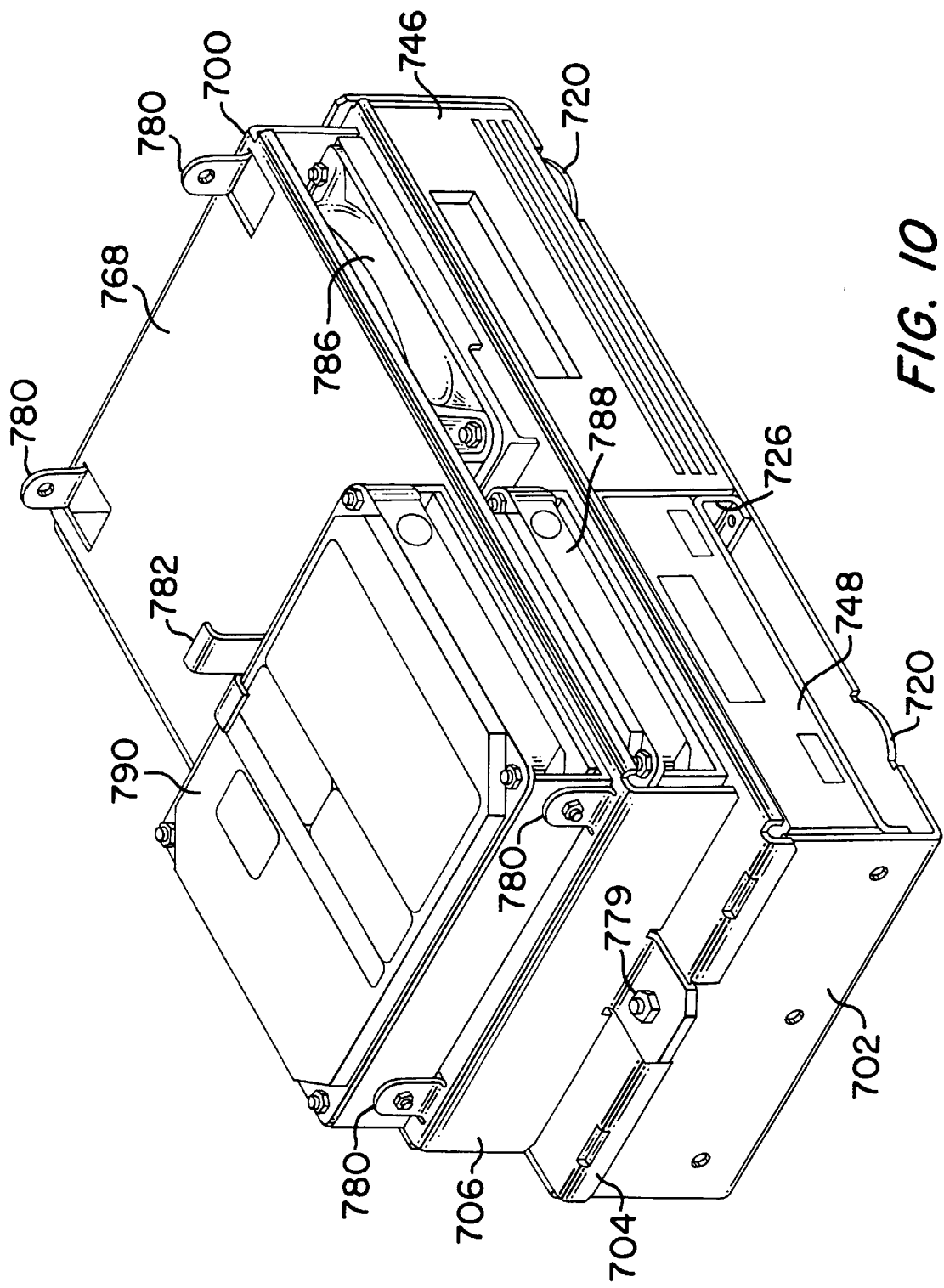
FIG. 10 is an isometric view of the drive support structure of FIG. 8, as assembled and supporting hard disk drive units and other media drive units.

Carried on the under side of the intermediate member 704 are pressure pads 744 (shown in phantom). When the support structure is in its assembled condition, as shown in FIG. 10, with drive units mounted therein, the pressure pads 744 exert downward pressure, respectively, on a DAT drive unit 746 and a floppy disk drive unit 748, to maintain those drive units in place in the drive support structure 700. The pressure pads 744 are preferably made of a resilient elastomeric material.

Punched-out fastener tabs 749 extend upwardly from positions at the four corners of the intermediate member 704. Holes formed in the tabs 749 permit insertion of fasteners for securing to the intermediate member 704 hard disk drive units mounted on the member 704. A unshaped bracket 751 is provided for attachment via a fastener 753 at a central portion of the intermediate member 704. The bracket 751 aids in securing to the intermediate member 704 the hard drive units mounted thereon.

A short tab 750 extends horizontally outwardly from a right side edge 752 of the intermediate member 704. Two hinge tabs 754 curve outwardly and upwardly from the edge 752, and are positioned respectively at front and rear positions on edge 752. The tabs 754 and 750 are spaced along edge 752 of member 704 so as to be simultaneously insertable through the slots 730 in side walls 714 of base member 702. After insertion of the hinge tabs 754 into the outer slots 730, the intermediate member 704 may, during assembly, be swung downwardly toward the base member 702.

At the left side of the intermediate member 704, there are provided slots 756 spaced so as to accommodate insertion therein of the short tabs 736 on the side wall 716 of base member 702. Also at the left side of member 704 are downwardly extending flaps 758 and a fastener tab 760 (similar to the fastener tab 738 of member 702) and having a hole 762 formed therein.

Two further pairs of slots 764 are also formed in the member 704, each pair of slots 764 being spaced a short distance from a respective side edge of the member 704. A short downward flap 766 is formed at each of the front edge and the rear edge of the member 704.

The top member 706, like the intermediate member 704, carries eight positioning studs 742 arranged in two groups of four apiece, each of the groups for positioning a respective hard disk drive unit. These positioning studs 742 are carried on a substantially planar top plate 768 which forms most of the top member 706. As indicated in FIG. 9, the underside of top plate 768 has mounted therein pressure pads 744 which are provided to press down upon hard drives mounted on the intermediate member 704.

Extending downwardly from respective left and right edges of the top plate 768 are side walls 770 and 772. Short tabs 774 extend vertically downwardly from lower edges of the side walls 770 and 772. The tabs 774 are spaced so as to be simultaneously insertable into the slots 764 of the intermediate member 704. (One of the four tabs774 provided on the top member 706 is occluded by the top plate 768 in the view provided by FIG. 9). A fastener tab 776 extends horizontally outwardly from a central portion of the lower edge of side wall 772. The fastener tab 776 is similar to the above-mentioned fastener tabs 738 and 760 and has a hole 778 formed therein. The members 702, 704 and 706 in general, and particularly the respective fastener tabs 738, 760 and 778, are dimensioned so that when the three members 702, 704 and 706 are assembled as shown in FIG. 8, the respective holes 740, 762 and 778 are brought into vertical juxtaposition with each other, thereby permitting a single fastener 779 to be inserted simultaneously through the three holes and permitting the single fastener to secure the three members 702, 704 and 706 together to form the drive support structure 700.

FIG. 10 shows the media drive support structure 700 in fully assembled form, including media drive units. In addition to the previously mentioned DAT drive 746 and floppy drive 748, hard disk drive units 786 and 788 are shown mounted side by side on intermediate member 704, and a single hard disk drive unit 790 is shown mounted on top member 706. It will be observed that a space for mounting a fourth hard drive unit (not shown) remains in the rightward portion of the top plate 768 of the top member 706.

Assembly of the drive units and the support structure may proceed rapidly and efficiently according to the following sequence: 1, mount DAT drive and floppy drive on base member; 2, using hinge tabs mount intermediate member onto base member; 3, mount two hard drive units on intermediate member; 4, using straight tabs extending downward from side walls, mount top member on intermediate member; 5, insert fastener (indicated by reference numeral 779 in FIG. 10) through all three holes in corresponding fastener tabs to form a single stable structure out of members 702, 704 and 706; 6, mount one or two hard drives on top member, using bracket 782 and fasteners through tabs 780. The completed media drive assembly can then be installed on the chassis of the VR/PC unit. If only two hard drives are to be provided in the unit, then step 6 may be omitted.

Figure 8:
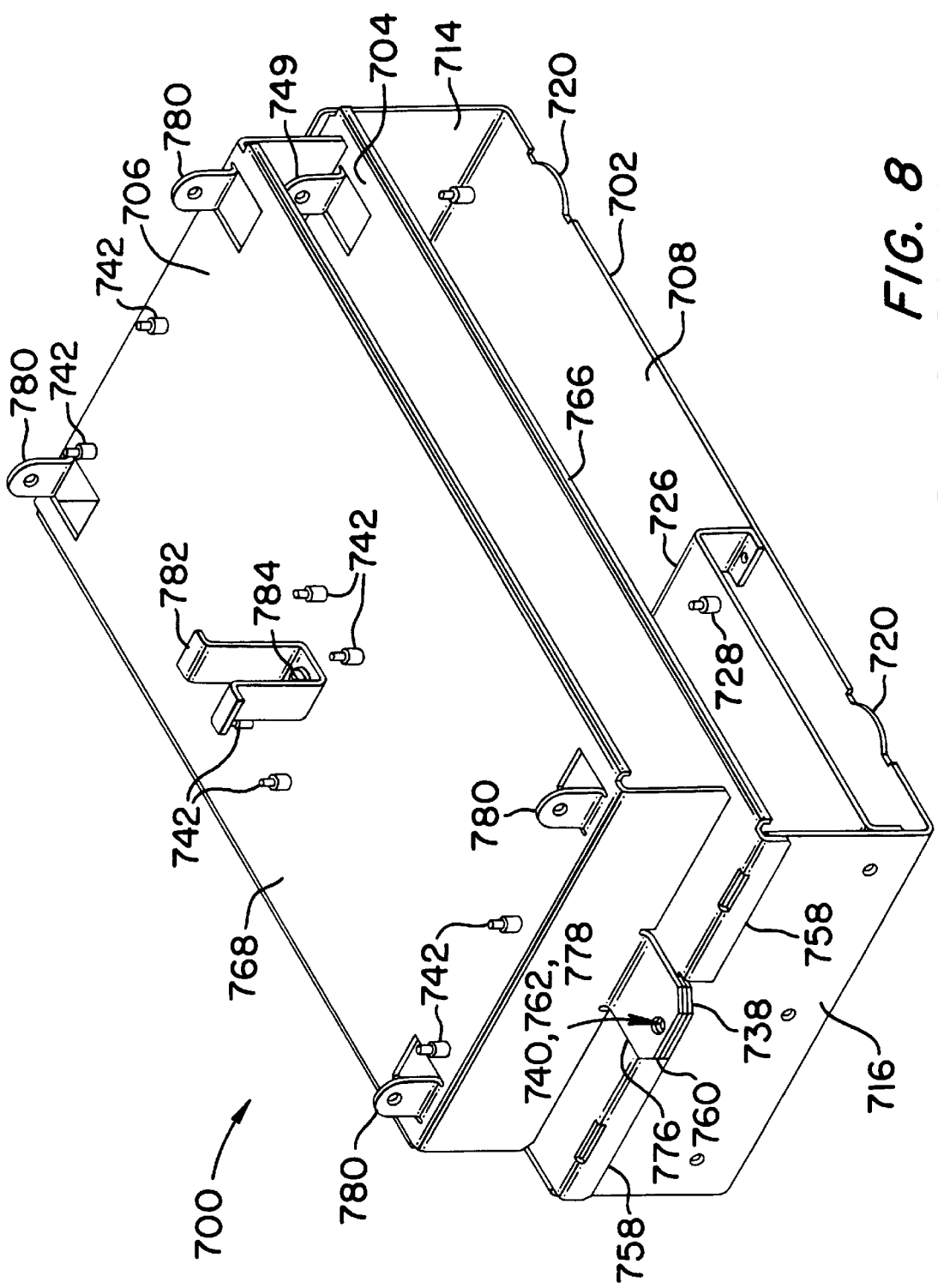

It is to be understood that the media drive support structure shown in FIGS. 8–10 allows the mass storage hardware portion of the VR/PC unit to be assembled in a manner that is convenient as well as cost- and time-effective.

ANALOG VIDEO HARDWARE

The analog front end circuitry provided on board 588 (FIG. 4) will now be described with reference to FIG. 13.

Figure 13A:
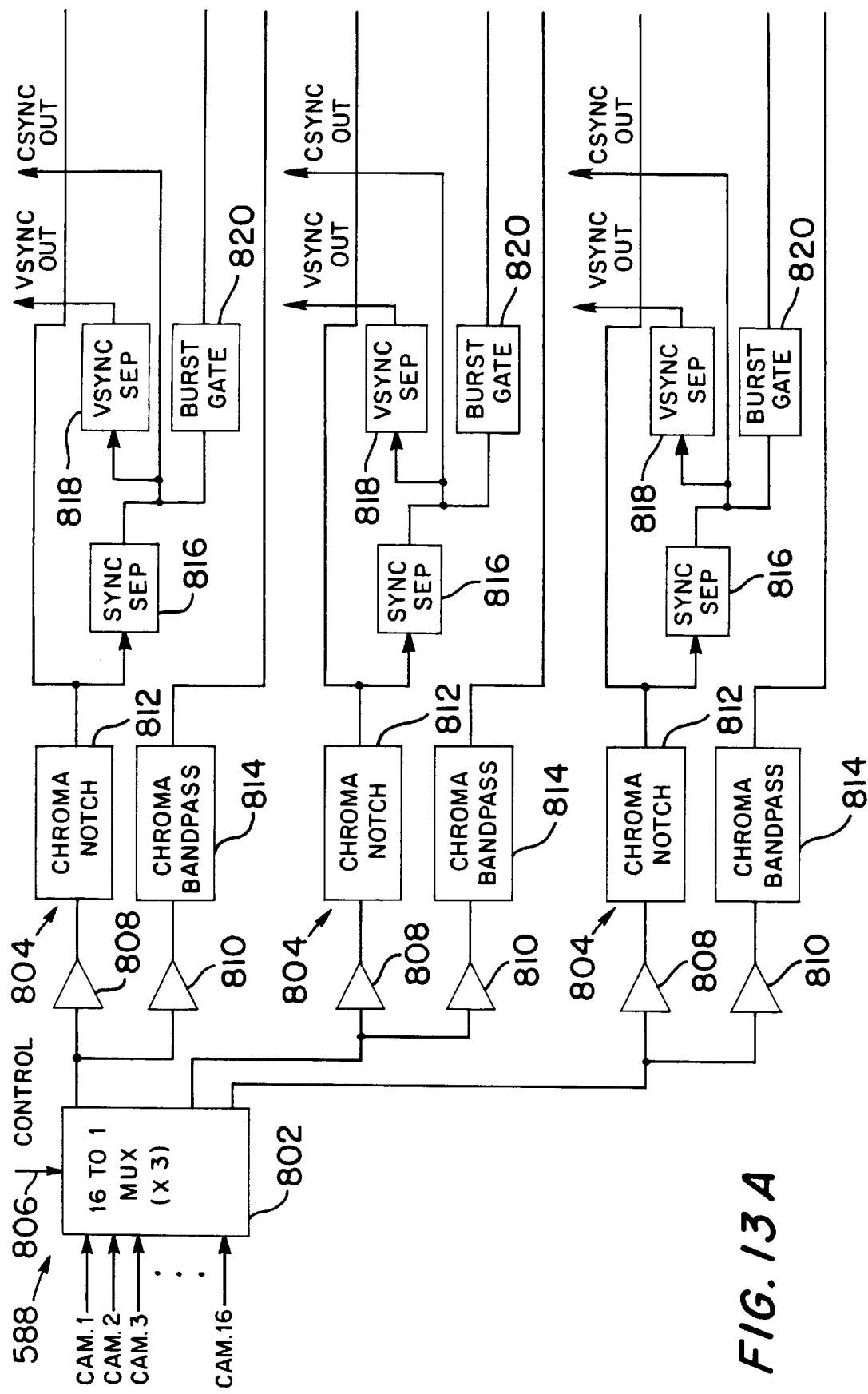
FIG. 13 is a schematic block diagram of an analog processing/multiplexing circuit board shown in FIG. 4.

As seen from FIG. 13, the sixteen analog video signal streams generated by the sixteen cameras attached to the VR/PC unit are provided in common to three sixteen-to-one multiplexers, together indicated by reference numeral 802. Together the multiplexers 802 provide three outputs, respectively constituting inputs to three field locking channels 804. Each of the multiplexers 802 is controlled by a respective control signal (the control signals together are indicated at 806) to select a respective one of the cameras 16 for acquisition through the respective locking channel 804. The control signals 806 are provided from the digital front end board 590 (FIG. 4).

Continuing to refer to FIG. 13, the three locking channels 804 are identical, so that only one of the three channels will be described. The selected input video signal is provided, through amplifiers 808 and 810, respectively, to a chroma notch filter 812 and a chroma bandpass filter 814. A luminance signal is output from the chroma notch filter 812 and provided to a synchronizing signal separator circuit 816, which outputs a composite sync signal extracted from the luminance signal. The composite sync signal from the sync separator 816 is provided to a vertical synchronizing signal separation circuit 818, which separates a vertical sync signal from the composite sync. The vertical sync and the composite sync are both provided to the digital front end board 590. The composite sync output from the sync separator 816 is also provided to a burst gate detection circuit 820, which outputs a burst gate detection signal. The burst gate detection signal and the chrominance signal output from the chroma bandpass filter 814 are provided as inputs to a phase lock loop (PLL) circuit 822. The PLL 822 outputs a baseband chrominance signal and a reference signal.

Another multiplexer block 824 is provided between the field locking channels 804 and two selection channels 826. The multiplexer block 820 is made up of six three-to-one multiplexers, of which three multiplexers are used for each of the two selection channels. The control signals for the multiplexer block 824 are indicated at 828 and are provided from the digital front end board.

The two selection channels 826 are identical, and accordingly only one of the two channels will be described. The three inputs to each selection channel are a luminance signal, a chrominance signal and a reference signal, all of which correspond to the video signal provided by a single one of the three input camera signals selected for locking by one of the three locking channels 804. The output of a respective three-to-one mux from the block 824 is used for each of the luminance, chrominance and reference signals, so that, correspondingly, the three inputs of the respective mux are the three luminance, chrominance or reference outputs, as the case may be, from the locking channels 804. The selected luminance signal is provided to a luma clamp circuit 830, which outputs a clamped luminance signal for selected channel one. The selected reference and chrominance signals, which correspond to the selected luminance signal, are provided to a chroma demodulation circuit 832, which outputs R-Y and B-Y signals to a multiplexer 834. The multiplexer 834 is controlled as indicated at 836 (control signal provided by front end digital board), to provide an alternating sequence of R-Y and B-Y signals as the chrominance signal for selected channel one. The clamped luminance and the sequentially alternating color difference signals making up the chrominance signal are then output for further processing to the digital front end board 590.

As noted above, the selection channel 826 corresponding to channel two is identical to that of channel one.

FRONT END DIGITAL HARDWARE

Figure 14:
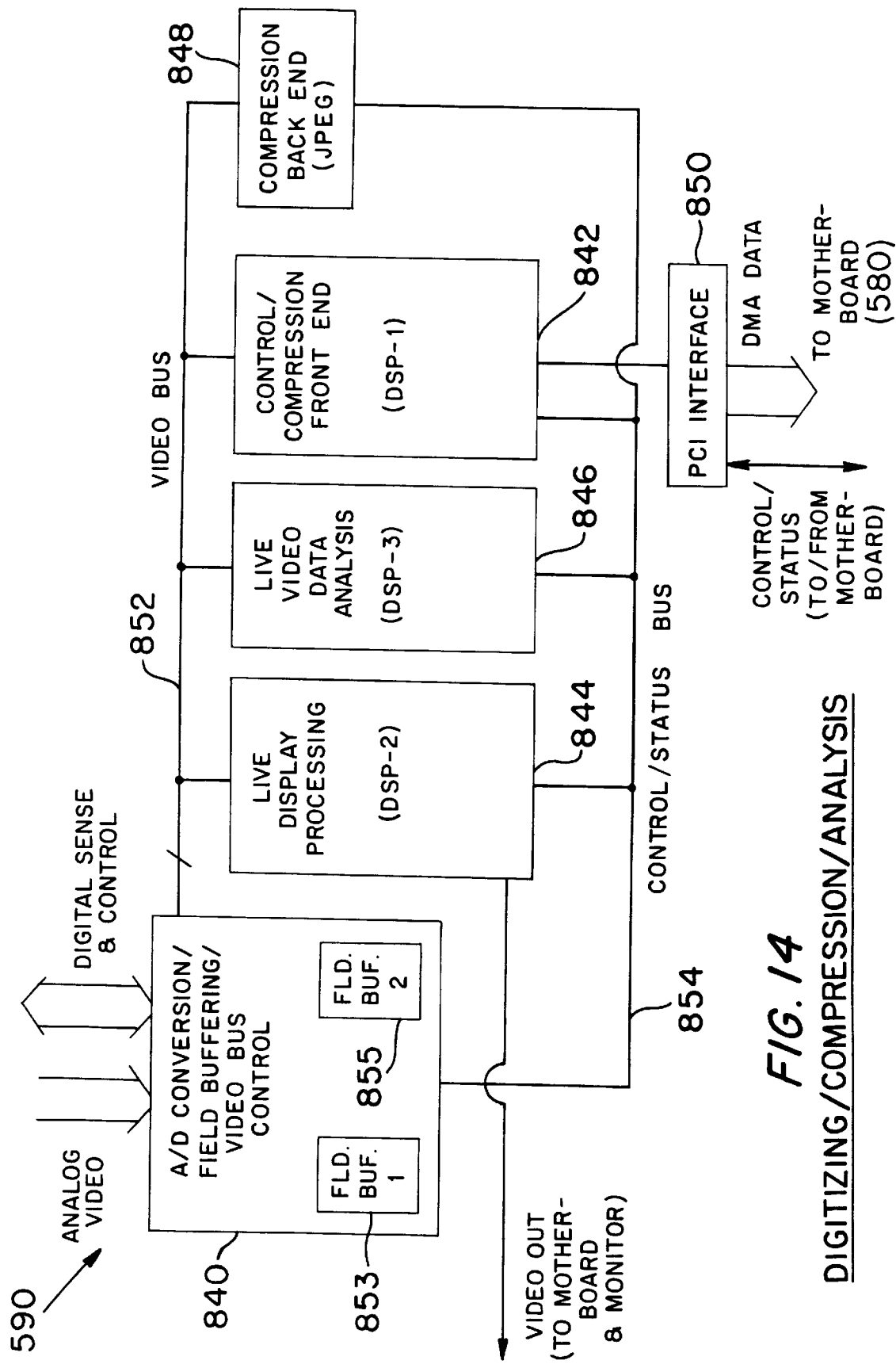
FIG. 14 is a block diagram of a digitizing/compression/analysis circuit board shown in FIG. 4.

FIG. 14 provides an overview, in functional block form, of the digital front end board 590. Major functional blocks on the front end board 590 include an analog-to-digital conversion and buffering block 840, a control and compression processing block 842, a live video display processing block 844, a live video image analysis block 846 and a "back end" compression block 848. Also included is an interface 850 to the PCI bus extension 596 (FIG. 3).

Continuing to refer to FIG. 14, the block 840 receives two channels of analog video acquired through and selected by the analog front end 588, digitizes the selected two analog channels, and buffers fields of the digitized video data in buffers 853 and 855, respectively corresponding to the two selected channels. Control signals to be output to the analog front end, and signals indicating the status of the analog front end, including sync signals, are received and transmitted through the block 840. In addition, the block 840 controls a video data bus 852 and distributes the buffered fields of video data, in accordance with a format to be described below, to the blocks 842, 844, 846 and 848. A control/status bus 854 interconnects the control block 842 and other blocks of the digital front end board 590, and permits the control block 842 to control the other blocks and to receive signals indicative of the status of the other blocks. Control and status signals ultimately transmitted to or from the analog front end are also carried on the control/status bus 854.

In addition to providing overall control of the function of the front end boards, the block 842 also performs initial data compression processing with respect to the video data output on video bus 852. Block 844 provides display processing of the video signals carried on video bus 852 and outputs a processed video signal, including overlay information and image plane allocation, in an output signal provided to the motherboard 580 and to the display monitors. The block 846 performs moving image analysis with respect to the video data carried on the bus 852, according to techniques described below, to permit the VR/PC to detect characteristics of the images represented by the incoming video data.

The block 848 is preferably implemented as a standard commercially available integrated circuit which performs data compression processing on the video data that has been pre-processed in block 842. In a preferred embodiment of the invention, the compression-processing carried out by the block 848 is in accordance with the well-known JPEG standard, and is implemented using IC model CL 560, available from the C$^3$ Corporation. According to this embodiment, only the encoding, but not the decoding, capability of the JPEG IC is utilized.

The PCI interface 850 is used for providing the incoming, compression-encoded video signal to the motherboard 580 via direct memory access (DMA) techniques, under control by block 842. Control signals received from, and status signals sent to, the motherboard 580 from the block 842 are also transferred through the PCI interface 850.

DIGITIZING AND BUFFERING VIDEO DATA

Figure 15:
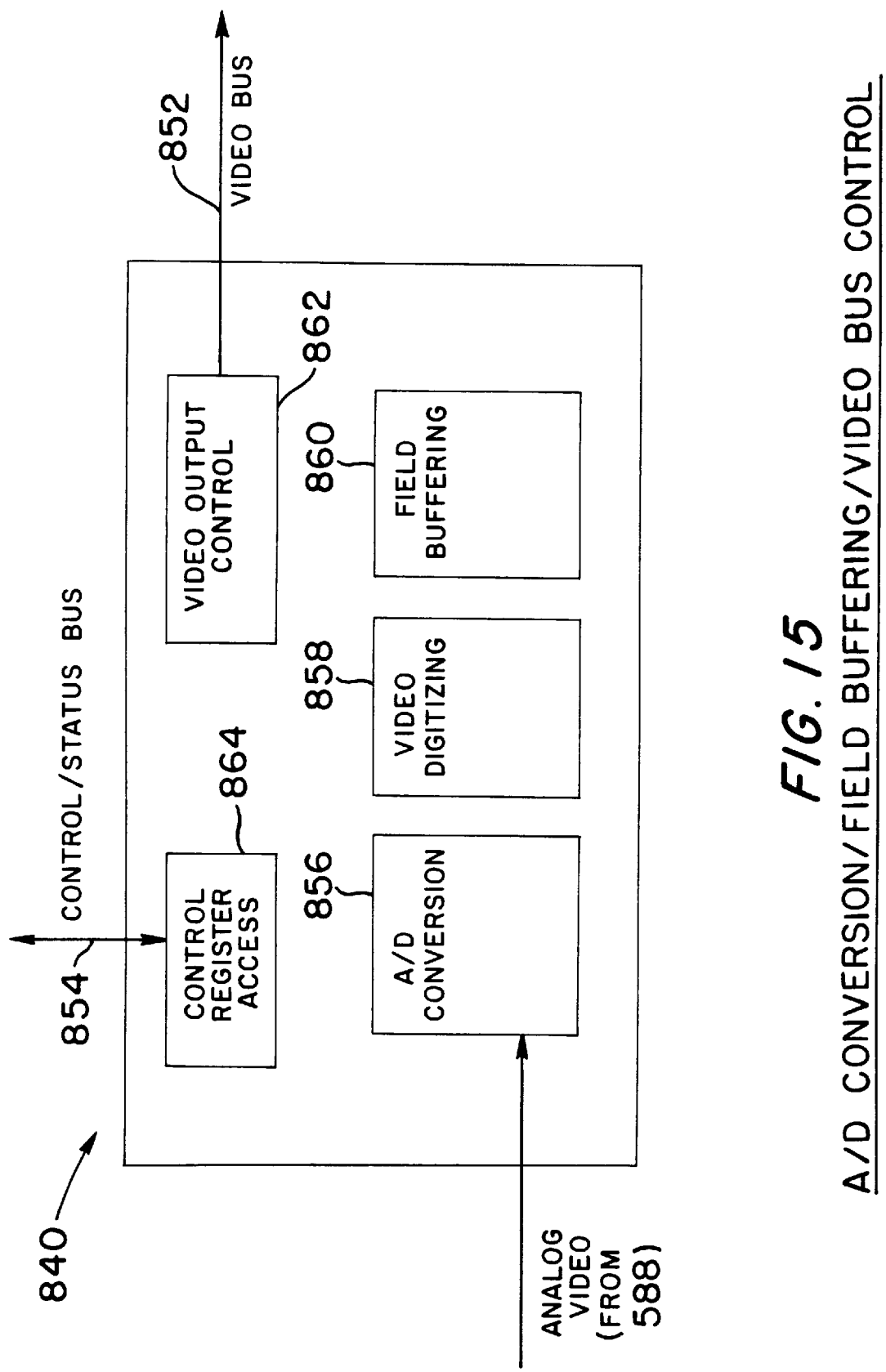
FIG. 15 represents functional blocks of an analog-to-digital conversion, field buffering and video bus control block-shown in FIG. 14.

The digitizing and buffering block 840 of FIG. 14 will now be described in more detail, initially with reference to FIG. 15. In FIG. 15, main functional portions of block 840 are shown, schematically, as including analog-to-digital conversion (856), video digitizing control (858), field buffering (860), video output control (862) and control register access (864). The control register access function 864 is provided to permit the control block 842 (FIG. 14) to write control messages with respect to the block 840 and the analog front end board, and to read incoming video data and status messages relating to block 840 and the analog front end board. The other portions of block 840 shown in FIG. 15 will be discussed with reference to subsequent drawing figures.

Figure 16:
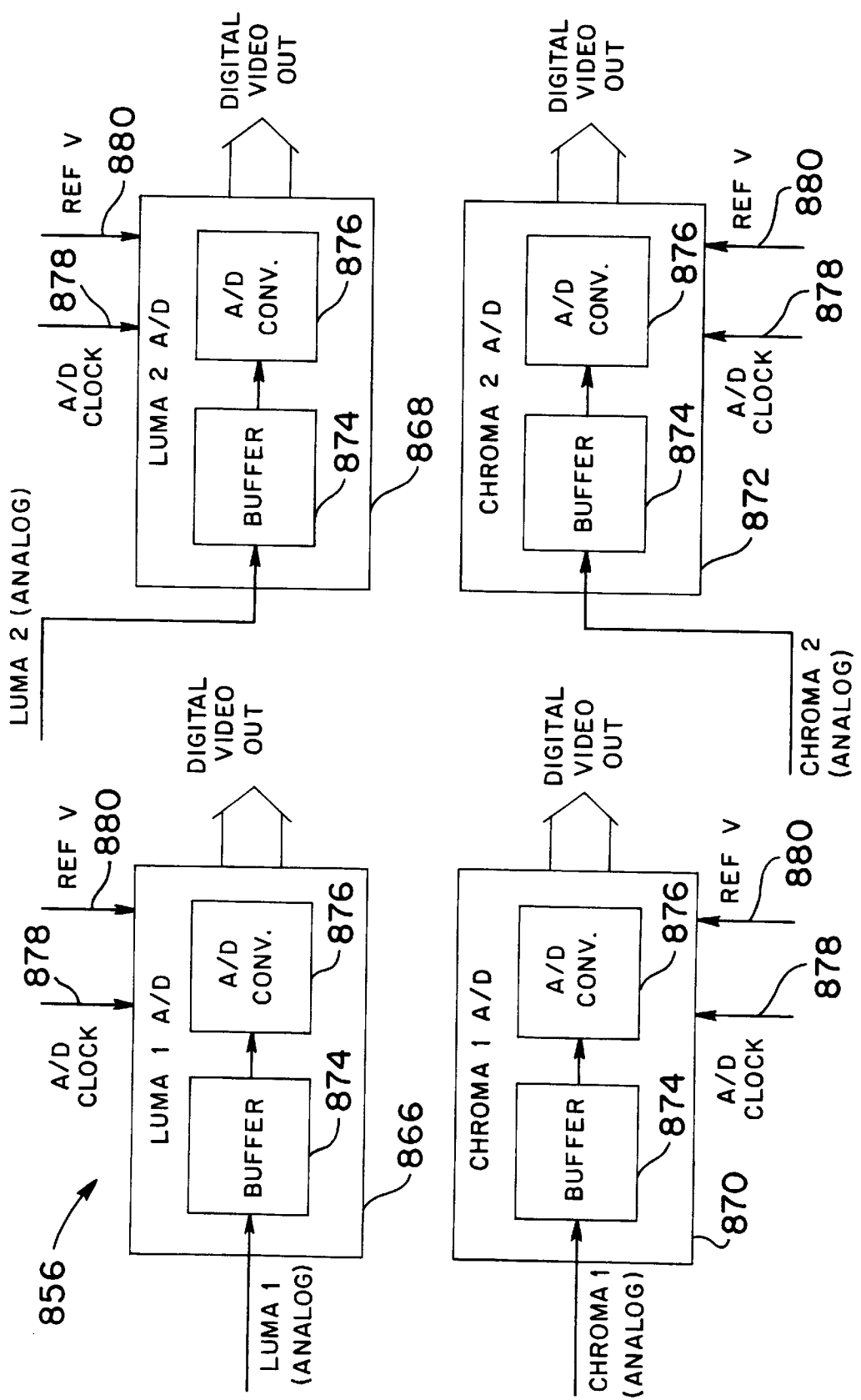
FIG. 16 shows some details of the analog-to-digital conversion function shown in FIG. 15.

Details of the analog-to-digital conversion function 856 are shown in FIG. 16. Four discrete conversion channels 866–874 are provided. Channels 866 and 868 are respectively for the luminance signals in channels one and two, and 870 and 872 are respectively for the chrominance signals in channels one and two. Each of the four conversion channels includes a buffer amplifier 174 and an analog-to-digital conversion circuit 876. Each channel is controlled in accordance with an analog/digital conversion clock (pixel clock), as indicated at 878 and a reference level, as indicated at 880.

Figure 17:
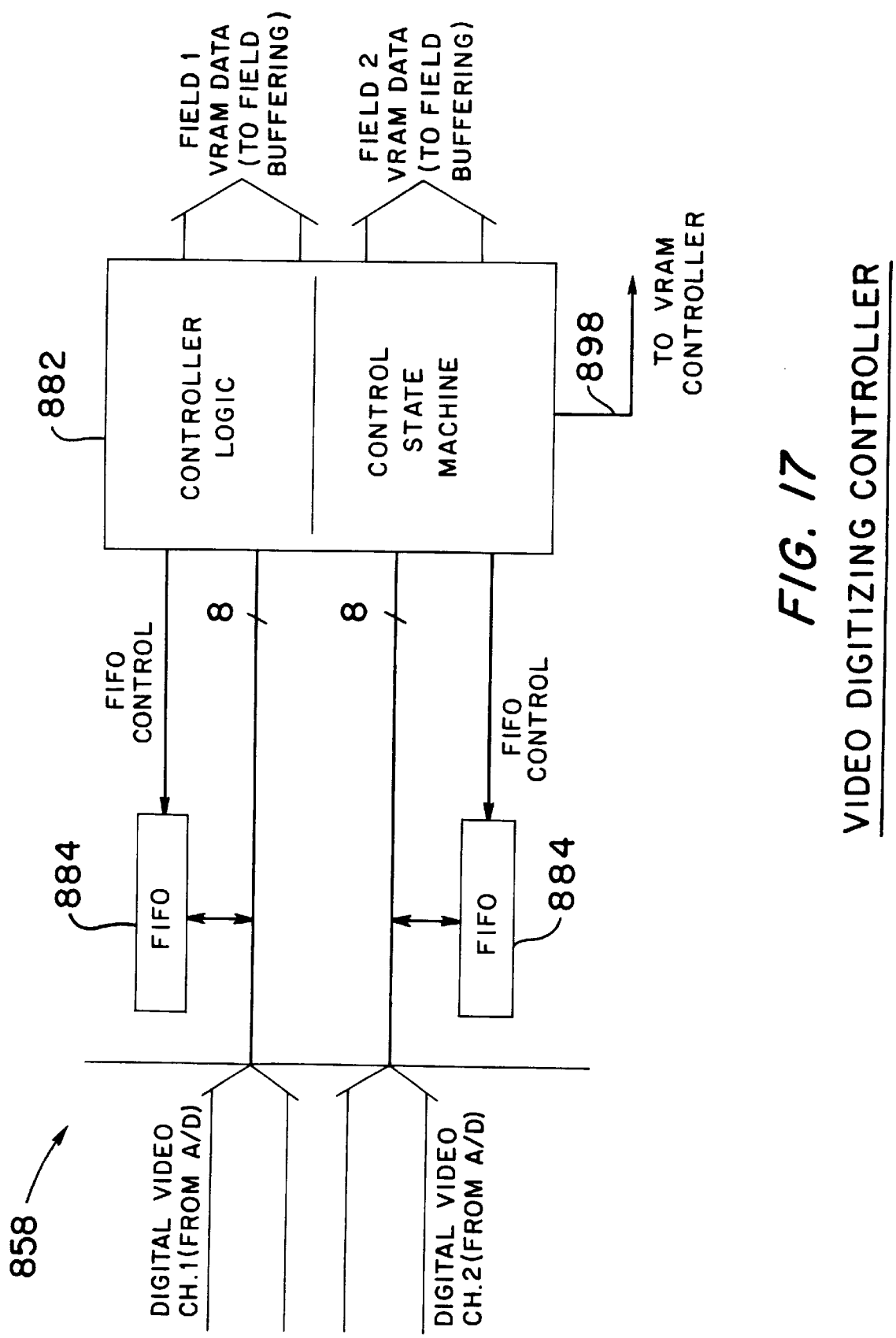
FIG. 17 shows some details of a video digitizing control function shown in FIG. 15.

As shown in FIG. 17, the digitized video signal output from the A/D conversion function 856 is provided in two channels (channel one including luminance one and chrominance one, channel two including luminance two and chrominance two), to video digitizing controller 858. The digitizing is performed so that an eight-bit word represents each pixel. The pixel data is provided to controlling logic 882 which performs processing as will be described in connection with FIG. 17A. A FIFO memory 884 is provided for each channel to permit timing adjustments required when a video signal according to the PAL standard is being processed.

Figure 17A:
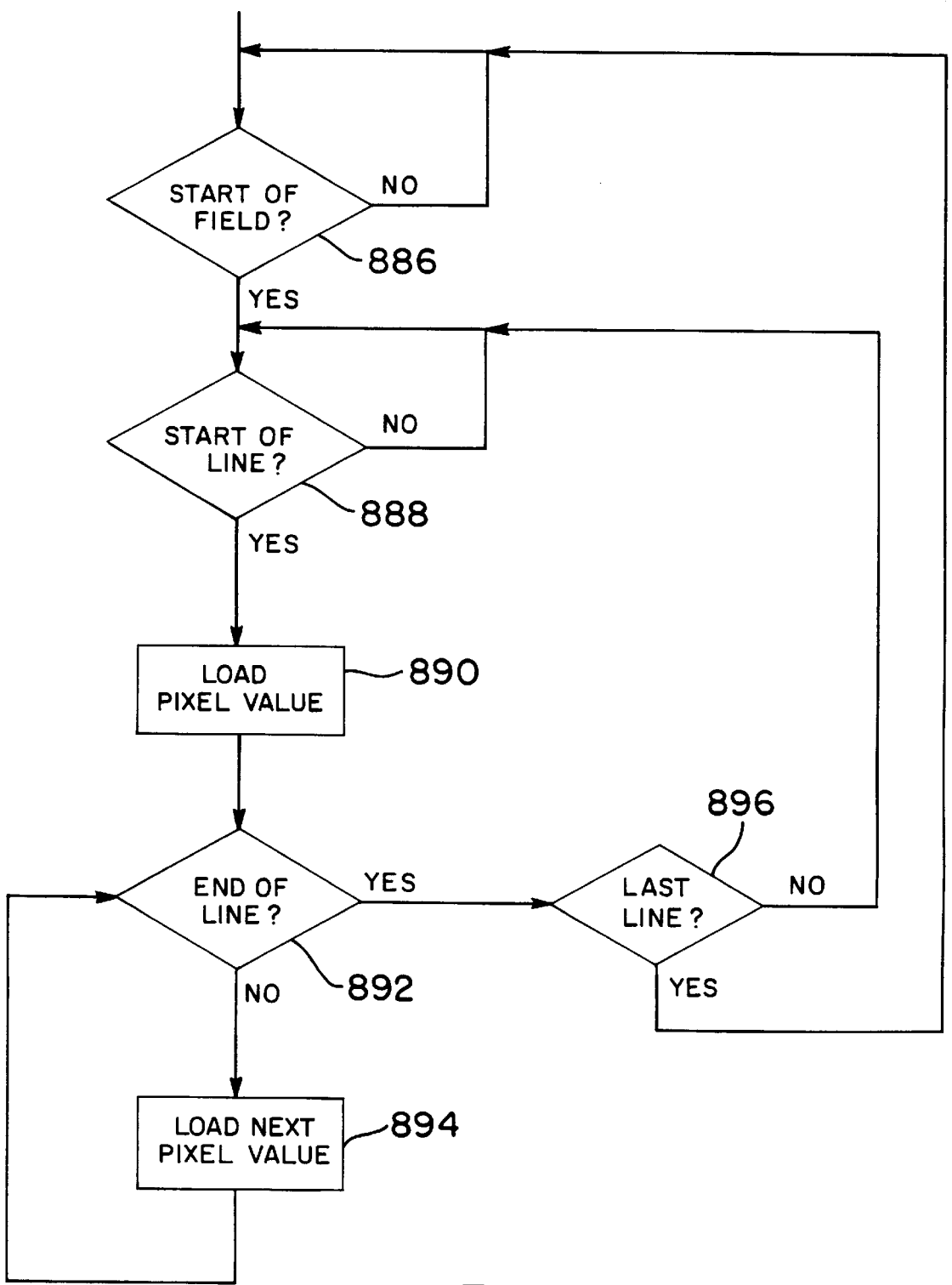
FIG. 17A illustrates in flow-chart form processing carried out in a controller logic block shown in FIG. 17.

The controller logic 882 performs the process shown in FIG. 17A with respect to each channel independently. With respect to a particular channel, the controller logic waits until the beginning of a video signal field is detected in the particular channel (block 886) and then waits for a predetermined period of time (to clear the vertical blanking interval) and then waits until the beginning of a line is detected (block 888). When the start of the line is detected, the first pixel value is loaded into the field buffer corresponding to the particular channel and the logic then performs a loop made up of blocks 892 and 894, whereby all of the subsequent pixel values in the line are loaded until the end of the line is detected. When the end of the line is detected, the loop is exited to block 896, at which it is determined whether this was the last line of the field. If not, the processing loops back to block 888. Otherwise, the processing loops back to block 886.

Advantageously, the processing of FIG. 17A may be implemented using a state machine formed as firmware in a programmable logic device. Design of such firmware is well within the capabilities of those who are skilled in the art, and need not be described further.

Referring again to FIG. 17, the control logic block 882 outputs the pixels of video data for the first and second channels, in accordance with the processing of FIG. 17A, and also provides to the following field buffering block a control signal, as indicated at 898.

Figure 18:
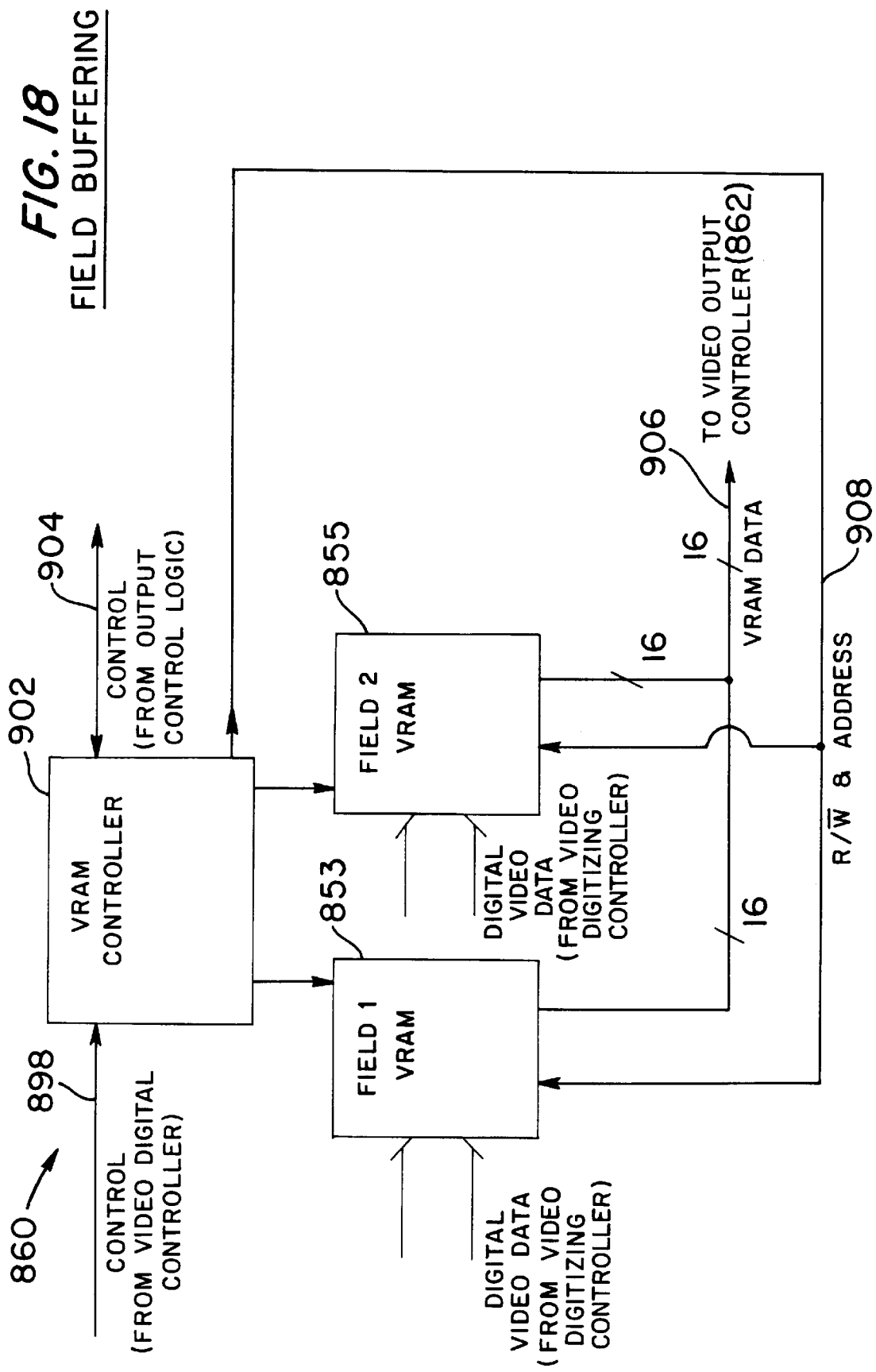
FIG. 18 shows some details of a field buffering function shown in FIG. 15.

Details of the field buffering block 860 are shown in FIG. 18. In addition to the previously mentioned field buffers 852 and 854 (each implemented using a VRAM), the field buffering block 860 also includes a VRAM controller 902. The VRAM controller 902 controls the buffer VRAMs 853 and 855 and is in turn controlled by signals 898 (from the video digitizing controller 858) and by signals 904 (from video output controller 862). The video data output from the video digitizing controller 858 is stored in the field buffers 852 and 854, and is read out therefrom via a bus 906. Address and enable signals for the buffers 852 and 854 are carried on an address bus 908 controlled by the VRAM controller 902.

As seen in FIG. 19, the heart of the video output control block 862 is output control logic 910, which implements an output state machine (FIG. 35, to be discussed below). The output control logic 910 receives the video data from the VRAMs 853 and 855. The VRAM controller 902 generates the control signal 908 for controlling the VRAMs and generating required addresses. The output control logic 910 controls a delay FIFO 912, a header module 912B, and a FIFO accumulation 914. Data from these modules are buffered onto the video bus by bus drivers 912A. The FIFO 914 accumulates video data to be used by the control/ compression front end block 842 for the purpose of video data compression. This data is made available to the block 842 via the control register access 864 (FIG. 15).

VIDEO DATA FORMATTING

There will now be described aspects of the format in which the output control logic 910 causes the video data to be transmitted on the video bus 852.

FIGS. 20A and 20B each show an image plane 920, which is divided, for internal data representation purposes, into 240 lines in the vertical direction, and each line is divided into 640 pixels in the horizontal direction. The actual video data used to drive the display monitors is formed as 480 lines by 640 pixels, with the additional lines being generated by vertical interpolation from the 240 data lines provided for each field in the internal data representation. The image plane is also represented in the form of tiles, each tile measuring eight pixels in both the horizontal and vertical direction (FIG. 21). The image plane is thus divided into 80 tiles in the horizontal direction and 30 tiles in the vertical direction (FIG. 20B).

A 4:1:1 data format is employed whereby a group of four pixels is represented by four bytes of luminance data and two bytes of chrominance data. In effect, each line is divided into discrete groups of four pixels, and for each such group four luminance pixel bytes are provided, as well as one pixel byte of U color data and one pixel byte of V color data (FIG. 23). This format contrasts with conventional 4:1:1 formats, in which each chrominance data byte corresponds to a two pixel by two pixel area of the image plane. The format utilized herein and illustrated in FIG. 23 helps to minimize "smearing" of the color information in the vertical direction and lessens any adverse effects upon image quality that may result from allocating only 240 horizontal lines to each video data field.

For compression encoding purposes, the image plane is divided into discrete groups of four, horizontally-arrayed eight-by-eight tiles (FIG. 22). Each group of four horizontally sequential tiles constitutes a "minimum coding unit" (MCU). The data required to represent each MCU is made up of four eight-by-eight pixel blocks of luminance data, and one eight-by-eight block each of U data and V data. As shown in FIG. 24, a preferred order for transmitting the data in each MCU is the U data block, the V data block, and then the four luma data blocks.

According to the novel video data format employed in the VR/PC unit, each field of video data output from the block 840 by the video output controller 862 is transmitted twice, once in the form of tiles and once in the form of raster scan lines. The tiles are interleaved with the scan lines, as illustrated in FIG. 25. In a preferred format, 15 8×8 tiles are transmitted, preceded by a block of field header data, which identifies the field of video data being transmitted. Then the field header is transmitted again, followed by the pixels corresponding to the first raster scan line of the field. After the first raster scan line of the field, another 15 tiles are transmitted, followed by the second raster scan line, then another 15 tiles and then the third raster scan line, and so forth. This process of interleavedly transmitting raster scan lines and groups of rectangular tiles continues until all of the tiles have been sent and all of the raster scan lines have been sent. As a result, as indicated above, each pixel data word of the field is transmitted twice, once as part of a rectangular tile, and once as part of a raster scan line. According to the timing shown in FIG. 25, a period of about 27 microseconds is required to transmit each raster scan line, and a period of about 40 microseconds is required to transmit each group of 15 tiles.

FIG. 25 represents a transmission mode which nominally corresponds to three-quarters of the NTSC standard 60 fields per second transmission rate. In the mode shown in FIG. 25, 45 fields of lines, and the same 45 fields in the -form of tiles, are transmitted each second. It will be noted that 240 lines per field and 3600 tiles per field are transmitted (2400 luminance data tiles, plus 600 tiles each of U data and V data). Thus, when the video bus 852 is operated as indicated in FIG. 25, the system has an input rate of 45 fields per second, which may be selectively distributed among up to 16 video camera inputs. Referring briefly to FIG. 14, the tiles are provided on the video bus 852 as the preferred format by which blocks 842 and 846 operate; whereas the raster scan line transmission of the fields is the preferred input format for the live display processing block 844.

Turning now to FIG. 26, another mode of operating the video bus will be described. In this mode, tiles are sent at the rate of 60 fields per second, but only every other one of the 60 fields is sent as lines. In other words, half of the fields are sent twice, once as lines and once as tiles, and the remaining fields are sent only as tiles. This mode may be employed, for example, when one or more of the field locking channels 804, and one or both of the selection channels 826 is used exclusively for a single one of the camera inputs. In such a case, the analog front end electronics are able to lock onto that input channel without any delay between fields, allowing for a throughput rate of 60 fields per second.

In the mode of operation shown in FIG. 26, a first raster line is sent during a period of 27 microseconds, then 30 tiles are sent during a period of 80 microseconds, then the next raster line is sent, then the next group of 30 tiles is sent and so forth. (The field headers are omitted from FIG. 26 to simplify the drawing.) During the time period in which 240 lines, corresponding to one field, are sent (i.e., approximately one thirtieth of a second), 7200 tiles, corresponding to two fields, are also sent.

FIG. 27 illustrates another mode of operating the video bus 852. The mode shown in FIG. 27 is utilized when the field being transmitted is to be displayed with zooming in on a particular portion of the image plane. In this mode only the raster lines required to produce the magnified image are sent, and only the pixels within those raster lines required for the magnified image are sent. This reduces the bandwidth requirements for storage in the live display frame buffer.

In the example shown in FIG. 27, it is assumed that a two times zoom display is being implemented. If FIG. 27 is compared with FIG. 25, it will be observed in the mode of FIG. 27 that in alternate ones of the raster line transmission time slots, all of the data is omitted from transmission. In the other time slots, only half of the pixels for the each line are transmitted. However, to maintain proper timing for the bus, the line time slots of 27 microseconds, provided between each pair of tile time slots, is maintained, even though no raster data, or a reduced amount of raster data, is being transmitted. (In FIG. 27, again the field headers are omitted to simplify the drawing.)

FIG. 28 illustrates the data format used in transmitting the raster line data on the video bus 852. In a preferred embodiment of the system, the video bus 852 consists of 19 parallel signal lines, of which 16 are devoted to data (two bytes side-by-side) and the remaining three bits are used to identify the bytes concurrently being transmitted. In the example shown in FIG. 28, it is assumed that the line being transmitted is the first line in a field, so that the first four bytes (first two byte transmission time slots) are devoted to a field header 926. In the field header 926, the two bytes that are initially transmitted make up a 16 bit time code. The next two bytes are indicative of the camera number and other information indicative of the type of field being transmitted. In the camera number byte, the first four bits are the camera number and the last four bits are indicative of the portion of the image plane in which the field being transmitted is to be displayed ("pane" number). The pane number may indicate, for example, that the field being transmitted is to be displayed in the second window in the third row of a 4×4 multi-window display format. The pane number aids in efficient composition of multi-window displays in the live display processing block 844 (FIG. 14).

Byte 930 contains field type and other information. In this format, the first through fourth bits and the eighth bit of the byte 930 are unused. The fifth bit indicates whether or not the incoming video is being captured in a single camera mode (i.e., only video information from one camera is being captured). The sixth bit indicates whether the field is even or odd, and the seventh bit indicates whether frames of fields of the video signal are being captured.

The next two bytes, indicated by reference numeral 940, constitute the line header, which is a 16 bit line identifying number. There follows the pixel data for the raster line, including first four bytes of luminance data, then two bytes of U color data, then another four bytes of luminance data, then two bytes of V color data, and so forth. The line is complete when 640 bytes of luminance data and 160 bytes apiece of U and V data have been transmitted. Accompanying the last pair of bytes is an identifying code indicating the end of the line, as indicated at reference numeral 942. If the line being transmitted is the last line in the field, then the next pair of bytes includes a "next camera" identifying byte 944, which has the same data format as the "camera number" byte 928 described above. The "next camera" byte 944 provides advance notice to the live display processing block 844, to permit pre-generation of overlay information, appropriate setting of buffer pointers, and so forth.

As an alternative to the format shown in FIG. 28, in which two color data bytes of the same type are transmitted together, there could instead be transmitted pairs of color bytes with each pair of bytes consisting of a U information byte and a V information byte corresponding to the four immediately preceding luminance pixels.

The format in which the tile data is transmitted on the video bus will now be described with reference to FIGS. 29 and 30. Referring initially to FIG. 29, a typical tile data format is shown. The first two bytes, indicated at 952, constitute the tile header. One byte of the header, indicated at 954, includes a seven bit column identifying code which indicates, by column, the location of the tile in the image plane. The last bit of the byte 954 indicates whether the tile has been found to be a "changed" tile for the purpose of the data compression processing to be described below. The other byte of the tile header, indicated at 956, includes six bits to indicate the row position of the tile in the image plane. The last two bits are respectively reserved for indicating whether the tile is considered changed for the purposes of two different image analysis algorithms (i.e., two different "change thresholds" may be applied for the purpose of image analysis, and both may be different from the threshold applied for the changed tile bit of byte 954, the latter being used for data compression processing.)

Following the header bytes 952, are the 64 bytes which correspond to the 8×8 tile. In the example shown in FIG. 29, it is assumed that the tile is a U color information tile. The other tiles are made up of either 64 luminance bytes or 64 V color information bytes. For each minimum coding unit of four horizontally sequential eight pixel by eight pixel regions of the image plane (see FIG. 22), four luminance tiles, one U tile and one V tile are transmitted (FIG. 24). Since the image plane is divided into 2400 eight pixel by eight pixel regions (80 tiles in the horizontal direction, 30 in the vertical direction; see FIG. 20B) a total number of 3600 tiles, including color information, is used to represent each field.

A field header is transmitted for each field of tiles, immediately in advance of the first tile of the field. The tile field header is like the field header shown for the line transmission format of FIG. 28, including two bytes of time code, a "camera number" byte and a "field type" byte, except that the camera number and a field type bytes used in the tile format differ somewhat from those used in the line format. Referring now to FIG. 30, the camera number and field type formats used with the fields of tiles will be described. The tile camera number byte 928' includes, in its first four bytes, the same 16 bit camera identifying code as for the line format. However, since the tiles are not used for live display, there is no need for pane identification information, so that the other four bits of the camera number byte 928' are unused.

As for the field type byte 930' used in the header for the tile field, the last six bits are the same as in the line format field header. The first bit indicates whether the field of tiles is used as a reference image field for the purpose of image analysis, and the second bit indicates whether the field of tiles is used as a reference image for the purpose of data compression processing.

FIG. 31 provides an overview of the processing functions performed by the output control logic 910 of FIG. 19. As seen from FIG. 31, the output control logic 910 includes a controlling state machine 960, a function 962 to build the field headers, header translation logic 964, raster building logic 966, tile building logic 968 and raster/tile sequencing 970. The output control logic functions to generate the data formats and bus operating modes that have been described above in connection with FIGS. 25–30. The field header building function 962 is illustrated in flow chart form in FIG. 31A. As indicated at block 972 in FIG. 31A, the field header building function idles until the beginning of a field (first pixel in first line) is detected. Once this occurs, the field header building function obtains camera identification and time stamp information from the front end board controller 842 (FIG. 14), as indicated at block 974, and then the field header format is assembled (block 976).

As shown in FIG. 31B, the header translation logic determines offset and scaling parameters (step 978) and uses these parameters to drive the raster build logic 966 and the tile build logic 968 (step 980).

FIG. 32 illustrates the processing carried on by the raster build logic 966. First (step 982), the raster build logic gets the line number on the basis of the current raster number. It is next determined whether this is the first line of a field (step 984). If not, the line header (shown as 940 in FIG. 28) is assembled (step 986) and then the data making up the raster line is sent to the sequencer 970 (step 988), and the process loops back to step 982. However, if at step 984 it was found that the first line in the field was about to be processed, then step 990 is inserted before step 986. At step 990, the information for the camera number and field bytes is obtained and the field header bytes are assembled.

The processing carried on by the tile build logic 968 is shown in FIG. 33. The processing shown in FIG. 33 is indicated as a continuous loop, including a first step 992, in which the tile build logic 966 obtains tile identification data, namely row and column location for the tile in the image plane. Then, at step 994, the data is assembled into the tile header bytes (shown as 952 in FIG. 29).

Continuing to refer to FIG. 33, step 996 follows step 994. At step 996, the tile building logic calculates the appropriate VRAM address from the row and column information and precedes to retrieve, from the appropriate one of VRAMS 852 and 854 (FIG. 18), the data required to construct the tile (step 998). Following step 998 is step 1002, in which the tile building logic 968 forwards to the sequencer 970 the completed tile.

Figure 34:
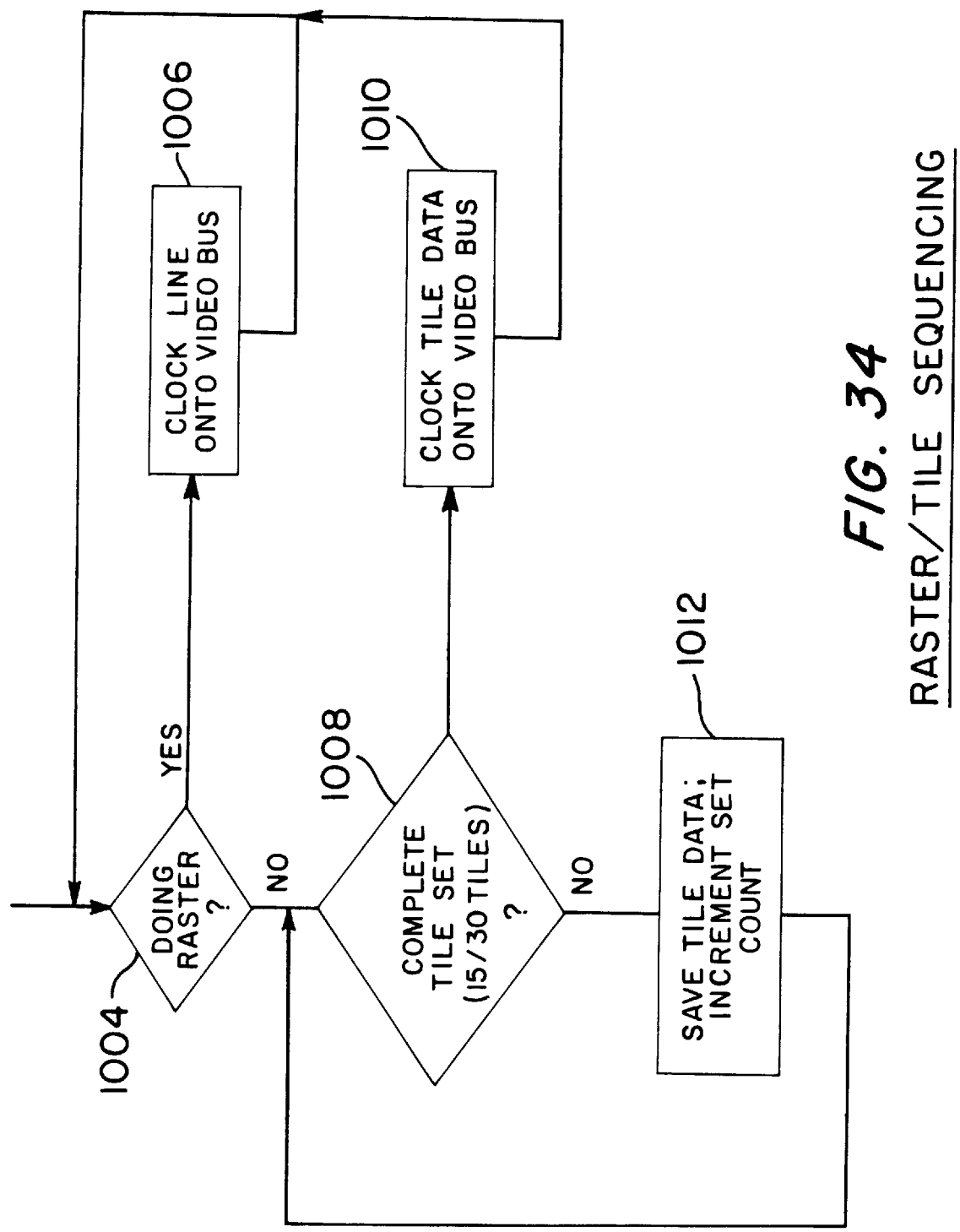
FIG. 34 illustrates in flow diagram form processing performed by the output control logic block of FIG. 31 for the purpose of generating an interleaved sequence of raster-scan lines and rectangular tiles of video data.

FIG. 34 illustrates the processing carried on by the raster/tile sequencer 970.

Initially, at 1004, it is determined whether it is time to send a raster line. If so, the sequencer 970 transmits the data corresponding to the raster line (step 1006), preceded by the line header generated by the raster build logic 996, and also preceded by the field header, if this is the first line of the field.

If at step 1004 it was not found to be the time for transmitting raster data, then step 1006 is reached. At step 1006, it is determined whether the sequencer 970 has received from the tile building logic 968 a complete set of the tiles to be transmitted during the period between two raster lines. The number of tiles will be either 15 or 30, depending upon whether the mode of FIG. 25 or FIG. 26, respectively, is in effect. If at step 1008 a complete tile set is found to be present, then the tile data, including tile headers generated by the tile build logic 968 (and a field header if appropriate) is transmitted onto the video bus 852 (step 1010). Otherwise, step 1012 follows step 1008. At step 1012, the tile set counter is incremented each time a tile is received from the tile building logic 968, and the process loops back to step 1008.

After either step 1006 or 1010, the process loops back to step 1004.

The controlling state machine 960 (FIG. 31) is illustrated in FIG. 35. As seen from FIG. 35, an idle state 1014 is exited, in favor of a tile handling state 1016, when it is time to start a field. When transmission of 15 tiles is complete (or 30 tiles, as the case may be, depending on the mode of operating the video bus), then the state 1016 is exited in favor of state 1018, in which data corresponding to a raster line is transmitted. When the line is complete, a transition is made from the line handling state 1018 back to the tile handling state 1016. However, at the completion of the last line, the field is complete, in which case the state machine transitions from the line handling state 1018 back to the idle state 1014.

FRONT END BOARD CONTROL HARDWARE

Turning now to FIG. 36, the control block 842 for the front end electronics will now be described in additional detail. Major components of the control block 842 include a digital signal processing integrated circuit 1050, a dynamic RAM 1052, a static RAM 1054 and a DMA addressing module 1056. The DSP 1050 (like the digital signal processing devices which respectively supervise the live display processing block and the live image analysis block 846) may be a series TMS-C32 device available from Texas Instruments. The DSP 1050 is the "brains" and "traffic cop" for the front end electronics. Among other functions, the DSP 1050 manages an address bus 1058 and a data bus 1060 which are utilized for management of video data in connection with data compression processing, and are also used for transfer of compressed video data to the motherboard via PCI interface 850.

The DSP 1050 also manages the control/status bus 854 (FIG. 14; not shown in FIG. 36). The control status bus 854 may be implemented as a high-speed serial link which carries commands from the DSP 1050 to the digitizing, buffering and bus control block 840, the live display processing block 844 and the live image analysis block 846. Status messages from the blocks 840, 844 and 846 to DSP 1050 are also carried on the control/status bus 854. Control and monitoring of the front end analog board 588 (FIGS. 4 and 13) is also handled by DSP 1050, by means of messages relayed through the block 840 (FIG. 14).

Referring again to FIG. 36, the DRAM 1052 stores statistics generated and used by the DSP 1050 in connection with initial compression processing of the tiles of video data which is accessed by the DSP 1050 via the FIFO 914 of FIG. 19 and the control register access 864 (FIG. 15). The SRAM 1054 serves as the general purpose working memory for the DSP 1050, and also as an output buffer for compressed video data that is ready for transfer to the motherboard via the PCI interface 850. The DMA addressing module 1056 provides the addresses used during DMA transfer of the compressed video data from the digital front end board 590 to the motherboard.

Tri-state bus drivers, indicated by reference numerals 1062, are associated with the buses 1058 and 1060 to route signal traffic flow as required on the buses.

LIVE IMAGE ANALYSIS HARDWARE

Figure 37:
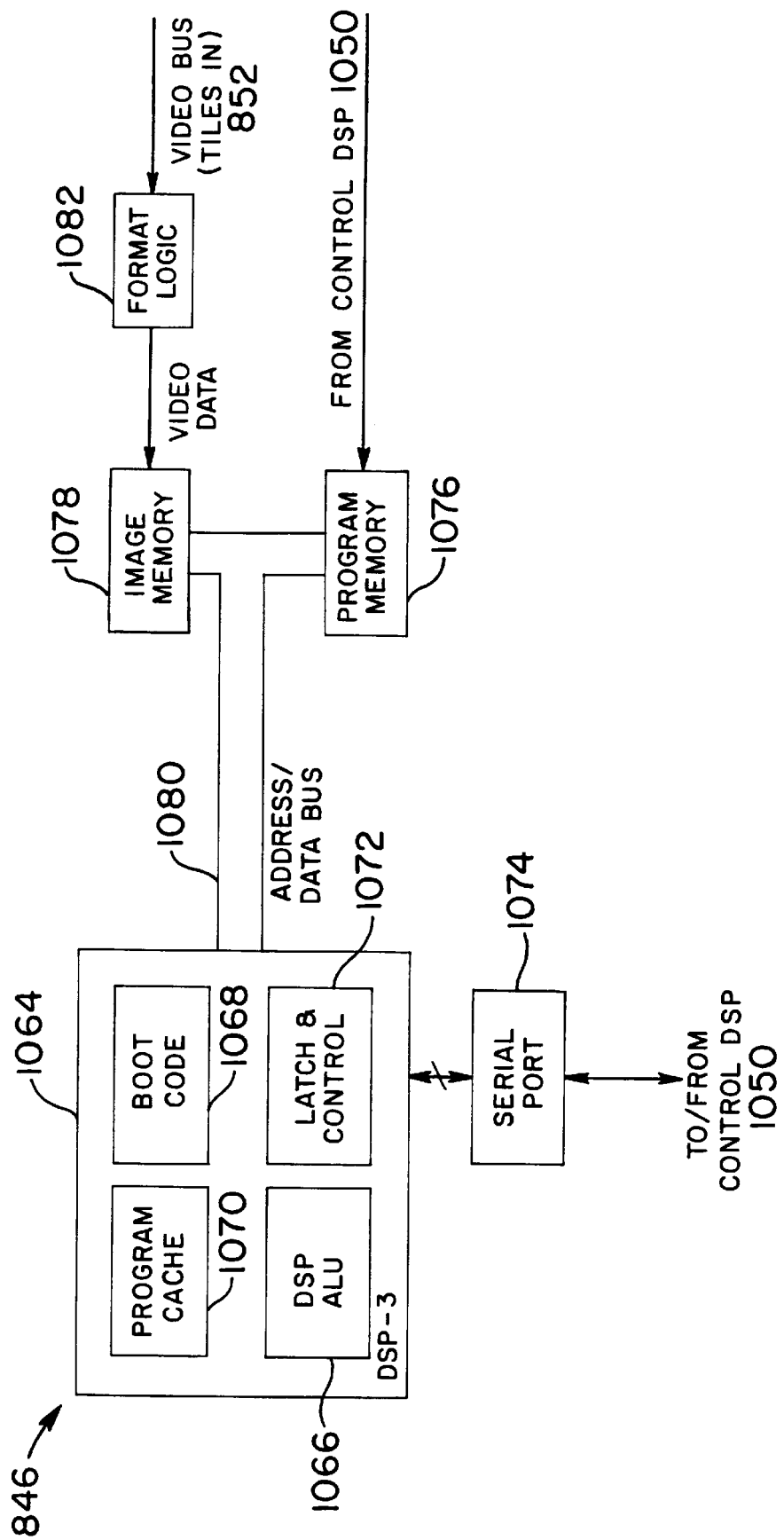
FIG. 37 represents in block form certain details of the live video data analysis processing block of FIG. 14.

Details of the live image analysis block 846 will now be described with reference to FIG. 37. A live analysis block 846 includes a digital signal processing integrated circuit 1064, which may be of the type, mentioned above, available from Texas Instruments. Included within the DSP 1064 are functional blocks including an arithmetic and logic unit 1066, a boot code memory 1068, a program cache memory 1070 and latch and control circuitry 1072. Associated with the DSP 1064 are a serial port 1074, program memory 1076 and image memory 1078. The serial port 1074 receives control signals from the front end controller DSP 1050 and relays the control signals to the latch and control circuitry 1072. Similarly, status messages are relayed from the latch and control circuitry 1072 through the serial port 1074 and then to the controller DSP 1050.

An address and data bus 1080 interconnects the DSP 1064 and the memories 1076 and 1078.

The program memory 1076 stores software which controls the DSP 1064 to execute one or more image analysis algorithms. The image analysis algorithm software is loaded in the program memory 1076 by the control DSP 1050. The algorithm software, in turn, may have been forwarded to the control DSP 1050 from the motherboard. The original source of some or all of the image analysis algorithm software may be a device that is separate from, and located remotely from, the VR/PC unit.

The image memory 1078 stores the video information which is to be analyzed by the live image analysis block 846. The video information is received in the form of tiles from the video bus 852, and then formatted in format logic 1082 prior to storage in the image memory 1078.

Preferably the image memory 1078 has sufficient storage capacity to store reference images, or statistics derived from reference images, for plural independent streams of video information. For example, it is contemplated that the live image analysis block 846 can contemporaneously apply image analysis to 16 live input video streams, respectively generated by 16 cameras connected to the VR/PC unit. Moreover, the respective image analysis algorithms applied to each incoming video stream may vary in terms of parameters used to constrain operation of the algorithms, and one or more of the algorithms may be directed to image characteristics that are completely different from other contemporaneously applied image algorithms. For example, a perimeter violation detection algorithm may be applied to some incoming image streams, while a "museum" algorithm is applied to one or more other of the incoming video streams. Both the perimeter violation algorithm and the "museum" algorithm will be further described below.

It should be understood that the results of the image analysis processing carried out by the block 846 are reported to the controller DSP 1050 via the serial port 1074.

LIVE DISPLAY PROCESSING HARDWARE

Details of the live display processing block 844 will now be described with reference to FIG. 38.

Major components of the live display processing block 844 are a DSP 1084, a first scaling and color space conversion circuit 1086, a display VRAM 1090, an overlay plane generating circuit 1092, an overlay mixer and concatenator 1094, a first in/first out memory 1096, a second scaling and color space conversion circuit 1098, an SVGA feature connector 1102, an NTSC/PAL encoding circuit 1104 and a synchronizing signal generator 1106.

Figure 38:
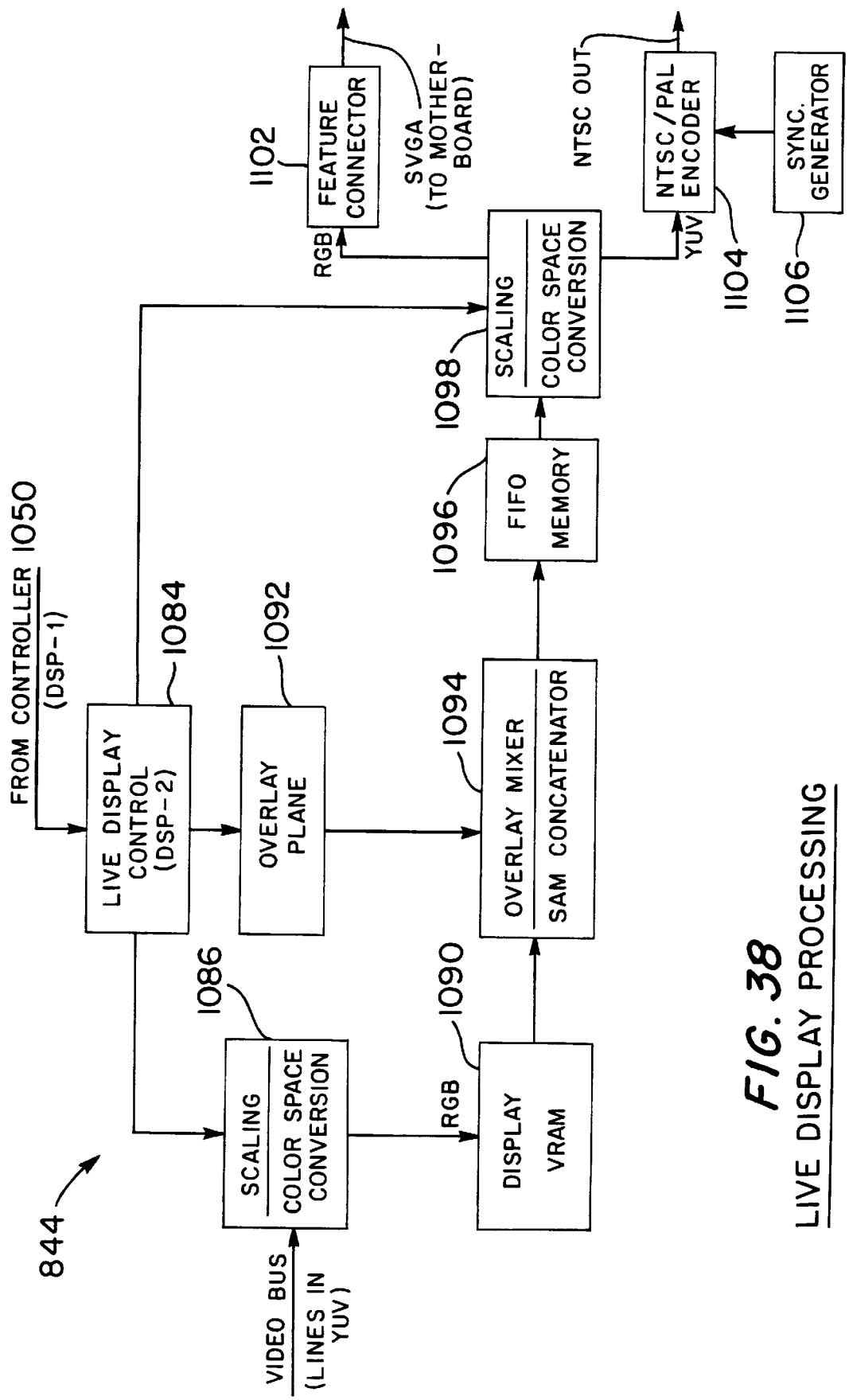
FIG. 38 illustrates in block diagram form certain details of the live display processing block of FIG. 14.

All of the circuit blocks shown in FIG. 38 are preferably implemented using standard commercially available components. For example, the live display controller DSP 1084 is preferably a Texas Instruments device of the type previously mentioned. The DSP 1084 receives command messages from the controller DSP 1050 and transmits status messages to the controller 1050. Under supervision of the controller DSP 1050, the live display control DSP 1084 controls operations of the live display processing circuitry 844, and, in particular, controls the two scaling/color space conversion circuits 1086, 1098 and the overlay plane generator 1092.

The first scaler/color space converter 1086 receives and processes the raster line data provided on the video bus 852. If the image represented by the received lines of video data is to occupy the entire live video display portion of the display screen, then no scaling is performed at circuit 1086. However, if a split-screen live image is to be displayed, including images corresponding to two or more live video image streams, then scaling is performed at circuit 1086. For example, if four images are to be displayed in respective windows in a 2×2 format, then each image is reduced by a factor of two, in both the horizontal and vertical directions, at the circuit 1086. In addition, color space conversion is performed at the circuit 1086 so that the YUV color data received from the video bus is converted into RGB data.

The converted (and if necessary, scaled) RGB data output from the scaling and color space conversion circuit 1086 is provided to a display VRAM 1090, which functions as a buffer, and then the buffered video data is output to the overlay mixer/concatenator 1094. Meanwhile, responsive to control signals from the DSP 1084, the overlay plane generator 1092 provides an overlay image, such as alphanumeric characters which may represent captions including "live" or "camera one". The image data representing the overlay image is supplied from the overlay plane generator 1092 to the overlay mixer 1094 for mixing with the live video image data. After suitable buffering in the concatenator portion of the circuit 1094, including, if appropriate, assignment to a selected display window, the video image information (which may be a composite of several video image streams), is transferred through FIFO memory 1096 to the second scaling and color space conversion circuit 1098.

Scaling of the image output through the FIFO memory 1096 is performed at the circuit 1098 if the image output from the front end electronics is to occupy less than the entire image plane of the display monitor. If the entire display screen on the monitor is to be devoted to the live image output from the front end electronics, then no scaling is performed at circuit 1098. However, if the live video occupies only a portion of the video screen (as shown, for example, in FIG. 11) then scaling is performed so that the image generated from the front end electronics fits into the window assigned thereto. It will be observed in the display of FIG. 11 that graphical user interface features are provided in a lower portion of the screen display. As will be explained below, the GUI elements are generated at the motherboard.

RGB video data, scaled if necessary at circuit 1098, is provided as the SVGA output from the digital front end board 590 (FIG. 4) to the motherboard by way of the standard SVGA feature connector 1102 (FIG. 38). In addition, the circuit 1098 performs a color space conversion (after scaling, if necessary) on the RGB data to provide a second output in the form of YUV video data. The YUV video data is provided to an NTSC or PAL encoder 1104 which uses a sync signal generated at sync generator 1106 to form an NTSC (or PAL, as the case may be) analog output signal, which may be used to drive an NTSC monitor.

FRONT END SOFTWARE

Figure 39:
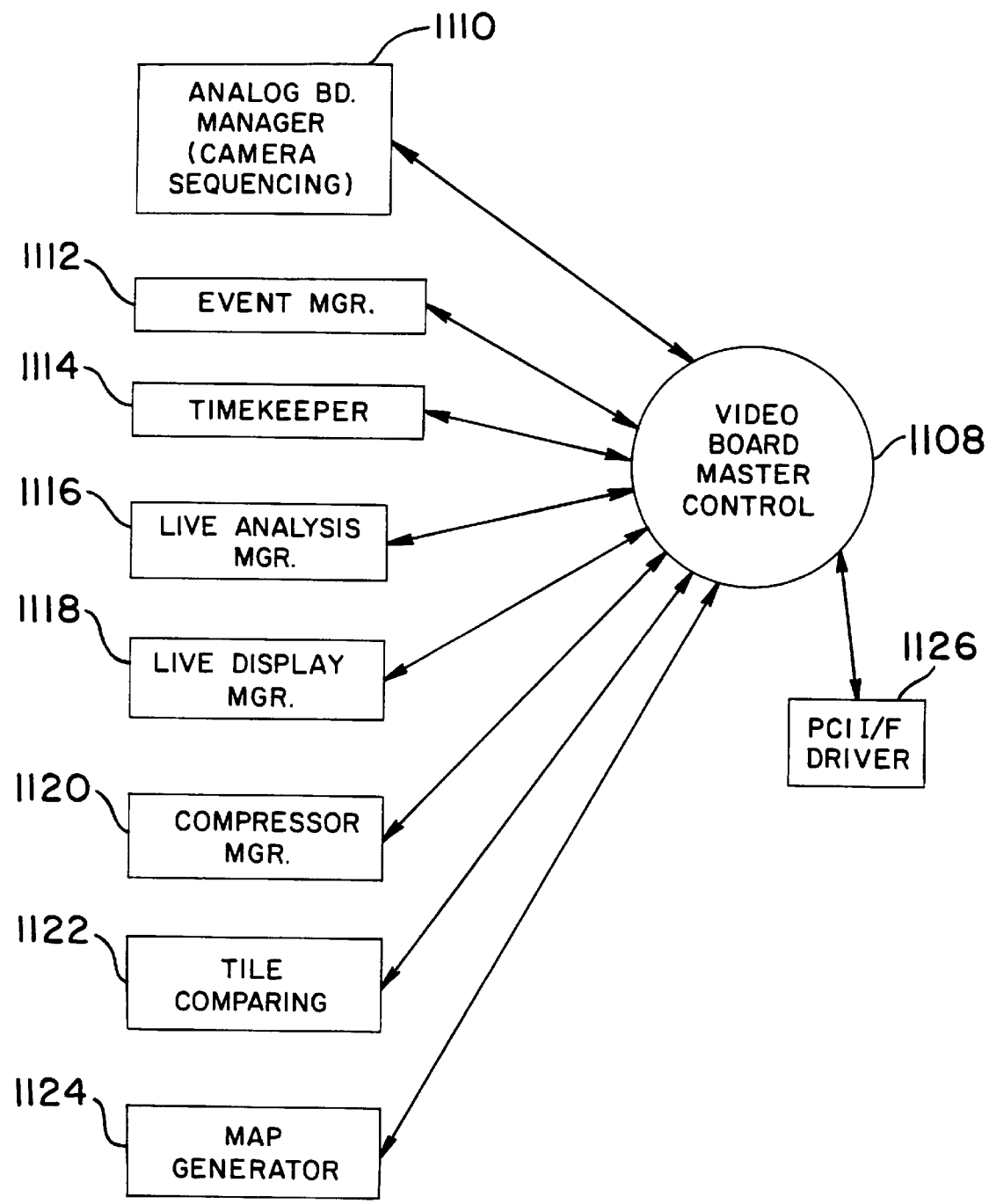
FIG. 39 is a schematic representation of major software modules which program the operation of the control DSP chip of FIGS. 36 and 14.

FIG. 39 presents an overview of the software which controls operation of the video board controller DSP 1050.

The software which controls the DSP 1050 includes a video board master control software module 1108 which arbitrates among the other software modules for the DSP 1050. The other software modules include an analog board managing (camera sequencing) module 1110, an event manager 1112, a time keeper module 1114, a live analysis block manager 1116, a live display block manager 1118, a compressor manager module 1120, a tile comparison module 1122, a map generator module 1124 and a driver module 1126 for the PCI interface to the motherboard.

The software modules 1110 through 1118 and 1126 can be thought of as handling the "administrative" duties of the DSP 1050, while the modules 1120–1124 are concerned with functions relating to compression of the video data. Of the "administrative" software modules, all except the PCI interface driver 1126 essentially perform routine functions such as relaying messages from/to the motherboard and to/from other components of the video processing front end electronics. These software components can be readily provided by those of ordinary skill in the art by following standard programming techniques, and therefore need not be further discussed.

The functioning of the PCI interface driver 1126 will, however, now be further described with reference to FIG. 40. Essentially, the PCI interface performs two functions: (1) transfer of compressed video data from the front end board to the motherboard by DMA operations; and (2) transferring command and status messages between the motherboard and the video processing front end board. The one-way video data traffic from the front end board to the motherboard is much greater in volume than the two-way message traffic.

Figure 40:
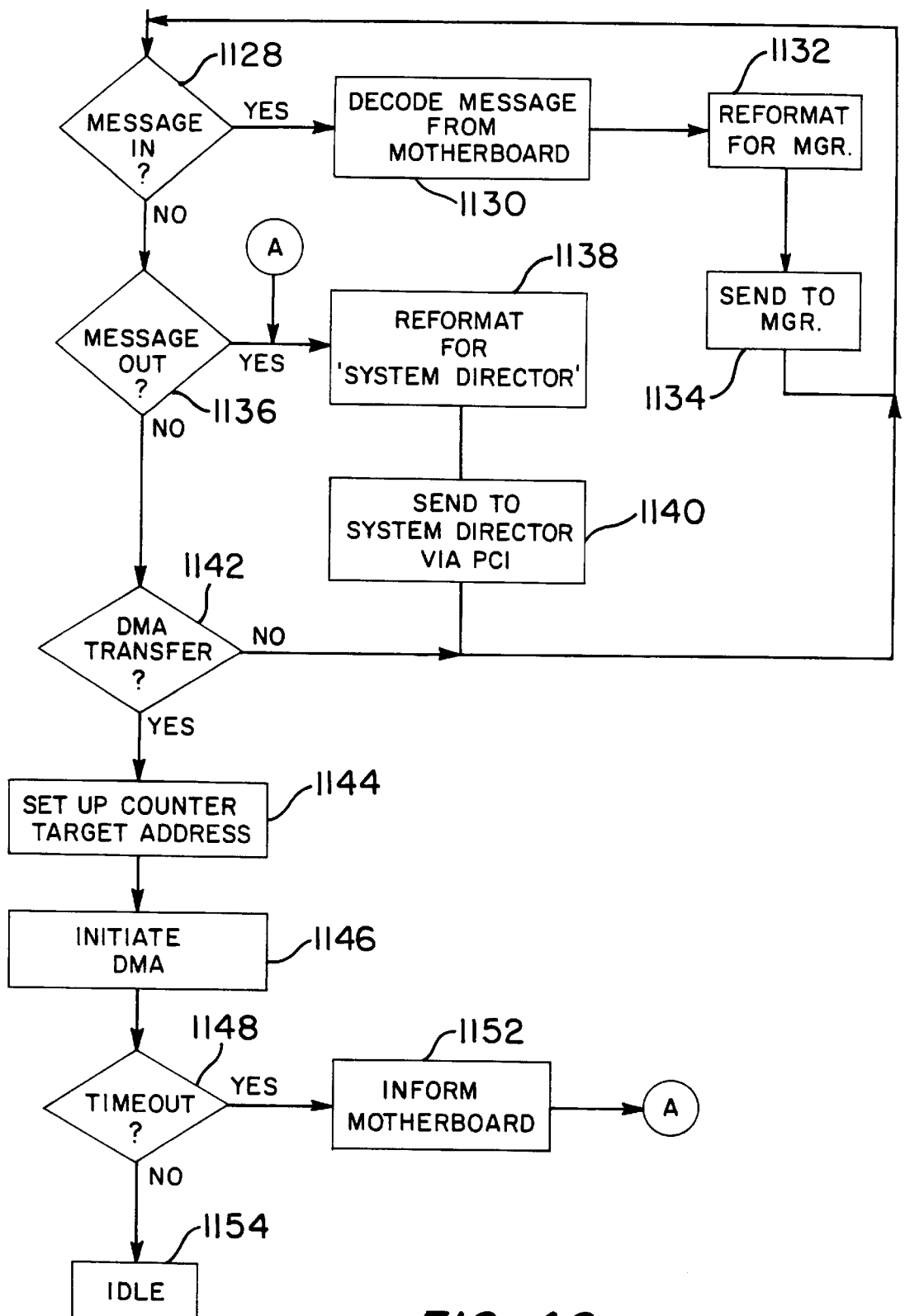
FIG. 40 is a flow chart representation of the PCI interface driver module of the software for the control DSP.

As seen from FIG. 40, the processing carried out by the PCI interface driver commences with a determination as to whether a message is incoming from the motherboard (step 1128). If it is found at step 1128 that a message is coming in from the motherboard, then step 1130 follows, at which the message is decoded. Then the decoded message is placed in a format suitable for handling by the relevant one of the manager modules shown on FIG. 39 (step 1132), and the reformatted message is dispatched to the relevant manager (step 1134). The process then loops back to step 1128. Typically, messages received at the front end processing board from the motherboard contain programming and/or command data, such as that required to change the sequencing of cameras in the field capture operations by the analog video board, changes in parameters used in connection with video data compression operations, selection or adjustment of live image analysis algorithms to be carried out by the front end board, and so forth.

If at step 1128 no message was found to be incoming from the motherboard, the driver processing advances to step 1136, at which it is determined whether there is a message to be sent from the front end board to the motherboard. If so, step 1138 follows, at which the outgoing message is reformatted for handling by the "system director". The "system director" is, as will be seen, a software module which controls the motherboard CPU and acts as a central clearing house for messaging among the software objects supported by the motherboard CPU. Following step 1138 is step 1140, at which the reformatted outgoing message is dispatched to the system director via the PCI connection between the front end board and the motherboard. The process then loops back to step 1128.

If at step 1136 no outgoing message was found to be present, the next step is step 1142. At step 1142 it is determined whether compressed video data is ready for transfer to the motherboard. If not, the process loops back to step 1128. However, if at step 1142 it is found that video data is ready for transfer to the motherboard, then the process goes on to step 1144, at which a counter in the DMA addressing unit 1056 (FIG. 36) is initialized with the target location in the motherboard memory space to which the video data is to be transferred. Following initialization of the target address, the DMA transfer of the video data to the motherboard is itself begun (step 1146). While the transfer of the video data is going on, the process of FIG. 40 may detect a time-out condition, as indicated at step 1148. It is noted that a time-out condition may occur if the DMA transfer fails for some reason. If a time-out is detected, a message is generated to inform the motherboard of the time-out (step 1152). Following the reformatting and message dispatch steps 1138 and 1140, the process then returns to step 1128. Unless a time-out condition is encountered, the interface driver process idles, as indicated at block 1154.

VIDEO DATA COMPRESSION

The video data compression operations carried out on the digital front end board 590 (FIG. 4) will now be discussed with reference to FIGS. 41 through 44 and 39A.

The VR/PC unit disclosed herein employs a novel video data compression technique which, under typical operating conditions for the unit, provides an effective compression ratio of at least about 250:1, while providing an image quality that is at least adequate for video surveillance security applications. This high degree of compression permits efficient use of storage capacity (principally hard disk capacity) while facilitating data transmission and manipulation within the VR/PC unit. Moreover, as will be understood from subsequent portions of the discussion, the novel video data compression technique disclosed herein synergistically accommodates image analysis algorithms that are subsequently performed on the compressed video data. Moreover, even with the remarkably high compression ratio provided by the present compression technique, rather difficult playback functions, such as reverse-direction playback, can be performed relatively efficiently.

Figure 44:
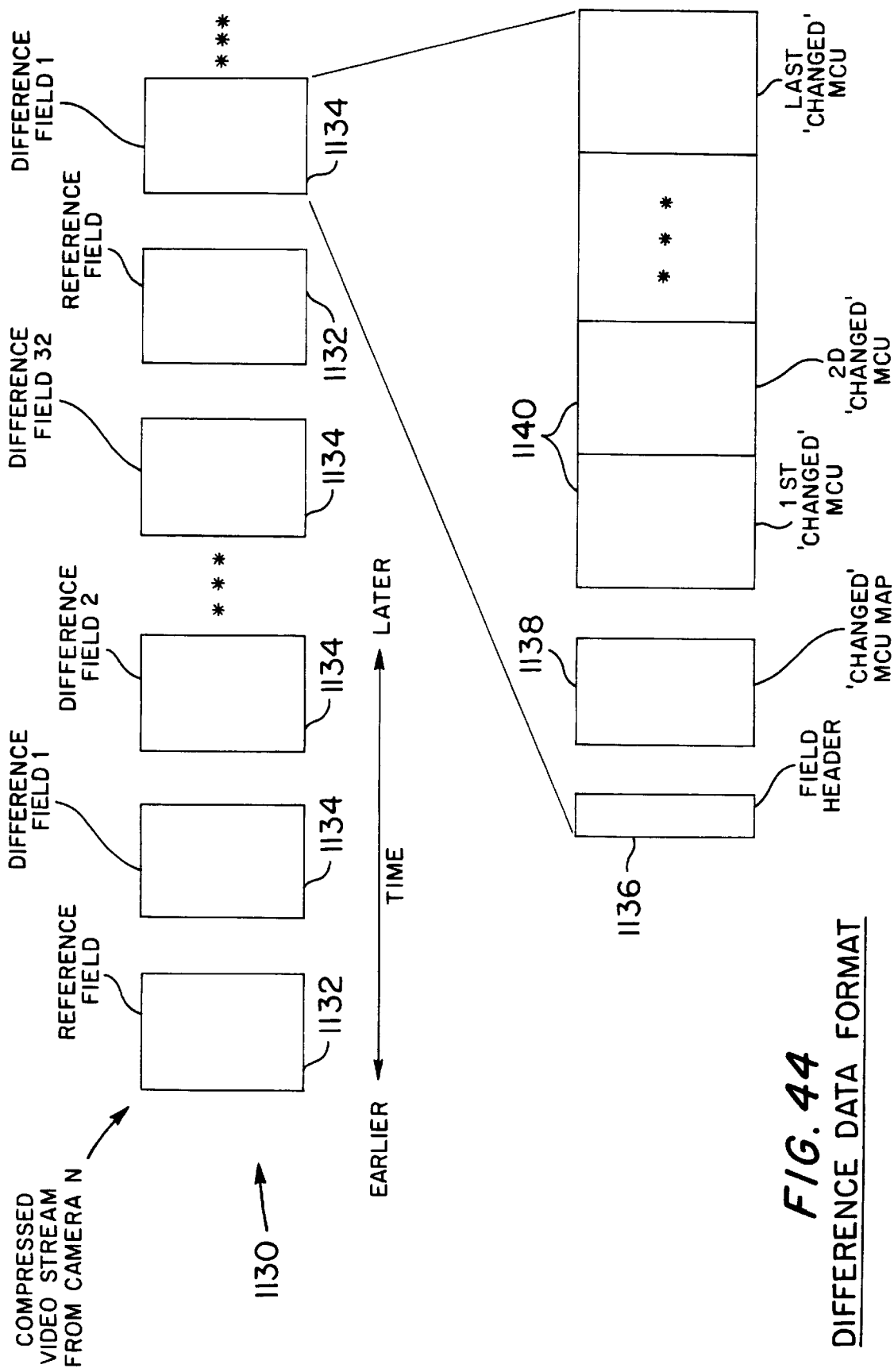
FIG. 44 is a representation of a data format used for compressed video data generated by the front end processing board of FIG. 14.

An overview of the present video data compression technique, and a description of the format of the compressed video data, will now be provided with reference to FIG. 44.

After compression, the stream of video images produced by a given camera is represented as a sequence of data fields 1130. There are two types of fields in the sequence of fields: reference image fields 1132 and "difference" image fields 1134. The reference fields 1132 occur at regular intervals in the sequence of data fields. For example, in a preferred embodiment of the present compression technique, every 33rd field in the sequence is a reference field; that is, 32 "difference" fields 1134 are provided between each sequential pair of reference fields 1132. The reference fields 1132 are each compression encoded without reference to any other image. On the other hand, each of the difference fields 1134 is compression encoded with reference to one or more preceding images.

Each of the reference fields 1132 begins with a field header (not shown in FIG. 44) which may be the same as the tile field header discussed above in connection with FIG. 30 (time code bytes not shown in FIG. 30 would also be included in the field header). The balance of the reference field 1132 is made up of compressed video data corresponding to every one of the 2400 tiles of the image plane. In particular, the compressed video data making up the balance of the reference field is formed by processing every one of the 3600 data tiles (2400 luminance tiles and 1200 color information tiles) by the compression-encoding circuitry of the JPEG chip 848 (FIG. 14). As is well known to those of ordinary skill in the art, the JPEG encoding process performed by the chip 848 entails conventional encoding steps such as orthogonal (DCT) transformation, quantization of coefficient values, and run-length encoding. The compression ratio achieved with respect to the reference fields is on the order of 30:1 to 70:1.

On the other hand, in the difference fields, each of the "difference" data fields 1134 include compressed video data only for selected tiles that represent "changes" relative to a preceding image. When there is little or no motion in the video image stream, very few, or none, of the data tiles are represented in the difference data fields 1134, so that a high degree of compression is realized.

As seen from the lower portion of FIG. 44, a typical difference data field 1134 is made up of a field header 1136, followed by map data 1138 which indicates the. portions of the image plane which were considered "changed" in the current image, and are accordingly represented by video data in the present difference data field 1134. For example, the map data may consist of one bit for each of the 600 minimum coding units (MCUS) in the image plane, it being recalled that an MCU corresponds to a discrete horizontal sequence of four tiles. For example, a "1" bit corresponding to a particular MCU would indicate that the MCU has been found to be "changed" and is represented by JPEG-compressed video data corresponding to the six data tiles for the MCU. A "0" value for the bit corresponding to a particular MCU indicates that no data for the MCU is included in the present difference data field.

Following the changed MCU map 1138 are data segments 1140 made up of the JPEG-compressed video data corresponding to the changed MCUs indicated by the map data 1138. The number of "1" bits in the map data is the same as the number of encoded MCU portions 1140.

The compression technique just described allows for an image reconstruction technique schematically illustrated in FIG. 61. According to this technique, a reference field 1132 is reconstituted simply by reversing the JPEG compression encoding in a conventional manner. Then, for the immediately following difference field, the changed MCU data segments are each JPEG-decompressed, and each MCU of the resulting video data is substituted at the appropriate portion of the image plane as indicated by the changed MCU map. One can think of the process of constructing the first difference field as one of "pasting in" postage stamps (reconstituted MCUs) using the MCU map as a guide. The process is then repeated with respect to each of the succeeding difference fields.

A key portion of the compression encoding process for the difference fields entails determining whether a particular MCU is to be JPEG-encoded (because it is "different" from a corresponding reference MCU) or discarded (because it is "the same" as the reference MCU). In a preferred embodiment of the invention, each tile.in the MCU is compared with a corresponding tile in the reference MCU, and an MCU in the difference field is considered different if any tile is found "different" from the corresponding reference tile. The determination as to whether a tile is different from a reference tile is made by calculating certain statistics from the pixel data making up the reference tile, and comparing the statistics, on the basis of a threshold, with the same statistics previously generated for the reference tile. The threshold level for "sameness" is adjustable by the user, in a preferred embodiment of the system, so that compression ratio and image quality may be traded off against each other by the user.

FIGS. 43A–43C schematically illustrate aspects of the tile comparison process. FIG. 43A shows the tile as an eight by eight array of pixels. FIG. 43B indicates how the tile of FIG. 43A is divided up into four quadrants that are discrete from each other and each consist of a four by four array of pixels. A tile comparison statistic is calculated for each of the four quadrants by summing eight of the 16 pixels in the quadrant and then dividing by four (shifting two binary places to the right). The result is a nine-bit quadrant statistic. (The number by which the eight pixel sum is divided may be considered a "scaling factor" and may be a number other than four.)

The eight pixels to be summed are selected by what will be referred to as "checker-board" subsampling, as indicated in FIG. 43C. Two checker-board -subsampling techniques are possible: either the pixels marked "x" in FIG. 43C may be selected for summation, or the pixels not marked may be selected. In either case, it will be observed that checker-board subsampling entails subsampling by a factor of two, with offset from line to line. In a preferred embodiment of the invention, only one of the two checker-board subsampling techniques is applied for all of the quadrants of all of the tiles, so that no pair of vertically or horizontally adjacent pixels is used for calculation of the tile characteristic statistics.

The same technique is used to calculate the statistics both for the reference tiles and the tiles in the difference fields. If one of the four quadrant statistics for a reference tile differs by more than the threshold amount from the statistic for the corresponding reference quadrant, then the entire tile, and hence the entire MCU, is considered to be "changed" relative to the reference MCU. It will be understood that this procedure is applied to six tiles (four luminance, two color) for each MCU.

Processing carried on in connection with compression encoding of the difference video data fields is illustrated in FIGS. 39A, 41A, 41B and 42. Referring initially to FIG. 41A, a setup operation for the compressor manager software module 1120 (FIG. 39) will be described. The setup phase of the compressor manager begins with a step 1142, at which there is received from the motherboard a table of threshold values respectively applicable to the input video streams from the respective cameras. These threshold values, which correspond to image quality and compression ratio parameters for the respective video signal streams, are stored in an on-board RAM for the front end board control block 842. The threshold values in the table are then loaded for use in compression processing by the DSP 1050 (step 1146) and the compression process is reset (step 1148). In particular, at step 1148, suitable instructions are sent to the JPEG chip 848 to set desired parameters, such as selection of quantization tables and Huffman encoding tables, selection of monochrome vs. polychrome encoding, etc.

Operation of the compressor manager software module is illustrated in FIG. 41B. As indicated at block 1152, the same operational process is carried on with respect to each of the 16 incoming video streams. First, as shown at block 1154, threshold data corresponding to the camera which generated the present difference field to be encoded is retrieved. It is then determined whether the threshold settings are different from those most recently applied (block 1156). If not, the compression process is applied in the same manner as was done for the most recent difference data field. However, if the threshold data is different from that most recently applied, the operating tables for the compression processing are updated (step 1158) and the compression process is reset (step 1160).

It should be understood that the same threshold parameter may be used in processing both luminance and color data tiles, or different thresholds may be used for the luminance data on one hand and the color (U,V) data on the other hand.

Figure 42:
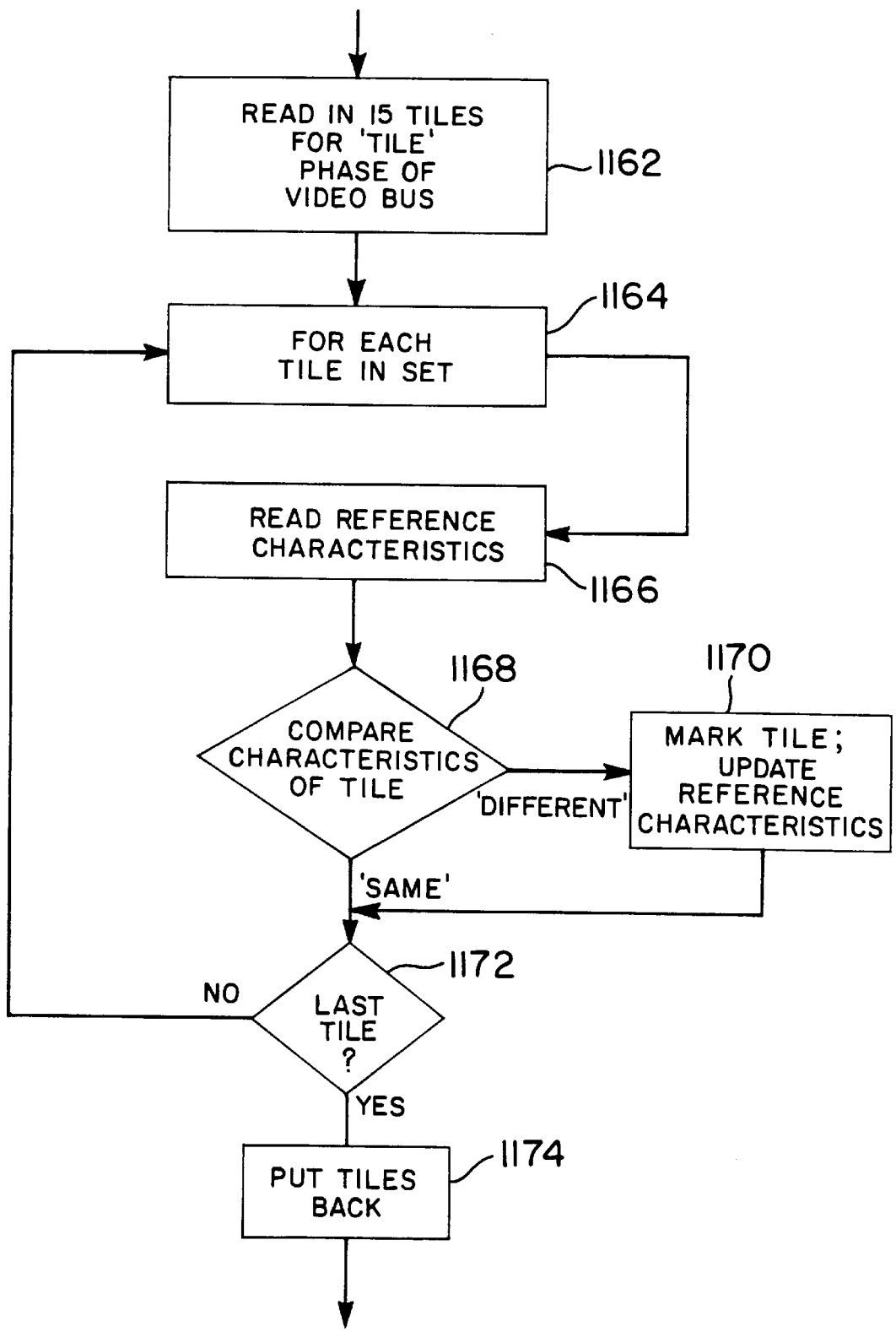
FIG. 42 represents in flow-chart form the video data tile comparison function carried out by the control DSP.

The processing carried on by the tile comparison software block 1122 is illustrated in FIG. 42. Initially, the 15 tiles to be transmitted during the tile phase of the video bus operation (see FIG. 25) are read in (step 1162) by accessing the tile data in the FIFO 914 (FIG. 19) and then, as indicated at step 1164, the following procedure is applied to each tile: the reference characteristic statistics for the corresponding reference tile are retrieved (step 1166) and the characteristic statistics for the present tile are calculated according to the technique described in connection with FIG. 43 (step 1168). If, based on the applicable threshold, the retrieved reference characteristics, and the calculated characteristic statistics for the present tile, a tile is found to be "different" from the reference tile, then the tile is marked as different (step 1170) and the calculated characteristic statistics for the present tile are stored in place of the previous reference characteristics and thus serve as updated reference characteristics. However, if at step 1168 the present tile was found to be "the same" as the reference tile (i.e, differing in its characteristics by less than the threshold), then the tile goes unmarked. As indicated at step 1172, the process of steps 1164 through 1178 continues until all 15 of the tiles have been compared with the reference characteristics. Then the tiles, including the tiles which have been marked as "different" tiles, are returned to the video output block (step 1174). As will be recalled from previous discussion, all tiles that are either marked "different" or are in the same MCU as a "different" tile are provided to the JPEG processing chip 848 for JPEG compression and inclusion in the compressed difference data field. All other tiles are not provided to the JPEG chip, but are simply discarded.

The processing performed by the map generator software module 1124 (FIG. 39) will now be described with reference to FIG. 39A.

As indicated at block 1176, the following procedure is carried out for each tile. First, it is determined whether the tile has been marked "different" (step 1178). Then, as indicated at steps 1180, 1182 and 1184, a flag corresponding to the present tile is set to one if the tile was marked "different" and is set to zero otherwise. As shown at step 1186, the flag is then merged with a map byte which is currently being constructed. If all eight flags from which the map byte is to be constructed have been merged into the map byte (step 1188) then a new map byte is started (step 1190). After map bytes have been constructed for all of the tiles for the image, the resulting map data is transferred to the motherboard through the PCI interface 850 (step 1192).

Figure 39A:
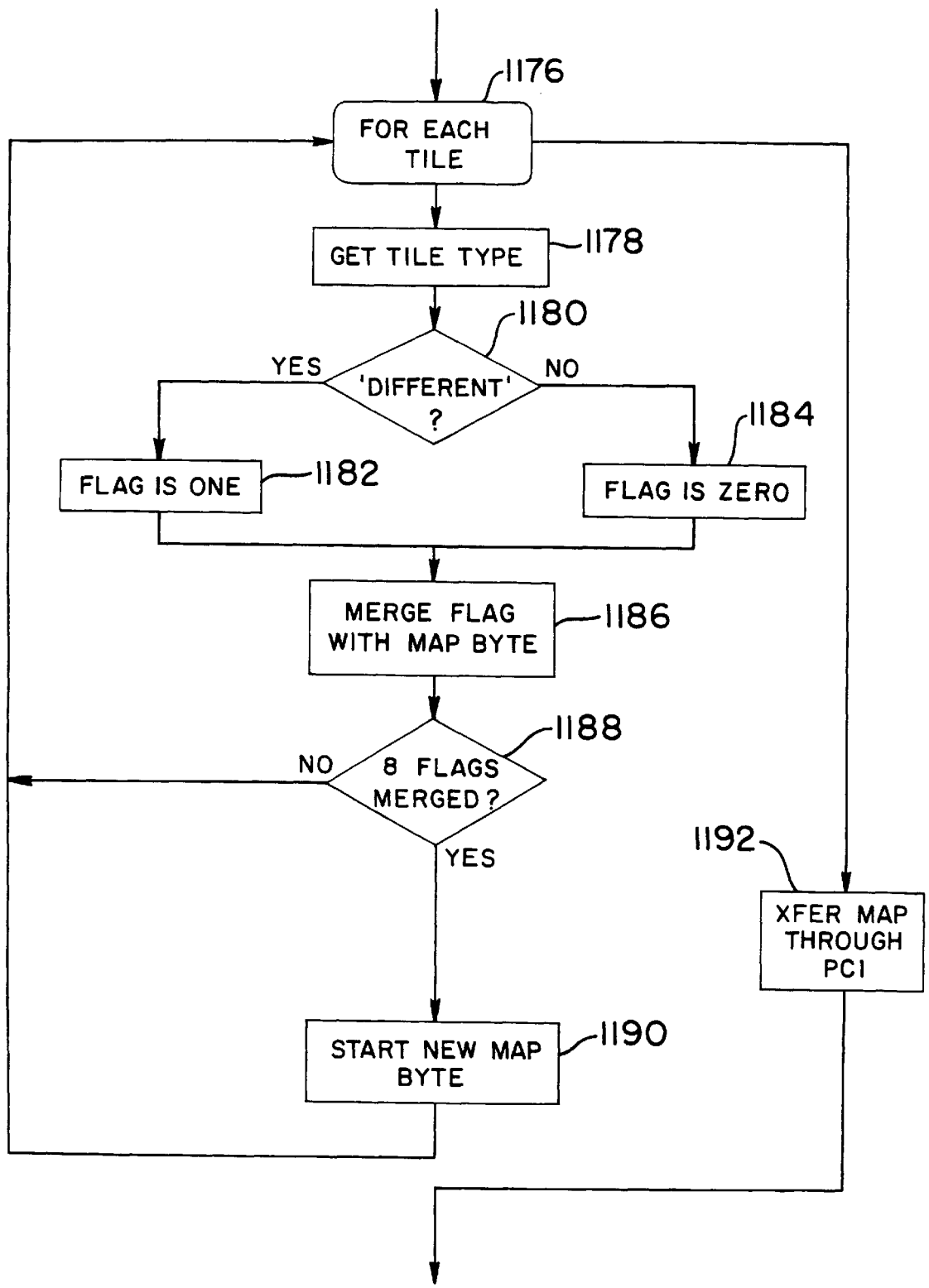
FIG. 39A represents in flow-chart form the "changed tile" map generator module of the software for-the control DSP.

Although the foregoing discussion of FIG. 39A has indicated use of one mapping bit per tile, it should be understood that as a preferred alternative, one map bit is allocated to each MCU and that the flag for a given MCU is set to "1" if any of the six data tiles for the MCU has been marked as "different".

MOTHERBOARD SOFTWARE

There will now be discussed the software which controls the operation of the motherboard CPU 592 (FIG. 3) and hence controls the VR/PC unit as a whole. In a preferred embodiment of the VR/PC unit, a standard microprocessor (e.g., a Pentium) is employed, operating with a standard operating system, in order to minimize the cost for the motherboard. The well known Windows 95 operating system is employed for the motherboard CPU in a preferred embodiment of the VR/PC unit, because of the multi-tasking options and software development capabilities supported by Windows 95. The application software modules to be discussed below were implemented in accordance with the Component Object Model (COM) architecture propounded by MicroSoft. The C++ object-oriented programming language was used to create the application modules.

Figure 45:
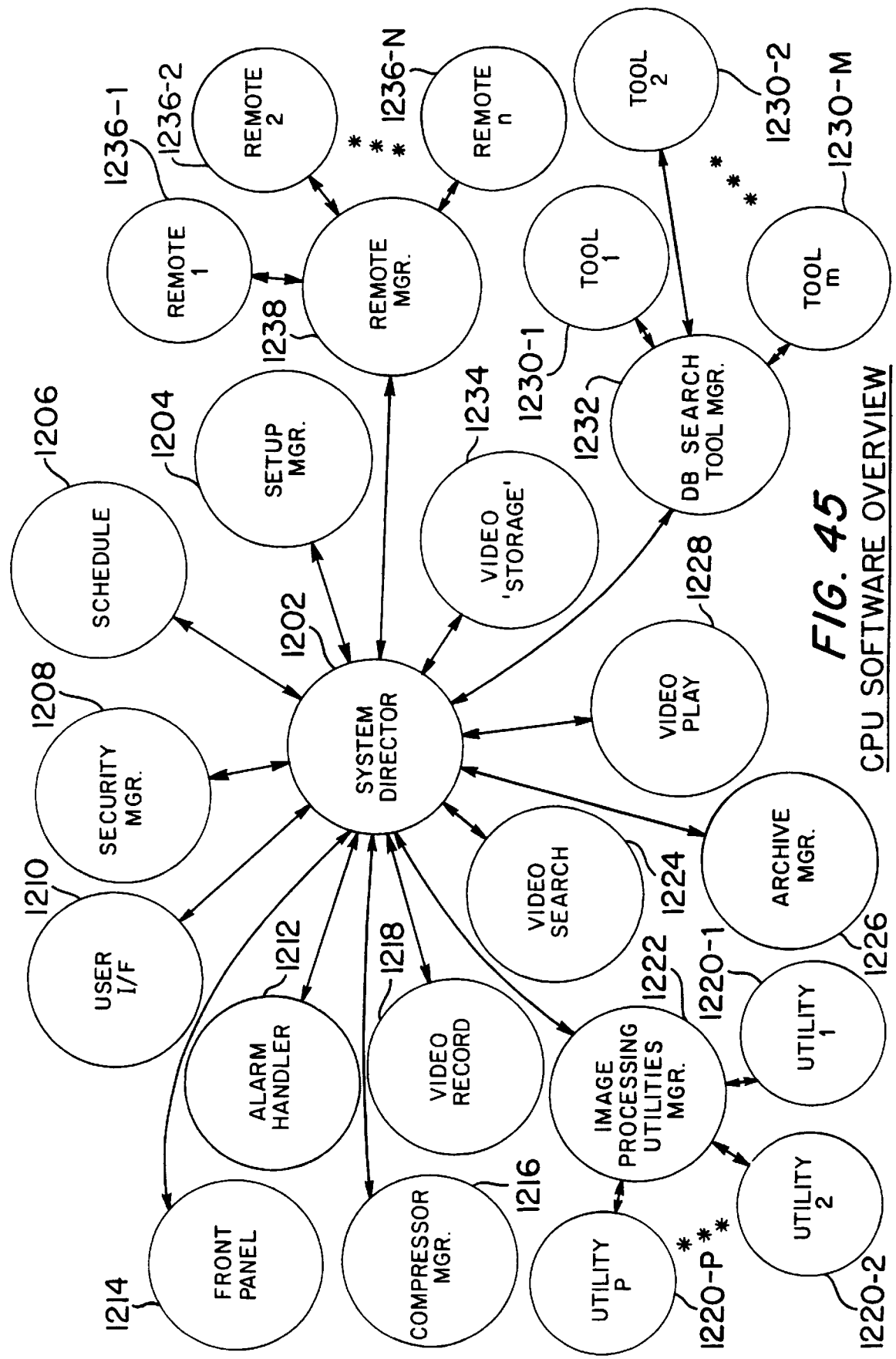
FIG. 45 represents an overview of major software components which control operations of the motherboard microprocessor shown in FIG. 3.

FIG. 45 provides an overview of software components which make up the motherboard CPU application. The illustrated components are enumerated as follows: system director 1202, setup manager component 1204, scheduling component 1206, security manager component 1208, user interface component 1210, alarm handling component 1212, front panel component 1214, compressor manager component 1216, video recording component 1218, image processing utility objects 1220-1 through 1220-P, image processing utilities manager component 1222, video search component 1224, archive manager component 1226, video play component 1228, image analysis (playback) tool objects 1230-1 through 1230-M, database search tool manager component 1232, video storage component 1234, remote device objects 1236-1 through 1236-N and remote object manager component 1238. Except for the remote objects 1236, playback analysis tool objects 1230 and image processing utility objects 1220, all of the components other than the system director 1202 are shown as being in two-way message-passing communication with the system director 1202.

The system director functions as a central message clearing house to permit message passing between the other application software components. Messages to and from the remote objects 1236 are passed through the remote manager component 1238, messaging to and from the image analysis tool objects 1230 occurs through the database search tool manager 1232, and messaging to and from the image processing utility objects 1220 occurs through the image processing utility manager component 1222. Through the multi-tasking facilities provided by the Windows 95 operating system, it is expected that each software module and object will operate its own processing thread or alternatively utilize the main GUI thread. The application software architecture is message oriented and event driven.

The system director 1202 is shown in FIG. 46A. In accordance with the standard approach of the COM architecture, the system director 1202 supports two interfaces, IUnknown (reference number 1240) and INotifySrc (reference numeral 1242). As will be appreciated by those of ordinary skill in the art, the IUnknown interface 1240 is a standard COM interface for the purpose of reference counting, freeing memory, and gaining access to interfaces supported by the other COM objects. The INotifySrc interface is 1242 is modelled after standard COM design guidelines allows software components to indicate interest in receiving certain messages. The system director maintains a mapping which relates messages to interested parties, and when a message comes to the system director, the system director looks up all interested parties and actuates a call to the interested party components through the INotifySrc interface. The system director is the first component that is loaded and initialized by the application software. The system director then determines from a system registry all components to be initialized by the system director and then loads each of the components and calls an initialization function passing the INotifySrc interface pointer so that the component can register itself.

Other software components are illustrated in generalized form in FIG. 46B. It will be noted that the other components typically support interfaces IUnknown and INotify.

Background on the COM architecture and messaging between objects by use of interfaces can be found in an article entitled, "How OLE and COM Solve the Problems of Component Software Design," by K. Brockschmidt, *Microsoft Systems Journal*, May 1996, pp. 63–80, and a related (sequel) article at pages 19-28 of the June 1996 issue of the *Microsoft Systems Journal*.

Processing carried out by the security manager component 1208 is illustrated in FIG. 47. As seen from block 1244, the security manager idles until a user attempts to login. When a login attempt is detected, it is determined (step 1246) whether the login attempt was valid. If not, the component loops back to block 1244. But if the login attempt is valid, then the user is logged in (step 1248), and it is then determined (step 1252) what system features the person logging in is permitted to operate. This is done by accessing a security database 1254 to retrieve the feature set associated with the person who has logged in. On the basis of the retrieved feature set, the security manager component then sends permission to operate to each component that the user is allowed to access (step 1256). As also indicated in FIG. 47 at block 1258, the security manager component further provides for a process whereby the feature sets in the security database 1254 can be entered and edited by authorized supervisory personnel.

Figure 48:
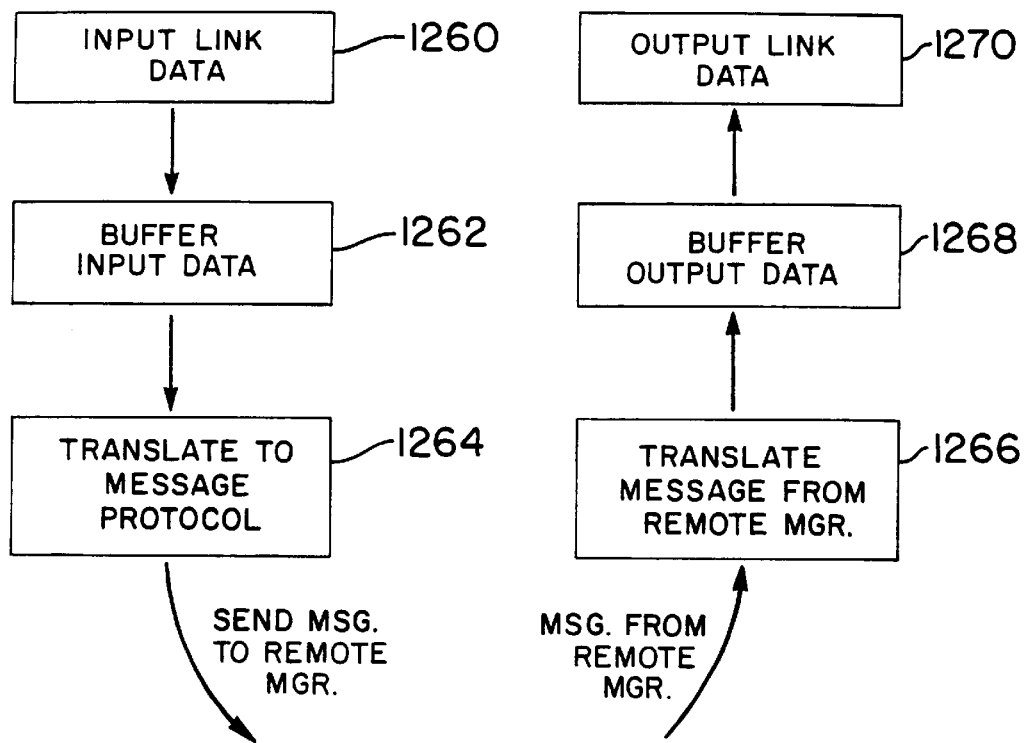
FIG. 48 represents a typical remote object which may be instantiated from time to time in the processing performed by the motherboard CPU.

FIG. 48 illustrates operation of a typical one of the remote objects 1236. The remote objects function as drivers or interfaces for devices external to the VR/PC unit. Such devices may include external media drive devices (e.g., an external DAT drive), other VR/PC units, or local or remote nodes like those shown in FIG. 1. Preferably, a remote object is instantiated for each external device which is in communication with the VR/PC unit.

As indicated at block 1260, data received via a communication link with the remote device is received, and then buffered (step 1262). Received data is then translated into the message protocol in use among the application software components (step 1264) and the resulting message is sent to the remote manager 1238 (FIG. 45). Continuing to refer to FIG. 48, when a message is to be sent from the VR/PC unit to a remote device, the message is received by the appropriate one of the remote objects 1236 from the remote manager 1238. The message is translated by the remote object 1236 into an appropriate format for transmission to the external device (step 1266) and then is placed in an output buffer (step 1268) and transmitted via the communication link (step 1270).

Figure 49:
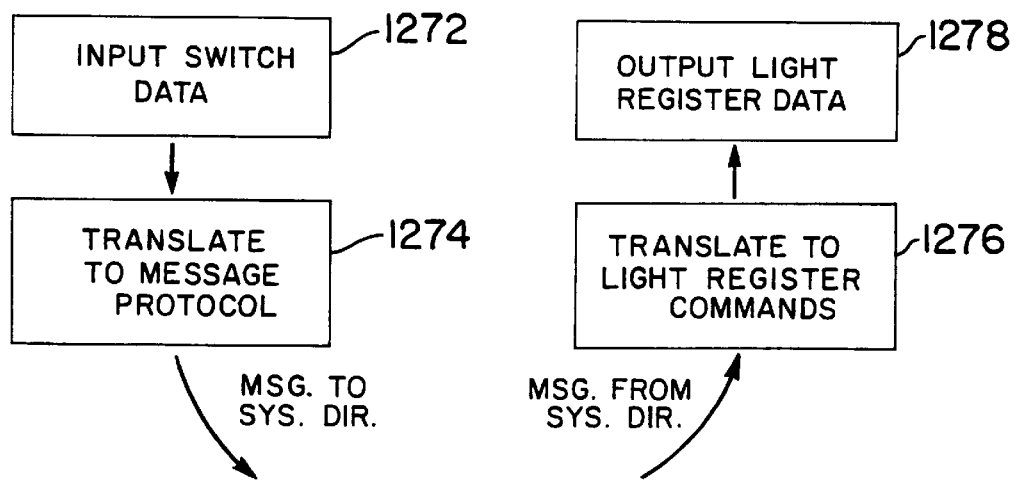
FIG. 49 represents a software object which handles interaction between the motherboard CPU and the physical front panel of the VR/PC unit of FIG. 5.

FIG. 49 illustrates processing carried out by the front panel software component 1214 (FIG. 45). When a user of the VR/PC unit manipulates a switch on the front panel 586 (FIG. 6), a corresponding signal is received by the front panel software object 1214 (step 1272, FIG. 49). The switch manipulation signal is then translated into the message protocol used within the application software (step 1274) and the resulting message is forwarded to the system director.

The front panel software object also manages the states of the LEDs provided on the physical front panel 586. When the LED display conditions on the front panel 586 are to be changed, a suitable message is received by the front panel software object 1214 from the system director. The front panel software module then operates to translate the message into LED register commands (step 1276) and outputs the resulting data for storage in the LED register (step 1278; LED register not shown).

Processing carried out by the setup manager component 1204 is illustrated in FIG. 50. Initially (step 1280), it is determined whether a request for previously stored setup information has been received. If so, the request is fulfilled (step 1282). Following step 1282 (or immediately following step 1280 if no request for setup information was received) is step 1284, at which it is determined whether a request to change the previously stored setup information is received. If so, the setup information is changed in accordance with the request (step 1286) and the process loops back to 1280. If no request was received at step 1284, then the process loops back to step 1280 directly from step 1284.

Figure 52:
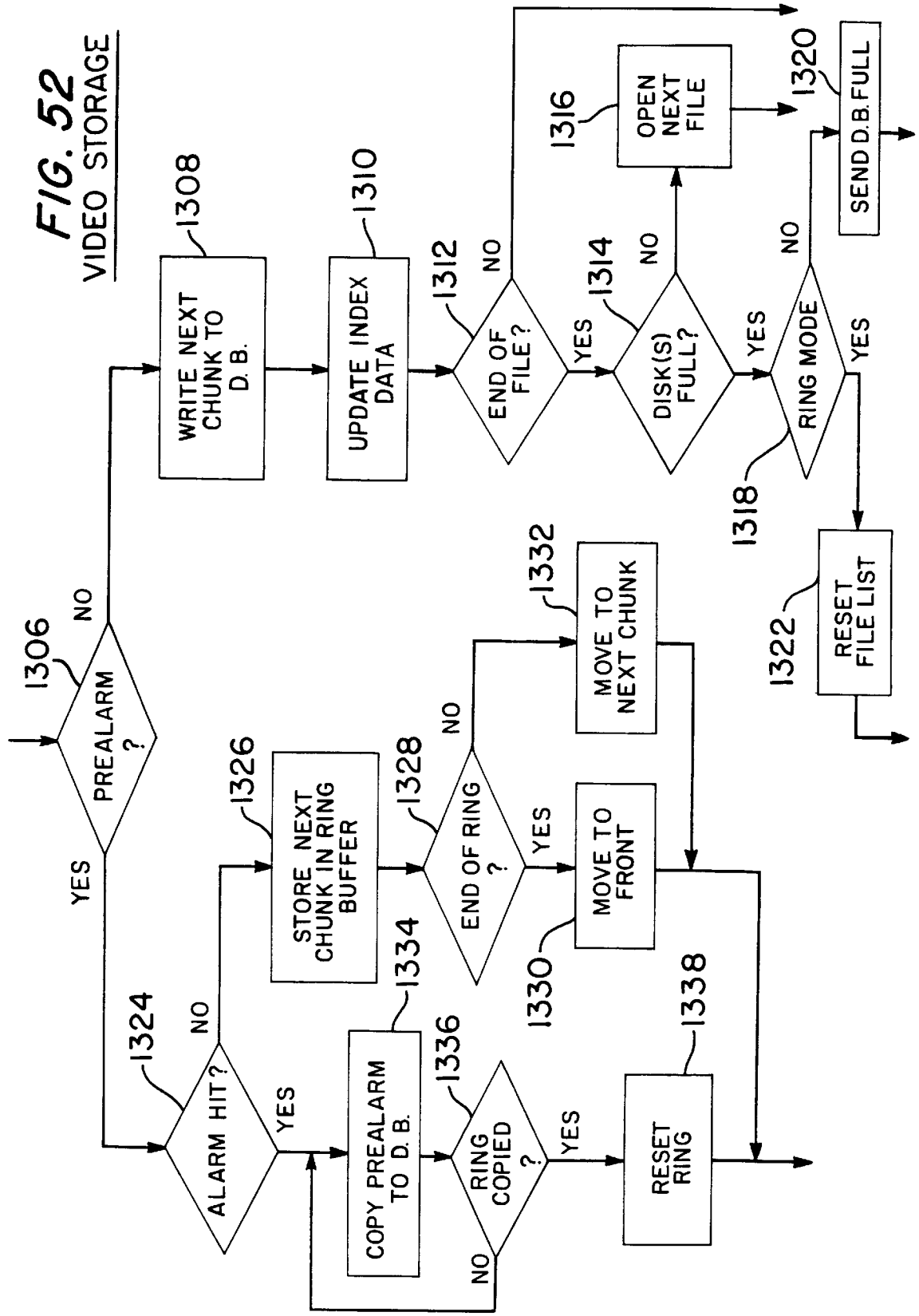
FIG. 52 illustrates in flow-chart form a video storage processing software module for the motherboard CPU.

There will now be described with reference to FIGS. 51 and 52 processing carried on by the video storage software component 1234.

FIG. 51 illustrates a format in which compressed video data is stored on one or more of the hard disk drives of the VR/PC unit.

As seen from FIG. 51, the data stored on the hard drives includes compressed video data 1288 and index data 1290. The video data corresponds to the incoming streams from all 16 cameras (if as many as 16 cameras are connected to the VR/PC and in operation) and is in a form which complies with the Microsoft .AVI (audio/video interleave) standard for audio/video files. Although the embodiment of the VR/PC described herein does not store audio information, it is contemplated to modify the system so that audio pickups (microphones) are provided and digitized audio data is stored in association with relevant video information.

The data corresponding to the streams of incoming video signals are stored interleaved together in the form of fixed length files 1292, of which N files 1292 are shown in FIG. 51 as being recorded on the hard disk. A preferred size for each of the files 1292 is about 20 megabytes. By dividing up the continuous streams of video data into files, loss of data due to a drop out or data corruption on the hard disk can be limited.

In addition to the quasi-permanent video data files 1292, there is also stored on the hard disk video data maintained in a pre-alarm buffer section of the disk (reference numeral 1294). The pre-alarm buffer 1294 preferably stores video data corresponding to the incoming video signals from all 16 cameras in an interleaved fashion and at what is substantially the full frame rate for the system (45 fields per second divided among the 16 cameras). By contrast, it should be understood that some or all of the 16 cameras may not be currently recorded at all in the quasi-permanent files 1292, or may be stored at a "time lapse" rate that is substantially less frequent than 45/16 fields per second. The pre-alarm buffer 1294 is preferably implemented as a ring buffer on the hard disk and may, for example, store all of the video fields captured at the front end electronics over the past 60 seconds.

Turning now to the index data on the hard disk, overall indexing covering all of the files 1292 is indicated at reference numeral 1296. For each of the N files 1292, a starting date and time and an ending date and time are provided. An additional, file-specific index is provided with respect to each one of the individual files 1292. This file-specific index is illustrated at 1298 and provides for each field of video data the date and time at which the field was captured, the camera by which the field was captured, event-related information, and the offset within the file at which the field can be found. As indicated at reference numeral 1302, the event information given for a particular field may include data indicative of the occurrence of more than one type of event at the time that the field was captured. The detection of events may be accomplished through the alarm sensors 526 discussed in connection with FIG. 1 and/or by analysis of characteristics of the image stream. The analysis may have occurred either at the time the image stream was received or by playing back the image stream at a later time. The image stream analysis algorithms used to detect the events may return confidence factor values in addition to detecting that an event itself has occurred. In such cases, the data indicating that an event has been detected may be accompanied by the confidence factor provided by the event detection algorithm, as indicated at reference numeral 1304.

In a preferred embodiment of the invention, the indexing information 1290 is stored on the same hard disk with the associated video data files 1292, and the indexing information is also stored on a second hard disk. The second hard disk may then be accessed in order to search for the locations on the first hard disk of video data that is of interest to the user, while access to the first hard disk for the purpose of storing new video data thereon continues without interruption for index searching. In one embodiment of the invention, two hard disks are provided, of which one is used for video data storage (and associated indexing) while the other hard disk is not used for video data storage, but rather is dedicated to the backup or "shadow" index information and storage of programs or the like. In another embodiment of the invention, three or more hard disk drives are provided. In the latter embodiment, one of the hard drives is dedicated to the shadow index and program information storage, and the other two or more hard disks are available for video data storage.

The video storage software component 1234 performs the functions of managing pre-alarm video data buffering on the hard disk or disks, storing the incoming video streams on the hard disk, and indexing the stored video data on the hard disk. The processing performed by the video storage software module is illustrated in flow-chart form on FIG. 52. Initially, it is determined at step 1306 whether the video storage software component is now engaged in the pre-alarm buffer management portion or regular video data storage portion of its function. If not engaged in pre-alarm buffer management, the process stores in a currently open file on the hard disk the next "chunk" of video data intended for quasi-permanent storage (step 1308). As used in the previous sentence and the subsequent discussion, it should be understood that a "chunk" of video data corresponds to a quantity of data that is conveniently handled and buffered preparatory to writing onto the hard disk. The corresponding index data is then updated (step 310). Next the process determines whether the end of the current video data file 1292 has been reached. If so, it is then determined whether the disk or disks available for video data storage are full (step 314). If not, another video data file is opened on the disk or disks (step 316). If the disk or disks are full, then step 318 follows step 314. At step 318, it is determined whether the video data storage disk or disks are being employed in a ring mode. If not, then the video storage software component sends a message to the system director indicating that the end of the storage capacity has been reached (step 320). However, if at step 318 it was found that the disk storage was being operated in a ring mode, then the file index list is reset and storage proceeds at the "beginning" of the hard disk (step 1322).

If at step 306 it was found to be time for execution of the pre-alarm buffer management function, then the process advances from 1306 to step 1324. At step 1324, it is determined whether an alarm condition has been detected. If not, the next chunk of video data to be stored in the pre-alarm buffer is placed at the next storage location in the ring buffer portion of the hard disk (step 1326). Then it is determined whether the end of the ring buffer portion of the hard disk has been reached (step 328). If so, the pointer indicative of the next storage point on the ring buffer is moved to the front of the ring buffer (step 330). Otherwise, the pointer is simply moved to the next storage location in the ring buffer portion of the hard disk (step 332).

If at step 1324 an alarm condition was found to have been detected, then step 1334 follows step 1324. At step 1334, the video data stored in the ring buffer is copied into the permanent storage portion of the hard disk. As indicated at step 1336, the copying of the data from the ring buffer to the permanent storage portion of the hard disk continues until complete, and then the pointer is reset to the beginning of the ring buffer portion. Alternatively, a new portion of the hard disk may be assigned for use as the ring buffer, with the portion of the hard disk previously assigned to use as a ring buffer having been made a part of the permanent storage portion in order to preserve the video data recorded in the pre-alarm buffer prior to the detection of the alarm condition.

Figure 53:
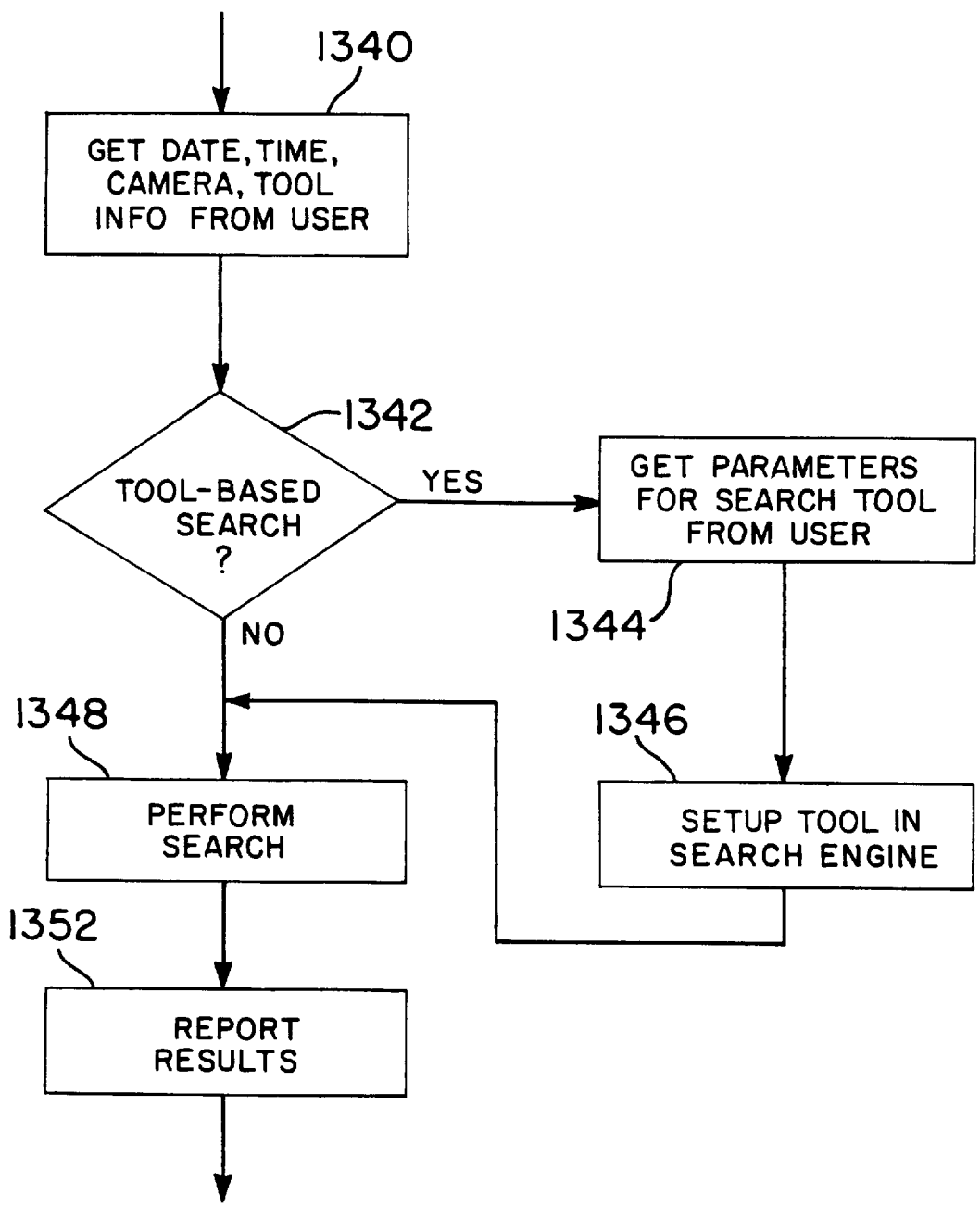
FIG. 53 illustrates in flow-chart form a video search processing software module for the motherboard CPU.

FIG. 53 illustrates the processing carried on by the video search software component 1224. When a search operation is initiated by a user (through interaction with the graphical user interface, as will be explained below), the video search software component proceeds to obtain from the user search parameters indicative of the date, time, and source camera for the video information of interest to the user (step 1340). In addition, the video search component obtains from the user an indication as to whether the search is to employ an image analysis algorithm ("tool"). Step 1342 is a decision block at which it is determined whether an image analysis based search is requested. If so, the video search software component obtains from the user input indicative of the type of image analysis algorithm to be performed, as well as, if appropriate, one or more parameters to constrain the execution of the image analysis algorithm (step 1344). On the basis of this information, the process then prepares the image analysis algorithm to operate with respect to the video data to be retrieved during the search (step 1346). Following step 1346 (or immediately following step 1342 if no image analysis is requested by the user) is step 1348, at which the database is searched to retrieve the video data requested by the user. If image analysis was requested, then the analysis algorithm is applied to the retrieved video data. In either case, the outcome of the search is reported (step 1352).

Figure 54:
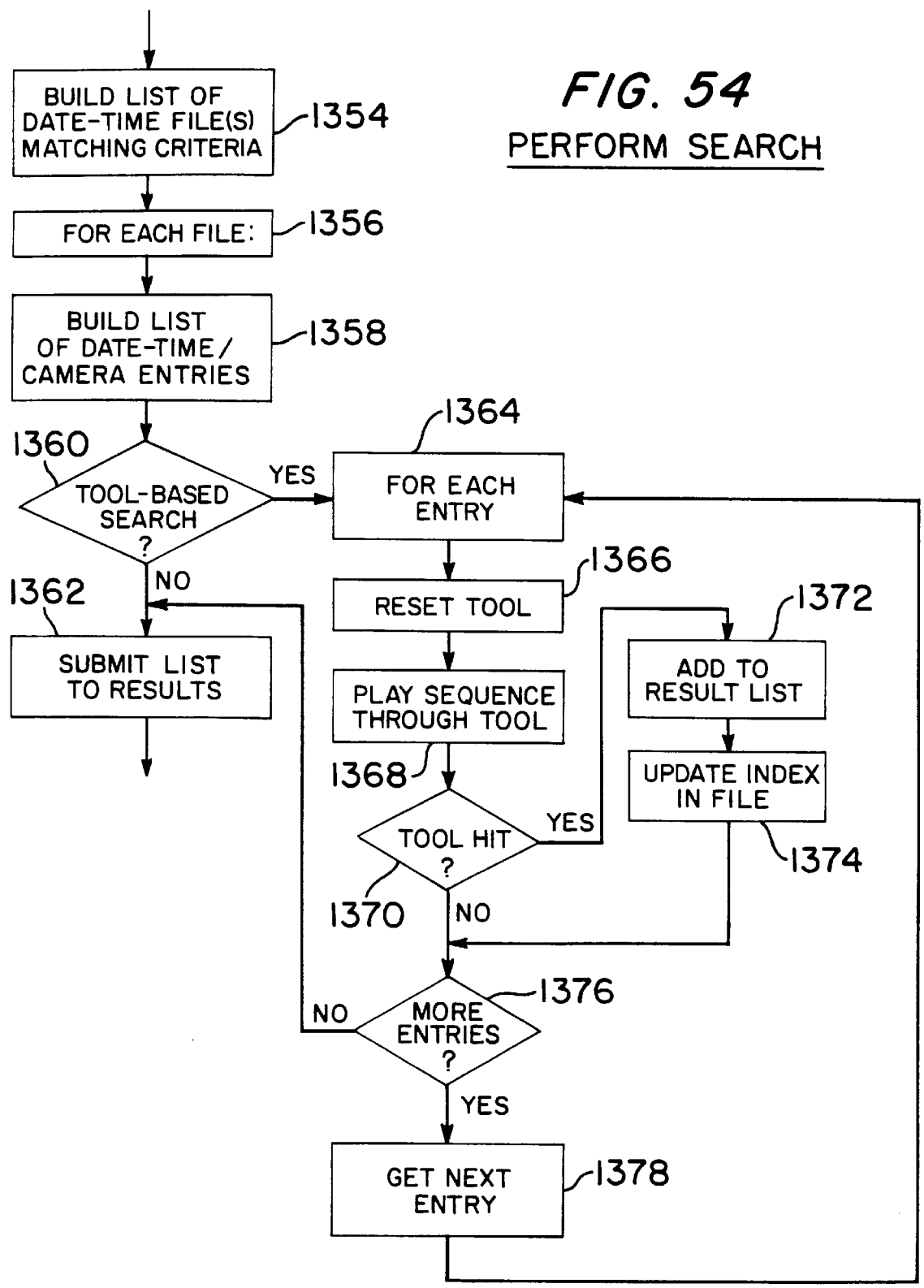
FIG. 54 illustrates in flow-chart form the "perform search" block of FIG. 53.

There will now be provided, with reference to FIG. 54, a more detailed description of the process step shown as step 1348 ("perform search") in FIG. 53. The step 1348 initially includes building a list of one or more date and time files that match the search criteria specified by the user (step 1354, FIG. 54). For each file on the list, the following steps are performed, as indicated at step 1356: A list of the date, time and camera entries is generated for each of the files (step 1358), and then a decision is made as to whether an image analysis algorithm is to be applied (step 1360). If not, i.e., if no image analysis was requested by the user, then the list is simply submitted for reporting (step 1362). However, if an image analysis based search has been requested, then for each entry in the list assembled at step 1358, the following procedure is followed, as indicated at step 1364: First the image analysis algorithm is reset (step 1366) and then the sequence of video images corresponding to the entry is analyzed using the image analysis algorithm (step 1368).

It is then determined at step 1370 whether the sequence of images exhibits a characteristic that was to be detected by the image analysis algorithm. If so, the sequence is added to a positive result list (step 1372) and the index information for the file is updated to indicate detection of the event (step 1374). That is, the event related data shown at 1302 in FIG. 51 is updated to indicate detection of the event, as well as the confidence factor applicable to the event detection decision. It will be appreciated that if the characteristic of the image stream is not found to be present, the sequence is not added to the result list and the index information is not updated. In any case, following step 1374, or directly following step 1370 if the characteristic of interest was not detected, it is determined whether more entries are present on the list (step 1376). If not, the results obtained as a result of the image analysis are reported (step 1362). However, if more entries are present, the next entry is retrieved (step 1378), and the loop starting at step 1364 is performed with respect to the next entry.

Figure 55:
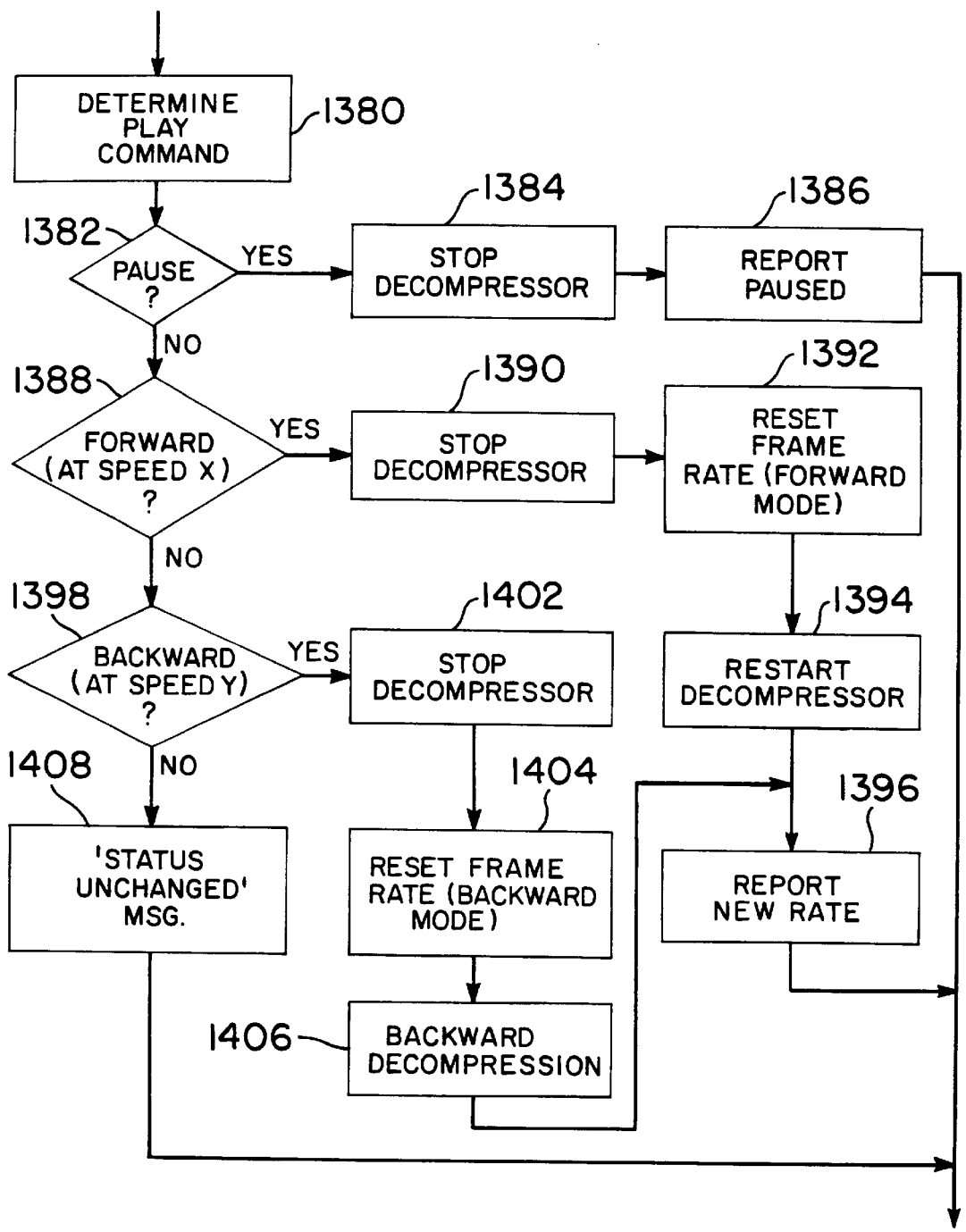
FIG. 55 illustrates in flow-chart form processing performed by the motherboard CPU in connection with video playback operations.

FIG. 55 presents an overview of the processing carried out by the video play software component 1228. Video playback operations may be initiated through user manipulation of the jog-shuttle switch 660 on the front panel 586 (FIG. 6) or by user interaction with the graphical user interface, as will be described below. In some cases the video play function is entered automatically upon completion of a search in order to display the video data requested by the user.

As shown in FIG. 55, an initial step of the video play function is determining what play command has been asserted (step 1380). If a pause command has been asserted (step 1382), then video data decompression operations are halted (step 1384), and the video play function reports to the system director that video playback has been paused (step 1386). If a forward play command, at a given speed of X fields per second, has been asserted (step 1388), then again the decompression operation is halted (step 1390) and the forward mode playback image rate is reset (1392). Then the video data decompression operation is restarted (step 1304) and the new requested playback rate is reported to the system director (step 1396).

If playback in the reverse direction has been selected, at a rate of Y images per second, was asserted (step 1398), then once more the decompression operation is halted (step 1402) and the image rate for the backward reproduction mode is reset (1404) and a reverse direction decompression operation is initiated (step 1406). Following step 1406 is the aforesaid step 1396, at which the requested playback rate is reported to the system director. If none of the circumstances to be detected at steps 1382, 1388 and 1398 have occurred, then a playback status unchanged message is sent to the system director (step 1408).

VIDEO DATA DECOMPRESSION (FORWARD DIRECTION)

The process step 1394 shown in FIG. 55 will now be described in greater detail with reference to FIG. 56.

Figure 56:
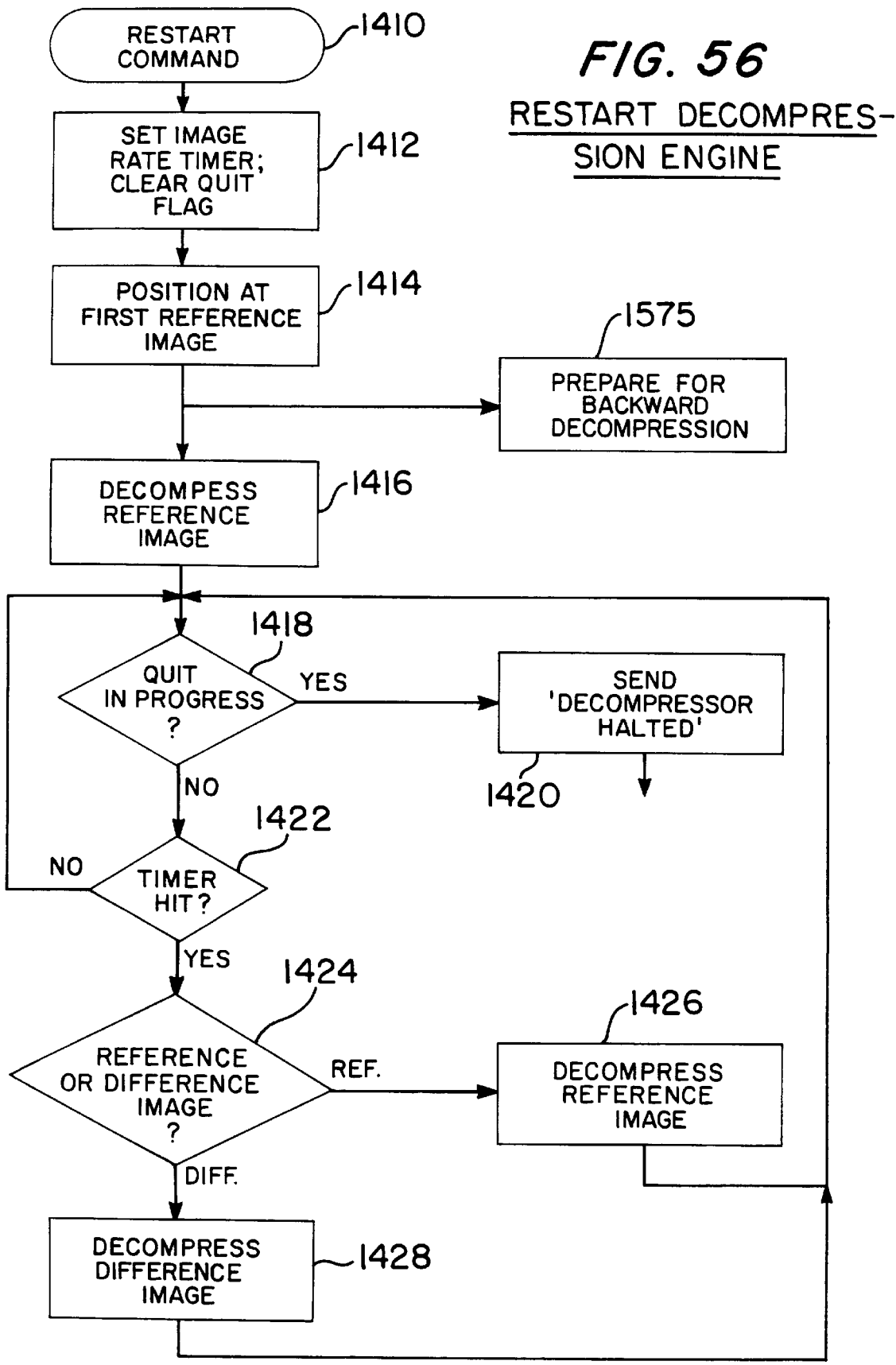
FIG. 56 illustrates in flow-chart form the "restart decompressor" block of FIG. 55.

The process illustrated in FIG. 56 commences with receipt of the restart command for the decompression engine (step 1410). There follows step 1412, at which the playback rate timer is set in accordance with the applicable X image per second rate, and the quit decompressing flag is cleared.

There follows step 1414 which entails locating the first reference image in the video stream to be played back occurring after the point at which playback is to be initiated. The reference image is then decompressed (reconstituted) in a step 1416. Following step 1416 is step 1418, at which it is determined whether halting of the decompression engine has been requested. If so, a message is sent to the system director to indicate that the decompression engine has halted (block 1420) and the decompression operation ceases. However, if it was not found at step 1418 that decompression was to be halted, then the process moves on to step 1422, at which it is determined whether the time has come to decompress the next image. If not, the process loops back to step 1418. However, if it is time to decompress the next image, the process advances to step 1424, at which it is determined whether the next image to be decompressed is a reference image or a difference image. If the next image is a reference image, a procedure for decompressing a reference image (block 1426) is applied, and then the process loops back to step 1418. If the next image is a difference image, then a procedure for decompressing the difference image (block 1428) is applied and the process again moves back to block 1418.

Figure 57:
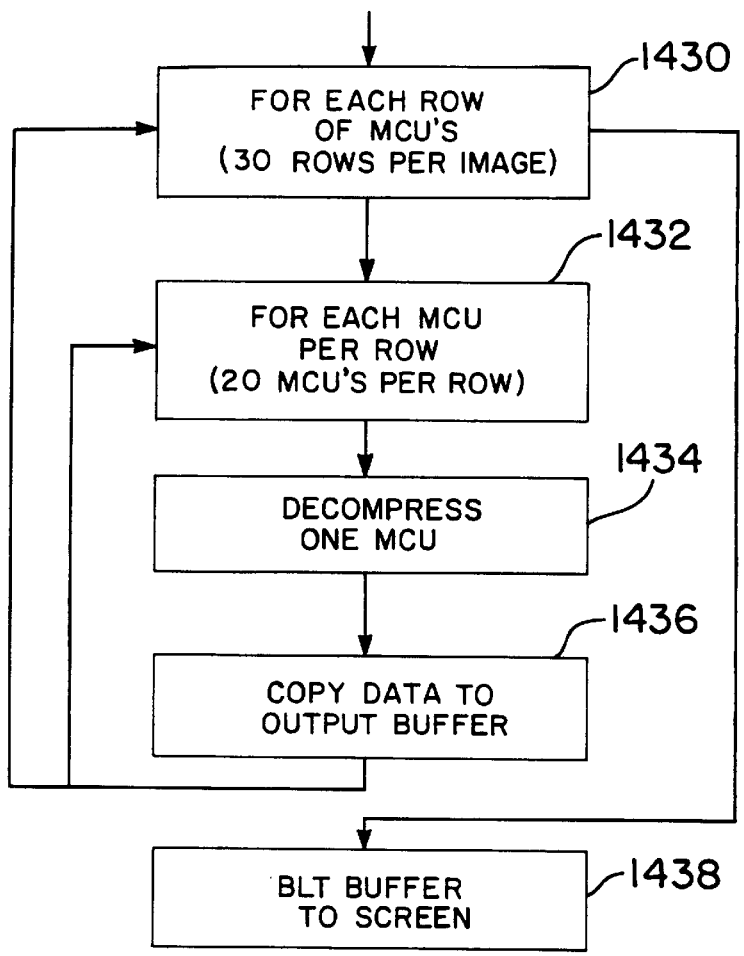
FIG. 57 illustrates in flow-chart form the "decompress reference image" block of FIG. 56.

The procedure used for decompressing reference images (blocks 1416 and 1426 in FIG. 56), will now be described with reference to FIG. 57. The procedure shown in FIG. 57 is made up of nested loops, of which an outer loop, indicated at block 1430, is applied to each row of minimum coding units in the image (30 rows per image) and the inner loop, indicated at block 1432, is applied to each MCU in the present row (20 MCU's per row).

At step 1434, each of the six blocks of JPEG-encoded data is processed so as to reverse the JPEG encoding and recover substantially the original six tiles (four luminance and two color) of video data. Routines for controlling a general purpose microprocessor to decode JPEG-encoded video data are well known and therefore need not be described herein. The decoded video data corresponding to the MCU is then copied into an output buffer (step 1436). Once all of the MCUs in all of the rows of the reference image have been decoded and placed in the output buffer, the buffered data, representing the entire decoded image, is bit-level transferred for display on the monitor (step 1438).

Figure 58:
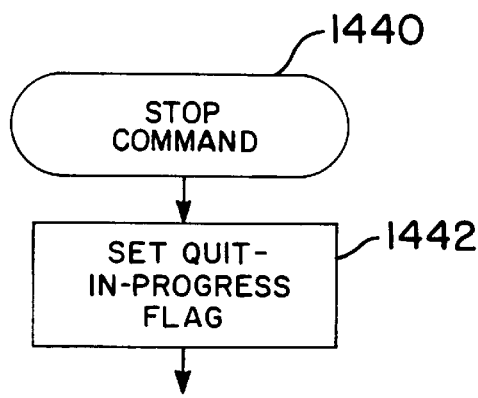
FIG. 58 illustrates in flow-chart form the "stop decompressor" block of FIG. 55.

Further discussion of blocks 1384, 1390 and 1402 of FIG. 55 will now occur with reference to FIGS. 56 and. 58. As indicated in FIG. 58, when a stop decompressor command is received (step 1440) then a "quit-in-progress" flag is set (step 1442). If a forward playback operation is then occurring, then the setting of the quit-in-progress flag triggers an affirmative finding at block 1418 (FIG. 56), leading to shutting down of the decompression engine, with transmission of an appropriate message to the system director. As will be seen from a subsequent discussion of the processing for reverse-direction reproduction, the quit-in-progress flag has a similar effect with respect to reverse-direction reproduction operations.

Processing carried out in connection with block 1428 ("decompress difference image") of FIG. 56 will now be described with reference to FIG. 59 and the representation of difference image data as shown in FIG. 44. The initial step for decompressing the difference image, as indicated at block 1444, is to read in the data which indicates the locations of the changed MCU data in the image plane corresponding to the difference image. Then nested loops are carried out, of which the outer loop is indicated at block 1446 and is carried out for each row of MCUs in the image plane (30 rows per image) and the inner loop, indicated step 1448, is carried out for each MCU in the row (20 MCUs per row).

For each MCU, the bit from the map data corresponding to that MCU is fetched (step 1450), and it is then determined (step 1452) whether that MCU in the image plane is changed in the present image. E.g., if the bit has a "0" value, then the MCU is unchanged, whereas a "1" value for the bit indicates that the MCU is changed and that updating data corresponding to the MCU is included in the present video data field. If a "0" bit is encountered, then the procedure simply loops back so as to fetch the bit for the next MCU. When there is little or no motion in the image, the MCU map will normally be quite sparse, so that entire rows of MCUs may go unchanged. However, when a changed MCU is encountered, the process of FIG. 59 advances to block 1454, at which the next block of changed MCU data is decoded. The decoding of the MCU data may be carried out by the same standard routines referred to in connection with step 1434 of FIG. 57.

Figure 59:
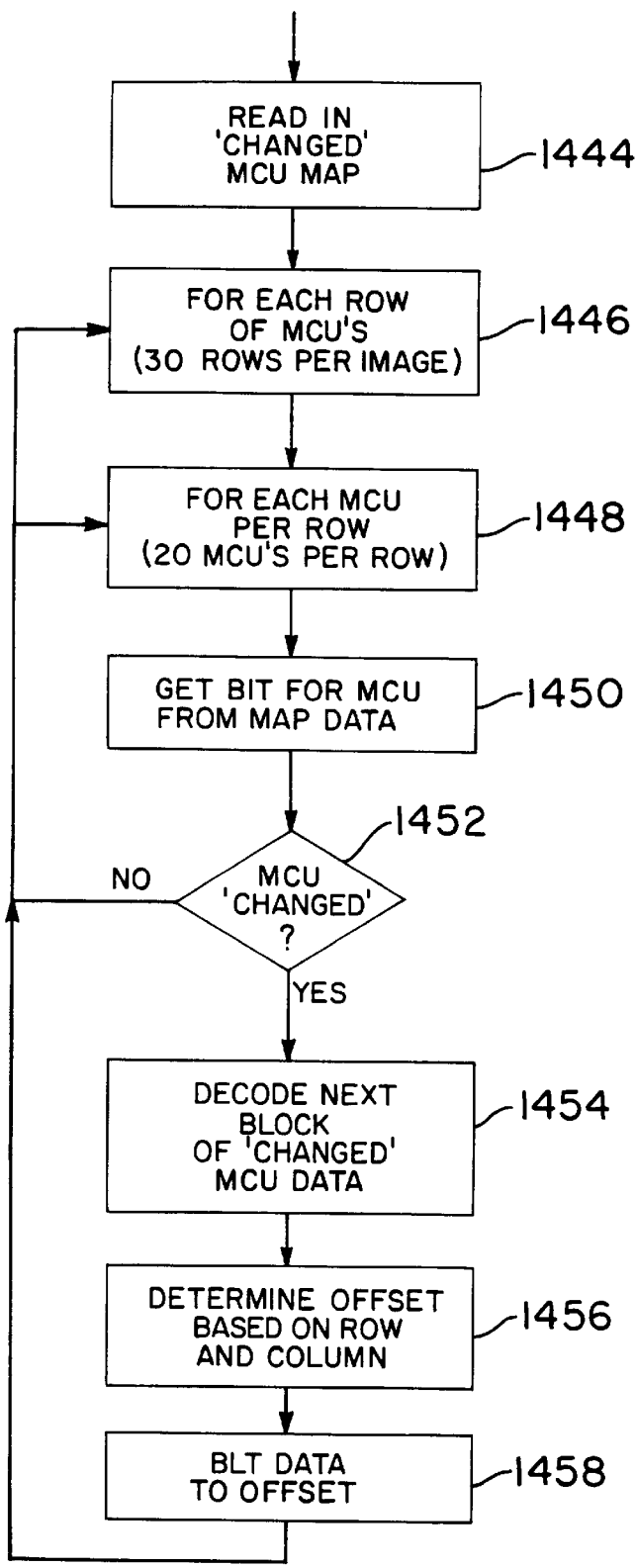
FIG. 59 illustrates in flow-chart form the "decompress difference image" blocks of FIG. 56.

Continuing to refer to FIG. 59, after the changed MCU data has been decoded, the process determines on the basis of the current row and column count for the MCUs an appropriate offset so that the just decoded block of MCU data is "steered" to the appropriate position in the image plane (step 1456). Then, based on the resulting offset, the decoded block of MCU data is output to refresh the display buffer (step 1458). The result of steps 1456 and 1458 is pictorially represented in FIG. 61. FIG. 61 shows that an image that was previously displayed is updated on an MCU by MCU basis to generate the difference image which is presently being decoded. As previously noted, the changed MCUs can be thought of as "postage stamps" that are to be "pasted" at locations in the image plane determined in accordance with the changed MCU mapping data.

After steps 1456 and 1458, the process loops back to obtain the map data bit for the next MCU in the image plane.

Additional details of step 1454 of FIG. 59 will now be described with reference to FIG. 60. Initially upon decoding a block of changed MCU data, a buffered quantity of the compression-encoded video data is fetched (step 1460). It is then determined whether enough of the compressed video data is available to apply the decoding routines (step 1462). If so, the standard decoding routines previously referred to are employed to reverse the JPEG encoding carried out on the front end board (step 1464). When it is found at step 1462 that insufficient compression-encoded video data is available to begin decoding, then the buffer is refilled, as indicated at step 1466. Moreover, if, while refilling the buffer, the end of a data storage file is encountered, then the next data file is opened (steps 1468 and 1470). In an alternative and preferred embodiment, the full data complement for the image is retrieved at once, and steps 1462, 1466, 1468 and 1470 can be dispensed with.

Alternative techniques for refreshing the display buffer during playback operations will now be described with reference to FIGS. 62A and 62B.

Figure 62A:
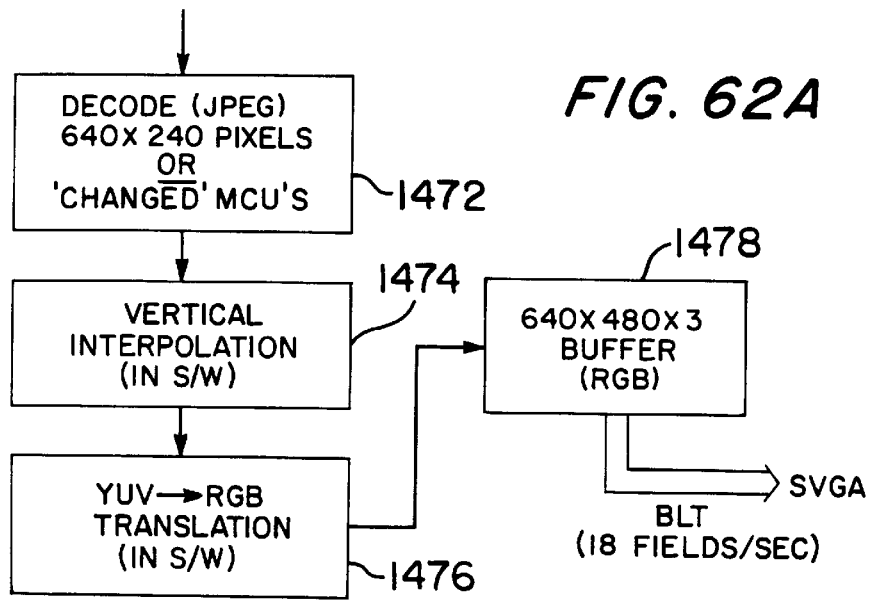
FIGS. 62A and 62b illustrate, respectively, alternative techniques for refreshing a video display buffer in connection with the VR/PC unit.

FIG. 62A shows a technique which is utilized in the VR/PC unit to provide a refresh rate of 18 fields per second. Initially, JPEG decoding is applied to the 600 MCUs of pixel data in a reference image or is applied to the changed MCU data in a difference image (step 1472). Then a vertical interpolation operation is applied by the motherboard CPU to obtain 480 rows of pixel data (step 1474) from the 640 pixel by 240 row internal data representation. Following a further software processing step in which the YUV data is translated to RGB data (step 1474), the translated data, consisting of 640 pixels in each of 480 rows, three bytes per pixel, is buffered at 1478 and then bit level transferred at 18 fields per second to drive an SVGA monitor.

Figure 62B:
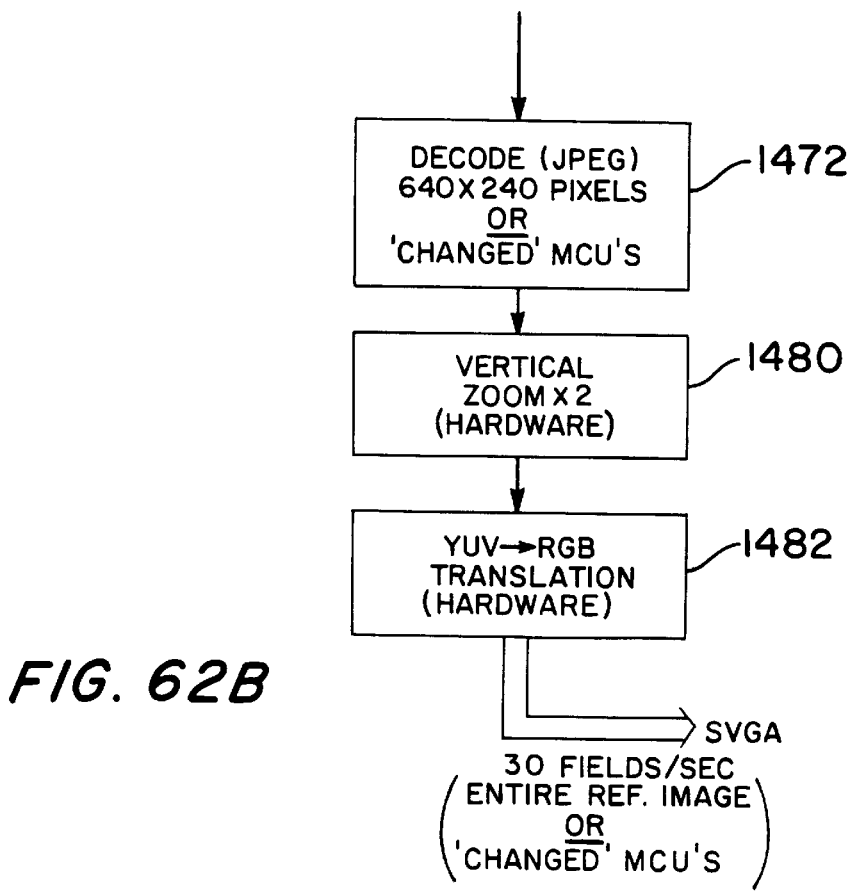

An alternative technique which provides a 30 fields per second refresh rate during playback is illustrated in FIG. 62B. According to this technique, the same initial JPEG decoding step 1472 is employed as in the technique of FIG. 62A, but the decoded data is fed to a hardware module 1480 which applies a two times vertical zoom function and then passes the resulting 480 lines of data to another hardware module 1482 for color space translation from YUV to RGB. The RGB data is then output directly from the hardware 1482 to drive the SVGA at a 30 fields per second refresh rate. The so-called "direct draw" technique illustrated in FIG. 62B, in addition to providing a faster refresh rate, also reduces the burden on the motherboard CPU, albeit at the cost of providing additional hardware components 1480 and 1482.

Alternative recording and playback strategies that may be employed in the VR/PC unit will now be described with reference to FIGS. 63A and 63B.

Figure 63A:
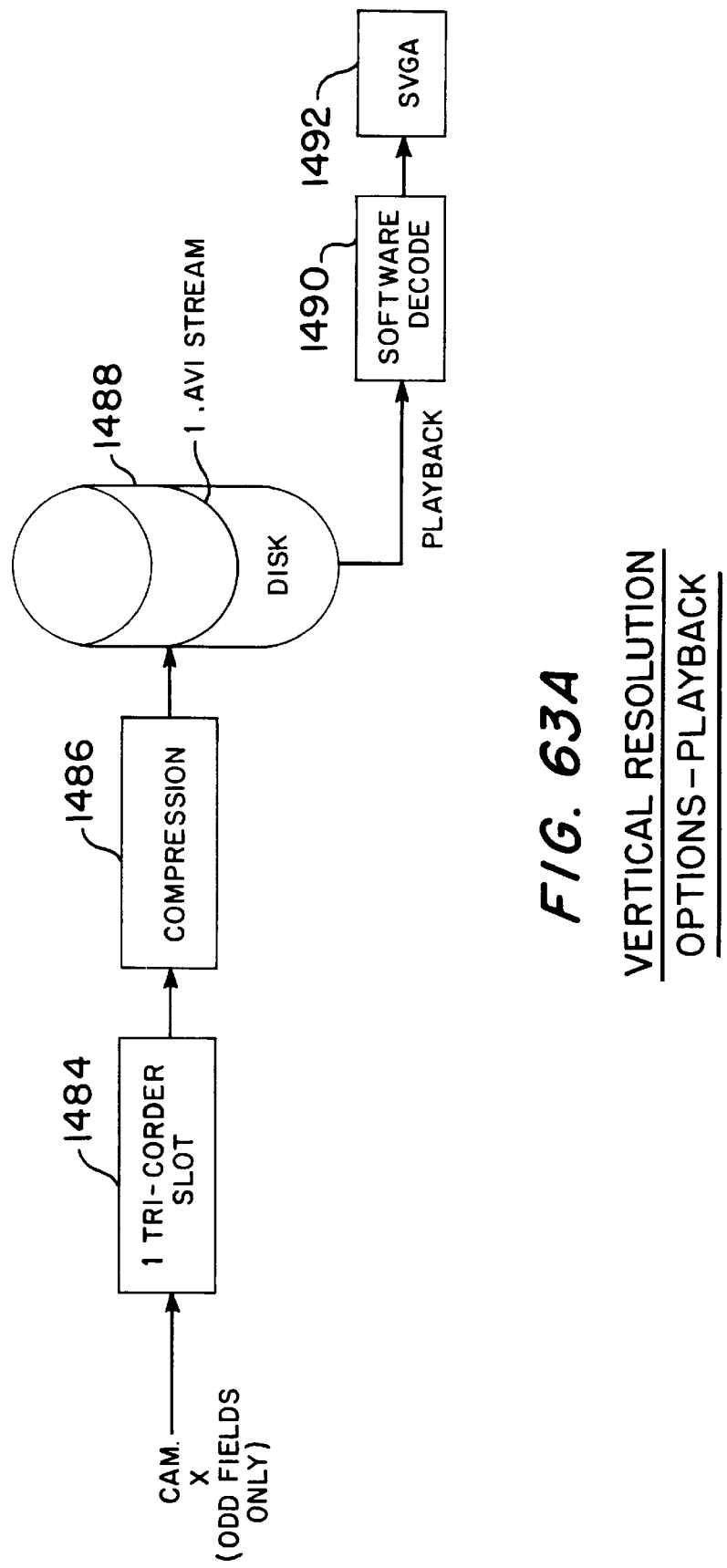
FIGS. 63A and 63B illustrate, respectively, lower-resolution and higher-resolution video data storage -and playback techniques that may be used .in the VR/PC.

The first alternative, schematically illustrated in FIG. 63A, maximizes the flexibility of the unit in recording simultaneous streams of video signals respectively generated by several (say 16) cameras connected to the unit, but provides only 240 lines of vertical resolution per image, roughly one half of the commercial broadcast standard. Nevertheless, it has been found that with interpolation to produce 480 lines, the vertical resolution is at least adequate for video surveillance applications. In any case, in the technique shown in FIG. 63A a "tri-corder" slot 1484. (which corresponds to one of the three field locking channels 804 of the front end analog board (FIG. 13)) is assigned at a given time to a field generated by camera X. The front end analog board is operated so that only odd fields are captured to minimize jitter and false indications of motion or changed MCUs. The captured field from camera X is then pipelined for digitization and compression through the front end electronics as indicated at 1486 and stored as a single .AVI data stream on the hard disk 1488.

When playback of the stream of images generated by camera X is requested, the corresponding .AVI stream is reproduced from the disk 1488, software decoded (decompressed) in the manner discussed herein above (block 1490) and then used to drive an SVGA monitor (block 1492).

Figure 63B:
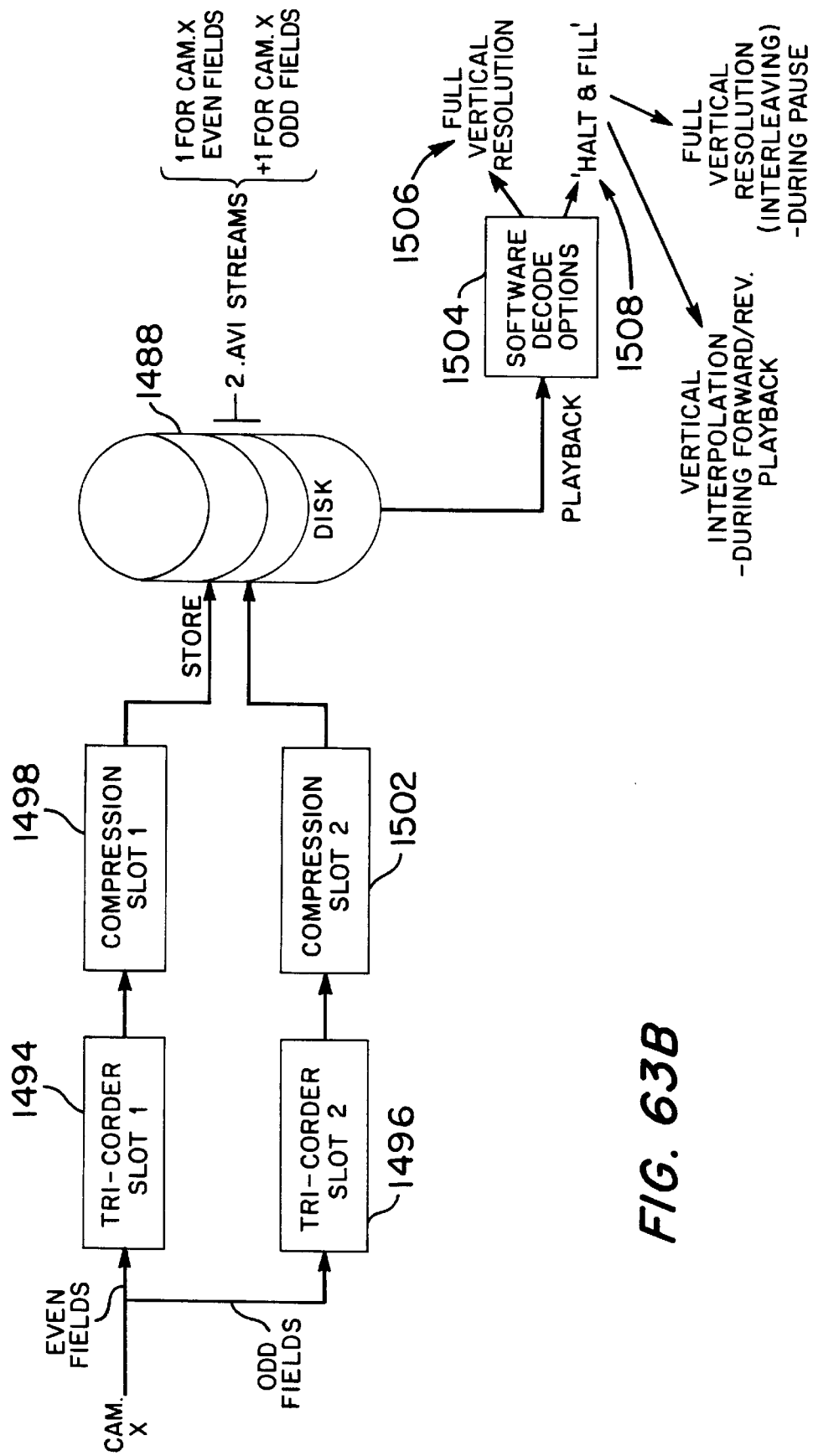

FIG. 63B illustrates an alternative technique, in which the VR/PC unit is operated to provide essentially the standard commercial broadcast vertical resolution upon playback for one camera, but at the cost of greatly reducing the recording resources available for other cameras that may be connected to the VR/PC unit. In the technique of FIG. 63B, two of the field locking channels 804 of the front end analog board, represented by "tri-corder" slots 1494 and 1496 in FIG. 63B, are dedicated exclusively to capturing both odd and even fields generated by camera X. The tri-corder slot 1494 captures only the even fields and the tri-corder slot 1496 captures only the odd fields.

In the subsequent processing up to and through storage on the disk, the camera X even fields and the camera X odd fields are treated as if the same were two unrelated streams of video signals. Thus the even fields are pipelined for digitization and compression separately from the odd fields streams, as indicated at blocks 1498 and 1502. Since a third field capture channel remains available, the third channel may be used by another camera or shared among other cameras, so that one or more additional streams (not shown in FIG. 63B) are pipelined for digitization and compression along with the odd and even field streams generated from camera X. In any event, the two separate streams are stored, managed and indexed as two separate .AVI streams on the hard disk 1488. As a result, the arrangement shown in FIG. 63B allows the VR/PC unit to store the images generated by camera X with a vertical resolution of 480 lines.

Because of the separate storage of the even and odd field streams, several software decoding options are available upon playback, as indicated at block 1504. For example, since all of the data required for full vertical resolution is present on the hard disk 1488, the two streams may be played back and interleaved to provide an interlaced 480 line display, as indicated at 1506. A less computationally-intensive approach, which could be referred to "halt and fill" (reference numeral 1508) entails playing back only one of the two streams, and vertically interpolating to provide 480 lines, when playback with either forward or reverse motion is occurring. But when the playback image stream is paused, the field from the other stream may also be reproduced to generate an image having full vertical resolution.

REVERSE DIRECTION VIDEO DATA DECOMPRESSION

Processing required to decompress the compression-encoded video data when the image stream is to be reproduced in a reverse direction will now be described. Initially, a conceptual overview of the process will be provided with reference to FIG. 64.

In FIG. 64 there is shown at reference numeral 1510 a sequence of compressed video data fields in the same format discussed on connection with FIG. 44. However, for the purposes of the example illustrated in FIG. 64, it is assumed that only three difference images 1134 are provided between two successive reference images 1132, rather than the 32 difference images actually employed in a preferred embodiment of the VR/PC unit. As would be expected from the format shown in FIG. 44, reference numerals 1138-1 through 1138-3 indicate the changed MCU mapping data included in the difference image data fields 1134-1 through 1134-3. By the same token, the reference numerals 1140-1 through 1140-3 indicate the changed MCU data respectively included in the reference fields 1134-1 through 1134-3. It should be understood that the left-to-right direction in the sequence of image fields 1510 corresponds to the forward passage of time which occurred as the fields were being recorded. In other words, the time sequence in generating and recording the fields was 1132-1, 1134-1, 1134-2, 1134-3, 1132-2.

There is illustrated at reference numeral 1512 in FIG. 64 a sequence of pre-processing steps that are carried out before actually proceeding with reverse direction playback of the sequence of image shown at FIG. 1510.

Having generated an image that corresponds to the image originally compressed to form the reference data field 1132-1, the pre-processing procedure then reads the "changed" MCU map data 1138-1 corresponding the following image, which is difference image 1134-1. Since the mapping data 1138-2 indicates the MCU portions of the image plane at which-the next difference image 1134-1 differs from the present image 1132-1, the mapping data 1138-1 is also indicative of the MCUs in the present image which will be "pasted over" when the next image is formed. For that reason, the MCUs of the image corresponding to the data field 1132-1 are selected on the basis of the mapping data 1138-1, to form "backwards postage stamp" data 1514-0 which will be used to reconstruct the present image in the course of reverse playback. After saving the "to-be-changed" MCUs 1514-0, the mapping data 1138-1 is used again, this time to update the image corresponding to the data field 1132-1 by "pasting on" the changed MCU data 1140-1 to reconstruct the image corresponding to data field 1134-1.

As in the procedure described in connection with FIG. 59, the mapping data 1138-1 is used to "steer" the decoded MCU "postage stamps" in the manner pictorially illustrated in FIG. 61. (Unlike the procedure of FIG. 59, however, the resulting reference image is not output for display.)

At this point the mapping data 1138-2 of data field 1134-2 is consulted to determine which MCUs of the image corresponding to 1134-1 are to be saved as "to-be-changed" MCUs 1514-1 corresponding to the data field 1134-1. Then, as before, the mapping data 1138-2 is used a second time to update the image corresponding to field 1134-1 by pasting in the MCU data 1134-2 to generate a reconstructed image corresponding to the data field 1134-2.

Next, the mapping data field 1138-3 is used to determine which MCUs of the image corresponding to 1134-2 are to be saved as "to be changed" MCUs 1514-2 for the data field 1134-2. Then, once more the mapping data 1138-3 is used to steer the MCU data 1134-3 to generate a reconstructed image corresponding to field 1134-3 by updating the image for field 1134-2. The resulting reconstructed image, labeled as 1134-3R (reconstructed) in FIG. 64, is then saved for use as a backwards "reference" image during the reverse playback sequence which is to follow. The pre-processing sequence 1512 is now complete, and the reverse playback procedure may go on to a sequence 1514 shown in FIG. 64 as proceeding from the right to left direction.

Initially in sequence 1514, the reconstructed backward "reference" image 1134-3R (corresponding to the image captured immediately earlier in time than reference image 1132-2) is output for display.

Then the image 1134-3R is updated using the mapping data 1138-3 to steer the backward postage stamps ("to-be-changed MCUs") 1514-2 so that the backwards reference image 1134-3R is updated on an MCU by MCU basis to produce an image corresponding to the next-earlier-in-time image, i.e., the image corresponding to difference video data field 1134-2. Then, in turn, the image corresponding to data field 1134-2 is updated using the changed MCU mapping data 1138-2 to steer the to-be-changed "backward direction stamps" 1514-1 to appropriate positions in the image plane so as to form an image corresponding to video data field 1134-1.

Next, the image for field 1134-1 is updated with the to-be-changed MCU 1514-0, steered by mapping data 1138-1, to form an image corresponding to field 1132-1. Alternatively, the entire reference field 1132-1 could be decoded de novo, but this would take longer than using the 'backwards postage stamps' 1514-0. At that point, the procedure which was discussed above with respect to sequence 1512 is again applied, but this time utilizing the reference image which occurs latest in the stream prior to the reference image 1132-1 and the set of difference image data fields immediately preceding reference image 1132-1.

In the remaining portion of FIG. 64, there is presented a simplified pictorial illustration of the decompression technique employed for reverse playback operations. As a simplified example, a sequence 1516 of images is shown. The sequence 1516 includes images 1132-1E, 1134-1E, 1134-2E, 1134-3E and 1132-2E. The following assumptions have been made so as to illustrate the principles of the decompression technique without unduly complicated drawings:

49

(1) It is assumed that each image is made up of a 4×4 array of minimum coding units.

(2) Each of the minimum coding units is presented as being square in shape, rather than the 4×1 rectangle of tiles which is the MCU configuration in an actually preferred implementation of the VR/PC unit.

(3) The initial image 1132-1E is all white.

(4) A black object, corresponding exactly in size to an MCU, enters the image field of view at the left-most MCU of the top row of MCUs, and exactly in time for image 1134-1E, and then proceeds in a rightward direction across the image plane at the rate of exactly 1 MCU per frame.

Presented at 1518 is the mapping data 1138-1E, 1138-2E, 1138-3E, respectively corresponding to the difference images 1134-1E, 1134-2E and 1134-3E. (However, it should be noted that only the first four bits of the mapping data 1138-(N)E are presented at 1518. Based on the exemplary images shown in 15–16, the last 12 bits of each of the mapping data would all be "0" and are omitted to simplify the drawing.)

Examining the mapping data presented at 1518, it will be noted that the image 1134-1E has only one changed MCU (the first in the top row), so that correspondingly only the first bit of the mapping data 1138-1E has the value "1". In the next image, 1134-2E, the first two MCUs in the top row are changed relative to the preceding image, so that the first two bits in the mapping data 1138-2E have the value "1" and the remaining bits have the value "0". In the next image, 1134-3E, the second and third MCUs in the top row are changed relative to the preceding image, producing the mapping data "0110" as shown at 1138-3E.

The corresponding changed MCU data is- pictorially represented at 1520. As seen from the drawing, only a single block of MCU data (a black "postage stamp") makes up the changed MCU data 1140-1E for the data representation of the first difference image 1134-1E. The changed MCU data 1140-2E for the next image consists of a white "postage stamp" followed by a black "postage stamp." The changed MCU data 1140-3E for the next image is the same, namely a white "postage stamp" followed by a black "postage stamp."

Following the pre-processing sequence discussed above with respect to the sequence 1512, the mapping data 1138-1E is read. The values "1000" mean that only the first MCU of the reference image 1132-1E is to be saved, thereby forming to-be-changed MCU data 1514-0E (one "backward postage stamp"—all white). Next, the reference image 1132-1E is updated using the mapping data 1138-1E to apply the all black postage stamp changed MCU data 1140-1E at the first MCU location in the top row of MCUs, to produce the reconstructed difference image 1134-1E. Then the mapping data 1138-2E for the next difference image is read. The values "1100" indicate that the first two MCUs of the reconstructed image 1134-1E (a black postage stamp followed by a white postage stamp) are to be saved, thereby forming the to-be-changed MCU data 1514-1E ("backward postage stamps"). Then the image 1134-1E is updated, changed MCU by changed MCU, to form the image 1134-2E. In particular, the mapping data 1138-2E is read, bit by bit, and as indicated by the values "1100", the first postage stamp of the MCU data 1140-2E is steered to the first MCU position in the top row, and then the next postage stamp in 1140-2E (all black) is steered to the second MCU location in the top row.

It is then once more time to save the "to-be-changed" MCUs. Thus the mapping data 1138-3E is read and it is found that the second and third MCUs in the top row (corresponding to a black postage stamp followed by a white postage stamp) are selected to form the ("backward direction postage stamp") to-be-changed MCU data 1514-2E.

Following is the step of updating the image 1134-2E MCU by MCU to form the image 1134-3E. As before, this is done by using the mapping data 1138-3E to steer the forward direction changed MCUs 1140-3E to the appropriate positions in the image plane. Since 1134-3E is the last difference image before a reference image, the reconstructed image 1134-3E is saved for display and then for use as a backward direction "reference" image.

At this point, the preprocessing stage is complete, and actual reverse direction playback may occur. Initially, the reconstructed image 1134-3E is displayed. Then the mapping data 1138-3E is read and used to steer the backward direction MCU data 1514-2E so as to update the image 1134-3E to form the image 1134-2E. Next, the mapping data 1138-2E is read to steer the backward MCU data 1514-1E so as to update the image 1134-2E to form the image 1134-1E. Finally, the mapping data 1138-1E is used to steer the backward MCU data 1514-0E to form the reference image 1132-1E by updating the difference image 1134-1E. As will be appreciated from the preceding discussion, then the pre-processing sequence is next performed as to the reference image and set of difference images which were originally generated immediately before the image 1132-1E.

It should be understood from the foregoing description of the decompression technique used for reverse direction playback that the mapping data 1138 is used in connection with reverse-playback decompression as well as forward-direction playback. In particular, the mapping data 1138 is used for three distinct purposes in connection with the reverse-playback decompression technique:

(1) To reconstruct difference images in a forward direction during the pre-processing. stage, in a similar manner as in forward-direction playback decompression.

(2) To select the "backward direction postage stamps" (to-be-changed MCUs) 1514.

(3) To steer the changed MCUs during the actual backward direction playback.

It is believed that the multiple and highly efficient use of the mapping data during reverse-direction decompression processing represents a particularly advantageous aspect of the compressed video data format (FIG. 44) and corresponding compression technique disclosed herein.

Against the background of the example illustrated in FIG. 64, there will now be provided, with reference to FIGS. 65–68, a more detailed description of the processing represented by block 1406 in FIG. 55.

Figure 65A:
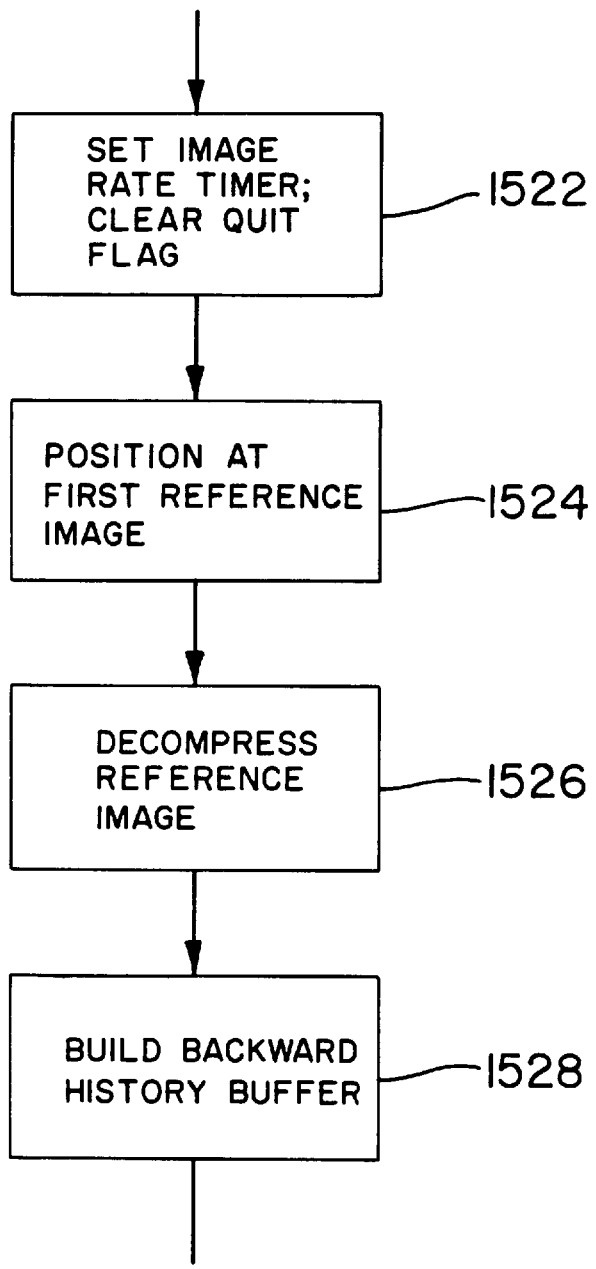
FIG. 65 is a high-level flow-chart representation of the reverse playback decompression technique of FIG. 64.
Figure 65B:
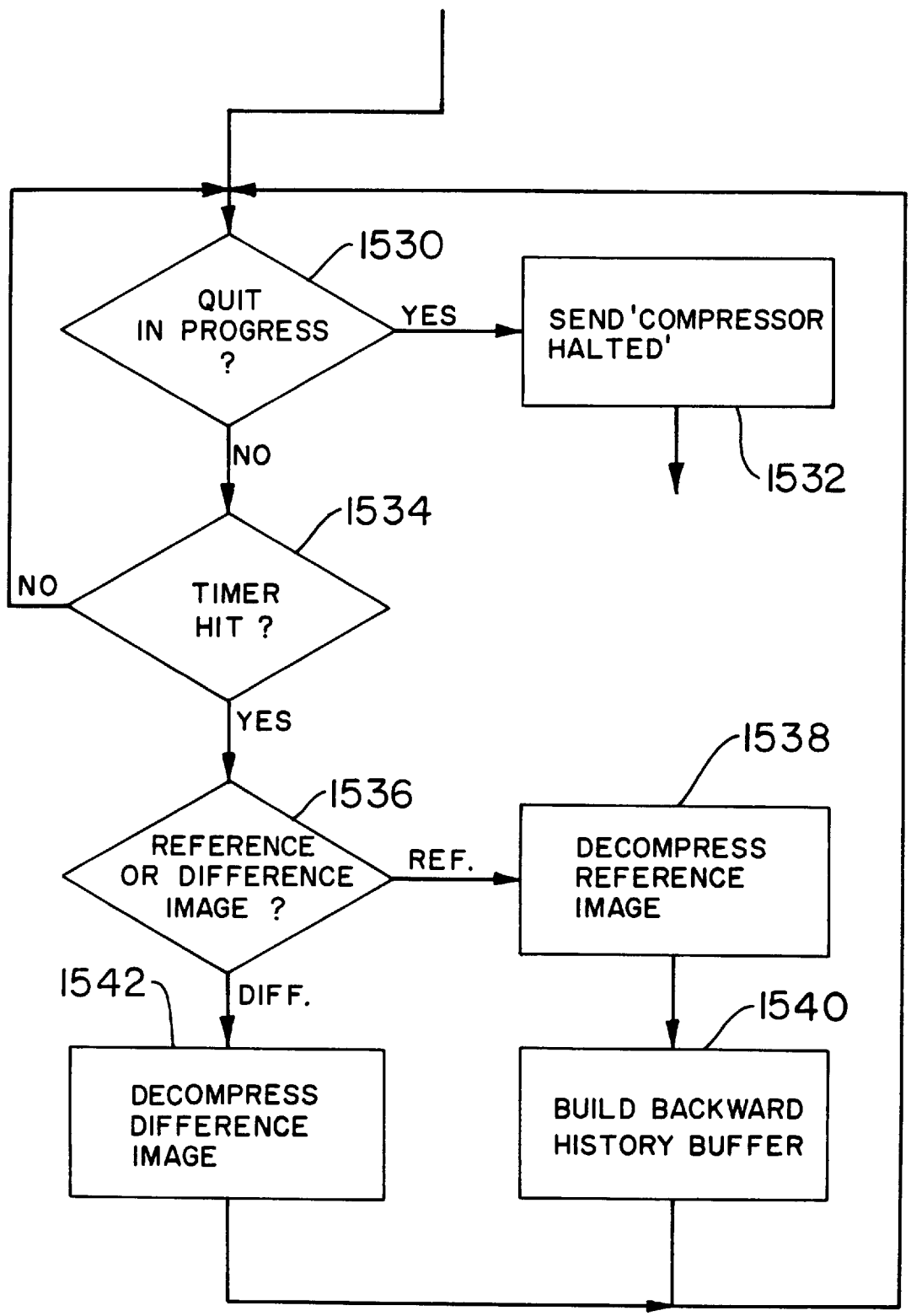

Referring initially to FIG. 65, the backward decompression process starts by setting the image rate timer in accordance with the desired backward playback rate and clearing the quit flag (step 1522). Then, at step 1524, the reference image corresponding to the point in time at which the reverse direction playback is to occur is located, and the reference image is then decompressed (step 1526). Following step 1526 is step 1528, which corresponds to the pre-processing sequence indicated at 1512 in FIG. 64.

The next step is step 1530, at which it is determined whether the quit-in-progress flag has been set. If so, a suitable message is transmitted to the system director (step 1532), and the backward-direction decompression operation is stopped. If the quit-in-progress flag was not found to be set at step 1530, then the process advances to step 1534, at which it is determined whether, for the desired playback image rate, it is time to decode and display the next image. If not, the process loops back to step 1530. However, if it is time to decode and display the next image, step 1536 follows, at which it is determined whether the next image is a reference or a difference image. If the next image is a reference image, the reference image is decoded according to a suitable procedure (step 1538) and then the next "backward history buffer" is built (step 1540), that is, the pre-processing procedure shown at 1512 in FIG. 64 is applied to the next (immediately earlier at time of recording) set of difference images.

If at step 1536 it is found that the next image to be decoded is a difference image, then the difference image is decoded according to a suitable procedure utilizing the previously generated backward history buffer.

Turning now to FIG. 6, the "build backward history buffer", steps 1528 and 1540 of FIG. 65 will be further explained. Initially (step 1544), the reference image (shown at 1132-1 in FIG. 64) recorded immediately prior to the set of difference images now to be decoded is decompressed and then stored in re-coded form in a "last field" buffer. Then, at step 1546, the process fetches the mapping data corresponding to the difference image 1134 recorded immediately later in time than the reference image just decoded. The fetched mapping data is used to update the "last field buffer" on an MCU by MCU basis using the changed MCU data 1140 corresponding to that first difference field (step 1548). There then follows a loop, as indicated at step 1552, which is applied with respect to each of the other difference images 1134 in the set of difference images now being encoded. As a first step of the loop, which is step 1554, the mapping data for the difference image following the difference image most recently reconstructed is fetched. Then the to-be-changed MCUs from the difference image just reconstructed (the backward postage stamps 1514) are generated on the basis of the next-difference-field mapping data (step 1556), and then the last field buffer is updated using the forward direction changed MCU data 1140 to reconstruct the next difference image (step 1558). After all the required iterations of the loop 1552–1558, the backward history buffer data as represented at 1512 in FIG. 64 has been generated.

FIG. 67 provides a more detailed illustration of the processing corresponding to block 1544 in FIG. 66. The processing of FIG. 67 takes the form of three nested loops, of which the outer loop, indicated at block 1560 is carried out with respect to each row of MCUs. The intermediate loop, as indicated at step 1562, is carried out with respect to each MCU in the row. The innermost loop, indicated at step 1564 is carried out for each tile in the MCU. As shown at block 1566, for each tile a decompression and then recording process is carried out. Details of block 1566 are shown in FIG. 68. Initially, as shown at step 1568, the compressed video data corresponding to the tile is processed to recover quantized coefficient values. Then the DC coefficient is recorded as an absolute value, rather than as a differential value generated in comparison to a preceding tile DC level.

Then the other coefficients are Huffman and run-length encoded according to standard video data compression techniques (step 1572) and the recorded tile of data is stored (step 1574). (Generation of a backward history buffer, as just described, may also be carried out during forward playback operations, as indicated at block 1575 in FIG. 56, to facilitate rapid changing over from forward- to reverse-direction playback.)

COMPRESSOR MANAGER SOFTWARE COMPONENT

The compressor manager software component 1216 shown on FIG. 45 will now be described in further detail with reference to FIGS. 69 and 70. It should be understood that the compressor manager software component 1216 handles communication between the motherboard CPU and the front end electronics (particularly front end controller DSP 1050, FIG. 36).

Figure 69A:
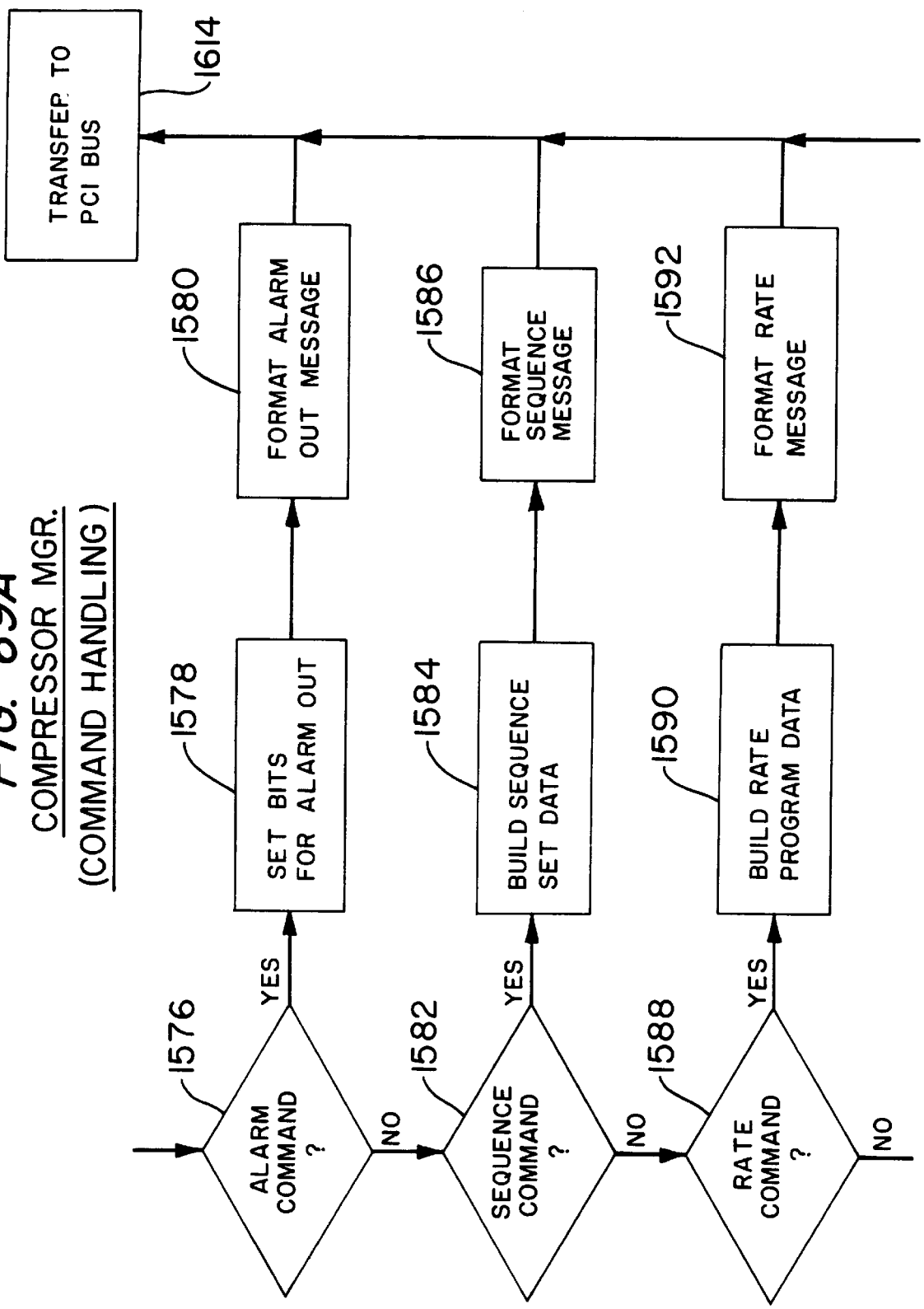
FIG. 69 illustrates in flow-chart form a command handling portion of a software module which programs the motherboard CPU to interact with the front-end processing electronics.
Figure 69B:
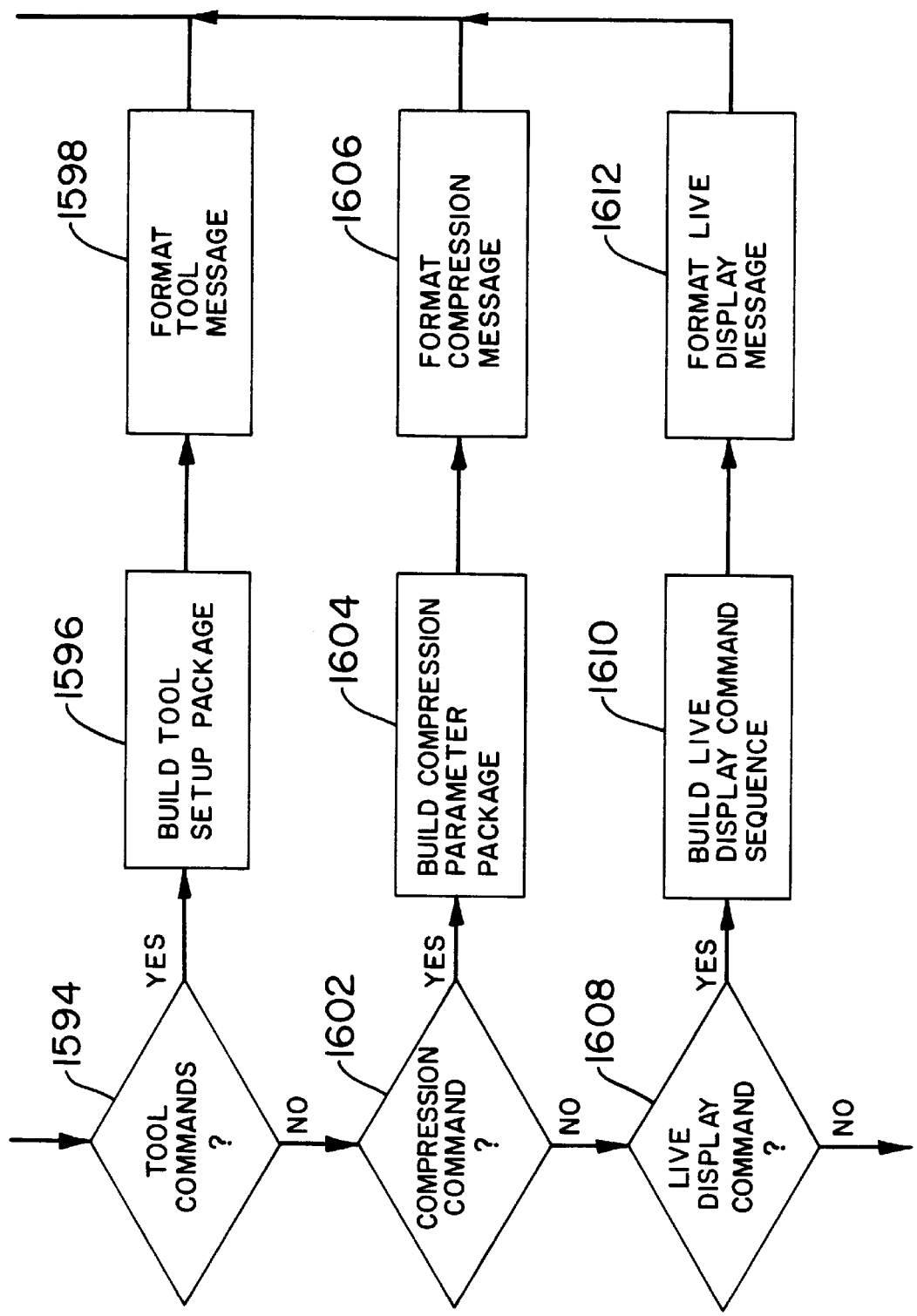

FIG. 69 illustrates the aspects of the compressor manager software component relating to handling commands, i.e., messages sent from the motherboard to the front end electronics. Initially, it is determined at step 1576 whether an alarm command is to be sent. If so, the bit or bits corresponding to the present alarm condition or conditions are set in alarm condition data bytes (step 1578) and then a message carrying the alarm condition bytes is generated in an appropriate format for receipt by the front end controller DSP (step 1580).

If a command relating to the sequence at which camera input streams are to be captured for storage is to be sent to the front end board (step 1582), then a data set indicative of the desired sequence for capturing the camera signal streams is generated (step 1584). The resulting message is formatted for receipt by the front end board controller (step 1586).

At step 1588 it is determined whether a field storage rate command is to be sent to the front end electronics. If so, data required to program the front end electronics to capture video fields at the desired rate is generated (step 1590) and the resulting data is formatted for receipt by the front end electronics (step 1592).

At step 1594, it is determined whether there is to be sent to the front end electronics a command relating to an image analysis algorithm to be performed in the live image analysis block 846 (FIG. 14) of the front end electronics. Continuing to refer to FIG. 69, if an image analysis algorithm command is to be sent, then the data relating to the image analysis (e.g., data specifying the algorithm to be performed, or parameters for constraining the performance of the algorithm) is generated (step 1596), and is then placed in a format appropriate for receipt by the front end electronics (step 1598).

It is determined at step 1682 whether a command relating to video data compression is to be sent to the front end electronics. If so, data for selecting a compression parameter is assembled (step 1604). For example, a compression parameter selecting one of a standard tile "sameness" threshold, or a second more stringent threshold providing better reproduced image quality, or a third parameter, which is less stringent and reduces the average quantity of compressed video data generated per field, may be sent. Alternatively, the compression parameter may be for setting the number of bits employed for quantization of coefficents in the JPEG chip 848.

It should be noted that the data packages assembled at steps 1596 and 1604 preferably include data identifying the camera for which the data is applicable, so that the image analysis algorithm and/or the compression procedure can be varied on a camera by camera basis.

Following step 1604 is step 1606, at which the compression parameter package is formatted for receipt by the front end electronics. At step 1608, it is determined whether a message is to be sent to the front end electronics for the purpose of controlling operation of the live display processing block 844 (FIG. 14). For example, the size of the image output from the live display block 844, the number of video streams to be simultaneously displayed, such as 1, 4, 9, or 16, and/or the assignment of camera streams among display windows, may be varied. If a positive determination is made at step 1608, then the appropriate live display command sequence is generated at step 1610, and formatted at step 1612 so as to provide a message that can be properly handled at the front end electronics.

Following any one of the steps 1580, 1586, 1592, 1598, 1606 or 1612, there is a step 1614 at which the message in question is coupled onto the PCI bus 596 (FIG. 3) for transmission to the front end electronics.

Aspects of the compressor manager software component relating to handling of status messages received by the motherboard from the front end electronics will now be described with reference to FIG. 70. As indicated at step 1616, message data that has come in over the PCI bus is received, and then the type of message is detected.

If the message is found to be an alarm message (step 1618), then the alarm data is decoded (1620) and a message reporting the alarm data is generated in an appropriate format for the motherboard CPU software components (step 1622). The alarm message may specify, for example, a type of alarm event detected through an alarm sensor 526 (FIG. 1) or by live image analysis carried out by the front end electronics.

Figure 70B:
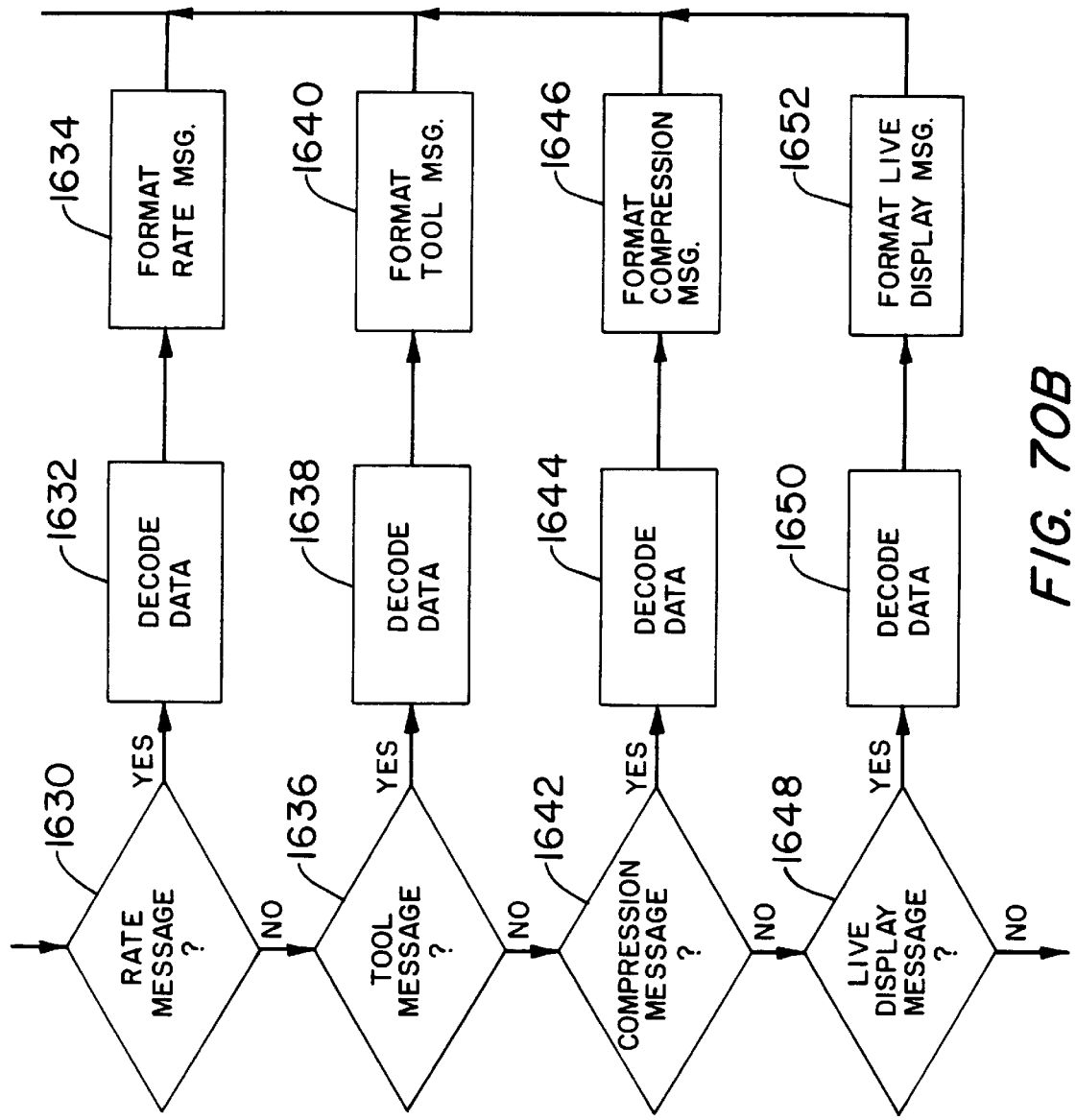
FIG. 70 is a flow-chart illustration of the status message handling portion of a software module which programs the motherboard CPU to interact with the front end processing electronics.

Continuing to refer to FIG. 70, if the incoming message is found to be a message relating to sequencing of camera streams for recording (step 1624), the data including in the message is decoded (step 1626) and the formatted for messaging within the motherboard CPU software (step 1628).

If the incoming message relates to a field capture rate implemented by the front end electronics (step 1630), then the field rate data is decoded (step 1632) and formatted in a suitable manner for use in the motherboard CPU software (step 1634).

If the incoming message is related to a live image analysis algorithm being carried out in the front end electronics (step 1636), then the data relating to the algorithm is decoded (step 1638) and formatted for use in the motherboard software (step 1640).

If the incoming message is related to a parameter used for controlling compression operations being carried out in the front end electronics (step 1642), then the compression parameter data is decoded (step 1644) and formatted for use in the motherboard software (step 1646).

If the message relates to live display processing being carried out in the front end electronics (step 1648), then the data is decoded (step 1650) and formatted for use in the motherboard software (step 1652).

Following any one of steps 1622, 1628, 1634, 1640, 1646 or 1652, a step 1654 follows, in which the message in question is forwarded to the system director software component 1202 (FIG. 45), and through the system director is relayed to other software components that have a need to receive the message. Typically, the messages detected at blocks 1624, 1630, 1636, 1642 and 1648 are status messages indicating that the front end board has implemented commands previously sent from the motherboard to the front end electronics.

Figure 71:
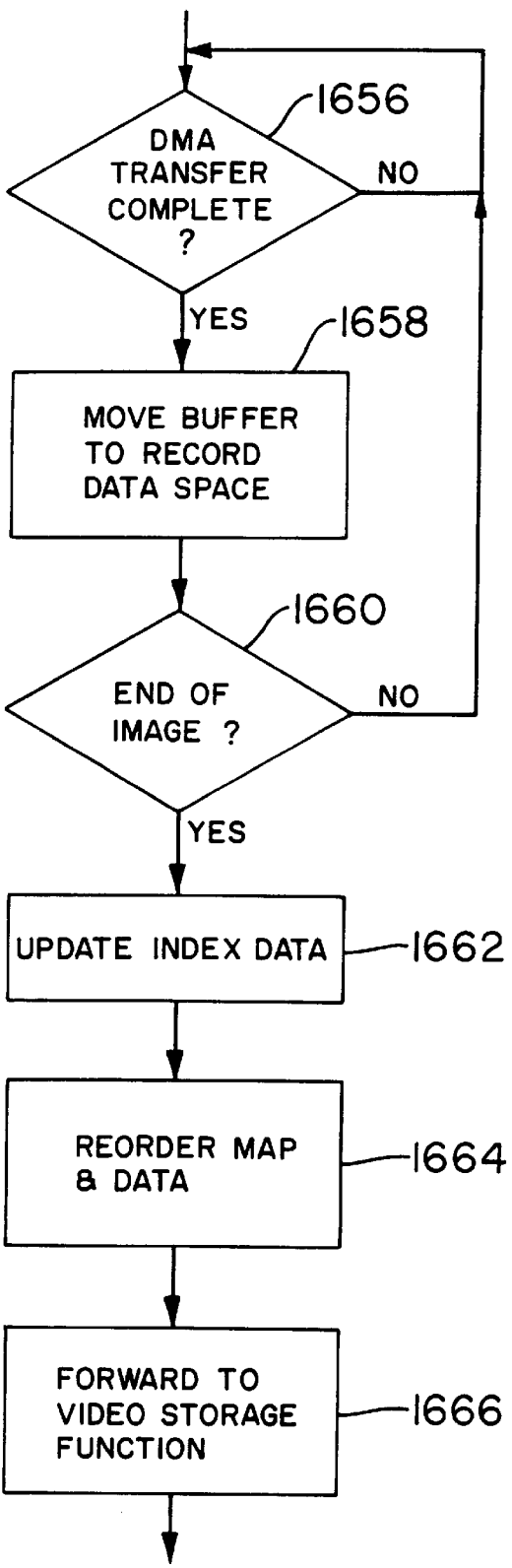
FIG. 71 is a flow-chart representation of video data handling processing carried out by the motherboard CPU with respect to video data transferred thereto from the front end processing electronics.

Aspects of the compressor manager software component relating to handling of incoming compressed video data will be described with reference to FIG. 71. It is assumed that a DMA transfer of video data is taking place. The compressor manager then determines if the DMA video data transfer is complete (step 1656). If so, the buffered video data which has just been received is transferred for recording on the hard disk (step 1658), and it is then determined whether the end of an image has been reached (step 1660). If not, the process loops back to step 1656. However, if the end of an image has been reached, then the index data corresponding to the video data just received is generated (step 1662), the map indicative of the locations of the video data is generated and stored and the video data is stored in locations following the map (step 1664). Finally, in a step 1666, the received video data and the index data are forwarded to the video storage software component 1234 (FIG. 45).

The video record software component 1218 (FIG. 45) will now be described with reference to FIG. 72. Essentially, the video record software component performs three functions. First, this component sets up the compression operations in the front end electronics by generating parameter setting messages (step 1668) which are forwarded to the front end electronics through the compressor manager software component 1216. Further, appropriate initializing messages are provided to the video storage software component 1234 (FIG. 45), as indicated at step 1670. Finally, operation of the compression processing in the front end electronics is actuated by a suitable message generated at step 1672 and forwarded through the compressor manager software component.

There will now be described, with reference to FIG. 73, aspects of the archive manager software component 1226 (FIG. 45) relating to handling of search requests.

Figure 74A:
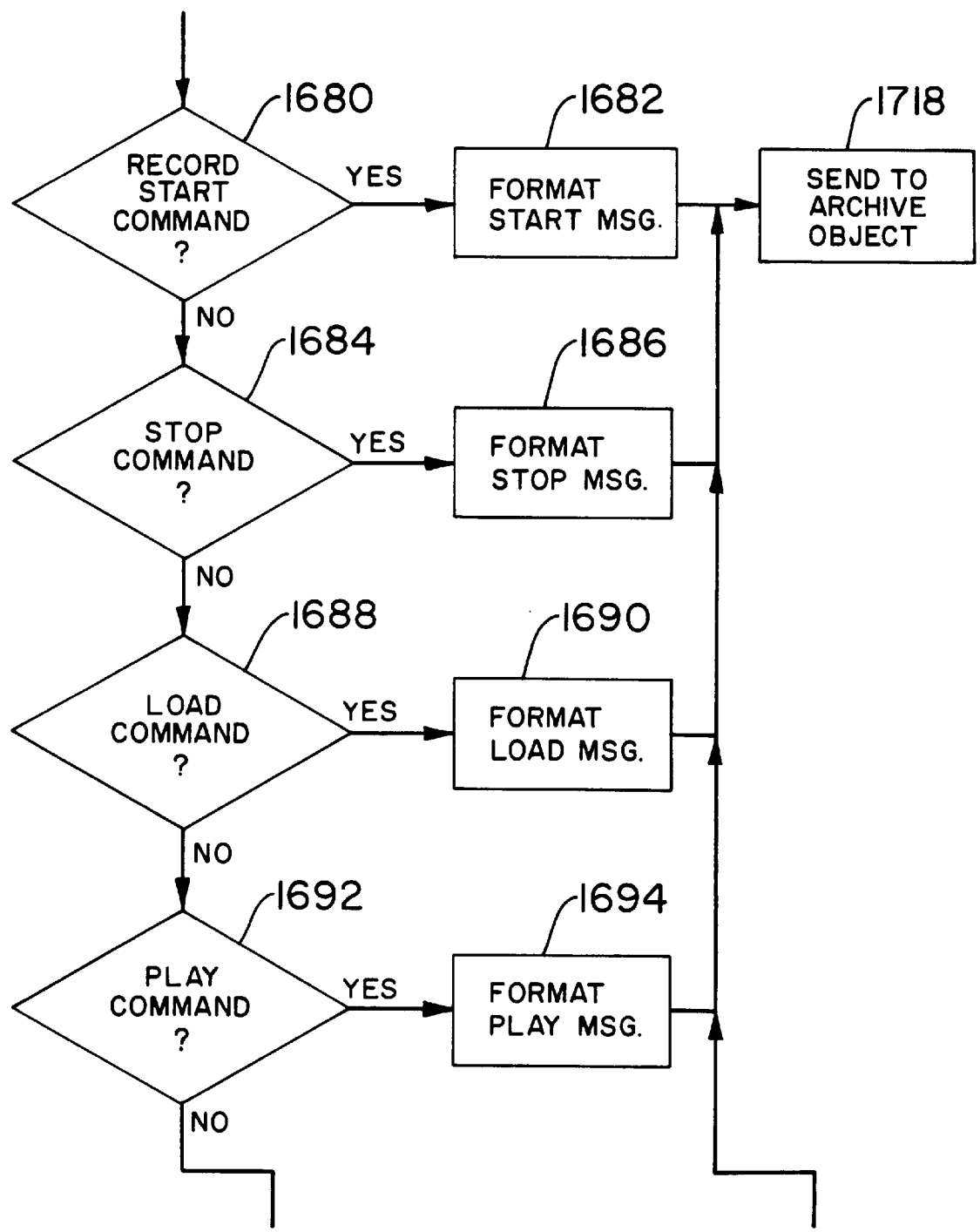
FIG. 74 illustrates in flow-chart form processing carried out by the motherboard CPU in connection with recording and/or playback of video data on or from a removable archive recording medium.
Figure 74B:
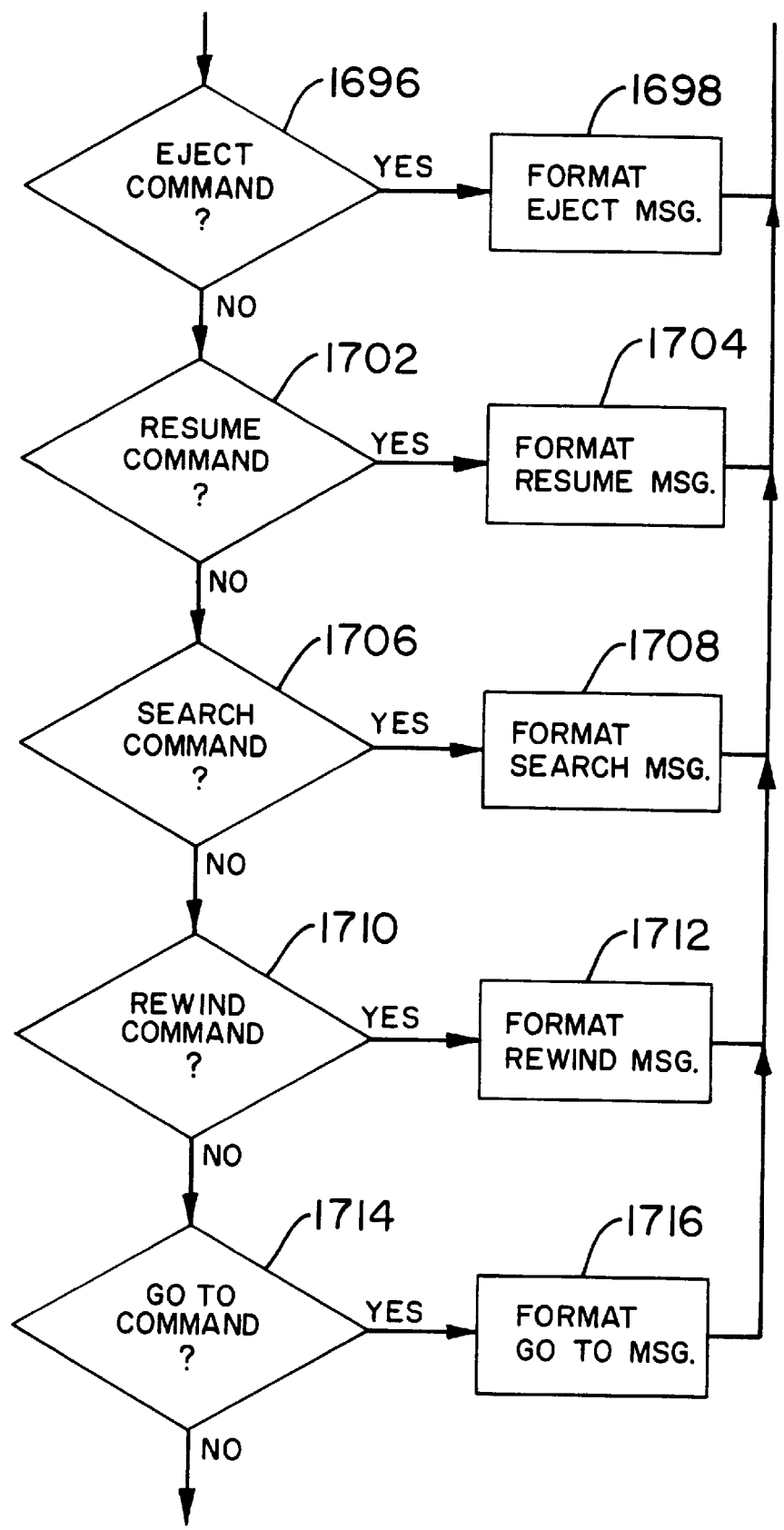

FIG. 74 illustrates aspects of the archive manager software component relating to command handling. Essentially, the commands handled in the processing shown in FIG. 74 relate to those required to carry on "tape recorder" functions or the like.

A first step 1674 shown in FIG. 74, indicates that the archive manager component has received a search request. The search request is parsed (step 1676) and then translated into commands in a format suitable for further processing in the archive manager software component (step 1678).

If a record start command is detected (step 1680), then a corresponding START message is generated (step 1682). If a stop command is detected (step 1684), then a corresponding STOP message is generated (step 1686). If a load command (step 1688) is detected, then a LOAD message is generated (step 1690). If a play command is detected (step 1692) then a PLAY message is generated (step 1694). If an eject command is detected (step 1696), then an EJECT message is generated (step 1698). If a resume command is detected (step 1702), then a RESUME message is generated (step 1704). If a search command is detected (step 1706), then a SEARCH message is generated (step 1708). If a rewind command is detected (step 1710), then a REWIND message is generated (step 1712). If a go to command is detected (step 1714), then a GOTO message is generated (step 1716). In the case of each of the messages referred to in this paragraph, the message is forwarded to an archive software object (step 1718). The archive object is a driver software function which controls the archive DAT drive 626 (FIG. 3) or an externally connected archive median drive unit. For example, a separate DAT drive, DVD drive, magneto-optical disk drive, or the like may be connected to the VR/PC unit through the SCSI port 628.

It is contemplated that archive storage and/or retrieval operations may be carried on simultaneously using two or more archiving devices, including, perhaps, the DAT drive 626 and one or more externally connected devices.

ALARM HANDLER COMPONENT

There will next be described, with reference to FIGS. 75 and 76, operation of the alarm handler software component 1212. For the purposes of FIG. 75, it is assumed that an alarm message has been received from the front end electronics. It is then determined, at step 1720 whether the user has elected to have alarms handled according to a standard protocol or a custom protocol. If a standard protocol has been selected, then step 1722 follows step 1720. At step 1722, the alarm handler causes one or more predetermined alarm out signals to be generated according to the type of alarm message that was received. For example, the alarm out signal or signals may automatically close or lock doors, actuate sirens or visible alarm indications, or the like. Following step 1722, is step 1724, at which a message is generated to cause the front end electronics to change the sequence in which video signal fields are captured from the respective cameras attached to the VR/PC unit.

The next step is step 1726, at which it is determined whether the VR/PC unit is being operated in a pre-alarm buffering mode. If so, then step 1728 follows step 1726. In step 1728, the alarm handler software component dispatches a message which instructs the video storage software component to capture the data in the pre-alarm buffer, as previously described in connection with steps 1334–1338 (FIG. 52). The video storage function may be arranged either so that all of the data in the pre-alarm buffer is transferred to "permanent" storage on the hard disk, or so that only video data fields corresponding to particular cameras are so transferred.

Following step 1728 is step 1730 (which directly follows step 1726 if the VR/PC unit is not being operated in the pre-alarm mode). At step 1730, the alarm timer is set (or extended, if an alarm condition is already in effect), and the detected alarm event is added to a list of alarm events maintained by the alarm handler software component.

Figure 76:
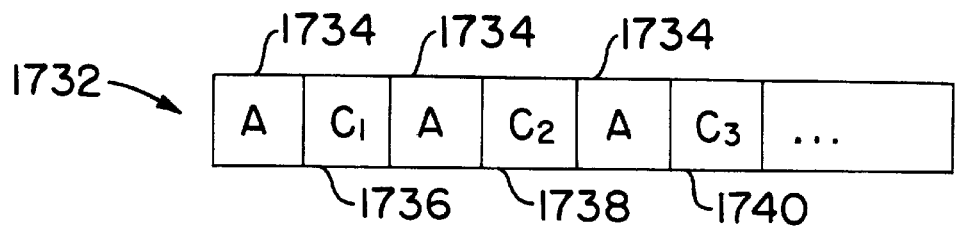
FIG. 76 is a pictorial representation of an allocation of a time-sequence of video data field recording slots provided as a standard response to an alarm condition.

FIG. 76 illustrates the camera sequence implemented at step 1724 according to a standard alarm-actuated camera sequencing scheme. The sequence shown in FIG. 76 is analogous to that provided in the MV 200 analog multiplexer marketed by the assignee of the present invention (see page 33 of *Multivision Optima II™ Multiplexers, Installation and Operation Manual*, Robot Research Inc., 1995). In a sequence of video fields 1732 shown in FIGS. 76, the blocks 1734 bearing the label "A" correspond to a field or fields generated by one or more cameras which have been predetermined as likely to generate video signals of interest relative to the detected alarm. Blocks 1736, 1738 and 1740 each respectively represent a video signal field captured from three different cameras that are not particularly of interest relative to the alarm condition. Thus, as in the above-indicated MV 200 multiplexer, the cameras are re-sequenced in response to an alarm so that fields generated by a camera or cameras of relevance to the alarm are accorded more frequent recording slots than other cameras.

Step 1742 follows step 1730. Step 1742 indicates that the recording sequence indicated in FIG. 76 is maintained until the alarm timer times out. The determination as to whether the last alarm has timed out is made at step 1744, and if so, the alarm timer is shut down (step 1746).

Once the time for recording the alarm-relevant cameras with an increased field rate, as per FIG. 76, has elapsed, the field recording rate for those cameras is reduced to whatever had been prescribed for those cameras for the period before the alarm was detected. It should be understood that the previously prescribed recording field rate might have been "zero" (i.e., the camera status would have been record-on-alarm-only), or recording in the ordinary sequence with other cameras in the normal record status, or a "time-lapse" recording status in which the camera is recorded with a lower field rate than cameras being recorded in the normal sequence.

If at step 1720 it was determined that a custom alarm handling mode is in effect, then step 1748 follows step 1720. At step 1748, the alarm handler software component. determines the camera, type of event and time relative to the alarm condition which has been detected. There follows step 1749, at which the decoded camera, event type and time data is used to fetch the appropriate event response script from an event response script database 1746. Following step 1749 is a loop, indicated at step 1750, which is carried out for each command in the retrieved event response script. The loop is made up of steps 1752, 1754 and 1756. At step 1752, the command corresponding to the present line in the script is read. At step 1754, a message corresponding to the command is encoded, and at step 1756 the message is sent to the system director software component.

An example of a typical event response script follows:

| Event Response Script (Example) | |
|---|---|
| ALARM1 OUT = ON | (1) |
| ALARM2 OUT = ON | (2) |
| CAMERA1RATE = 30 | (3) |
| CAMERA1 = ON | (4) |
| WAIT = 30 | (5) |
| RESUME | (6) |

It will be observed that the exemplary event response script set forth above consists of six lines. The first line indicates that the alarm 1 output signal is to be turned on. This may be, for example, a signal to actuate a visual alarm indicator such as a flashing light. The second line indicates that the second alarm output signal is to be turned on. This may operate, for example, an audible alarm indicator, such as a siren.

The third line indicates that the rate at which fields from camera one are to be captured for recording is set to 30 fields per second. The remaining recording bandwidth will then be allocated among other cameras which had previously been sequenced for recording.

The fourth line indicates that recording status for camera 1 is to be set to "on". This command would override any previous command that had software-disabled camera 1.

The fifth command indicates that the status defined by the first four lines of the response script is to be maintained for 30 seconds.

The sixth and final line of the script indicates that the prior operating status of the system is to resume after the 30 second alarm-response.

IMAGE PROCESSING UTILITIES

Figure 77:
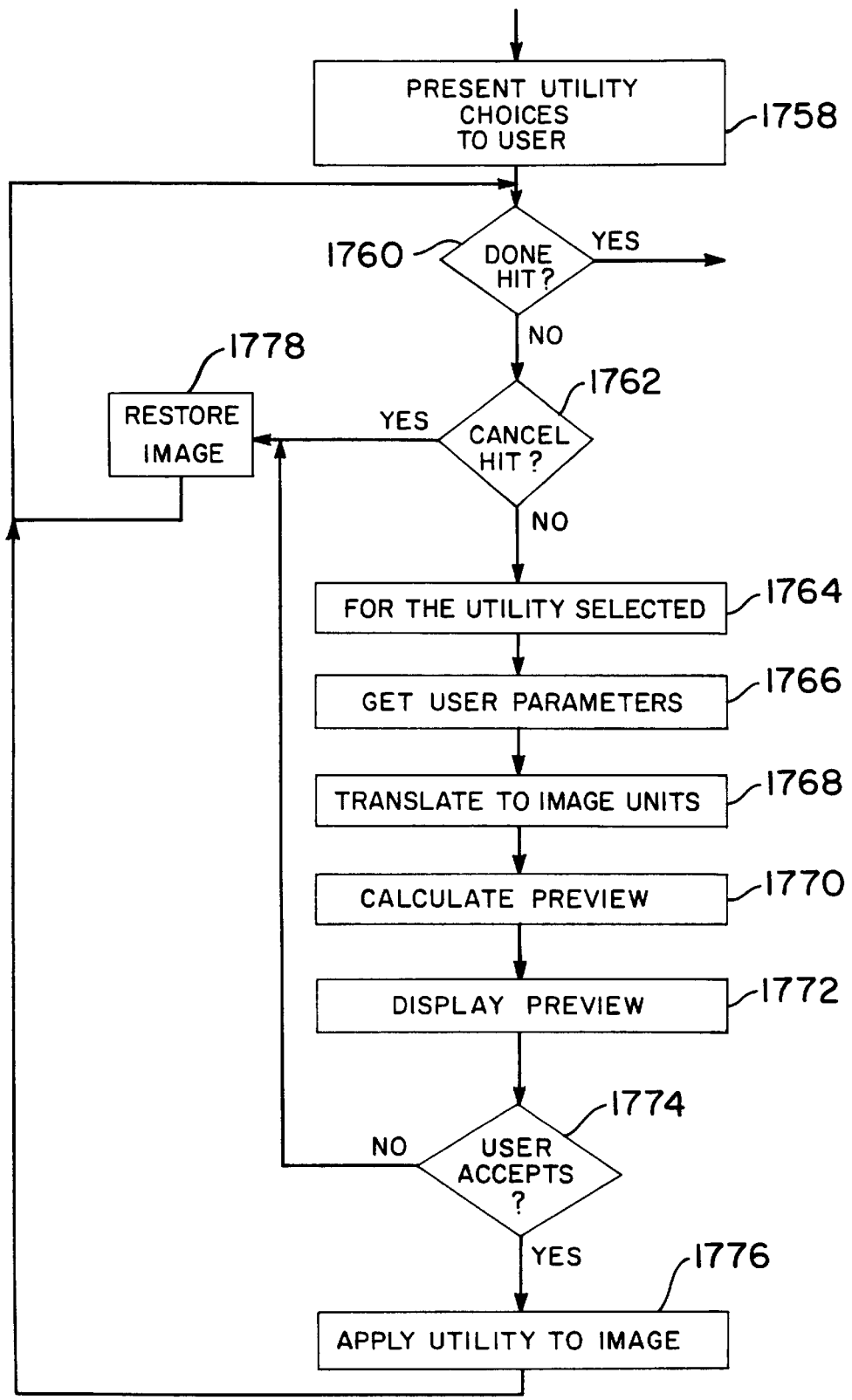
FIG. 77 illustrates in flow-chart form processing performed by the motherboard CPU in connection with image processing utility features of the VR/PC.

The image processing utilities manager software component 1222 (FIG. 45) will now be described with reference to FIG. 77. Initially, at step 1758, the image processing utilities manager software component operates to present to the user of the VR/PC unit options available to the user for processing an image or sequence of images being displayed by the system. Following step 1758 is step 1760, at which it is determined. whether the user has indicated that selection of an image processing utility and parameters therefor has been completed. If the user has not indicated completion of the utility and parameter selection process, then step 1762 follows, at which it is determined whether the user has indicated that a currently selected utility and set of parameters therefor is to be cancelled. If the user has not so indicated, then step 1764 follows step 1762. Step 1764 indicates that for a utility selected by the user, steps 1766 through 1772 are to be performed. As will be understood from subsequent discussion, the image processing utility options available for the user may be presented in the form of a menu or as a collection of icons representing a "tool kit". Among the image processing utility options contemplated for inclusion in the VR/PC unit are a zoom-in option, a color adjustment option, a contrast adjustment option, a focus adjustment option, a histogram balance option or an object recognition option.

Step 1766 entails receiving input from the user as to parameters relevant to the image processing utility selected. The parameters may include a zone or zones in the image plane in which the utility selected is to be applied or is not to be applied. Other parameters may include a degree or intensity of operation of the selected utility or numeric or quantitative controls such as a slide bar. For example, if a zoom utility is selected, the degree of zoom (2, 3, 4 times, etc.) may be selected.

At step 1768, the parameter or parameters selected by the user are translated into units relevant to the image plane, such as pixel location. There may also be translation, if appropriate, to color or contrast or focus adjustment control values or the like. Then, at step 1770, the image processing utilities manager component uses the translated parameter values to generate a "preview" image that will indicate to the user the likely effect of the selected image processing utility. Then, at step 1772, the preview image is displayed.

Following step 1772 is step 1774, at which it is determined whether the user has approved for execution the selected utility and parameters. If so, step 1776 follows, at which the selected utility and parameters are applied to the image or sequence of images. The process then loops back to step 1760. However, if at step 1774 the user indicates that the selected utility and parameter settings are not satisfactory, then the image or sequence of images is restored to the condition prevailing before the image processing utility was applied (step 1778) and the process loops back to step 1760. Furthermore, it will be seen that if at step 1762 it is determined that the user has elected to cancel the utility and parameter selected, again step 1778 is entered.

Of course, if at step 1750 it is determined that the user wishes to end interaction with the image processing utilities manager, then the process terminates, with any selected and not cancelled image processing utility continuing in effect.

GRAPHICAL USER INTERFACE

Figure 78:
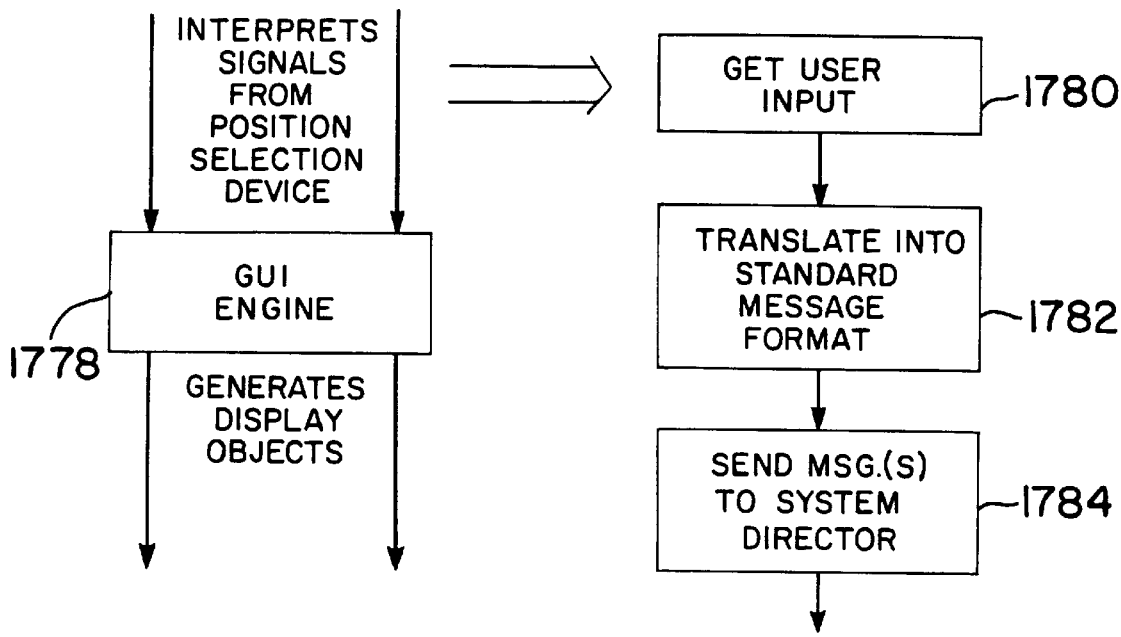
FIG. 78 schematically illustrates operation of the motherboard CPU in connection with operation of the graphical user interface.

FIG. 78 illustrates operations of the graphical user interface portion of the motherboard CPU software. As indicated at 1778, a graphical user interface (GUI) engine interprets signals input by a user via a position selection device, such as a mouse, and generates objects to be displayed on a display monitor. In a preferred embodiment of the VR/PC, the GUI engine 1778 utilizes the capabilities of the well-known Windows 95 operating system. Use of other GUI kernels, such as Windows NT, is contemplated in alternative embodiments. Operation of the GUI engine 1778 to interpret signals from the position selection device is illustrated by steps 1780–1784 in FIG. 78.

At step 1780, the user input is received and decoded. At step 1782, the decoded input signal data is translated into a standard message format, and at step 1784, the user interface software component sends a corresponding message or messages to the system director.

SCHEDULING SOFTWARE COMPONENT

A portion of the scheduling software component relating to setup, and in particular, to a main option screen display, will now be described with reference to FIG. 79. At step 1786, it is determined whether the user has elected to setup a holiday scheduling operation. If so, the holiday setup operation is performed (step 1788).

At step 1790, it is determined whether the user wishes to setup a definition of "day time" versus "night time" periods. If so, an operation to partition the 24 hours making up a calendar day between day and night is performed (step 1792).

At step 1794 it is determined whether the user wishes to perform a scheduling function with respect to a specific time-block (e.g., day-time on weekdays or night-time on weekends). If so, a scheduling operation for the selected time block is performed (step 1796).

At step 1798, it is determined whether the user has indicated that the scheduling operation is complete. If not, the process loops back to step 1786. Otherwise, the process is terminated.

Figure 79:
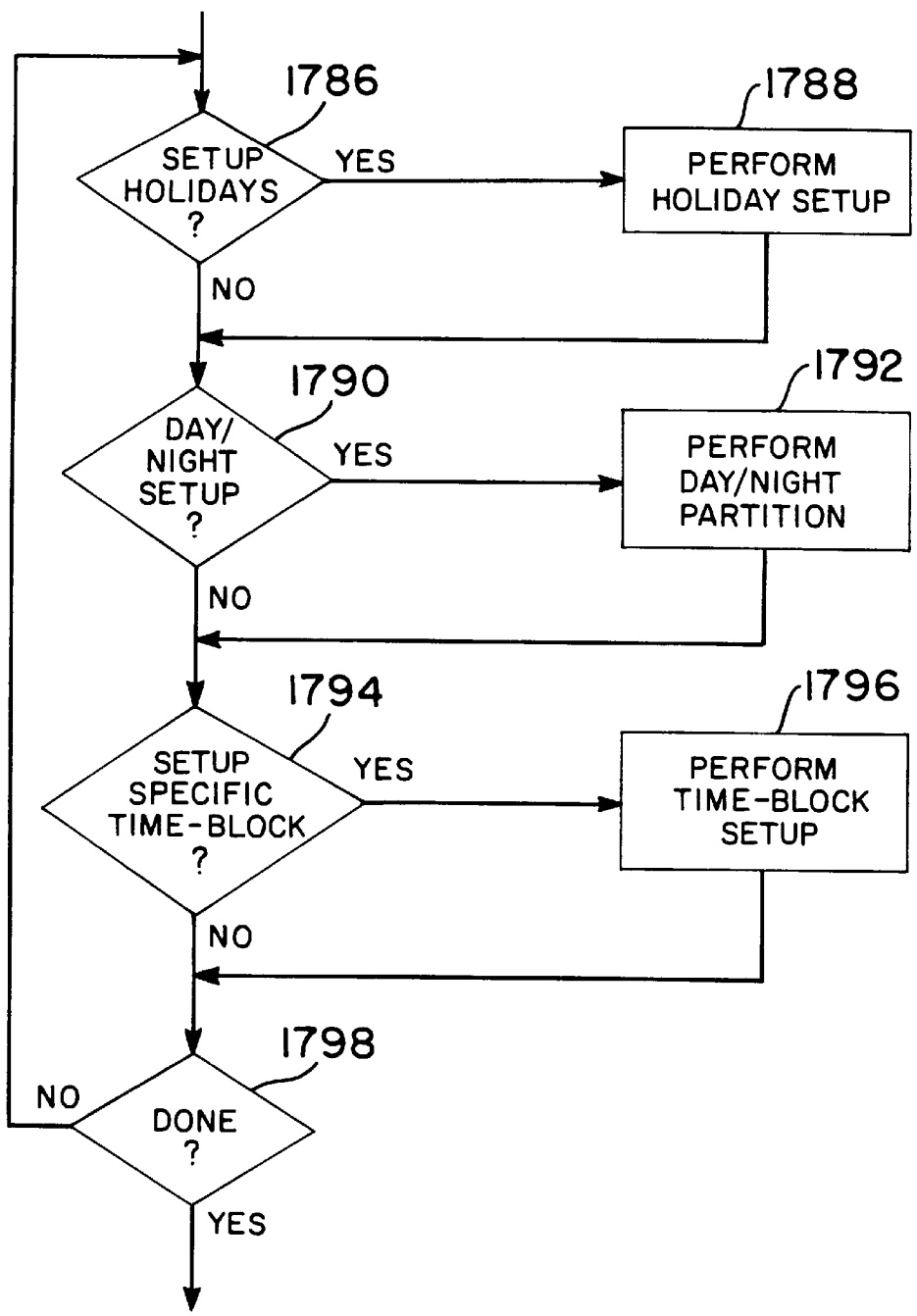
FIG. 79 illustrates in flow-chart form software which programs the motherboard CPU for selection of main scheduling options.
Figure 80:
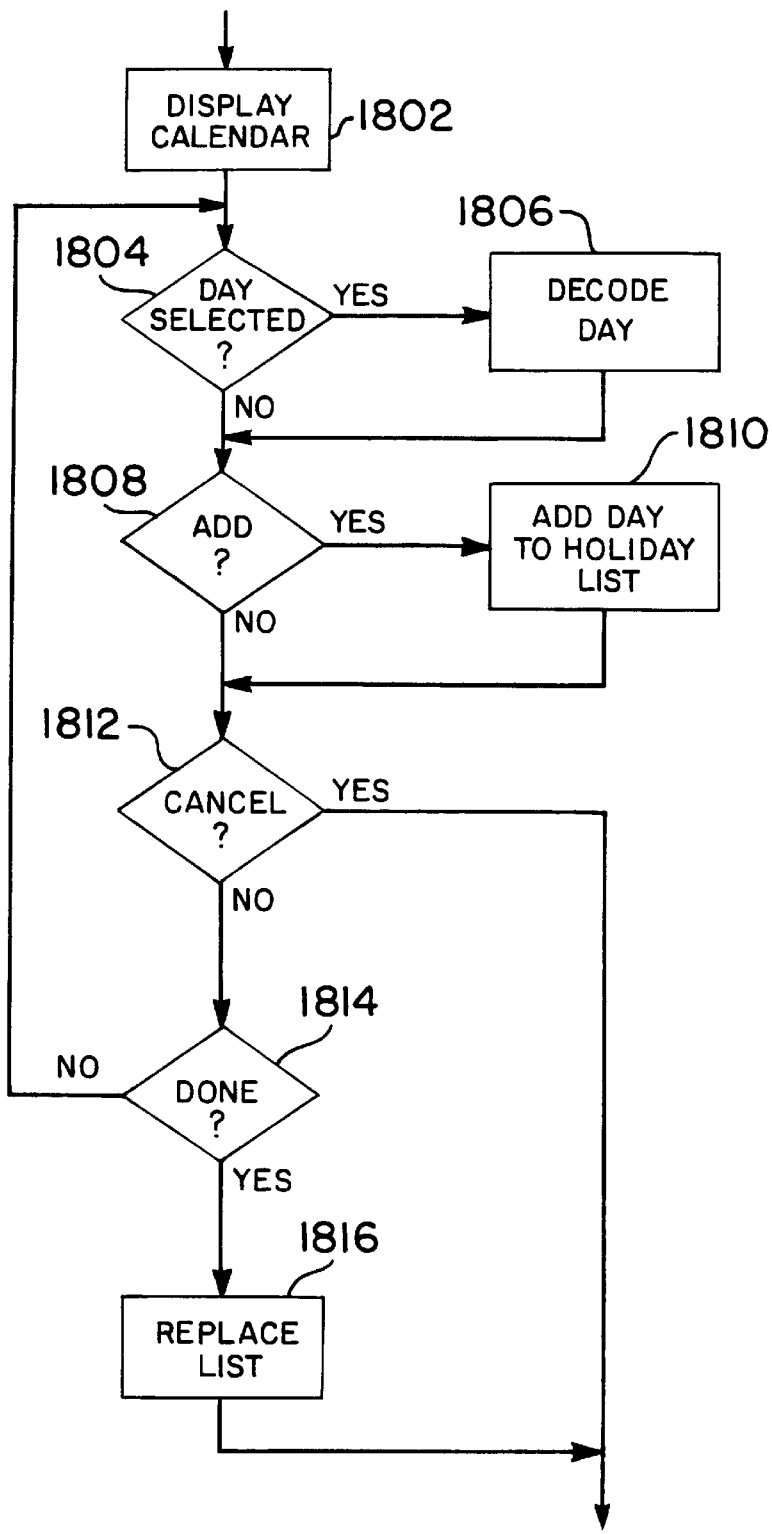
FIG. 80 illustrates in flow-chart form operation of the motherboard CPU in connection with setting up a selection of holidays for the purpose of scheduling operation of the system.

FIG. 80 illustrates the processing involved in block 1788 of FIG. 79. The holiday setup process illustrated in FIG. 80 begins with a step 1802 in which a calendar screen display is presented to the user (see, for example, FIG. 152).

At step 1804, it is determined whether the user has selected a day from the calendar display. If so, the selected day is decoded (step 1806). It is then determined whether the user has indicated a desire to add the selected day to the list of holidays (step 1808). If so, the selected day is added to the holiday list (step 1810).

Figure 81:
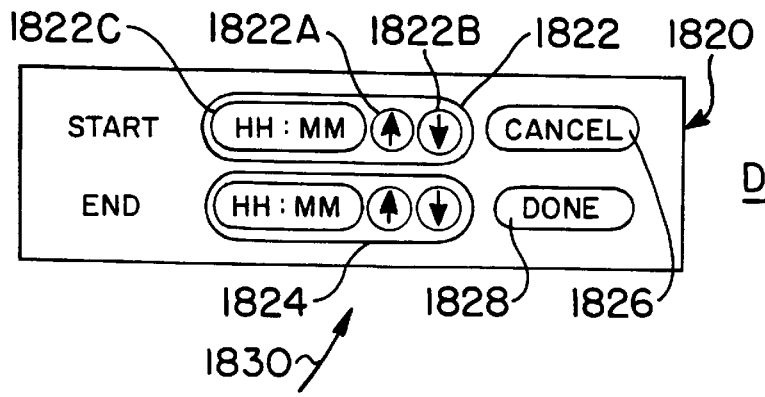
FIG. 81 is a pictorial representation of a screen display used to define "day" versus "night" periods of a 24-hour calendar day interval.
Figure 82:
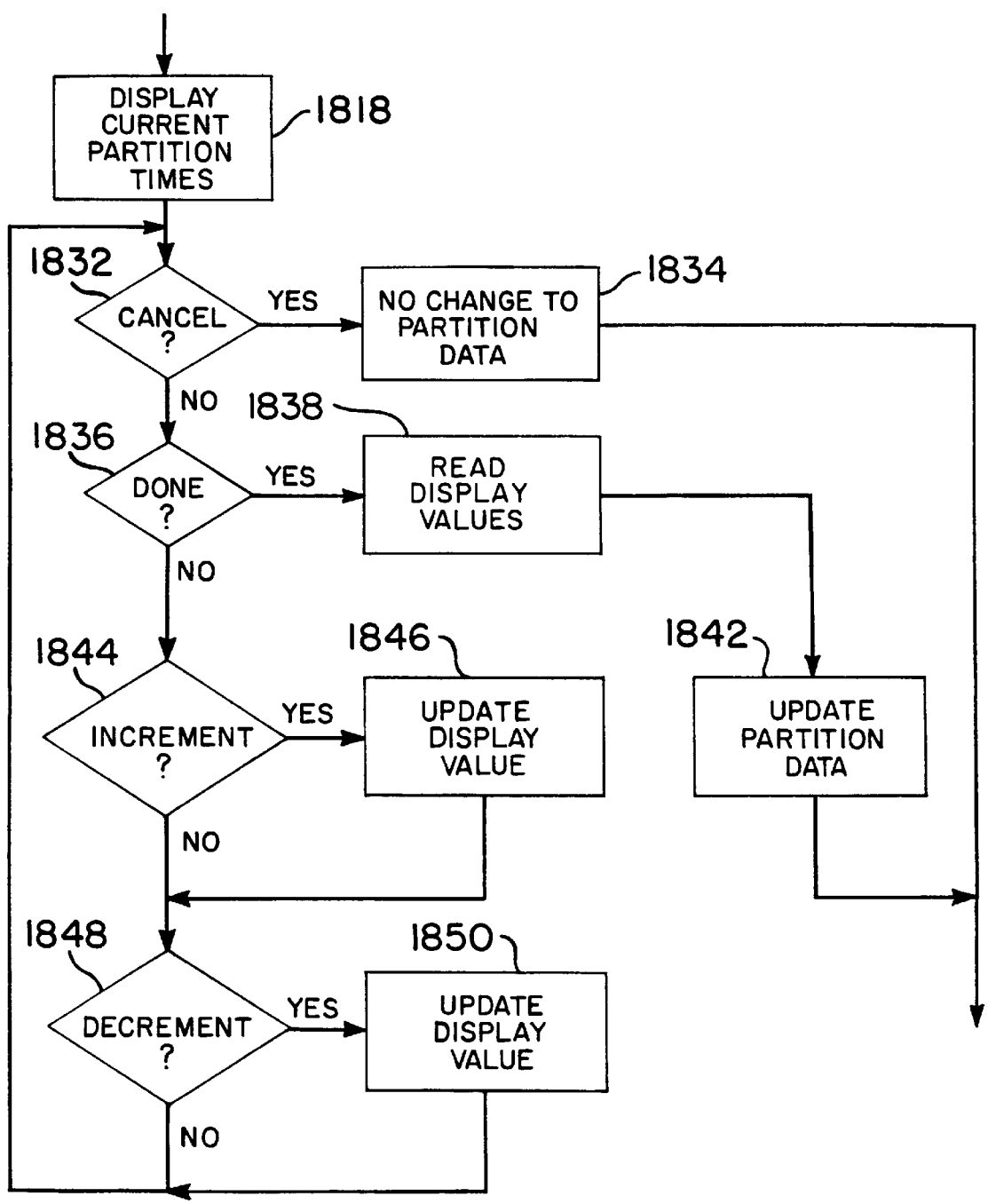
FIG. 82 illustrates in flow-chart form programming of the motherboard CPU to carry out the day/night partition function pictorially illustrated in FIG. 81.

At step 1812, it is determined whether the user wishes to cancel a decision to add a selected day to the holiday list. If a selection is not cancelled, it is determined whether the user has indicated that the holiday setup session is complete (step 1814). If the session is indicated as being completed, the list of holidays generated during the session is used to replace the previously existing holiday set (step 1860), and the scheduling session the ends. Until the user indicates completion of the session, the process loops through steps 1804, 1808, 1812, and 1814. If at a step 1812 the user indicates a desire to cancel the selections made by the session, then the session ends without replacing the holiday list as it existed prior to the holiday session, The process entailed by step 1792 in FIG. 79 will now be described with reference to FIGS. 81 and 82. The process illustrated in FIG. 82 begins, as indicated at step 1818 with the display for the current start (night-day) time, and end (day-night) time utilizing two time controls as illustrated in FIG. 81, in display box 1820. Each time control (1822, 1824) consists of an up arrow button (1822A), a down arrow button (1822B) and a time display field (1822C). In addition to those two controls, there is a cancel button (1826), and a "done" button (1828). The entire control box is manipulated using positioner/cursor (1830). Following the initial display the process sits in an endless loop until the user activates either the cancel button (1826) as indicated in decision box 1832, or the "done" button (1828) as indicated in decision box 1836. If the cancel button (1826) was activated by the cursor (1830), the process terminates without updating the partition data as indicated in the process box 1834. If the done button (1828) was activated the values in the display portions (1822C) of the controls are read and the partition data updated as indicated in process boxes 1838 and 1842. If the cursor is used to select either the start time control (1822) or the end time control (1824), then the times may be incremented or decremented by activating the corresponding up arrow button (1822A) or down arrow button (1822B) using the cursor (1830). The increment or decrement operation results in an updated display value as illustrated in decision boxes 1844 and 1848 and process boxes 1846 and 1850.

Figure 83:
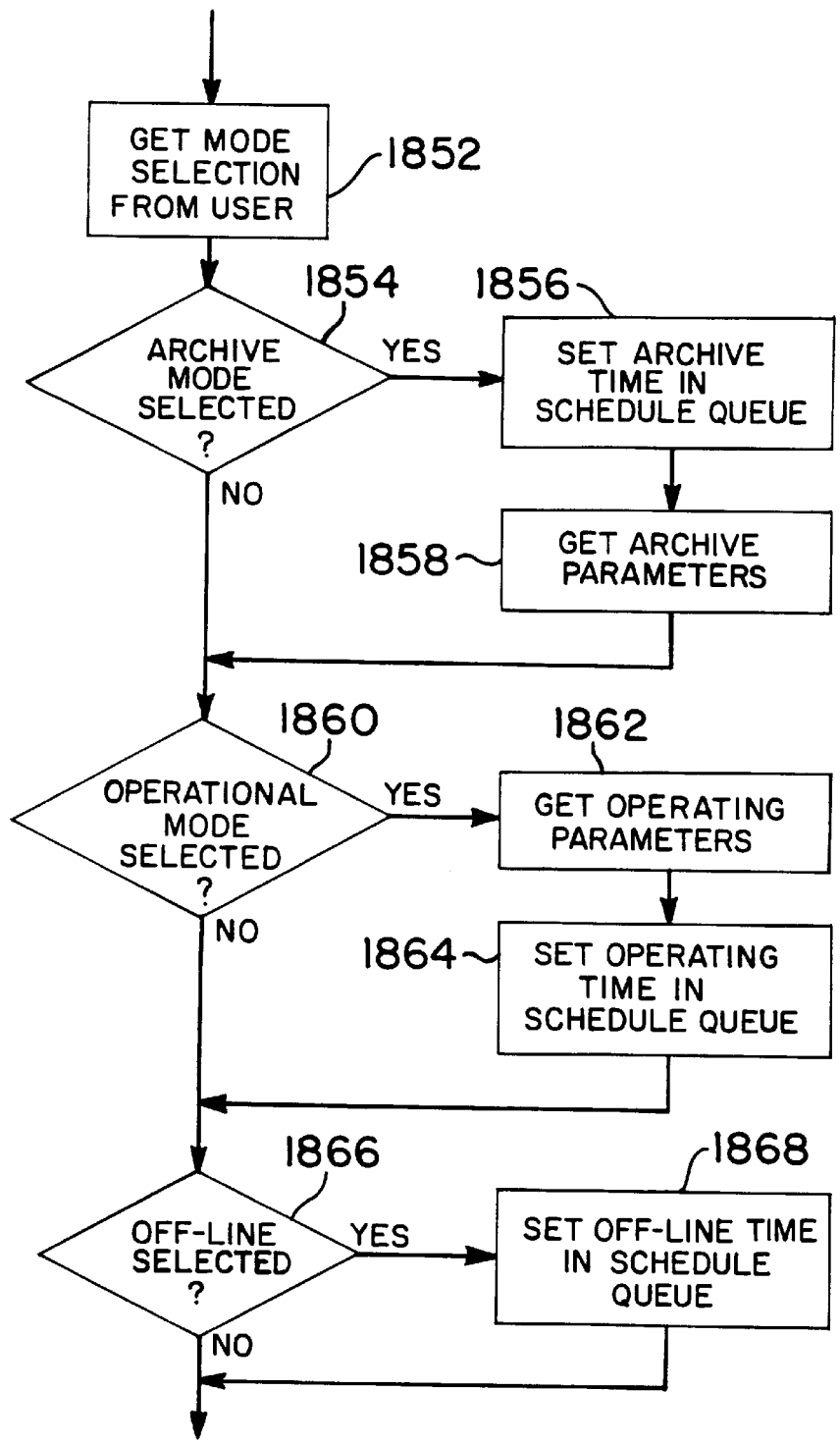
FIG. 83 illustrates in flow-chart form programming of the motherboard CPU to carry out option selections in connection with scheduling of system operations.

FIG. 83 illustrates processing performed during scheduling setup to permit the user to select from a number of different modes to be selected for scheduling.

At step 1854, it is determined whether the user is performing scheduling with respect to an archiving mode. If so, the time selected for the pre-scheduled archiving operation is set in a schedule queue (step 1856) and the parameters for the archiving operation, as selected by the user, are fetched (step 1858).

At step 1860, it is determined whether the user has selected for scheduling an operational recording mode. If so, the relevant operating parameters selected by the user are received (step 1862) and the relevant time for the operational mode is set in the schedule queue.

At step 1866, it is determined whether the user is scheduling one or more cameras to be "off-line", that is excluded from recording (also referred to as "software disabled"). If so, the relevant time is set in the schedule queue (step 1868).

Figure 85:
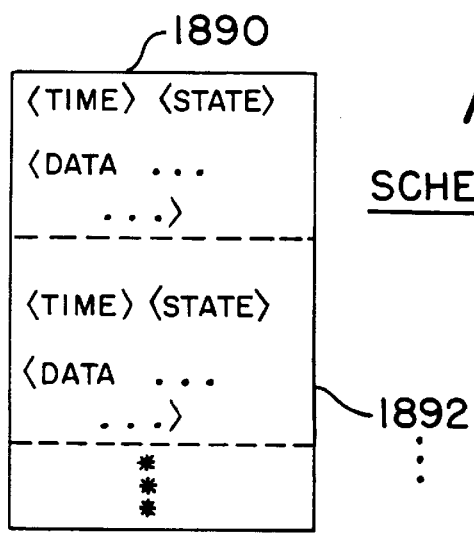
FIG. 85 illustrates a data format for a queue that controls pre-scheduled operations of the system.
Figure 86:
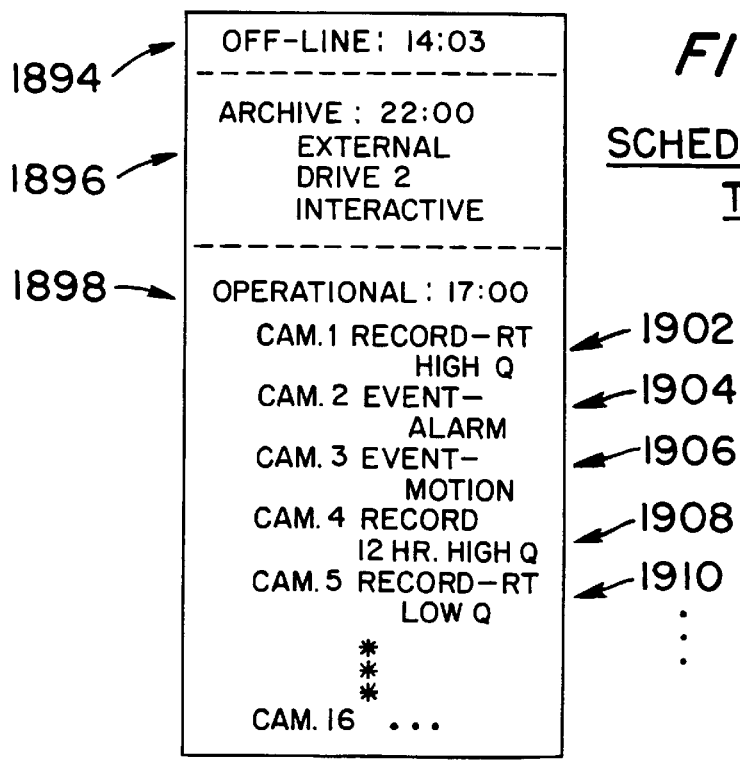
FIG. 86 is a data format which illustrates a scheduling script table of the kind generated by the processing of FIG. 84.
Figure 84:
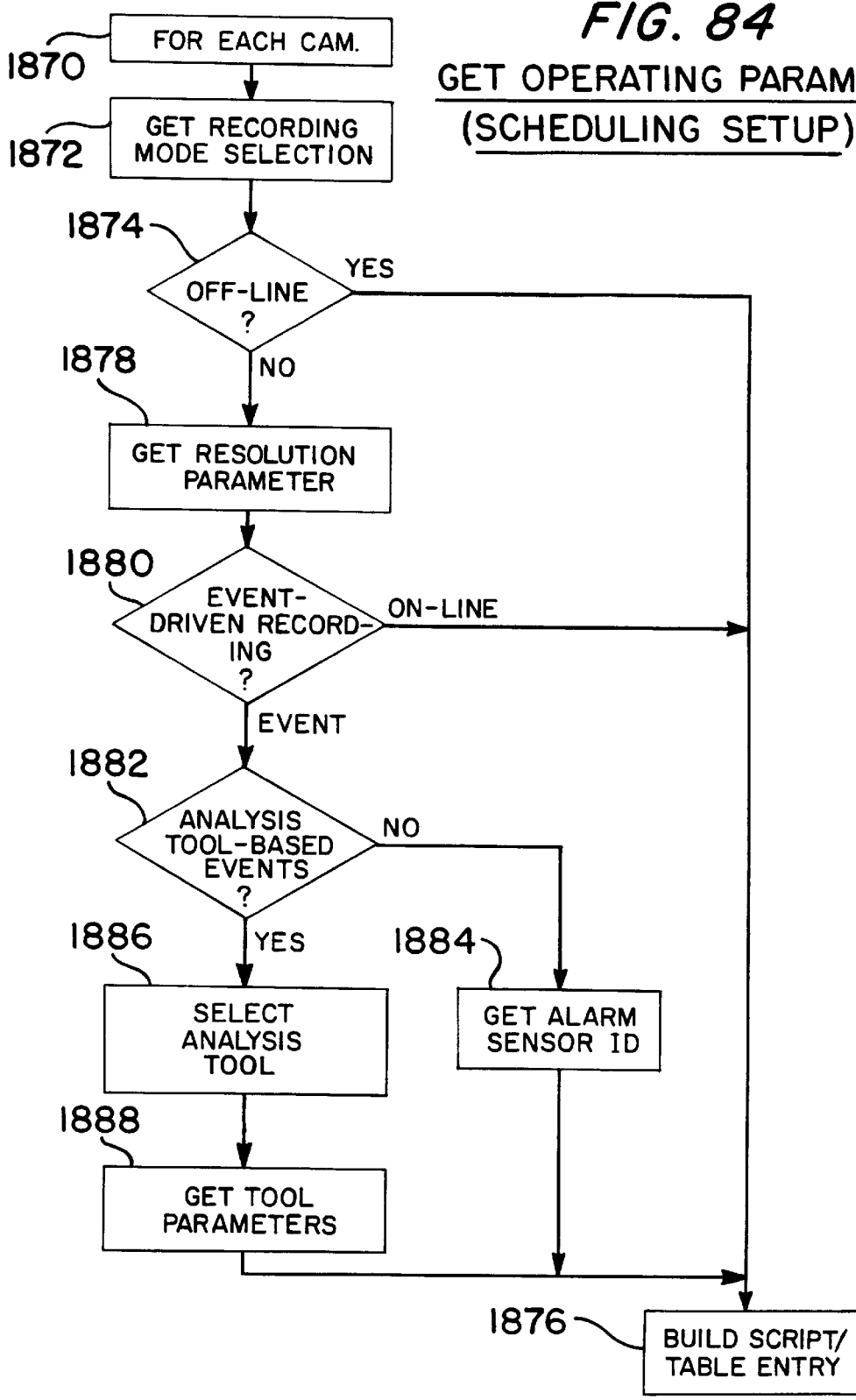
FIG. 84 illustrates in flow-chart form programming of the motherboard CPU in connection with generating scripts for controlling pre-scheduled system operations.

Further discussion of the processing indicated in FIG. 83 will now proceed with reference to FIGS. 84–86. In particular, FIG. 84 illustrates details of block 1862 ("get operating parameters"). As indicated at step 1870 in FIG. 84, the processing illustrated in FIG. 84 is a loop carried out with respect to each camera connected to the VR/PC unit. Step 1872 shows that, for the particular camera, the recording mode selected by the user is noted. If the selected mode is "off-line" (as determined at step 1874), then a indication to that effect is inserted as an entry in a schedule script (step 1876).

If at step 1874 it was found that the selected mode is not off-line, then the user's selection for the spatial resolution parameter for governing the data to be recorded is obtained (step 1880). It is then determined whether the camera is to be recorded in an ongoing on-line basis or in an event-driven mode. If on-line, such is then indicated in a suitable table entry (step 1876).

If at step 1880 it is determined that the camera has been selected for recording only on an event-driven basis, then step 1882 follows, at which it is determined whether the events are to be detected through external sensors or through image analysis processing carried out by the front end electronics. If the event detection is through alarm sensors, then step 1884 follows, at which the alarm sensor or sensors used to drive the recording of the invention are identified. Otherwise, step 1886 follows step 1882. At step 1886, the image analysis algorithm to be applied by the front end electronics and used to generate event-driven recording for the particular camera is selected.

Following step 1886 is step 1888, at which the parameters for constraining the selected analysis algorithm are received. Following either step 1888 or 1884, as the case may be, is again step 1876, in which the relevant data is provided as an entry in an schedule script or table.

FIG. 85 presents a simplified example of a schedule queue. The schedule queue is made up of entries 1890, 1892, etc. Each of the entries starts with a time and operational state header, and then data indicative of operational mode parameters or a pointer to a relevant scheduling script or table. An example of a schedule script or table is shown in FIG. 86. In a first entry, indicated at 1894, the system is shown as being taken off-line. At the next entry, shown at 1896, an archiving operation is scheduled and it is indicated that the operation is performed on an interactive basis with a device designated as a "external drive 2". A third entry indicates a time at which the system is made operational and contains a script detailing the operating mode for each camera. For example, at 1902, it is indicated that camera 1 is to be recorded in "real time" (not time lapse), and with a compression parameter that corresponds to a high quality image. Accordingly, camera 1 will be included in the sequence of cameras from which fields are captured at regular intervals for recording. At 1904, it is indicated that camera 2 is to be recorded only on the occurrence of events detected through an alarm sensor. At 1906, it is indicated that camera 3 is to be recorded only upon the occurrence of events detected by a motion detection algorithm carried out by image analysis in the front end electronics.

At 1908, it is indicated that camera 4 is to be recorded at a "time lapse" rate that is less frequent than other cameras being recorded, but with high image quality compression.

At 1910, it is indicated that camera 5 is to be recorded in real time, but with video data compression that provides comparatively low image quality. Corresponding script lines (not shown) would also be provided for other cameras (up to a total of 16) connected to the VR/PC unit.

Figure 87:
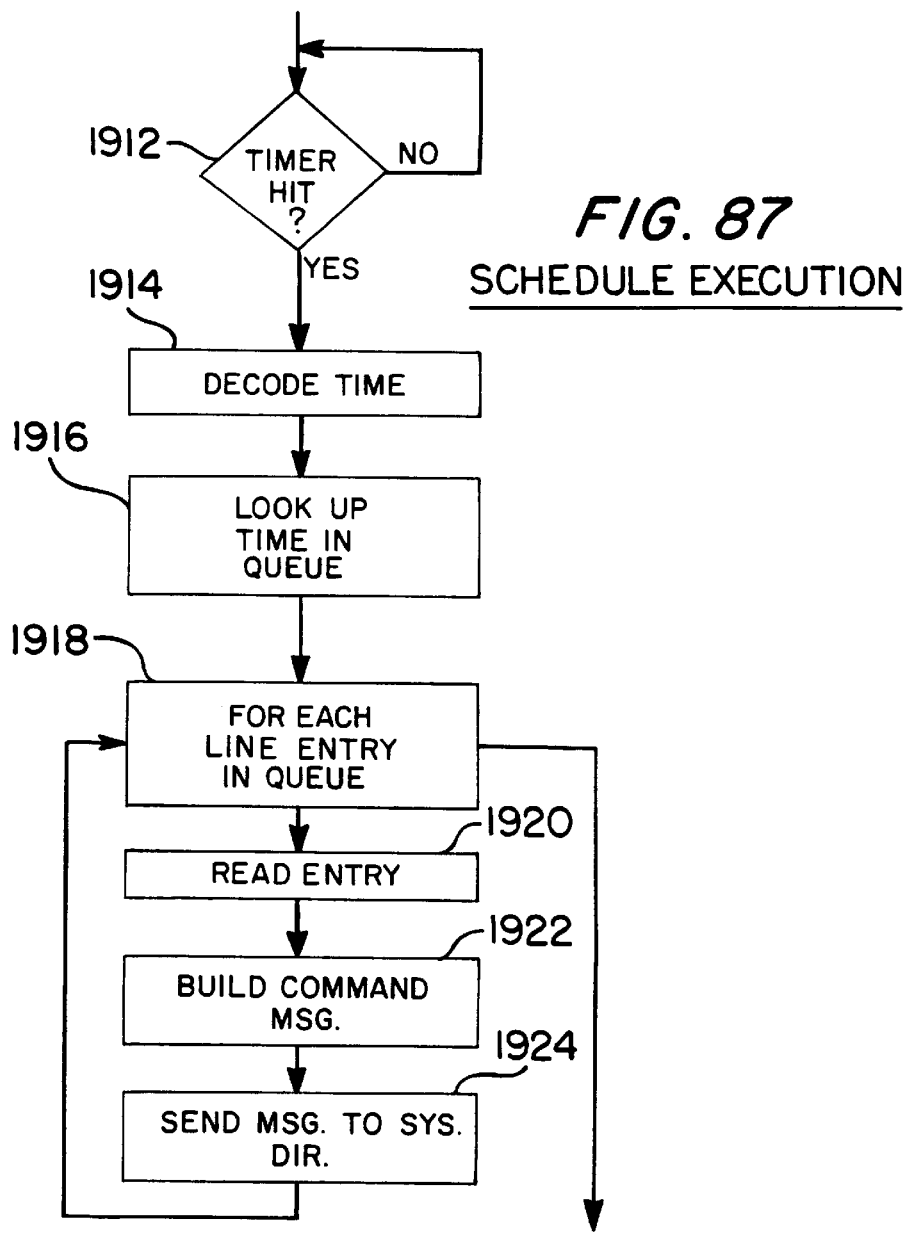
FIG. 87 illustrates in flow-chart form programming of the motherboard CPU to control system operation in accordance with pre-set scheduling parameters.

FIG. 87 represents processing carried out in execution of pre-scheduled operating modes that have been stored in the system. At step 1912, it is determined whether the time has arrived to check the schedule. For example, the timer may "go off" at one minute intervals, so that a schedule change is checked for once a minute. When the timer goes off, the present time is decoded (step 1914) and if there is a match, the time is looked up in the schedule queue (step 1916). In a processing loop carried out for each line in the schedule queue (as indicated at step 1918), steps 1920–1924 are carried out. At step 1920, the entry line is read. At step 1922, a suitable command message is built in accordance with the entry line. Then, at step 1924, the message is sent to the system director for forwarding for execution by the relevant software component.

MACHINE ANALYSIS OF VIDEO STREAM CONTENT

Software for performing image analysis algorithms will now be discussed, with reference to FIGS. 88–98. The ensuing discussion will have bearing both on application of image analysis to "live" video by the front end electronics and also to image analysis carried on by the motherboard CPU with respect to sequences of video data fields reproduced from the hard disk.

Figure 88:
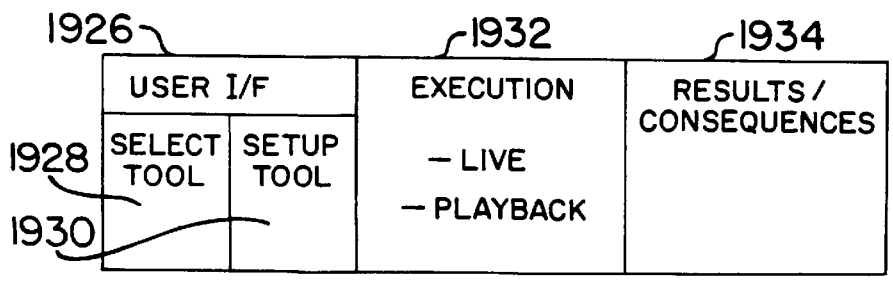
FIG. 88 illustrates in summary form operations carried out by the motherboard CPU in performing a typical image analysis algorithm.

FIG. 88 presents an overview of aspects common to all image analysis algorithms provided in the VR/PC unit. Aspects related to the user interface are represented at 1926, and may be divided into those used to select an image analysis algorithm (1928) and those used to set parameters for a selected algorithm 1930).

Block 1932 is indicative of the execution of the algorithm in question, whether performed on "live" video by the front end electronics, or executed by the motherboard CPU with respect to reproduced video signals. Then, as indicated at 1934, results of the algorithm are reported and/or stored and/or certain actions are taken, depending on the outcome of the image analysis algorithm.

Figure 89:
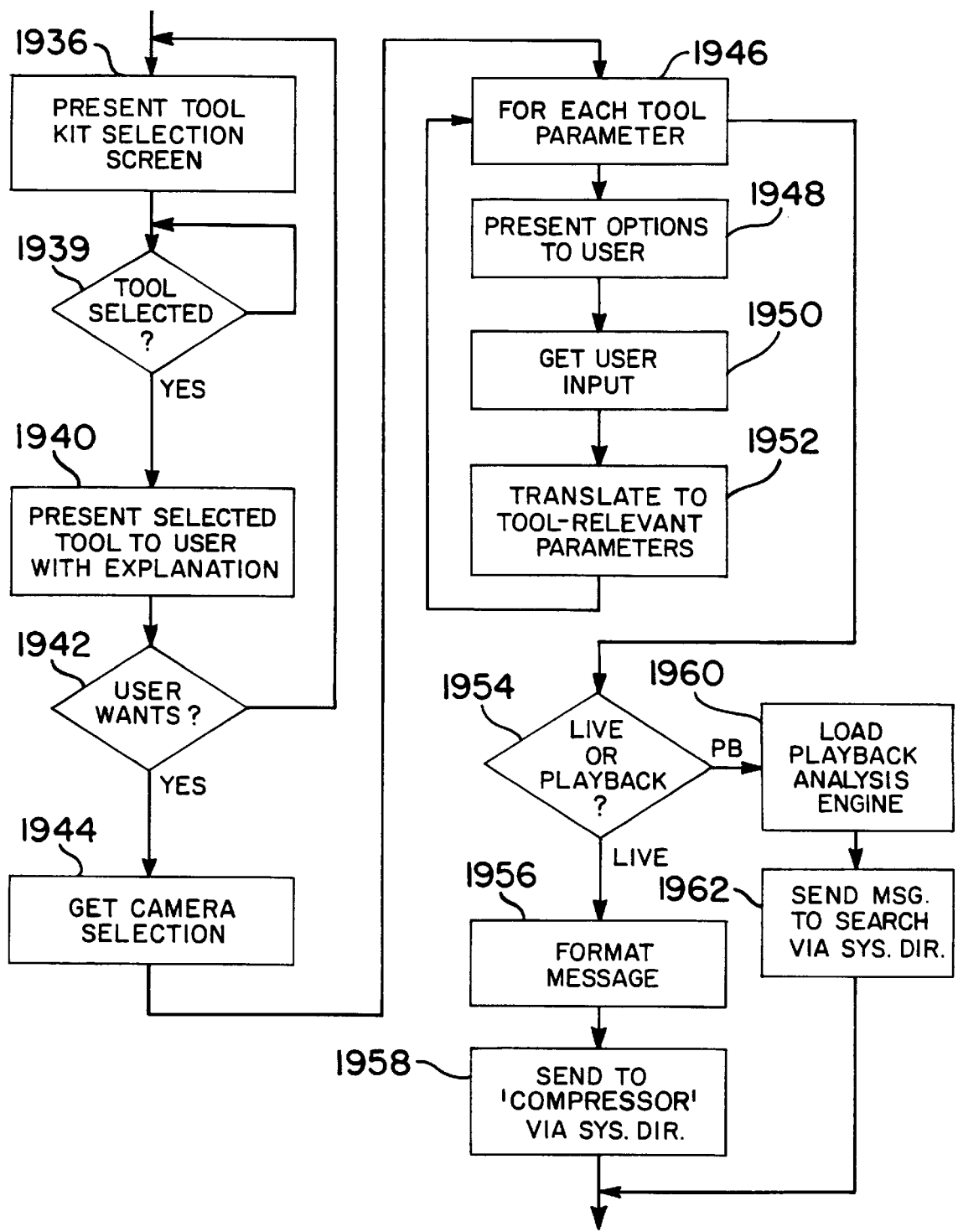
FIG. 89 illustrates in flow-chart form the select and setup portions of the image analysis tool operation of FIG. 88.

FIG. 89 illustrates processing involved in the selection and setup of an image analysis algorithm or "tool". As indicated at step 1936, the user is initially presented with a screen display in which a number of tools (analysis algorithms) are available for selection by the user. For example, a respective icon corresponding to each available tool may be displayed on the screen. Or, a menu listing the available tools by name may be displayed. Then, at step 1938, it is determined whether the user has selected a tool from the tool kit. If so, a new screen is generated, or the selection screen is altered, in a manner to indicate which tool has been selected (step 1940). It is then determined (step 1942) whether the user wishes to actuate employment of the selected tool. If not, the process loops back to step 1936. However, if the user does wish to actuate use of the tool, then step 1944 follows, at which the user indicates, by camera number or name, the source of the video signal stream to which the selected tool is to be applied. There follows a loop (as indicated at step 1946) which is to be applied to each parameter relevant to the selected tool. The loop is made up of steps 1948 through 1952. At step 1948, the options selectable by the user with respect to the parameter are indicated to the user. At step 1950, the user's input as to the desired option is received, and at step 1952 the parameter setting provided by the user is translated into data that is relevant to the image analysis process.

After the tool parameter loop has been carried out as to each parameter, step 1954 follows, at which it is determined whether the tool in question is to be applied to live video or reproduced video. If live video is to be analyzed by the selected tool, then a suitable command message or set of command messages is generated (step 1956) and transmitted to the front end electronics by way of the system director (step 1958).

On the other hand, if the selected algorithm is to be applied to reproduced video signals, then the image analysis component of the motherboard CPU hardware is loaded (step 1960) and a suitable command message indicative of the selected algorithm and parameters is sent via the system director (step 1962).

Examples of parameter setting will now be described, in the context of a "perimeter invasion tool", with reference to FIGS. 90A–90D.

FIG. 155 is a screen display of the type that may be presented to the user in connection with setting parameters for execution of a "perimeter violation" image analysis tool.

Turning to FIG. 90A, in an initial step 1964, there is displayed over a video image a drawing element (such as a box or line) which is indicative of a perimeter of an area in the scene represented by the video signal, the purpose of the image analysis algorithm being to detect entry of objects into the indicated area. In the screen display of FIG. 155 the parameter is represented by the box graphic element 1966.

Referring again to FIG. 90A, step 1968 follows step 1964. At step 1968, the user is permitted to drag and/or stretch the perimeter element 1966 in essentially the same manner that a polygon or line may be dragged or stretched in a conventional PC software drawing package. When the user indicates that parameter setting is done (as detected at step 1970), then the end points of the line or box indicating the perimeter 1966 are determined on the basis of the relevant tiles (column and row) in the image plane space (step 1972). The end points are then saved as parameters indicative of the perimeter location.

Another parameter relevant to the perimeter tool is the direction of crossing the perimeter. That is, the image analysis tool may be instructed to detect crossing of the perimeter in both directions, or in only one of the two possible directions. For the purpose of user selection, the crossing direction may be indicated by an arrow (which may be two-headed to indicate crossing in either direction). In FIG. 155, single-direction arrows are indicated at 1976.

The process for selecting the crossing direction or directions to be detected is illustrated in FIG. 90B. In an initial step, the crossing direction arrows 1976 are displayed (step 1978). Following steps 1978 is step 1980, at which it is determined whether the user has indicated a change in the crossing direction. If so, a crossing direction is toggled to the next direction. For example, the crossing direction may be toggled in a loop such as in, out, both ways, in and so forth (step 1982).

As in FIG. 90A, a step 1970 is present in the process of FIG. 90B so that the crossing direction parameter is set (step 1984) when the user indicates that parameter setting is complete.

Another parameter relevant to the perimeter violation detection tool is the size of the object found to be crossing the perimeter. For example, it may be desirable to disregard apparent perimeter crossings unless the object which seems to be crossing the perimeter is of a given size or larger. To specify the size of object another drawing element box, perhaps shaded in a contrasting color such as red, may be displayed, as indicated at 1986 in FIG. 155. Thus, turning to FIG. 90C, the initial step 1988 entails displaying the object size box 1986. Following step 1988 is step 1990, at which it is determined whether the user has indicated that the object size box is to be changed. If so, the new size setting is determined from user input (step 1992) and the size box is updated on the display screen (step 1994). Again, a step 1970 is provided in FIG. 90C to determine whether the parameter setting process is complete. If so, the final size setting is determined (step 1996), based on the state of the size box as currently displayed on the screen. Then the final object size setting is translated into tile based units (step 1998) and the corresponding tile-based object size parameter is stored (step 2002).

Figure 90D:
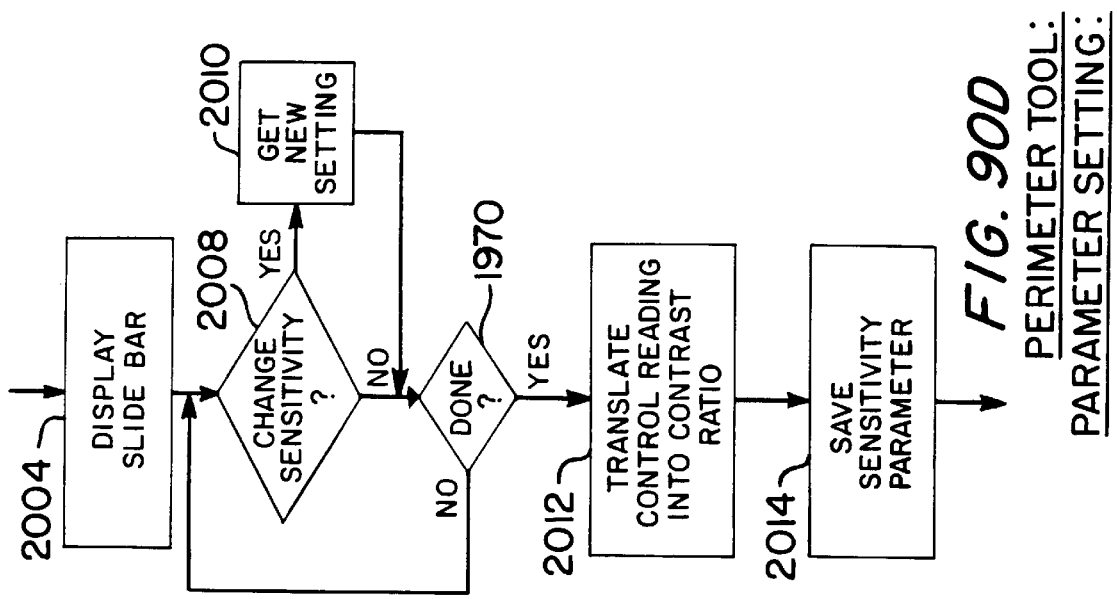
Figure 90C:
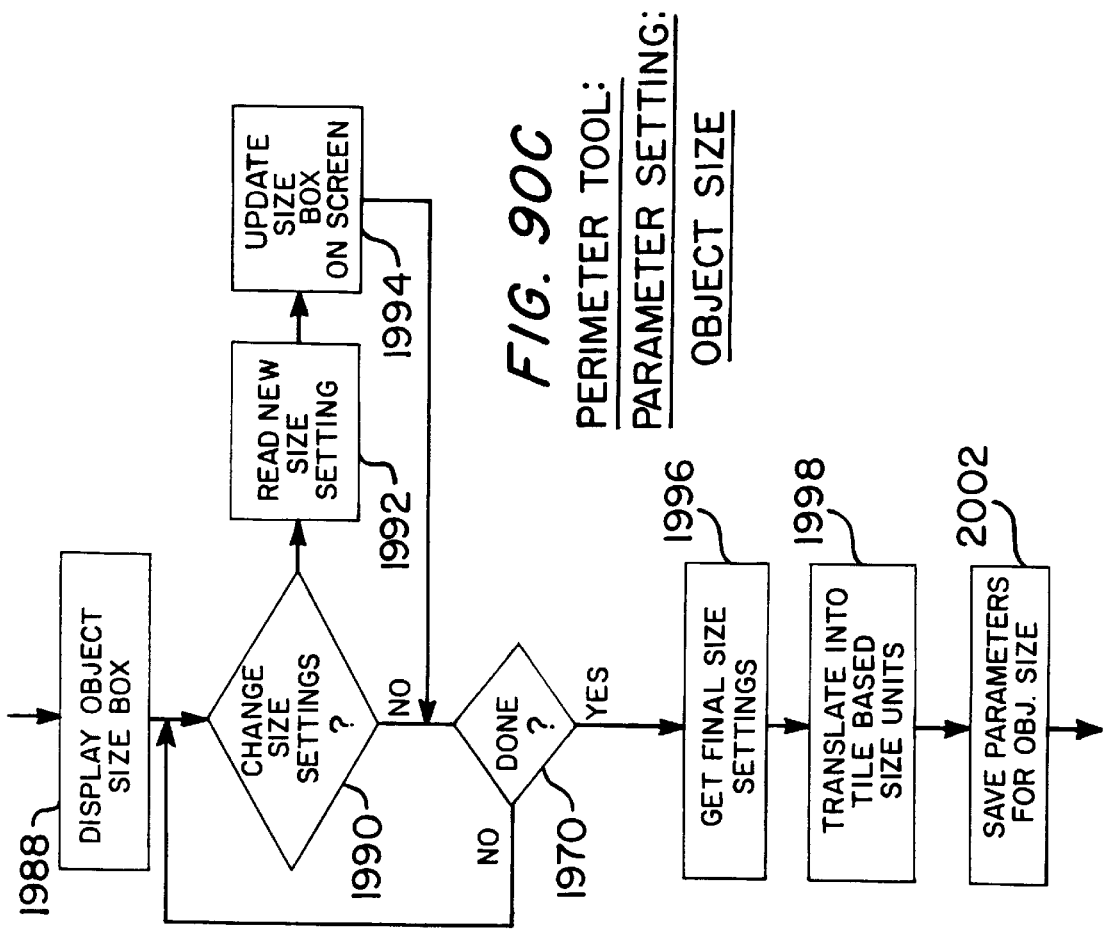

Another parameter relevant to the perimeter violation detection algorithm is the "sensitivity", i.e., a video signal contrast level that will be considered to represent motion rather than noise. The setting of the sensitivity parameter is illustrated in FIG. 90D, and includes a first step 2004, in which a slide bar or similar image element is displayed. The corresponding sensitivity slide bar element is indicated by reference numeral 2006 in FIG. 155.

Turning again to FIG. 90D, a step 2008 follows step 2004. At step 2008, it is determined whether the user has indicated a change in the sensitivity level. If so, the new slide bar setting is detected (step 2010). As in the FIGS. 90A–90C, step 1970 is again present to determine whether the parameter setting process is complete. If so, step 2012 follows, at which the slide bar reading is translated into a video signal contrast ratio, and the resulting contrast ratio threshold is saved as the sensitivity parameter (step 2014).

Figure 91:
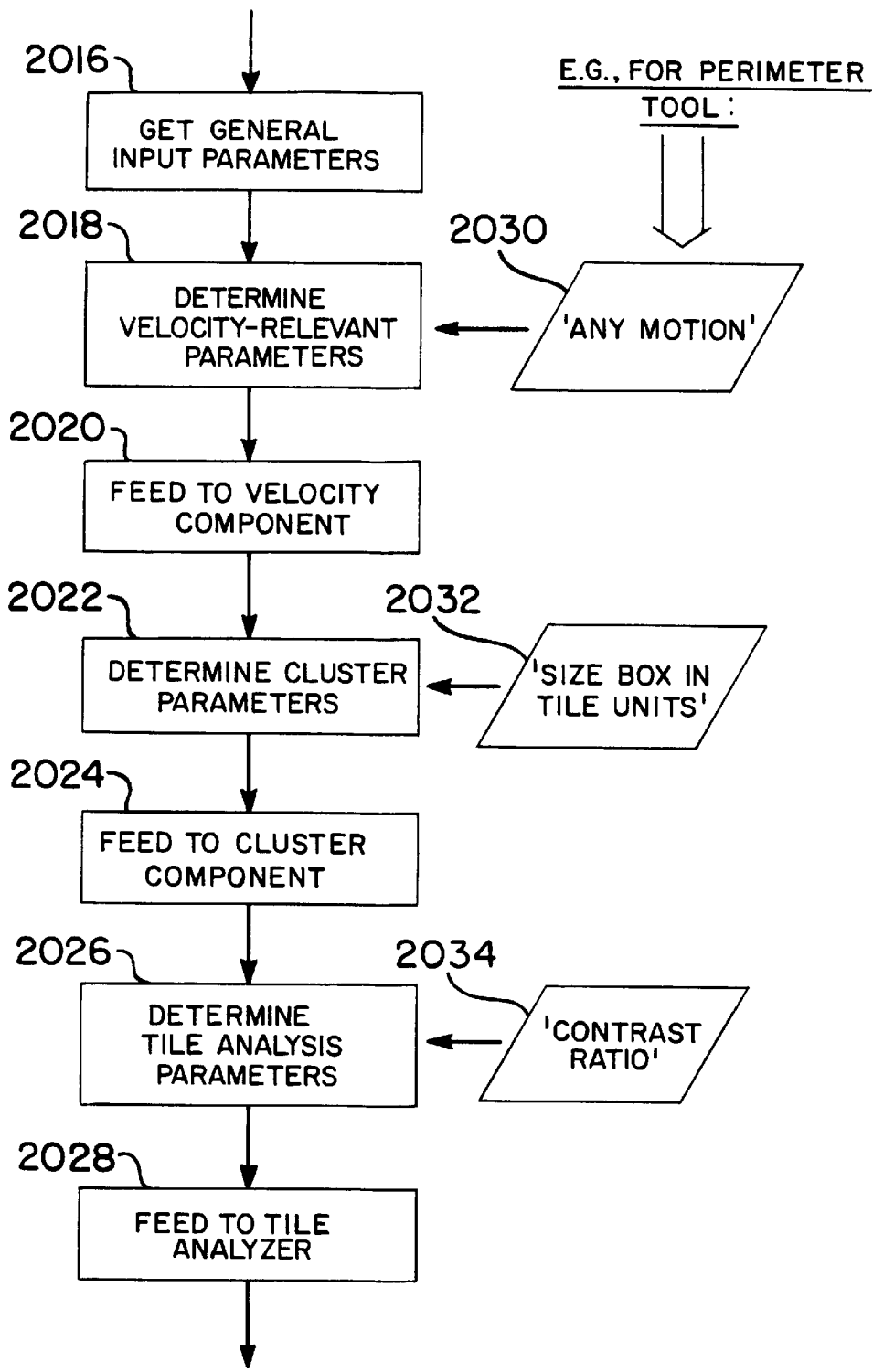
FIG. 91 is a flow-charts based illustration of preparatory steps required before performing an image analysis.

A process for loading the image analysis engine is shown in FIG. 91. Initially (step 2016), parameters of general applicability to any analysis tool are loaded. The parameters loaded at step 2016 may include, for example, data indicative of how to translate GUI input information into tile space and/or velocity space. Then, at step 2018, parameters relevant to velocity are determined, and the velocity-relevant parameters are the fed to a velocity-analysis component of the image analysis engine (step 2020). Then parameters relevant to clustering of detected motion vectors are determined (step 2022), and the cluster-relevant parameter are fed to a clustering component of the image analysis engine (step 2024). Following step 2024 is step 2026, at which parameter relevant to analysis of individual video data tiles are determined. The resulting tile analysis parameters are then fed to a tile analyzing portion of the image analysis engine (step 2028). To provide examples of the parameters relevant to the perimeter violation detection tool, the velocity-relevant parameter for the perimeter tool would be detection of any motion (block 2030). The cluster-relevant parameter for the perimeter tool is the object size box, as measured in image plane tile units (block 2032). The relevant tile analysis parameter for the perimeter tool is the contrast ratio derived from the sensitivity setting (block 2034).

A process for initializing an image analysis algorithm to be carried out on live video data by the front end electronics is illustrated in FIG. 92. First, one or more reference images (preferably live video images) are obtained (step 2036). From the reference image, relevant parameter reference values are extracted (step 2038). Following step 2038 is step 2040. At step 2040, the extracted parameter reference values are stored in the memory of live image analysis block 846 (FIG. 14), then counters used in the image analysis engine are set to zero (step 2042) and a message is sent to the system director component of the motherboard software indicating that the live analysis engine is ready to operate (step 2044). The counters zero'ed at step 2042 are used to determine when enough data is available to apply FFT processing. In the case of the perimeter violation detection tool, the step 2038 preferably consists of calculating an average luminosity along the perimeter line to provide a base value against which changes will be detected (block 2046).

Operation of the live analysis block 846 for the purpose of carrying out the perimeter violation detection algorithm will now be described with reference to FIGS. 93A–93E.

First, it is assumed that the live analysis block uses any of a number of conventional image sequence filtering algorithms which generate data indicative of optical flow. In a preferred embodiment of the invention, motion-related analysis algorithms are implemented using FFT-based spatio-temporal filtering applied to a time-varying series of changed MCU mapping data so as to generate X- and Y-direction velocity estimates. (The MCU mapping data subjected to FFT analysis may be the same data used for compression processing, or may be generated specifically for motion analysis based on different MCU 'sameness' criteria than those used for compression.) A clustering analysis is applied to the velocity estimates to detect the leading and trailing edges of moving objects. Particular examples of motion-related algorithms are the motion detection and perimeter violation detection analysis tools discussed below.

Figure 93A:
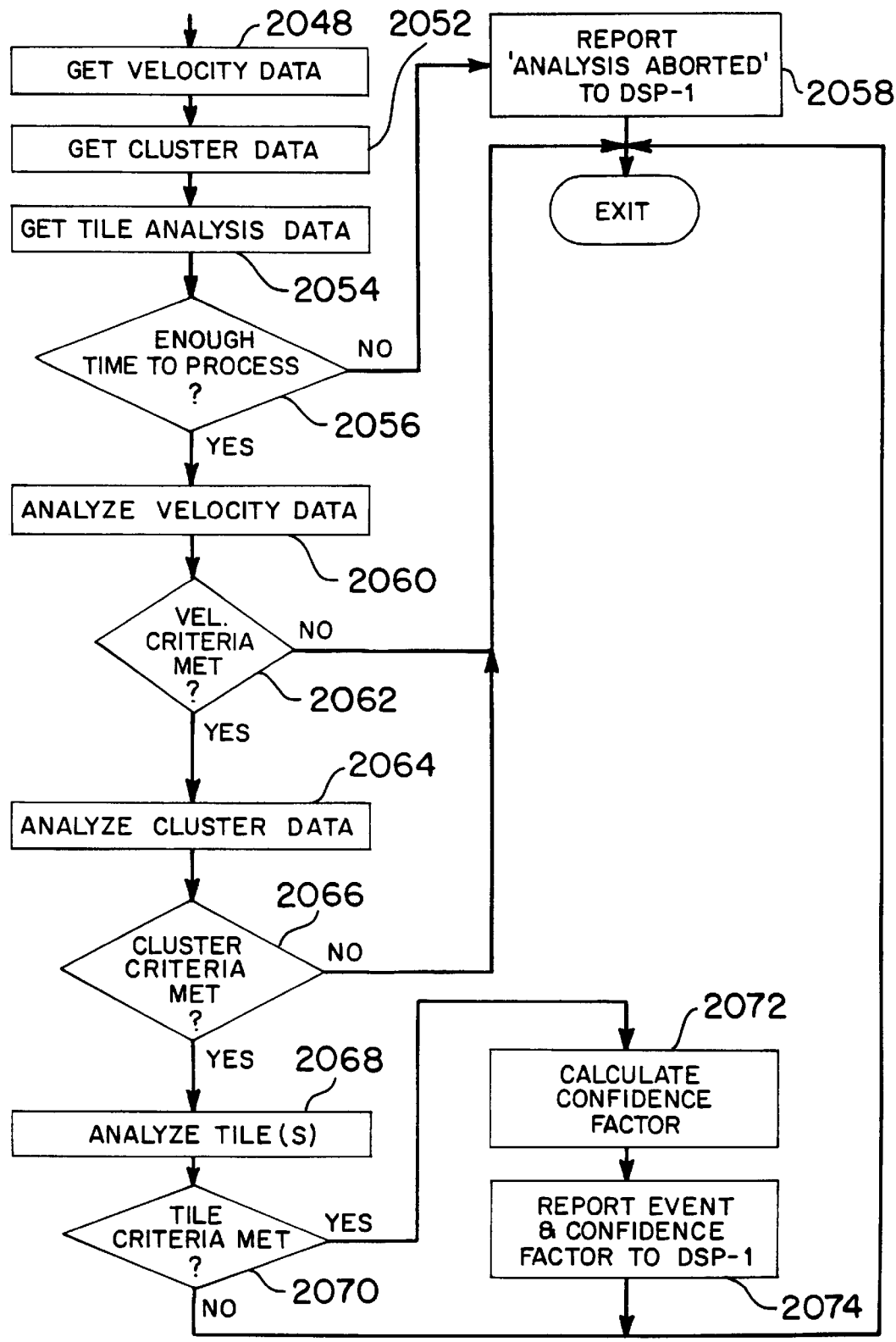
FIG. 93A illustrates processing performed by the live image analysis processor of the front end video board of FIG. 14, and FIGS. 93B and 93C are associated processing steps carried on by the video board controller.

Other analysis algorithms, such as the "museum" and "light" tools discussed below, entail tile-by-tile comparison of the content of a present image data field versus a reference image data field. As indicated in FIG. 93A, data indicative of velocity vectors is obtained (step 2048), and so is data indicative of clustering of the velocity vectors (step 2052). At step 2054, data relating to analysis of the tiles at the designated perimeter is obtained. Then, as shown at step 2056, it is determined whether enough time is available to complete the analysis. If not, an "analysis aborted" message is sent to the front end controller DSP 1050 (step 2058). If appropriate, the controller DSP may then issue an event report to the motherboard, which may, in turn, declare an alarm condition.

However, if enough time is available to complete the analysis, then step 2060 follows step 2056. At step 2060, the velocity vector data is analyzed. If the velocity vector criteria indicative of a perimeter violation are met (step 2062) then the vector clustering data are analyzed (step 2064). It is then determined whether the cluster "object size" criteria required to find a perimeter violation have been met (step 2066). If so, step 2068 follows, at which the data representing the perimeter tiles themselves is analyzed.

Following step 2068 is step 2070. At 2070, it is determined whether the analysis of the perimeter tiles indicates that a perimeter violation has occurred. If so, step 2072 is performed. At step 2072, a confidence factor for the violation detection determination is calculated. Then, at step 2074, the occurrence of the perimeter violation and the confidence factor are reported to the front end controller DSP 1050.

On the other hand, following step 2058, or upon a negative determination at any one of steps 2062, 2066 or 2070, the perimeter violation detection analysis is terminated without finding that a violation has occurred.

Figure 93C:
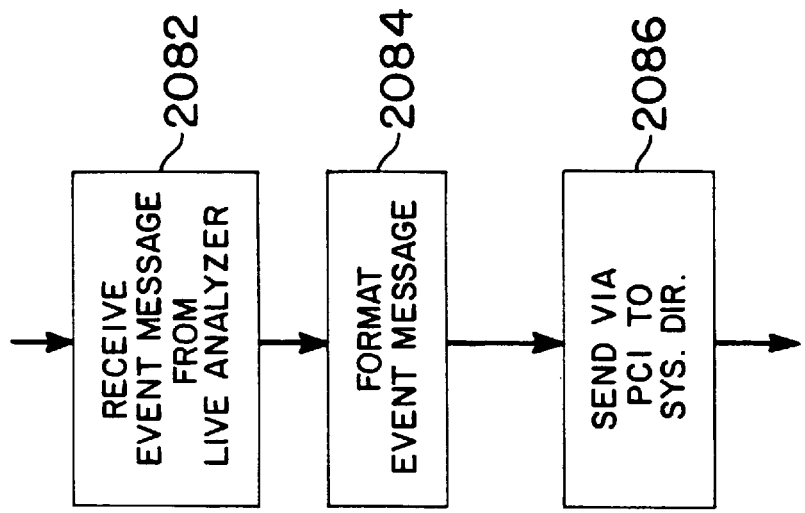
FIGS. 93D and 93E illustrate in flow-chart form further processing carried on by the live image analysis processor.
Figure 93B:
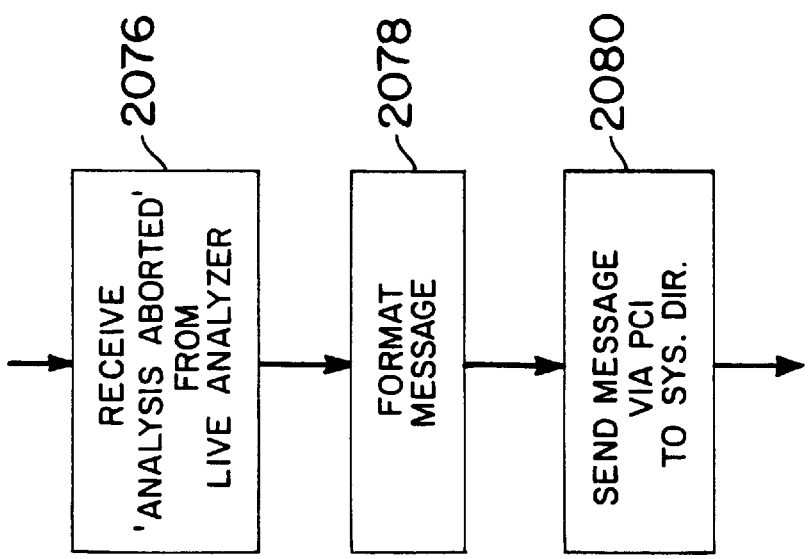

FIG. 93B illustrates action taken by the controller DSP 1050 in response to an "analysis aborted" message generated as step 2058. As shown in FIG. 93B, the controller DSP first receives the "analysis aborted" message (step 2076), then formats a suitable message for receipt by the motherboard (step 2078) and forwards the message to the system director component of the motherboard software via the PCI connection between the front end electronics and the motherboard (step 2082).

FIG. 93C illustrates processing carried out by the front end controller DSP in response to the message generated by the live display analysis block at step 2074. As seen from FIG. 93C, the controller DSP receives the message reporting the detected event (step 2082), formats a suitable message to report the event to the motherboard (step 2084), and then sends the message to the motherboard software system director via the above-mentioned PCI connection (step 2086).

FIG. 93D illustrates in generic terms the processing carried out in connection with each of the decision blocks 2062, 2066 and 2070 the processing of FIG. 93A. The first step in FIG. 93D is a step 2087 which indicates that the processing of FIG. 93D is carried out for each parameter. At a step 2088, it is determined whether the parameter value is below an upper level threshold for the parameter. If so, then at step 2090 it is determined whether the parameter value is above a lower-level threshold for the parameter.

A step 2092 is reached if the response to both of the steps 2088 and 2090 is positive. At step 2092, a flag value indicating that the parameter criteria were met is set, and a confidence level value is returned. On the other hand, a step 2094 is reached if a negative result is obtained at either one of steps 2088 and 2090. At step 2094, the flag is set to indicate that the parameter criteria were not met.

FIG. 93E illustrates details of step 2072 (calculate confidence factor, FIG. 93A). In the processing shown in. FIG. 93E, a confidence weight is applied to the velocity confidence level value (step 2096) then a confidence weight is applied to the confidence level value corresponding to the clustering determination (step 2098), and then a confidence weight is applied to the tile processing confidence level value (step 2102). At step 2104, the weighted velocity, cluster and tile values are added to obtain an overall confidence level value, and a message including the resulting value is generated (step 2106).

FIG. 94 illustrates a process for initializing an analysis engine included in the motherboard CPU software for the purpose of applying an image analysis algorithm to a reproduced video data stream.

In first step shown in FIG. 94, the first reference image in this stream after the point at which analysis is to begin is found (step 2108). Following step 2108 is step 2110, at which the relevant parameter reference values are extracted and stored. Then, at step 2112, the flags for the image analysis engine are initialized to appropriate starting values and, at step 2114, the analysis engine reports to the system director that it is ready to begin the analysis algorithm.

Figure 95A:
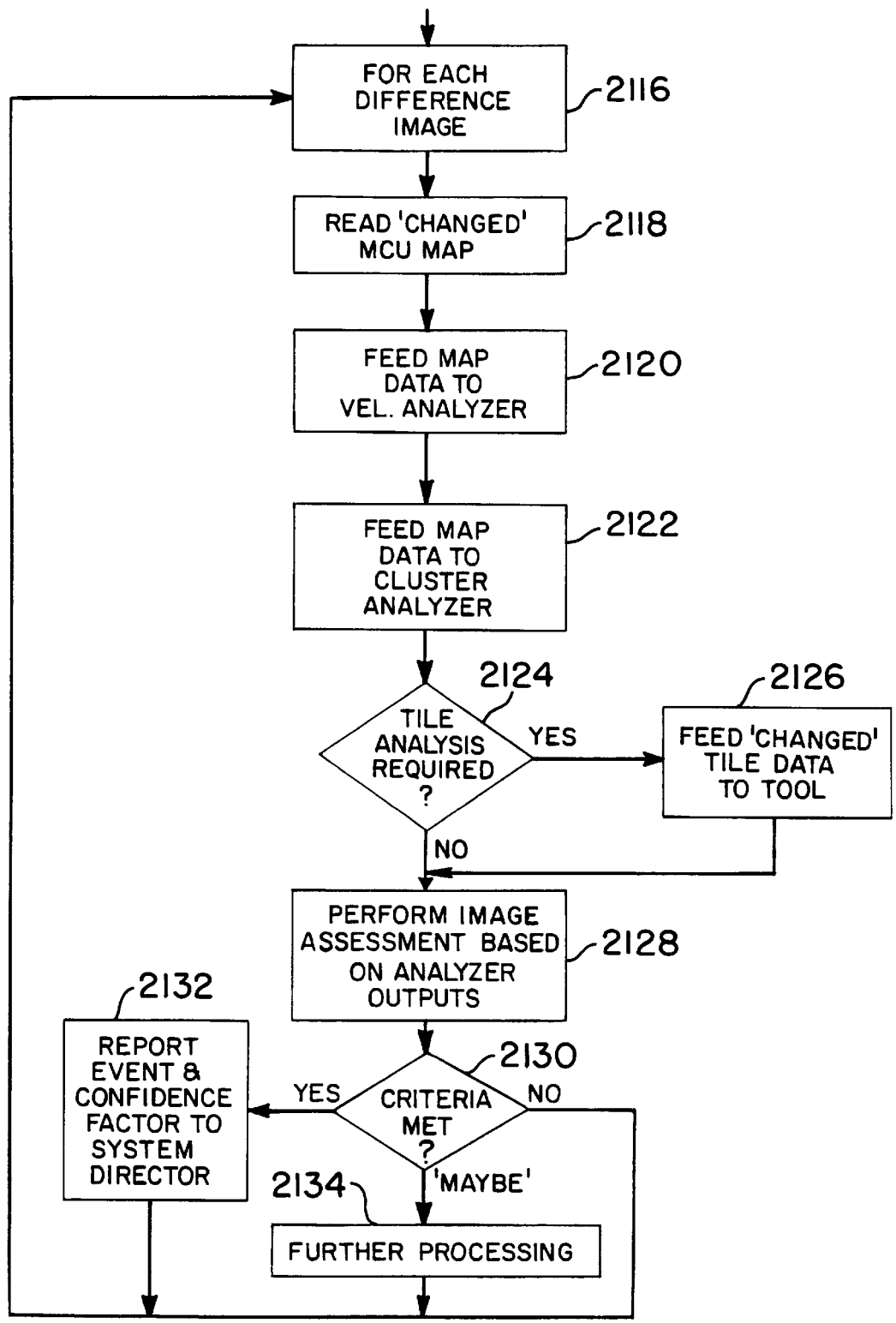
FIGS. 95A–95C are flow-charts illustrating processing carried out by the motherboard CPU for the purpose of applying an image analysis algorithm to a reproduced video stream.
Figure 95B:
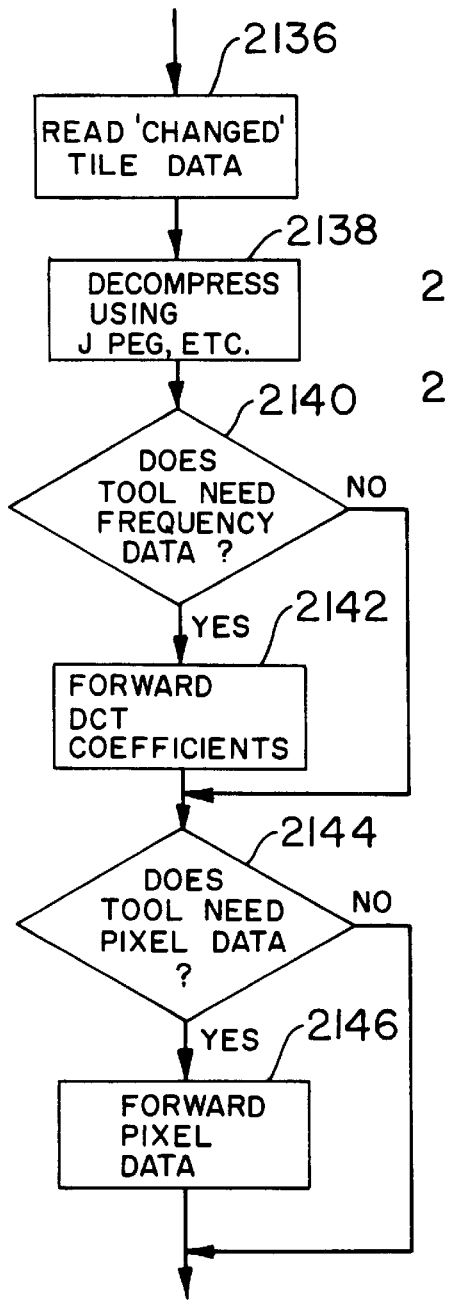
Figure 95C:
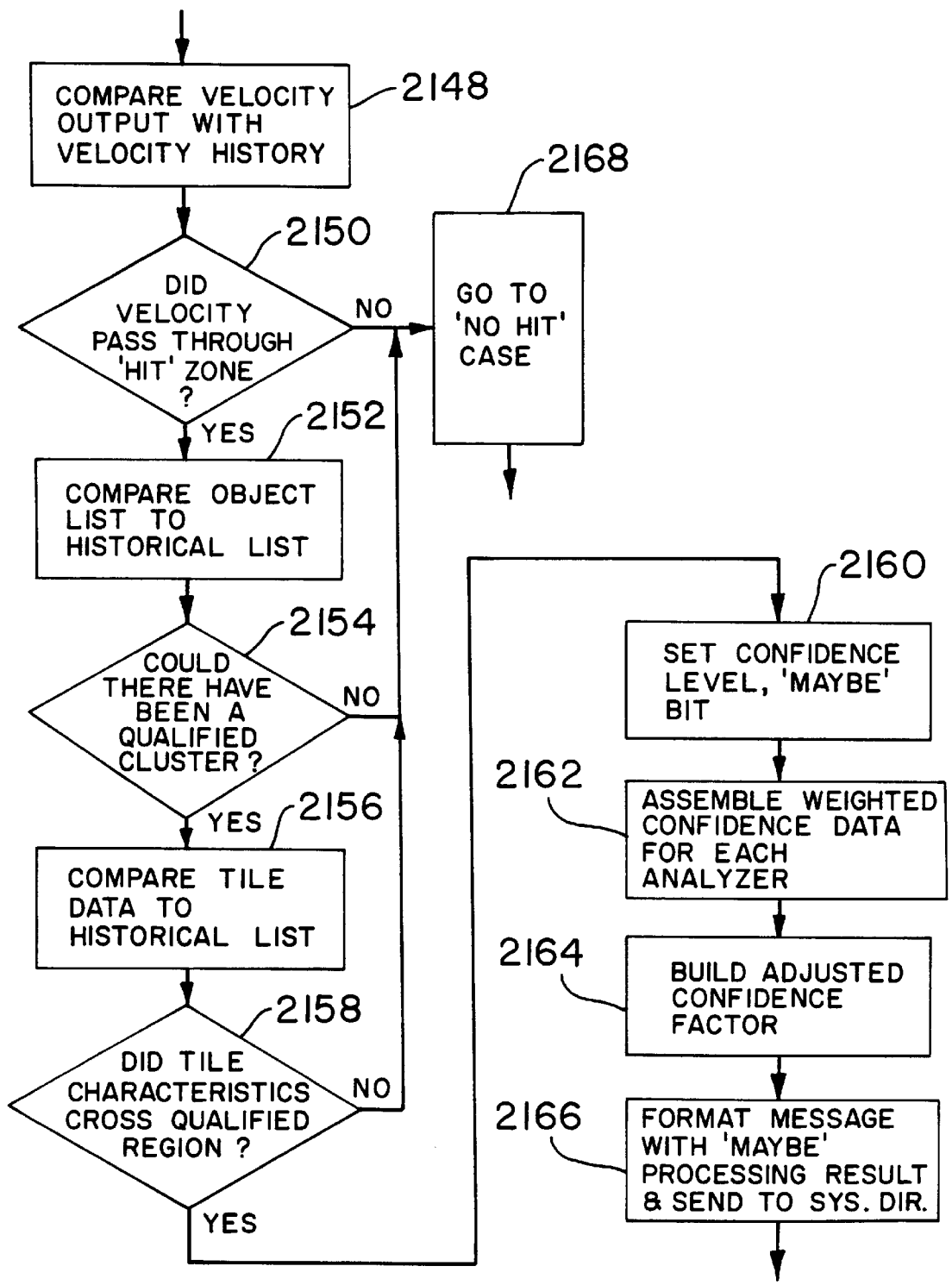

FIGS. 95A–95C illustrate operation of the image analysis engine which operates on the reproduced video stream. The image analysis engine employed for analyzing reproduced video data is similar to the live video analysis technique described above in connection with FIGS. 93A–93E. As indicated at step 2116, the process shown in FIG. 95A is a loop applied to each difference image field 1134 (FIG. 44) in the reproduced stream of video image fields. Step 2118 indicates that for the present difference image field, the changed MCU mapping data is read, and then the mapping data is used as an input to a velocity analysis process (step 2120) and also as an input to a cluster analysis process (step 2122). On the basis of the outputs from the velocity analysis and cluster analysis processes, it is determined whether an analysis of the changed MCU tile data itself is required (step 2124). If so, the tile-data-based analysis proceeds (step 2126). In either case, step 2128 next follows, in which the image is assessed on the basis of the results of the analysis processes. A determination is then made whether the criteria are met (step 2130). If at step 2130 it is found that the criteria have definitely not been met, then there is no finding that the image characteristic of interest has been detected. If the criteria have definitely been met, then a step 2132 follows step 2130. At step 2132, detection of the characteristic of interest is reported to the system director along with a confidence level. However, if the confidence level resulting from the analysis is not high enough to report the detection of the characteristic of interest, nor low enough to definitely rule out the presence of the characteristic, further processing occurs, as indicated at step 2134.

FIG. 95B illustrates further details of the step 2126 of FIG. 95A. As shown in FIG. 95B, the changed MCU data is read in (step 2136), and then decoded using conventional JPEG decompression processing (step 2138).

It is then determined whether the frequency coefficient data is required for further analysis (step 2140) and if so, the DCT coefficients are provided for analysis (step 2142). Then, at step 2144, it is determined whether pixel data (time domain data) is required, and if so, the. pixel data is obtained by inverse transform processing and supplied for analysis (step 2146).

FIG. 95C illustrates the processing indicated at step 2134 in FIG. 95A. The first step in FIG. 95C is shown as step 2148, in which the present set of velocity vectors resulting from optical flow analysis is compared with a history of velocity vectors generated based on previous images in the sequence of images.

Following step 2148 is step 2150, at which it is determined whether the analysis of the velocity vector history indicates that the velocity may have passed through a velocity vector value that the image analysis algorithm was intended to detect. If so, then objects currently detected by the optical flow analysis are compared with objects detected over the preceding set of images (step 2152). It is then determined at step 2154 whether an object of the type to be detected by the analysis algorithm might have been present. If so, step 2156 follows. At step 2156, an historical analysis of tile data is performed, and then at step 2158 it is determined whether present and past detected tile characteristics indicate that tile characteristics to be detected by the present algorithm may have been present. If a positive determination is made at step 2158, then step 2160 is performed. At step 2160, a confidence factor is generated for the algorithm output, and a flag corresponding to a "maybe" determination is set. Then, at step 2162, the confidence data generated from each analysis portion of the algorithm is assembled and weighted, and next an adjusted confidence factor is calculated (step 2164). Following is step 2166, at which a suitable message including a "maybe" result is forwarded to the system director.

If a negative determination is made at any one of steps 2150, 2154 and 2158, then the processing of FIG. 95C returns a conclusion that the characteristic to be detected by the algorithm was not present (step 2168).

Figure 96:
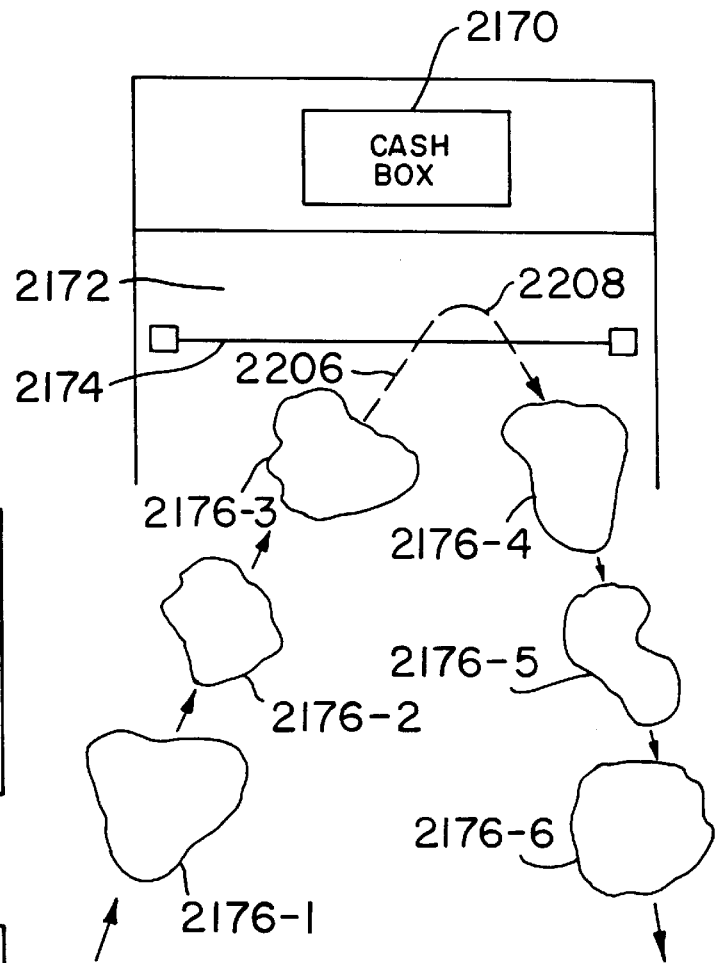
FIG. 96 is a pictorial illustration used in explaining a curve-fitting analysis performed on a reproduced video stream.

A particular example of operation of an image analysis algorithm applied to reproduced video data will now be described, with reference to FIGS. 96 and 97. For the purposes of this example, it is assumed that the analysis algorithm to be applied is of the type mentioned above which detects violations of a "perimeter". FIG. 96 schematically represents a sequence of images generated by a video camera (not shown) which provides a view, from above, of a cash box 2170 kept in a partially enclosed area 2172.

A graphical drawing element 2174 is indicative of a perimeter assigned by a user for the purpose of carrying out a perimeter violation analysis algorithm.

Shapes 2176-1 through 2176-6 are representative of a moving object detected by the analysis algorithm as positioned in respective fields of the sequence of video signals under analysis.

Figure 97:
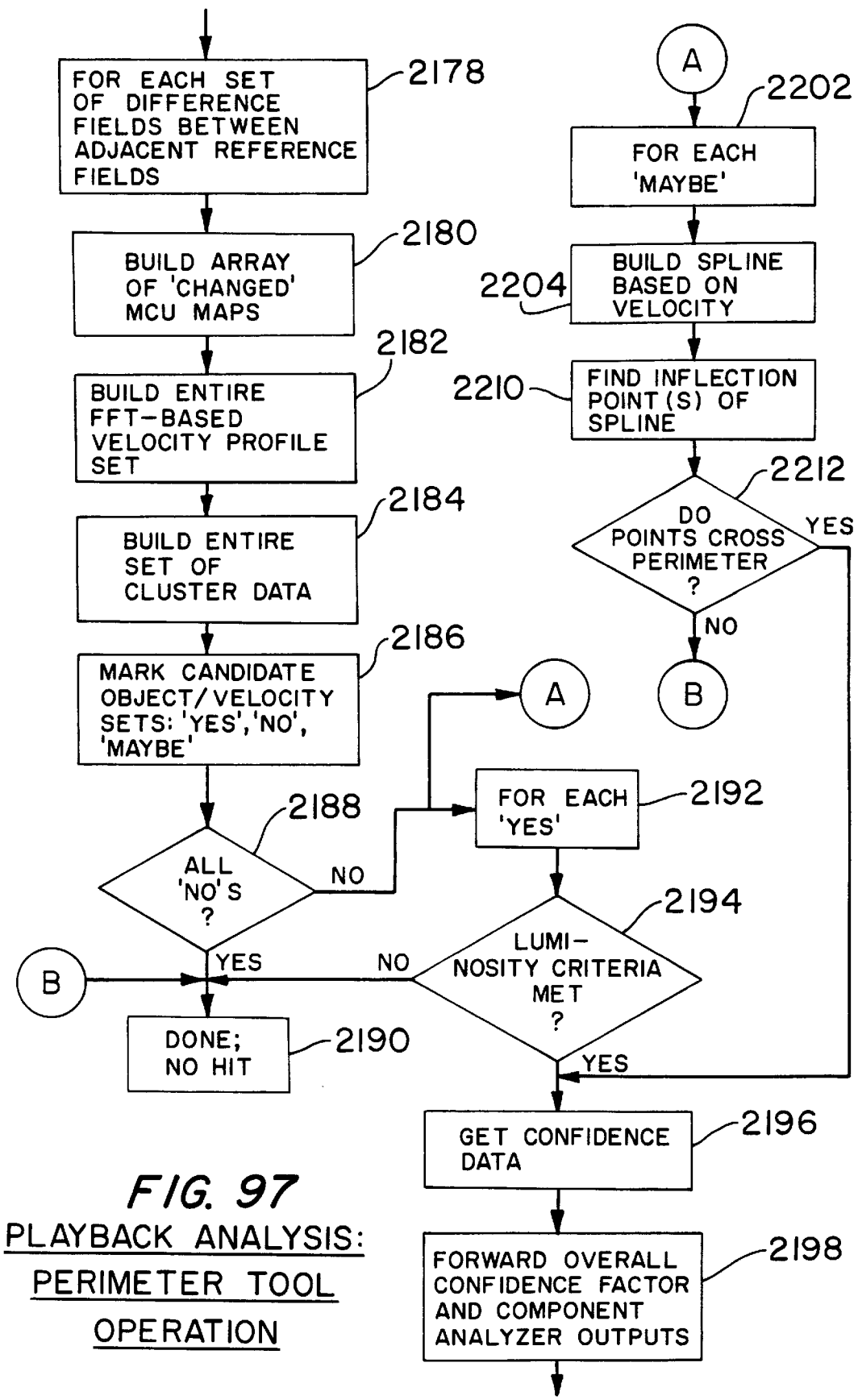
FIG. 97 illustrates in flow-chart form application of a perimeter violation detection image analysis algorithm to a reproduced video stream.

Turning to FIG. 97, an initial step 2178 indicates that the subsequent processing is carried out with respect to each set of difference fields in the reproduced sequence of video signals that is being analyzed. For efficiency in processing, preferred embodiments of the motion-based image analysis algorithms, when applied to reproduced video streams, disregard the "reference" images and operate, as noted before, on the changed MCU mapping data. As a result, a "hole" or "seam" in the sequence of images occurs at each reference image, but this is found not to cause serious shortcomings in the image analysis if a reasonably large number of difference images are provided in each interval between reference images. Of course, a larger number of difference images also produces a higher compression ratio, while trading off image quality and convenience in the case of reverse-direction reproduction. As noted before, a preferred embodiment of the VR/PC unit generates 32 difference fields between each pair of reference fields.

Continuing to refer to FIG. 97, the process applied to each set of difference fields includes a step 2180, at which an array of the changed MCU mapping data is generated, and a step 2182, at which a velocity profile set is formed from the MCU mapping data array, by using FFT (fast Fourier transform) processing or the like. Clusters of velocity vectors which may constitute objects are then assembled at step 2184, and each association of possible objects and velocity vectors is analyzed as per FIG. 95A to generate a "yes", "no" or "maybe" determination as to each object/velocity set (step 2186). A decision block 2188 follows step 2186. At step 2188, it may be determined that each object/velocity set has been marked "no", in which case step 2190 follows. Step 2190 is representative of ending the analysis process without detecting any violations of the perimeter.

For each object/velocity set marked yes (as represented by step 2192), that is, for each object/velocity set which met the criteria for indicating a violation of the perimeter, it is determined, at step 2194, whether the sensitivity (luminance) criteria were met. If so, a confidence level value is generated (step 2196), and the confidence level, as well as the values representing the outcomes of the object and velocity analysis, are generated as outputs (step 2198). As to each object/velocity set marked "maybe" (i.e., neither clearly indicative of a perimeter violation nor clearly not indicative of a perimeter violation), a process beginning at step 2202 is carried out. Initially, a spline based on the velocity history is generated (step 2204). An example of such a spline is shown as dotted line 2206 in FIG. 96. Then, an inflection point of the spline (indicated at 2208 in FIG. 96) is determined (step 2210) and then the decision is made as to whether the inflection of the spline has crossed the perimeter (step 2212). It will be seen from FIG. 96 that in the example shown therein, the inflection point 2208 of the spline 2206 did indeed cross the perimeter 2174.

In the case of a positive determination at step 2212, the steps 2196 and 2198, as previously described, are carried out. In the case of a negative determination at either one of steps 2212 or 2194, step 2190 (end of processing with no violation detected) takes place.

Figure 98:
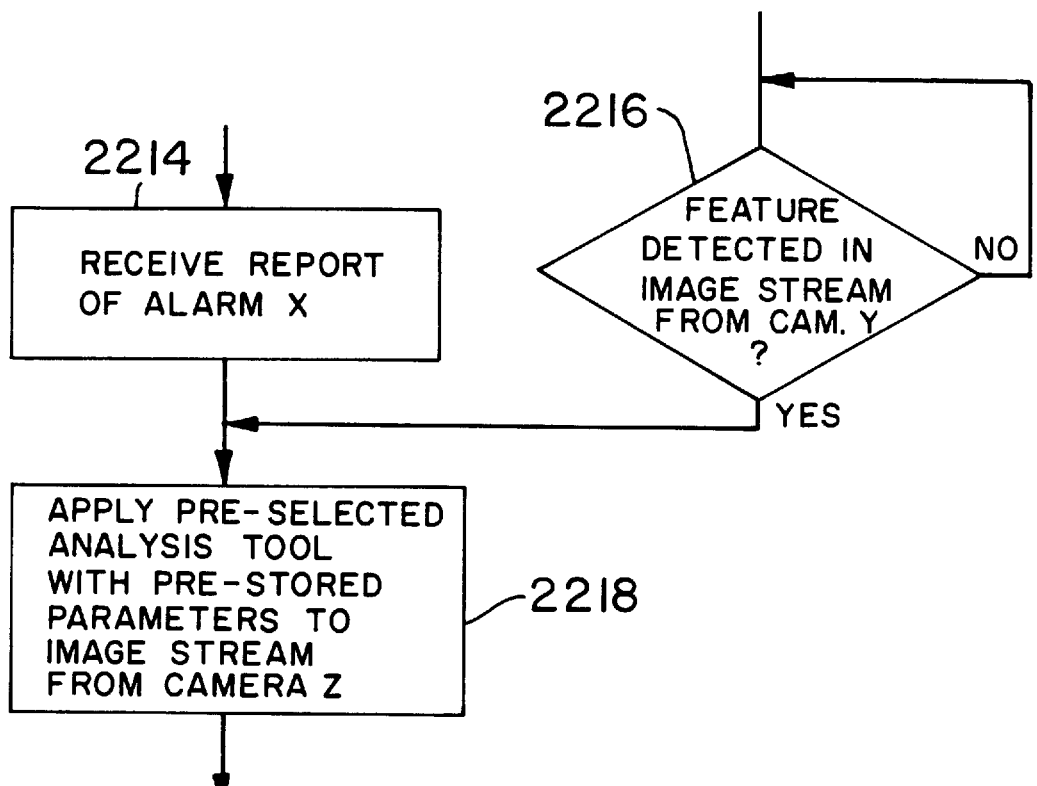
FIG. 98 illustrates in flow-chart form actuation of a live video analysis algorithm in response to occurrence of an event.

FIG. 98 illustrates processing steps which cause a preselected image analysis algorithm to be applied to a predetermined live video signal stream upon occurrence of certain alarm events. In FIG. 98, step 2214 indicates that an alarm signal provided by an external alarm sensor device or the like has been received. Step 2216 is a decision block at 2216 which indicates that a certain image analysis algorithm is being applied on a continuous basis to a live video image stream generated from a camera Y. Occurrence of either step 2214 or a positive determination (detection of image characteristics) at step 2216 causes step 2218 to be carried out. At step 2218, the pre-selected image analysis algorithm is applied to a live video image stream generated from a camera Z in accordance with parameters (such as a perimeter line location) that have been pre-stored. The image analysis algorithm performed in connection with step 2218 may, but need not, be similar to that applied in connection with step 2216. Moreover, camera Z may be considered the same as camera Y. In other words, detection of a feature that is of interest in a live video stream using a first analysis algorithm may automatically lead to application of a second analysis algorithm to the same live video stream.

ALTERNATIVE VIDEO DATA COMPRESSION TECHNIQUE

Figure 99:
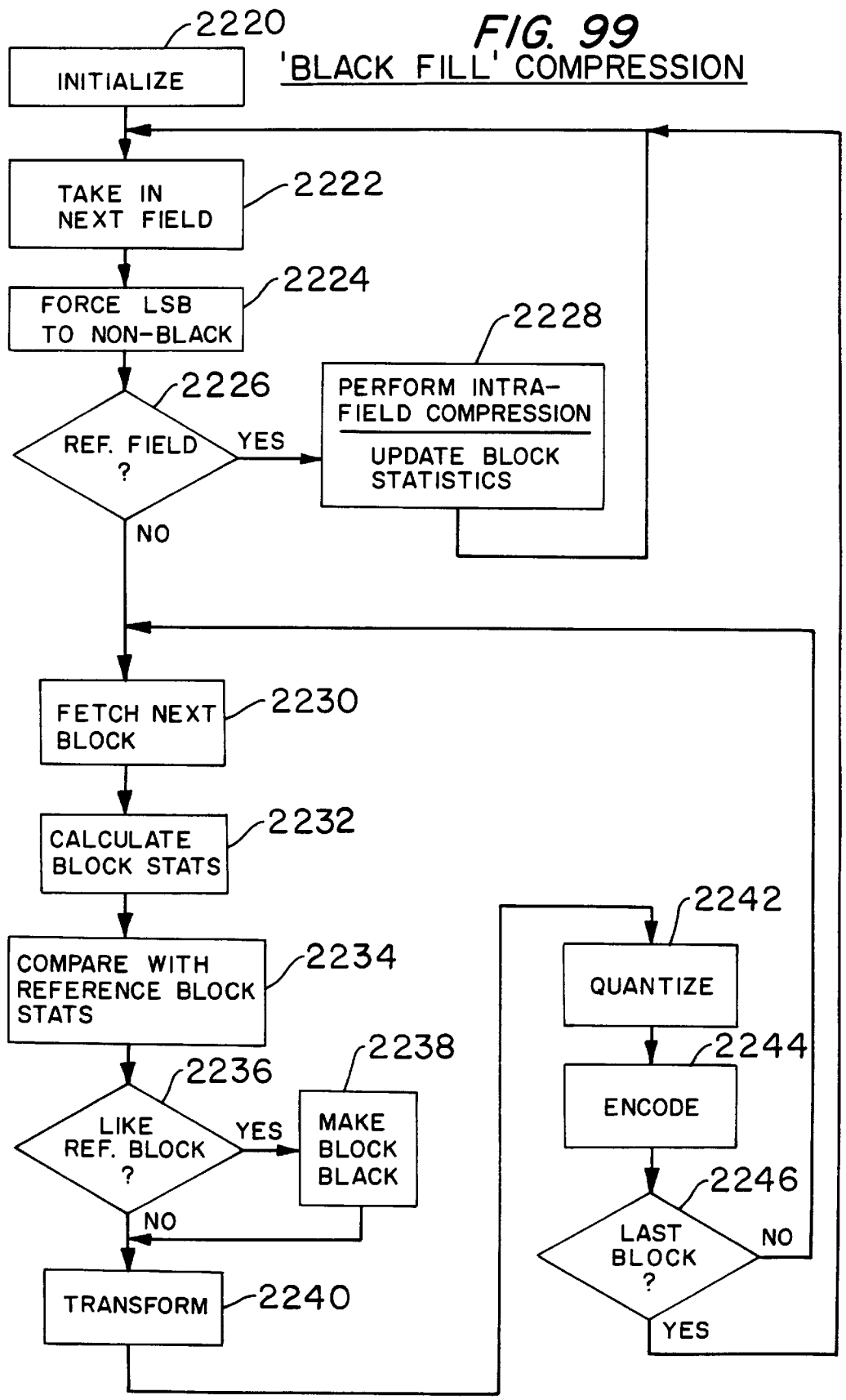
FIG. 99 illustrates in flow-chart form a video data compression technique provided in an alternative embodiment of the invention.
Figure 100:
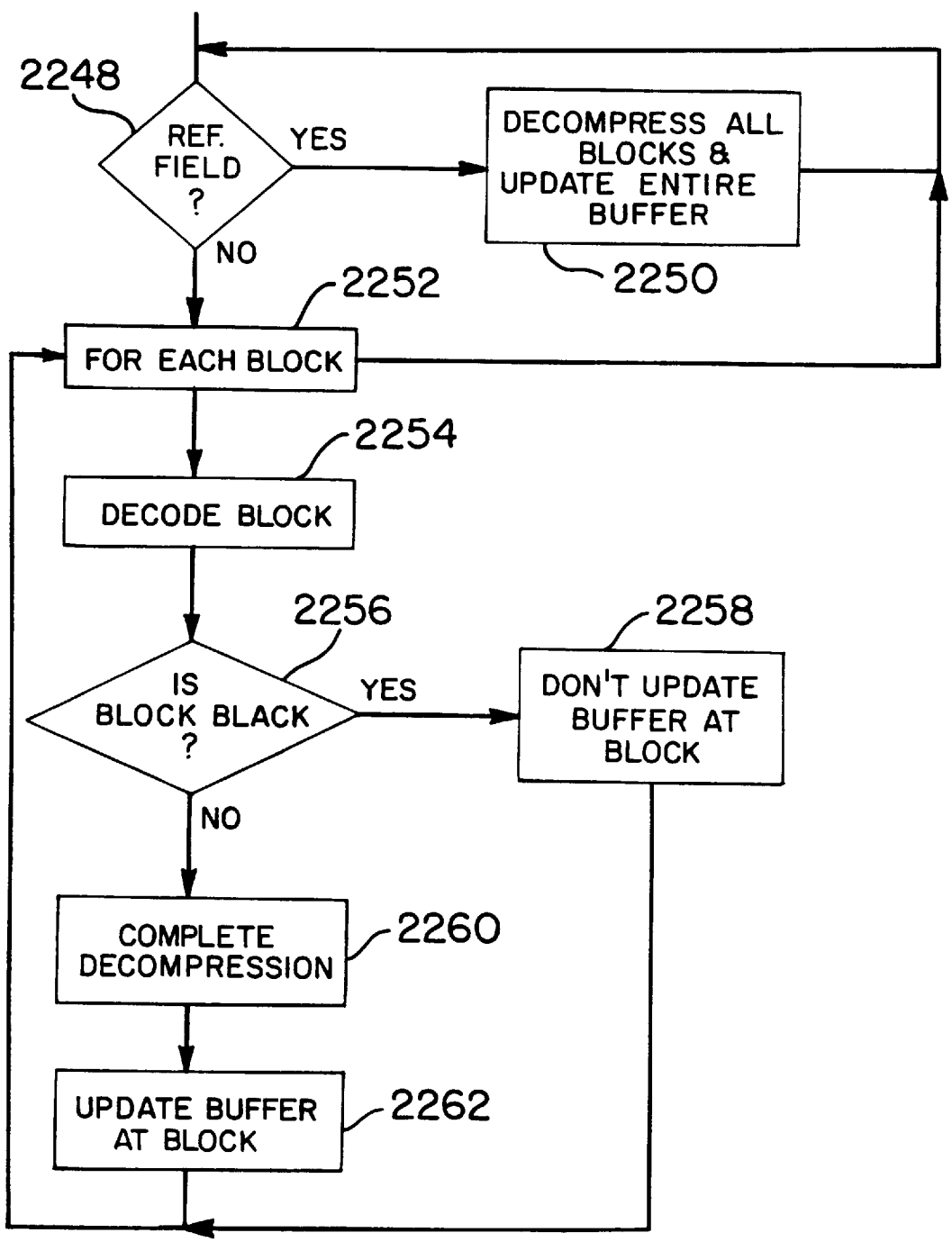
FIG. 100 illustrates in flow-chart form a decompression technique carried out with respect to data compressed according to the processing of FIG. 99.

FIGS. 99 and 100 illustrate processing performed according to a variation of the "postage stamp" compression technique that has previously been described herein. Essentially, in the variation of FIGS. 99 and 100, instead of simply omitting from storage "same" MCUs in difference. images, the "same" MCU portions of the difference images may be converted into an all black condition prior to JPEG encoding.

Turning to FIG. 99, an initialization step is performed (step 2220). Following step 2220, is step 2222, at which the next video data field to be encoded is received. After step 2222, is step 2224, at which the least significant bit of each pixel value is forced to assume a value that is inconsistent with a black pixel value. It is next determined (step 2226) whether the field being processed is a reference field. If so, step 2228 follows. At step 2228, JPEG compression is performed as to all of the blocks (as in the compression technique previously described), and the reference statistics for making "sameness" determinations are updated. The process then loops back to step 2222.

If at step 2226 it was found that the field to be processed is a difference field, then the next tile or MCU is fetched (step 2230) and characteristic statistics. are calculated (step 2232). The calculation of the statistics may use the checkerboard sub-sampling technique described above, or other suitable techniques, including diagonal sampling in the tiles or quadrants of tiles.

Following step 2232 is step 2234, at which the calculated characteristics are compared with reference characteristics, and at step 2236 a "sameness" determination is made. If at step 2236 the present MCU or tile is found to be "the same" as the reference tile or MCU, then all of the pixels making up the MCU or tile being processed are forced to values indicating a solid color black in the MCU or tile (step 2238).

Following step 2238 are steps 2240, 2242 and 2246, which represent the portions of the JPEG encoding technique which include orthogonal transformation, quantization and run length encoding. Accordingly, the blackened tile or block is JPEG encoded. However, if at step 2236 the tile or MCU being processed was found to be "different" from the reference statistics, then the JPEG encoding steps are performed with respect to the tile or MCU without first forcing the tile or MCU to be black.

The decision block indicated as step 2246 shows that the process loops back to step 2230 until the last MCU or tile or in the difference field has been processed, at which point the process loops back to step 2222. The decompression technique which corresponds to the "black-fill" postage stamp decompression technique of FIG. 99 is shown in FIG. 100. Initially in FIG. 100, is a step 2248, which represents a decision as to whether a reference field is now to be decoded. If so, all of the tiles in the field are JPEG-decompressed and the display buffer locations corresponding to the entire image plane are updated using the decoded tiles (step 2250). The process then loops back to step 2248.

If at step 2248 it was found that a difference field is now to be decoded, then a processing loop is performed as to each tile or MCU in the difference field (as indicated at step 2252). A first step in the loop is step 2254, at which the particular tile or MCU is JPEG-decompressed. It is then determined, at step 2256, whether the entire tile or MCU is black. If so, step 2258 follows, at which the display buffer locations corresponding to the tile or MCU are not updated. However, if at step 2256 it is found that the tile or MCU is not totally black, then the JPEG-decompression process relative to the block is completed (step 2260) and the "postage stamp" corresponding to the block is used to update the display buffer at the corresponding location in the image plane (step 2262).

The decompression technique of FIG. 100 can be summarized by saying that in the difference data fields, the black postage stamps are thrown away, and the non-black postage stamps are used to update the image plane. It will be noted that the technique just described in connection with FIGS. 99 and 100 lacks the changed MCU mapping data 1134 as in the initial "postage stamp" compression technique described, for example, in connection with FIG. 44. Thus, the data format and the processing of the technique shown in FIGS. 99 and 100 is somewhat simpler, but lacks the benefits for motion detection and backward-direction decompression provided by the mapping data. Also, the "black-fill" postage stamp technique provides a lower compression ratio. In addition, the dynamic range of the compressed video data provided by the technique of FIG. 99 is less than in the pure "postage stamp" technique since no compressed data pixel is permitted to have a true black value.

USER SELECTABLE DISPLAY/STORAGE OPTIONS

There will now be described, with reference to FIGS. 101A and 101B processing which permits the user to select spatial and temporal resolution options with respect to storage of incoming video signal streams.

First, a setup portion of the processing will be described with respect to FIG. 101A. At step 2264, the user is presented with temporal and spacial resolution options. Then, at step 2266, it is determined whether the user has selected a non-standard temporal resolution with respect to a given video signal stream generated by a given camera. An example of a non-standard temporal resolution would be a "time-lapse" recording mode which would cause the respective input stream to be recorded at a lower field rate (lower temporal resolution) than streams recorded with the standard resolution. If a positive determination is made at step 2266, then a suitable message is sent to the front end electronics (step 2268) so that the non-standard time resolution is implemented for the camera stream in question.

It is determined at step 2270 whether a non-standard spatial resolution is requested with respect to a given camera stream. Examples of non-standard spatial resolution would be using more or fewer than the system standard 240 horizontal lines to represent each video field of the camera stream in question. If a positive determination is made at step 2270, then a suitable message is sent to the video storage software component to implement the selected non-standard spatial resolution (step 2272).

Figure 101:
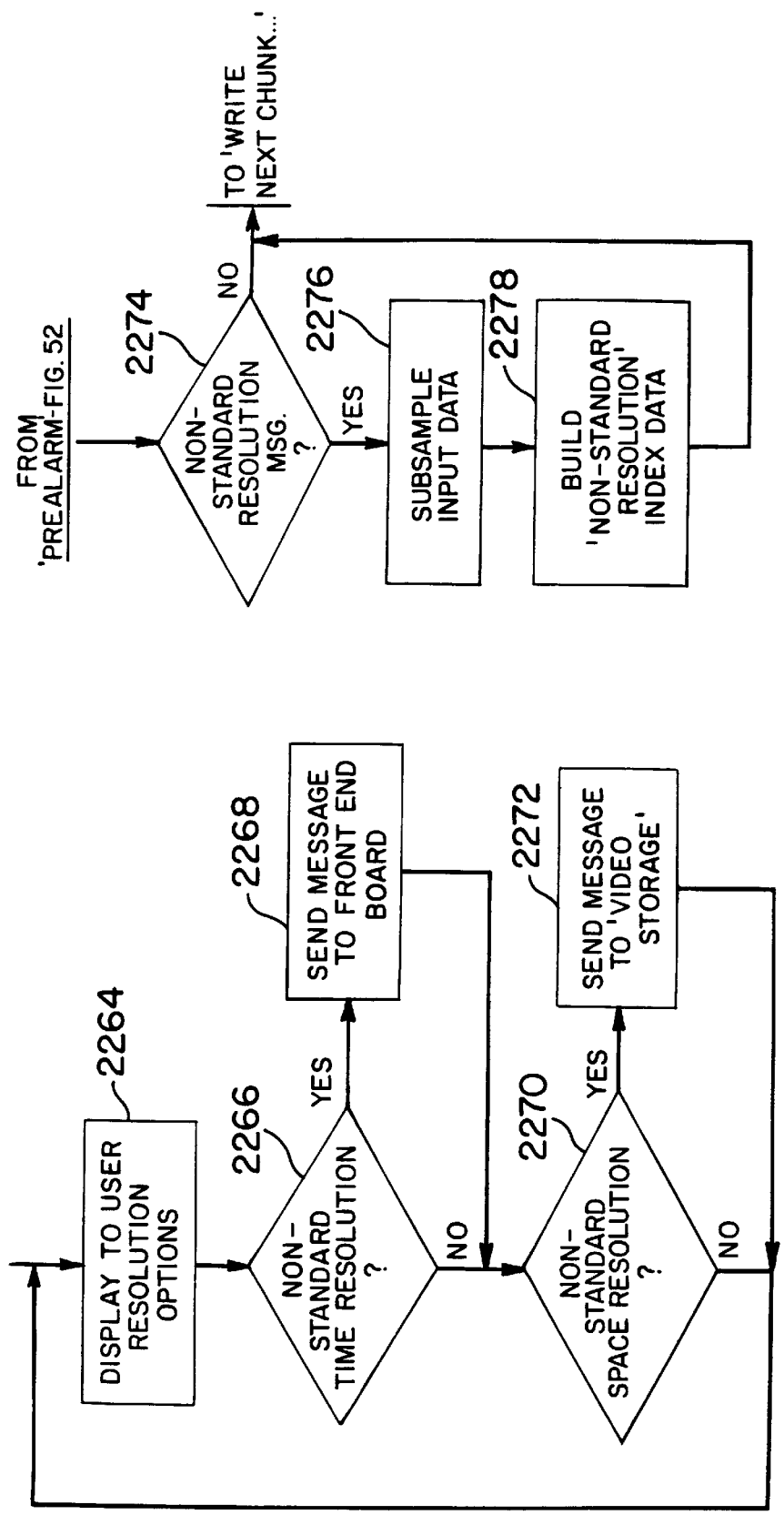

FIG. 101B represents processing performed to implement the resolution options discussed in connection with FIG. 101A. In particular, the processing shown in FIG. 101B represents steps entered upon a negative determination at block 1306 ("pre-alarm?") in FIG. 52 ("video storage" software component). In the processing of FIG. 101B, first it is determined whether a non-standard resolution message has been received with respect to the field being stored (step 2274). If such is not the case, then step 1308 of FIG. 52 is entered directly from step 2274 of FIG. 101B. However, if a positive determination is made at step 2274, then, for example, alternative lines of the field being stored may be omitted from storage (step 2276), and indexing data indicating a non-standard spatial or temporal resolution for the stored data is generated (step 2278).

Figure 102:
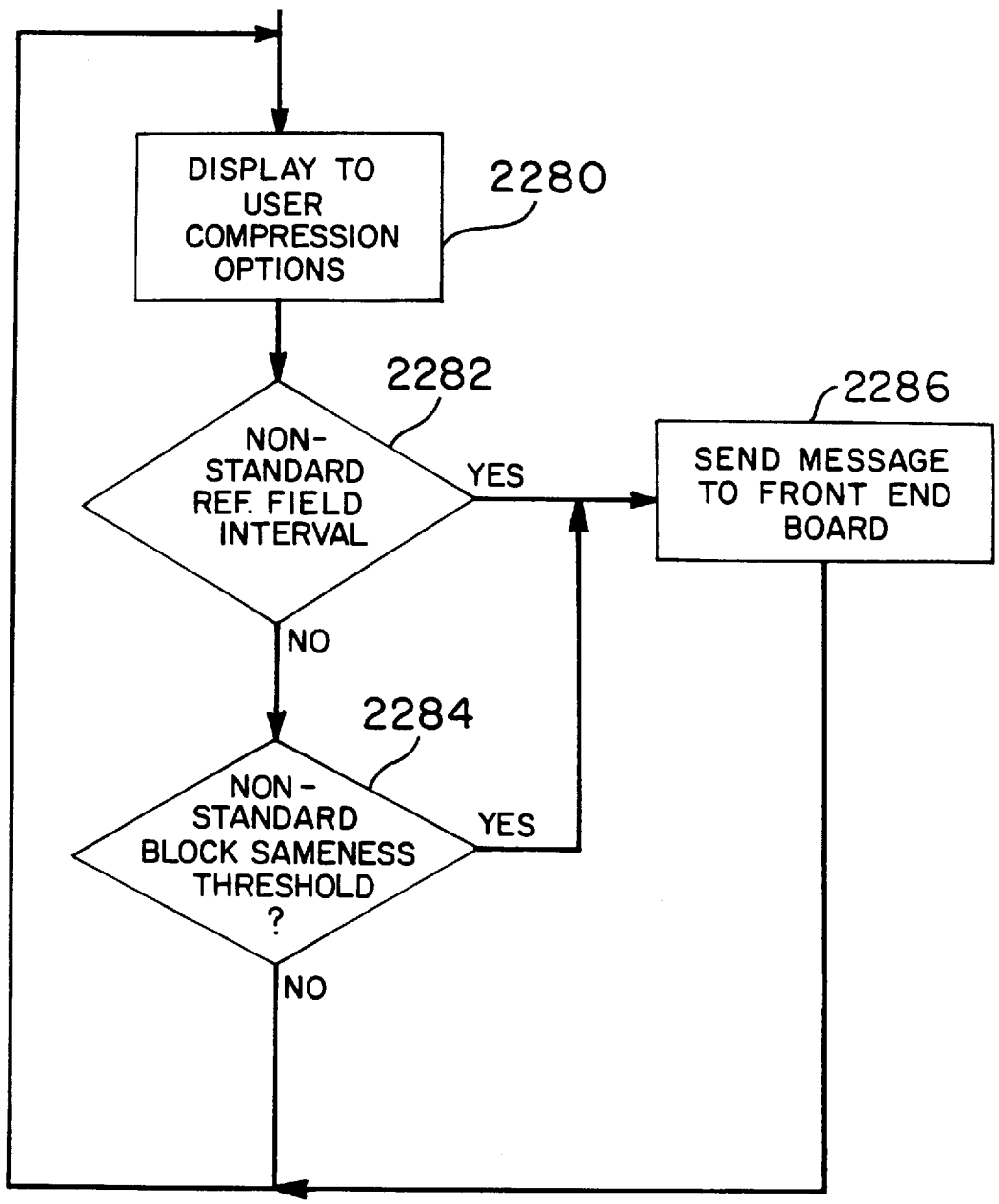
FIG. 102 illustrates in flow-chart form operation of the system to permit a user to adjust video data compression parameters.

FIG. 102 represents processing carried out to set a parameter related to compression of input video signal streams. The first step shown in FIG. 102 is step 2280, at which a screen display is provided to indicate to the user parameter setting options with respect to compression operations. The options will customarily entail trading off image quality against efficient use of the VR/PC unit's storage capacity. The options may include setting bit rates available for quantization operations in the JPEG chip 848 (FIG. 14), increasing the number of difference fields provided in each interval between reference fields, and/or adjusting a tile-sameness threshold used in determining whether to retain or discard tiles in difference fields. It is to be understood that the options presented to the user are settable camera-by-camera.

It is determined at step 2282 whether a non-standard interval between reference fields is selected. Moreover, it is determined at step 2284 whether a non-standard block-sameness threshold is selected. In the case of an affirmative determination at either one of steps 2282 and 2284, then step 2286 follows, at which a suitable message to implement the non-standard compression parameter is sent to the front end electronics. Although not shown in FIG. 102, if the user indicates a change in the quantization bit rate, a message to this effect is also sent to the front end electronics.

APPLICATIONS OF IMAGE ANALYSIS TOOLS IN DISTRIBUTED IVIM SYSTEM

There will now be described with reference to FIGS. 103A through 103C processing involved in downloading image stream analysis algorithms from a remote site, such as a local or master node, to the VR/PC unit.

The processing shown in FIG. 103A is presented from the point of view of the external device, e.g., the master or remote node. At step 2286, it is determined whether a remotely-located VR/PC unit has requested that a program routine corresponding to an image analysis algorithm be transmitted to the VR/PC unit from the master or local node (step 2286). If so, step 2288 follows, at which it is determined whether parameters to constrain execution of the algorithm will be set at the requesting VR/PC unit. Step 2292 follows step 2290, or directly follows step 2288 if the parameters are not set at the master or local node. At step 2292, the program routine corresponding to the requested analysis algorithm, with set parameters as the case may be, is downloaded to the requesting VR/PC.

FIG. 103B provides additional details regarding the step 2290 of FIG. 103A. In particular, at step 2294 of FIG. 103B, it is indicated that a reference image is uploaded from the requesting VR/PC unit to the master or local node at which the algorithm parameters are to be set. The updated reference image is then used at the master or local node in setting the algorithm parameters (step 2296).

Figure 103C:
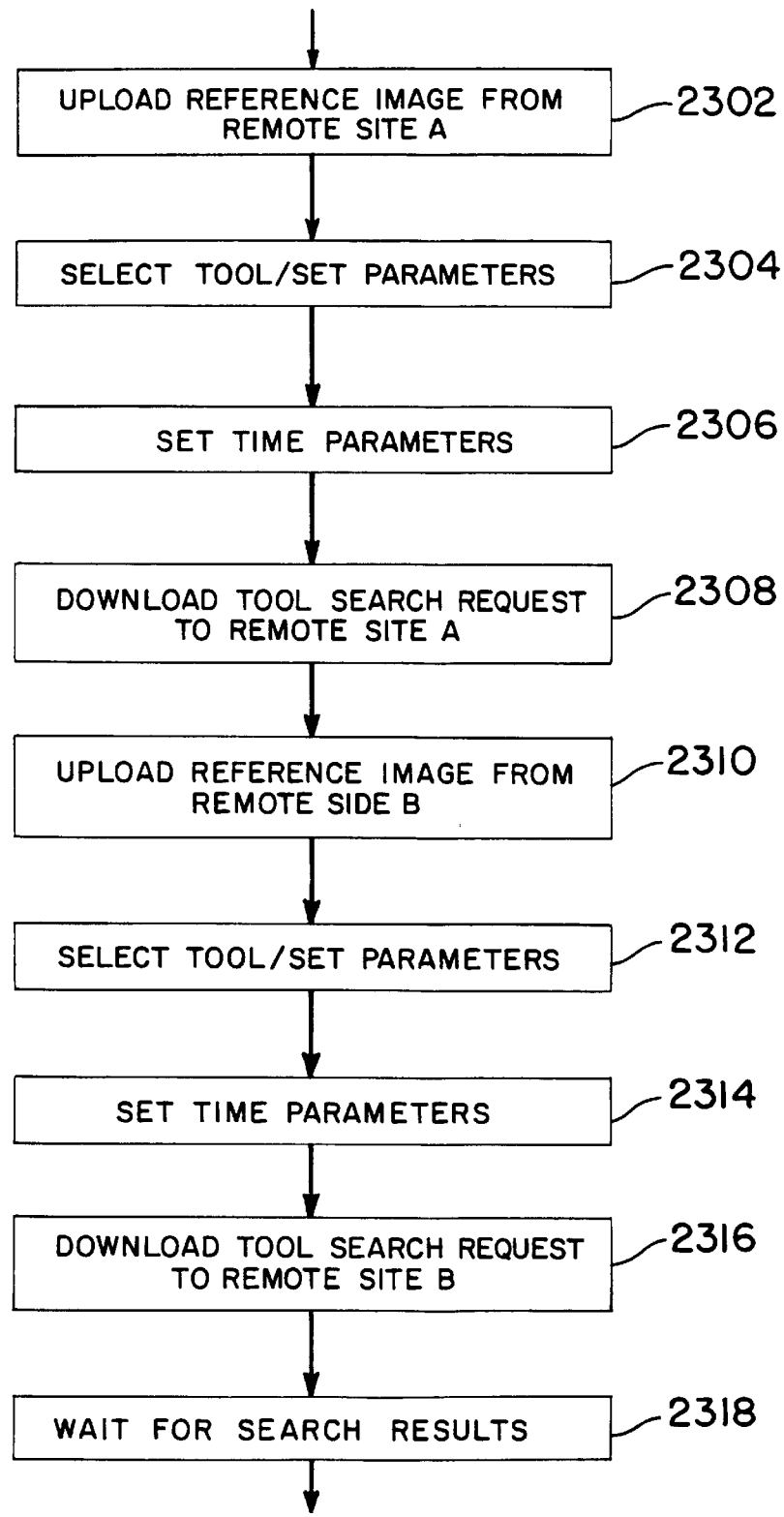

FIG. 103C illustrates processing which takes place at a master or local node when the node operates to initiate analysis-tool-based searches at two or more VR/PC units located remotely from the node device. Step 2302 is the first step shown in FIG. 103C. At step 2302, the node device initiates communication with a VR/PC unit at a first remote site to cause a reference image to be uploaded to the remote device from the first VR/PC unit. An image analysis algorithm is then selected at the node device, and parameter to constrain execution of the algorithm are set using the uploaded reference image (step 2304). Following step 2304 is step 2306. At step 2306, time parameters (begin and end times) are specified to indicate the time period of interest for the ensuing database search to be performed on the video data in the first VR/PC unit. After step 2306 is step 2308. At step 2308, a data message (or more precisely a sequence of data messages) are transmitted from the node device to the first remote VR/PC unit to download the selected analysis algorithm, the parameters set at the node device, and the time range of interest. Execution of the algorithm-based search of the video database at the first VR/PC unit proceeds at that point.

Following step 2308 are steps 2310 through 2316, which are the same as steps 2302 through 2308, except that steps 2310 through 2316 are performed with respect to a second VR/PC unit located at a site different from the location of the first VR/PC unit. As before, a reference image is uploaded (step 2310), analysis algorithm selection and parameter setting proceed at the node device, along with setting of the relevant time range (steps 2312 and 2314) and messages are sent to the second VR/PC unit to download the selected algorithm, with the parameters including the time parameters, to initiate a video database search carried on within the second VR/PC unit (step 2316). The final step in FIG. 103C is 2318, at which the node device waits for the VR/PC units to report the results of the respective searches carried on in each VR/PC unit. Another practice contemplated in the distributed IVIM system entails uploading a sequence of dynamic video image data fields from a VR/PC unit to a master or local node for application of an image analysis algorithm to the uploaded image sequence at the node. It is noted that this practice may not always be desirable because of the considerable transmission bandwidth and/or amount of time required to transmit the video data from the VR/PC unit to the node.

FIG. 104 represents processing which occurs to automatically transmit video information of interest upon detection of a characteristic of interest by an image analysis algorithm applied to a live input video stream. It is assumed that the processing in FIG. 104 is carried out in a VR/PC unit. Initially, in the processing of FIG. 104, it is determined whether an analysis algorithm applied to an input stream generated by camera X has detected a characteristic which the algorithm is intended to detect (step 2320). If so, the VR/PC unit operates to automatically transmit video data fields from the incoming camera X signal to an external device, such as a local or master node device (step 2322).

INTELLIGENT RESPONSES TO EVENTS

FIG. 105 illustrates processing carried out in a VR/PC unit to change a camera recording sequence upon detection of a characteristic of interest by means of image analysis of a live incoming video stream.

Initially, in FIG. 105 is step 2324 at which it is determined whether a characteristic of interest has been detected in the stream of video signals incoming from a first video camera. When such a characteristic is detected, step 2326 follows. At step 2326, a camera different from the first camera and up to this point not included in the recording sequence, is added to the recording sequence. For example, the two cameras may generate views of the same area from different angles. The first camera may normally be in operation with a motion detection analysis algorithm applied to the incoming stream from the first camera. When motion is detected, the second camera, normally "off line" (not recorded) is added to the recording sequence so that the motion event is captured from both angles. Although not indicated in FIG. 105, the response at step 2326 may also include permanently storing video signals generated through the second camera and present in a pre-alarm buffer as at blocks 1726 and 1728 of FIG. 75.

FIG. 106 illustrates a feature implemented in software by which detection of an image characteristic by an image analysis algorithm causes actuation of an additional image analysis algorithm. An initial block 2328 in FIG. 106 is the same as block 2324 in FIG. 105. If the image analysis algorithm represented by block 2328 detects the characteristic to which it is directed, then step 2330 follow step 2328. At step 2330, a predetermined image analysis algorithm, with pre-stored parameters, is retrieved from memory. Then step 2332 follows step 2330. At step 2332, the retrieved analysis algorithm is sent to the front end electronics to be applied to the incoming video image stream generated either by the same camera which was monitored using the algorithm referred to in 2328, or another incoming video stream, or both. The additional algorithm retrieved at step 2330 may be of the same type applied at step 2328, or may be substantially different.

FIG. 107 illustrates processing which causes video data compression parameters to be changed in response to detection of an alarm condition. As seen from FIG. 107, it is first determined, at step 2334, whether an alarm condition is detected. The alarm condition may be detected by input from an alarm sensor device, by analysis carried out on a live video stream using an image analysis algorithm, or by a signal input by a user of this system to declare an alarm condition. In any case, when an alarm condition is detected, step 2336 follows step 2334. At step 2336, a script is retrieved from memory designating a camera or cameras which are relevant to the detected alarm condition, and also indicating updated compression algorithm parameters which are to be applied because of the detected alarm condition. Typically, the alarm-actuated compression parameters would be such as to provide improved image quality. Thus, the number of bits available for quantization in the JPEG encoding process would be increased, the number of difference images in each interval between reference images would be reduced, and/or the "sameness" threshold for comparing difference field tiles with reference tiles would be lowered.

Following step 2336 is step 2338. At step 2338 the updated compression parameter retrieved at step 2336 is sent to the front end electronics with instructions to compress the designated camera video stream in accordance with the updated compression parameter.

Figure 108:
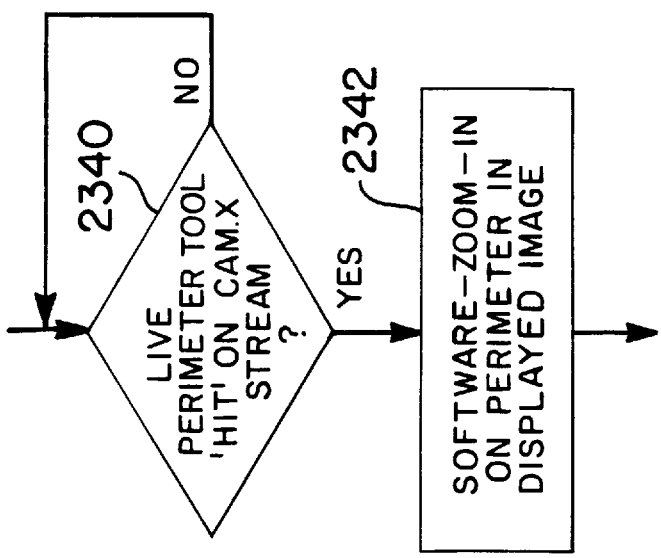
FIG. 108 is a flow-chart which illustrates an automatically actuated software zoom-in operation in response to detection of a predetermined condition by a live video analysis algorithm.

FIG. 108 illustrates an example of how an effective field-of-view of a camera is changed in response to detection of an image characteristic using an image analysis algorithm applied to a live incoming video stream. It is assumed for the purposes of FIG. 108 that a perimeter violation detection algorithm, as previously described, is being applied to a live video stream generated by a camera designated as camera X. At step 2340 it is determined whether a perimeter violation has been detected. If so, step 2342 follows. At step 2342, a zoom-in operation is carried out by processing the incoming video stream from camera X so that the portion of the image plane corresponding to the designated perimeter is magnified. In this way, a larger portion of the image plane is devoted to what is likely to be the most important information in the image stream, namely, features at or near the designated perimeter.

Figure 109:
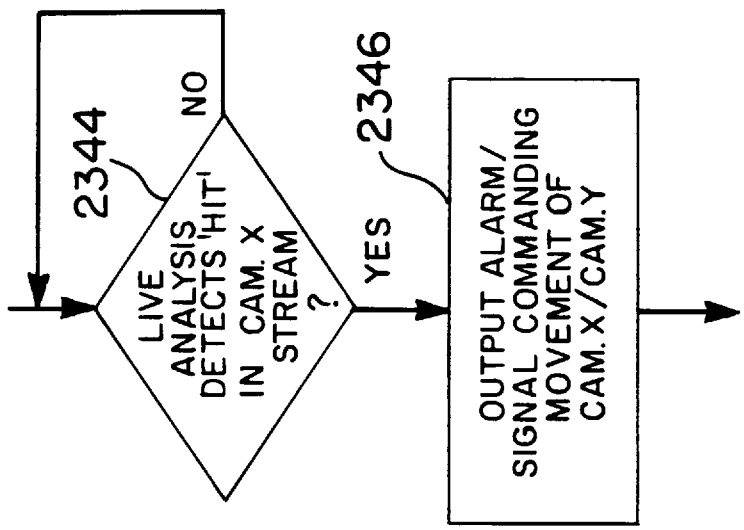
FIG. 109 is a flow-chart which illustrates operation of the system to automatically actuate a movement of a video camera in response to detection of a predetermined condition by live video analysis.

FIG. 109 illustrates another example of automatically changing a camera's field of view in response to detection of an image characteristic by an image analysis algorithm applied to a live incoming video stream. The initial step 2344 shown in FIG. 109 is the same as step 2324 in FIG. 105. If at step 2344 it is found that the feature of interest has been detected, then step 2346 is carried out. At step 2346, a predetermined alarm output is generated and/or a signal is generated to cause a predetermined movement of either the camera from which the video stream is monitored at step 2344 and/or predetermined movement of a different camera. The predetermined camera movement or movements may be carried out with a predetermined targeting algorithm as is described in U.S. Pat. No. 5,526,041.

FIG. 110 illustrates processing in which a predetermined action or actions are taken in response to detection of two different characteristics of an incoming video stream. It is determined at step 2348 whether a first characteristic is present in an incoming stream of video images, by application of a first image analysis algorithm. If at step 2348 it is determined that the predetermined characteristic has been detected by the first analysis algorithm, then step 2350 follows, at which it is determined whether a second predetermined characteristic has been detected in the same incoming video stream using a second analysis algorithm. If so, step 2352 follows. As indicated in FIG. 110, step 2352 is entered only if a positive determination is made at both of steps 2348 and 2350.

Step 2352 represents performance of one or more of the following actions: Changing the displayed image of the incoming video stream (e.g., by increasing the vertical resolution or temporal resolution); selecting a storage medium in which the incoming video stream is to be stored (e.g., transmitting data representing the video stream to an external device such as a local or master node); transmitting a signal to cause an automatic targeting or other movement of the camera generating the incoming video stream or a different camera; and/or selecting an additional image analysis algorithm to be applied to the incoming video stream of a different video stream. The process shown in FIG. 110 can be thought of as applying a logical combination of two analysis "tools", particularly in this case, an AND combination of the two tools. It is further contemplated that other logical combinations of analysis tools could be employed to detect an event condition, or to trigger a predetermined response, and so forth. For example, an event condition could be declared when any one of two or more tool "hits" are detected. This would constitute an OR combination of two or more tools. (As will be understood from the previous sentence, logical combinations of more than two analysis tools are also contemplated.) Moreover, there may be employed other logical operators such as NOR, NAND, XOR, etc., and also complex logical combinations including two or more operators.

The user may be presented with a screen display (not shown) which permits construction of a desired logical combination of analysis tools from available choices of tools and logical operators. The user would also be permitted to select a camera stream or streams to which the analysis tools are to be employed, and also to set parameters relevant to the selected tools.

FIG. 111 shows a process in which application of a live image analysis algorithm is inhibited when the camera generating the video stream to which the algorithm is to be applied is in motion; or when there is an alarm condition relevant to the camera. In FIG. 111, step 2354 indicates a determination whether an alarm condition relevant to a certain camera (designated camera X) is present. The alarm condition may be detected through an alarm sensor device, through live image analysis, or may be actuated by user input.

Step 2356 indicates a determination as to whether camera X is in motion. This determination may be made based on whether a camera movement signals is received from the camera control device 528 (FIG. 1).

Continuing to refer to FIG. 111, a step 2358 is entered if a positive determination is made at either one of steps 2354 and 2356. In step 2358, a suitable message is sent to the front end electronics to inhibit application of an image analysis algorithm to the live video stream generated by camera X. Where an alarm condition relevant to camera X has been detected, it may be beneficial to inhibit live analysis of the camera X video stream so as not to unduly prolong the alarm condition. Also, it may be desirable to inhibit live analysis of the camera X video stream when camera X is in motion, because it may not be possible, depending on the nature of the image analysis algorithm, to generate a meaningful analysis with respect to a video stream generated by a moving camera.

FIG. 112 illustrates another feature designed to handle the situation in which a video stream is being generated by a moving camera. In FIG. 112, the first step, which is step 2360, is the same as step 2356 in FIG. 111. If at step 2360 it is determined that a camera X is in motion, then step 2362 follows. At step 2362, a message is sent to the front end electronics to add an indication (e.g., set a bit value in the video data field headers for the camera X video stream) to show that the video data fields in question were generated while the camera is in motion. The header data may later be used, upon reproduction of the video data fields captured by a moving camera, either to inhibit a post-recording image analysis algorithm, or as a cue for specialized processing by an image analysis algorithm. As an alternative to step 2362, the in-motion indicator in the header data may be added at the motherboard CPU during the recording process, and/or may be added in indexing data generated during recording of the video stream on the hard disk.

Figure 112A:
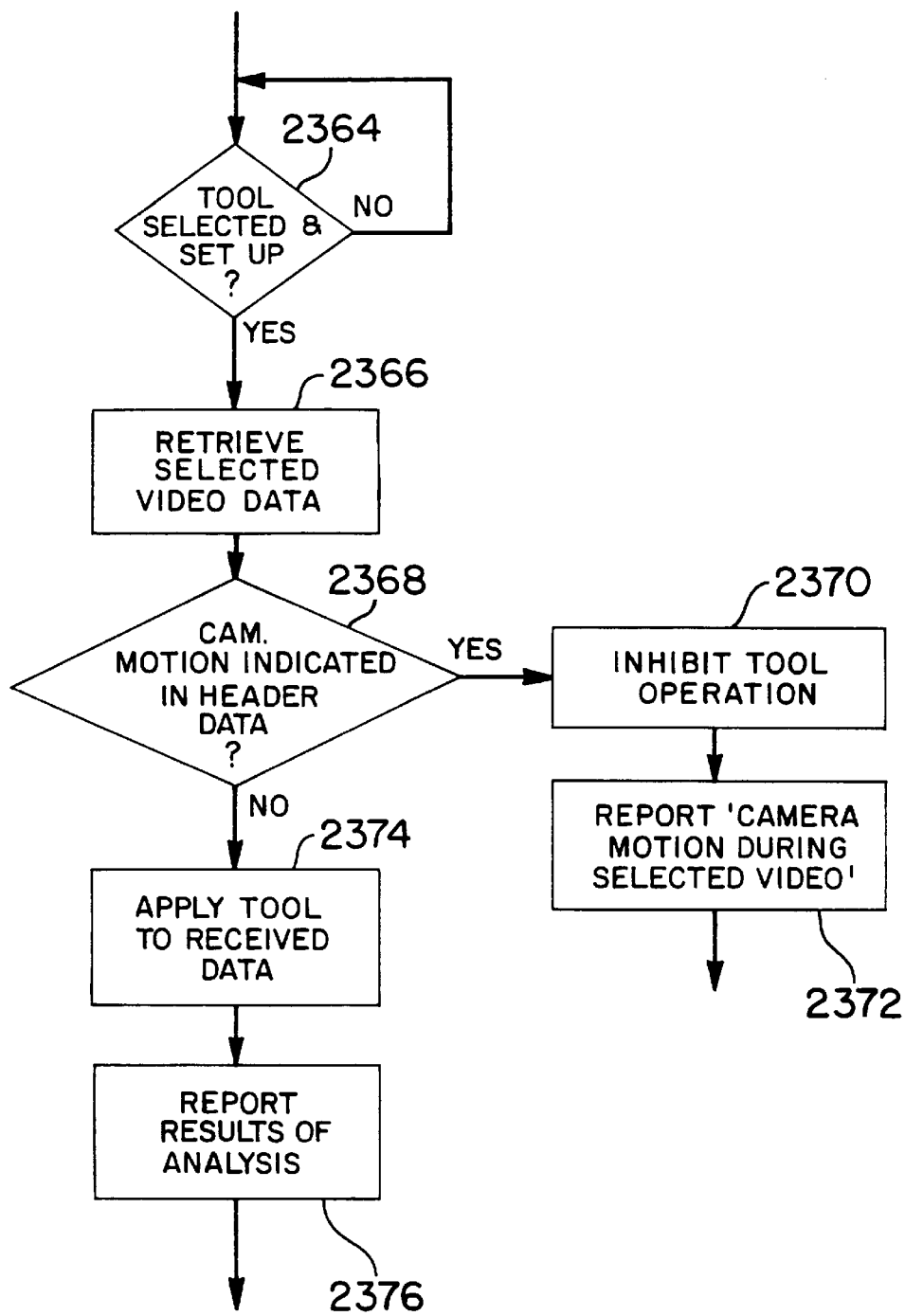
FIG. 112 is a flow-chart which illustrates operation of the system to store header data indicating that a camera which is generating an input video stream is in motion.

FIG. 112A illustrates a process in which the camera-in-motion indicator is used to inhibit subsequent application of an image analysis algorithm. The first step shown in FIG. 112A is step 2364. At step 2364, it is determined whether an image analysis algorithm has been selected, and parameters set, for application of the algorithm to a video image stream reproduced from the hard disk. If so, then the video stream to be analyzed is retrieved from the hard disk (step 2366). Following step 2366 is step 2368. At step 2368, it is determined whether the header data accompanying the reproduced video data fields indicates that the camera which generated the video data fields was in motion at the time the fields were generated. If so, step 2370 follows step 2368. At step 2370, the performance of the selected image analysis algorithm is inhibited, and then a messaging reporting that there was camera motion during the selected video stream is generated (step 2372). On the other hand, if no motion indication is found at step 2368, then the image analysis algorithm is applied, and the results of the algorithm are reported, in accordance with the usual practice as previously disclosed herein (steps 2374 and 2376).

It would be understood that the motion indication may be carried in index data rather than a header data, in which case step 2368 entails examining the index data for the motion indication.

Figure 113:
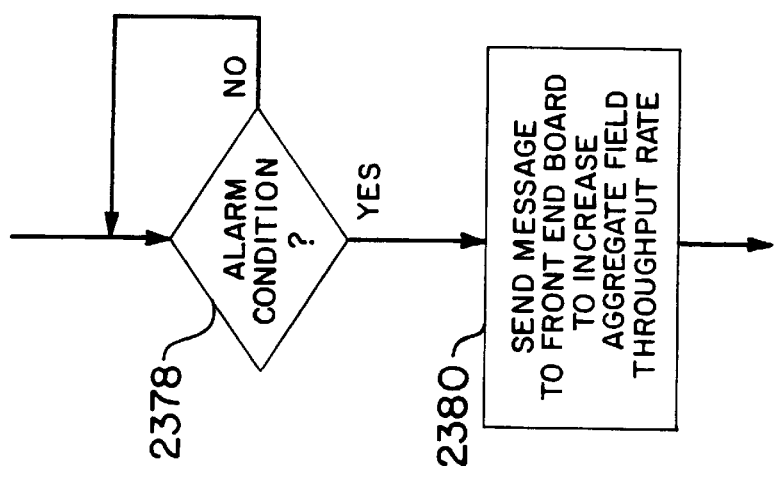

FIG. 113 illustrates the processing by which an overall rate at which video data fields are captured and stored is increased when an alarm condition is detected.

In FIG. 113, step 2378 indicates a determination as to whether an alarm condition is detected. The alarm condition may be detected based on a signal received from an alarm sensor device, by application of an image analysis algorithm to a live video image stream, or by actuation of an alarm signal by a user of the system. If an alarm condition is found to be present at step 2378, then step 2380 follows. At step 2380, the VR/PC unit, and particularly the front end electronics portion thereof, is switched over from a first mode in which video data fields are captured and stored at a first rate to a second mode in which the video data fields are captured at a higher aggregate rate. For example, it is contemplated that when no alarm condition is present, the VR/PC unit operates to capture and store 30 fields per second. The aggregate 30 fields per second, may, for example, be allocated in sequence to each of the cameras connected to the VR/PC unit. But when an alarm condition is detected, the aggregate field capture rate may be increased to 45 fields per second. The 45 fields per second being captured and stored may be allocated according to the same sequence as before, or, more preferably, 15 or 30 of the fields per second may be allocated to one or two cameras of particular interest, and the remaining field recording slots would then be allocated to a sequence of the other cameras. A sequence in which fields generated by an alarm-relevant camera are interleaved with a sequence of fields from other cameras has been discussed above in connection with FIG. 76.

Figure 114:
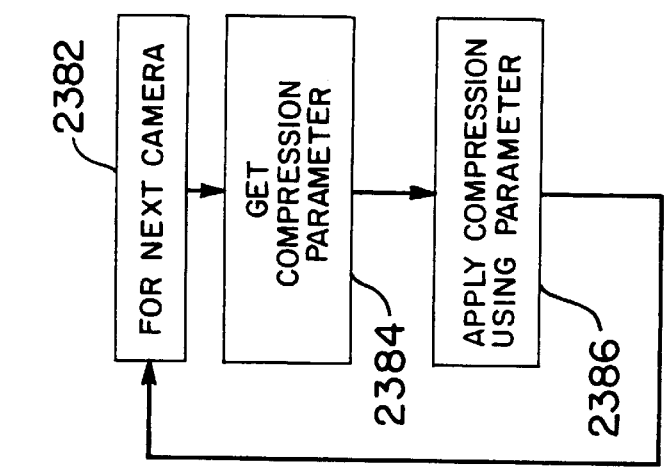

FIG. 114 illustrates a process by which different compression parameters are applied, respectively, to incoming video streams received from different cameras. Step 2382, which is the first step shown in FIG. 114, indicates that the subsequent steps 2384 and 2386 are performed for each camera as it is selected for recording in the sequence of cameras to be recorded. At step 2384, the process retrieves for the next camera to be recorded the compression algorithm parameter which determines how much difference there can be between a tile of a difference video data field and the reference field without considering the difference field tile to be "different" from the reference field tile. At step 2386, the compression algorithm is applied to the difference field data using the compression parameter retrieved at step 2384.

Figure 115:
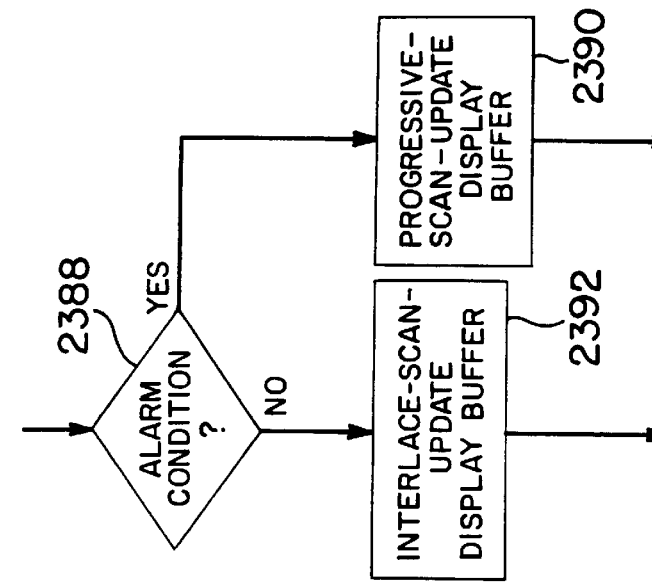

FIG. 115 represents a process by which detection of an alarm condition causes a display buffer to be updated in a different manner than when no alarm condition is present. The first step in FIG. 115 is step 2388, which is the same as step 2378 of FIG. 113. If it is determined at step 2388 that an alarm condition is present, then the display buffer is updated so that the entire buffer is updated at each field display interval (step 2390). On the other hand, when no alarm condition is found to be present, step 2392 is performed. At step 2392, only some of the display buffer locations are updated at each display cycle. For example, an interlace updating technique may be applied, whereby display buffer locations corresponding to even line pixels are updated at a first display cycle and then in the next display cycle, the remaining (odd line) locations are updated, and that the alternating updating of even and odd line display buffer locations is carried out for subsequent display cycles.

VR/PC UNIT PERFORMS MAJOR FUNCTIONS SIMULTANEOUSLY

Figure 116:
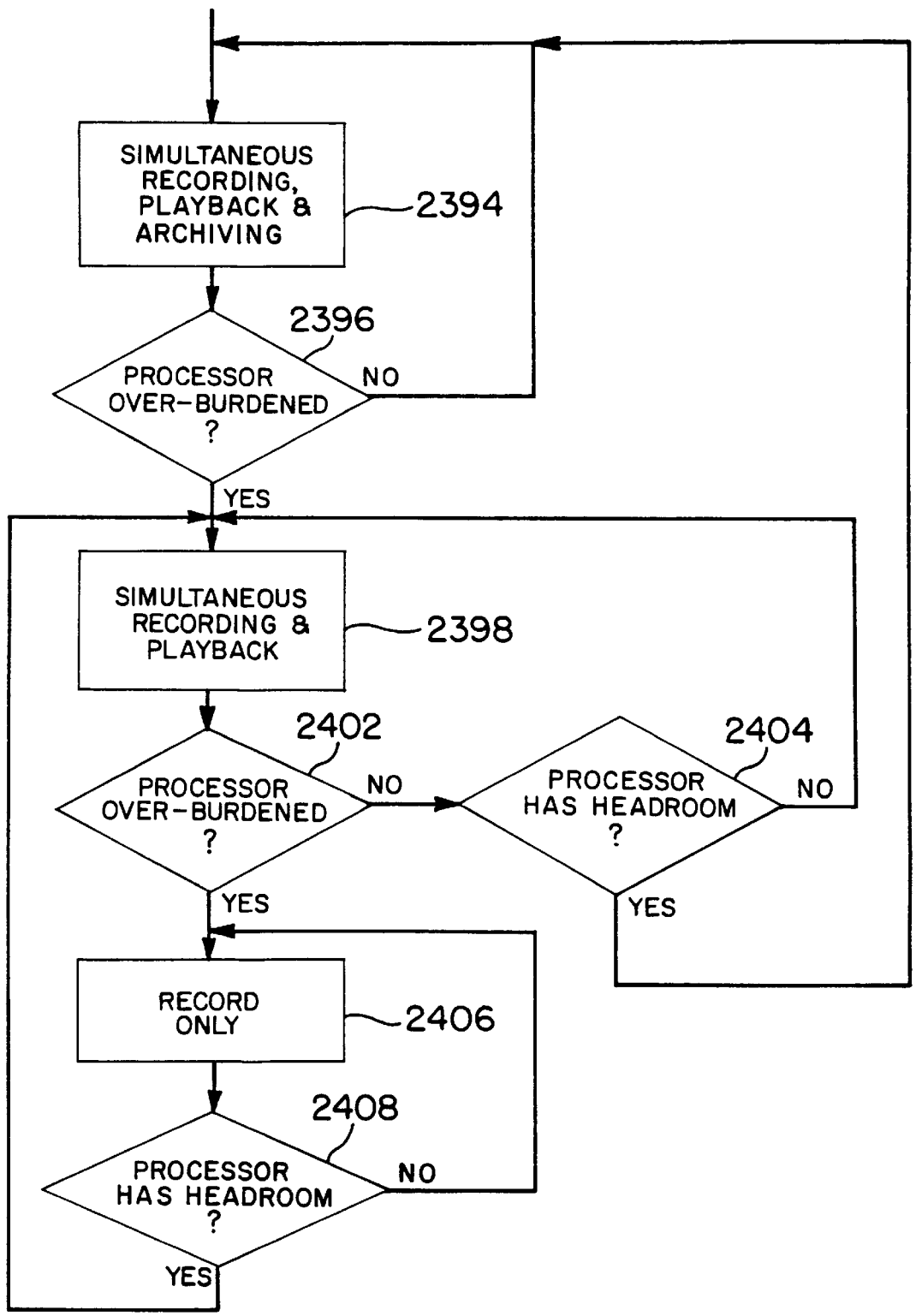

FIG. 116 represents a process by which the VR/PC unit resolves conflicts among the recording, playback and archiving functions carried out in the VR/PC unit.

The quantity of data to be handled during recording, playback and archiving is subject to dynamic variations. For example, there may be times when neither playback nor archiving is carried out. Or, the quantity of video information to be played back or to be archived may vary. In addition, the rate at which video data is generated for recording is subject to variation depending upon the aggregate rate at which video fields are captured, the degree of compression achievable as to the incoming video streams, the resolution and compression parameters selected by the user, and other factors.

The VR/PC unit disclosed herein is intended to be operable simultaneously for recording, playback and archiving operations. As used herein and in claims that may be appended hereto, the term "simultaneous" should be understood both literally and in a virtual sense. As an example of a literally simultaneous recording and playback operations, one may consider a case in which a video display monitor is displaying a signal indicative of a video image stream reproduced from the hard disk, while at precisely the same instant video data generated by one or more cameras connected to the VR/PC unit is being written onto the hard disk. "Virtual" simultaneity can be achieved by multi-tasking operation of the motherboard CPU by which independent recording, playback and archiving control threads are contemporaneously maintained. As will be understood by those of ordinary skill in the art, maintenance contemporaneously of the recording, playback and archiving threads involves time division multiplexing of the processing cycles carried by the CPU to serve the recording, playback and archiving threads among others. Through the multi-tasking operations, activities corresponding to all three of the recording, playback and archiving threads are carried on repeatedly within short periods of time that are, for example, small portions of a second.

Of course, the number of processing cycles carried out by the motherboard CPU within a given period of time is finite. Moreover, the rates at which data can be written to or read from the hard disk drive(s) are also finite. There accordingly may be situations in which simultaneous recording, playback and archiving operations are constrained by either CPU processing capacity or hard disk access rates. FIG. 116 indicates how such constraints are managed in a preferred embodiment of the VR/PC unit.

The first step shown in FIG. 116 is step 2394, at which simultaneous recording, playback and archiving operations are maintained. Following step 2394 is a step 2396, at which it is determined whether the processor (and/or hard disk access bandwidth) is over burdened by the three simultaneous recording, playback and archiving threads. If not, the process simply loops back to step 2394. However, if the processing capacity is found to be over burdened at step 2396, then step 2398 follows, at which only simultaneous recording and playback are maintained. Thus, archiving is accorded a lower priority than either one of recording and playback. Following step 2398, is step 2402. At step 2402, it is determined whether the simultaneous recording and playback operations are overburdening the capabilities of the processor (and/or the hard disk access bandwidth). If such is not the case, then it is determined at step 2404, whether there is sufficient processing and hard disk bandwidth available to support archiving as well as recording and playback. If so, the process returns to step 2394. Otherwise, the process returns to step 2398.

If at step 2402 it was found that recording and playback were over burdening the processor or exceeding the disk access capabilities, then the playback operation is halted and recording alone is carried out (step 2406). Thus, it can be seen that recording is accorded a higher priority than both playback and archiving.

Following step 2406 is step 2408. At step 2408, it is determined whether the processor has a predetermined amount of unused capacity, and if so, step 2398, with simultaneous recording and playback, is reinstituted. However, if the predetermined amount of unused capacity is not present, then the recording-only operation of step 2406 is maintained.

The flow-chart presentation of FIG. 116 should be understood as somewhat simplified, in that cases such as simultaneous recording and archiving without playback are not addressed. However, it should be understood that recording is always accorded priority over playback and archiving, and playback is always accorded priority over archiving.

Figure 117A:
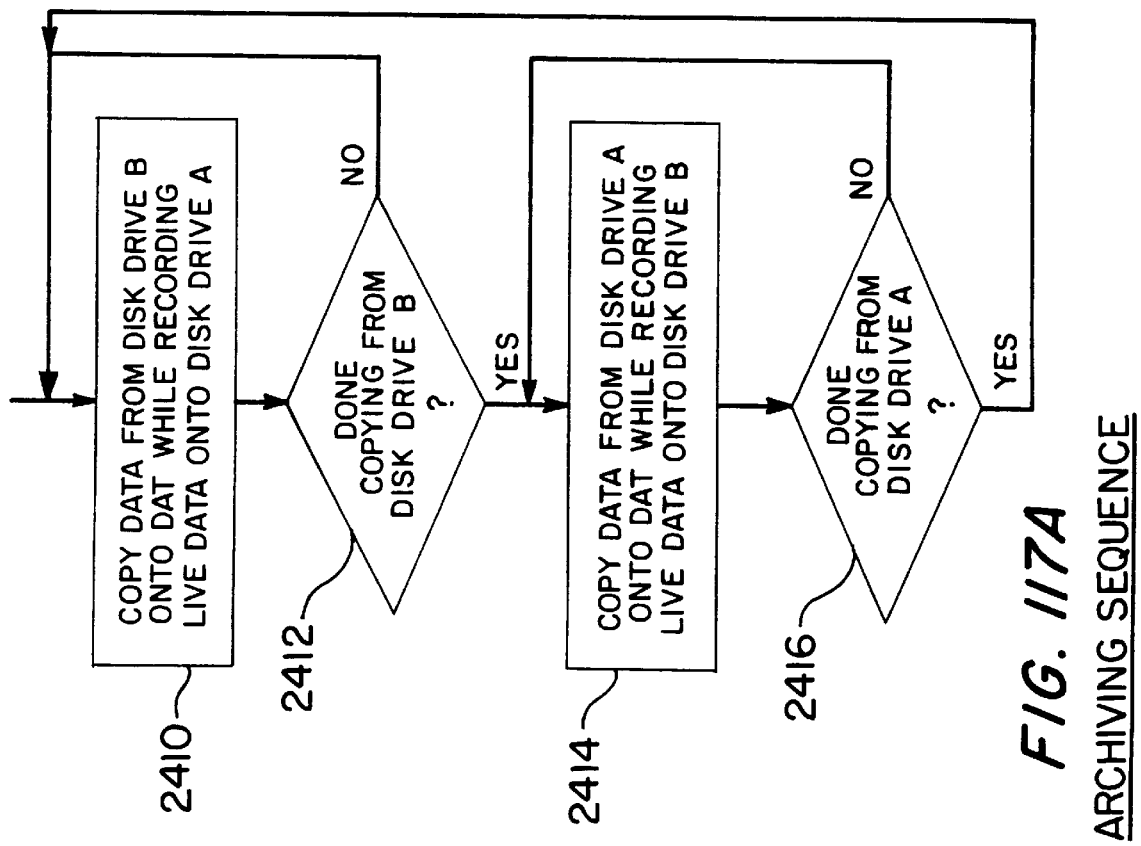

FIG. 117A is illustrative of processing carried out during simultaneous recording and archiving operations. According to the first step of FIG. 117A, which is step 2410, data is copied from a disk drive (designated disk drive B) onto the removable recording medium (e.g., digital audio tape) used for archiving, while simultaneously incoming video stream data is recorded onto another disk drive, designated disk drive A. Following step 2410 is step 2412, at which it is determined whether all of the video data has been copied from disk drive B onto the archive medium. If not, step 2410 continues. However, once the copying of the data from disk drive B is complete, copying of the data from disk drive A onto the archive medium begins, while using disk drive B to record the incoming video data stream (step 2414). At step 2416 it is determined whether all of the video data has been copied from disk drive A onto the archive medium. If not, step 2414 is maintained. However, once the archiving from disk drive A is complete, the process returns to step 2410, with archiving from disk drive B and live recording on disk drive A.

Figure 117B:
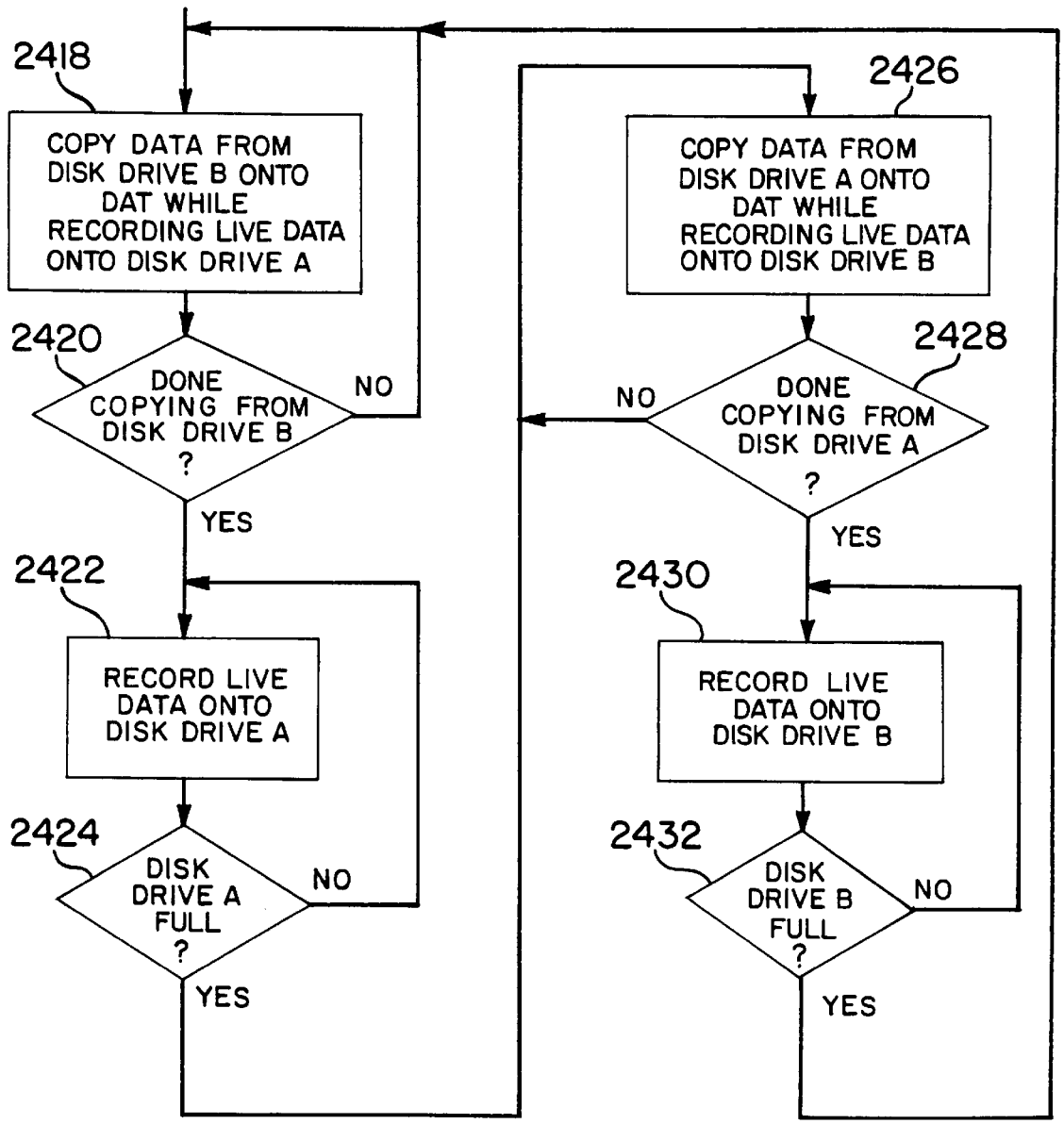

The process carried out in FIG. 117A can be summarized by saying that the point in time at which the disks are switched over from archiving to recording is driven by completion of the archiving. FIG. 117B presents an alternative technique, in which the live data continues to be recorded on a first disk, even after all of the video data on the other disk drive has been archived. The process shown in FIG. 117B starts with a step 2418, which is the same as step 2410 of FIG. 117A. In FIG. 117B, step 2418 is followed by step 2420. Step 2420 is the same as step 2412 of FIG. 117A. That is, it is determined whether all of the video data on disk drive B has been copied onto the archive recording medium. If not, step 2418 is maintained. However, if the copying from disk drive B is complete, then step 2422 follows, at which the archiving is no longer carried on, but the incoming video data continues to be recorded on disk drive A. Following step 2422 is step 2424. At step 2424, it is determined whether the entire storage capacity of disk drive A had been utilized (or, alternatively, whether a predetermined proportion of the recording capacity has been used). If not, step 2422 continues. However, if disk drive A is full or the predetermined quantity level has been reached, then step 2426 follows. Step 2426 is the same as step 2414 of FIG. 117A, and signifies that live recording has been switched over from disk drive A to disk drive B, while copying of the recorded video data from disk drive A onto the archive medium is initiated. At step 2428, it is determined whether the archiving from disk drive A is complete. If not, step 2426 is continued, but if the archiving from disk drive A is complete, then step 2430 follows, at which archiving is no longer carried out, but live data recording onto disk drive B continues. At step 2432 it is determined whether the disk drive B is full. If not, recording onto disk drive B continues, but otherwise step 2418 is entered again. That is, live recording switches back to disk drive A and archiving from disk drive B begins again.

For the purposes of FIGS. 117A and 117B it has been assumed that the full recording capacity of one disk drive is never reached before archiving from the other disk drive is complete. If this ever turns out not to be the case, it is contemplated to switch the live recording over from the full disk drive to the disk drive being archived. It should also be understood that playback operations may be carried on simultaneously with the recording and archiving operations discussed in connection with FIGS. 117A and 117B.

A technique to prevent one disk from filling up before the other has been completely archived is presented in FIG. 118. It is assumed for the purposes of FIG. 118 that recording is being carried on one disk drive while archiving of the other disk drive takes place. At step 2434, an estimate is made of the time at which the archiving operation will be completed, taking into account the rate at which archiving is taking place and the quantity of data remaining to be achieved. At step 2436, an estimate is made as to the time at which the recording capacity of the disk being used for recording will be exhausted. This estimate is made, for example, based on the remaining unused storage capacity, and the rate at which data is being recorded.

At step 2438, it is determined whether the archiving operation will be completed before the other disk drive becomes full. If the archiving will be completed first, then the process loops back to step 2434. However, if it appears that the capacity of the other disk will be reached before archiving is complete, a message is sent to the front end electronics to reduce the aggregate rate at which video data fields are being captured for storage (step 2440). In this way, the storage rate is reduced to permit archiving to be completed on the other disk.

USER-FRIENDLY FEATURES OF THE VR/PC UNIT

Figure 119:
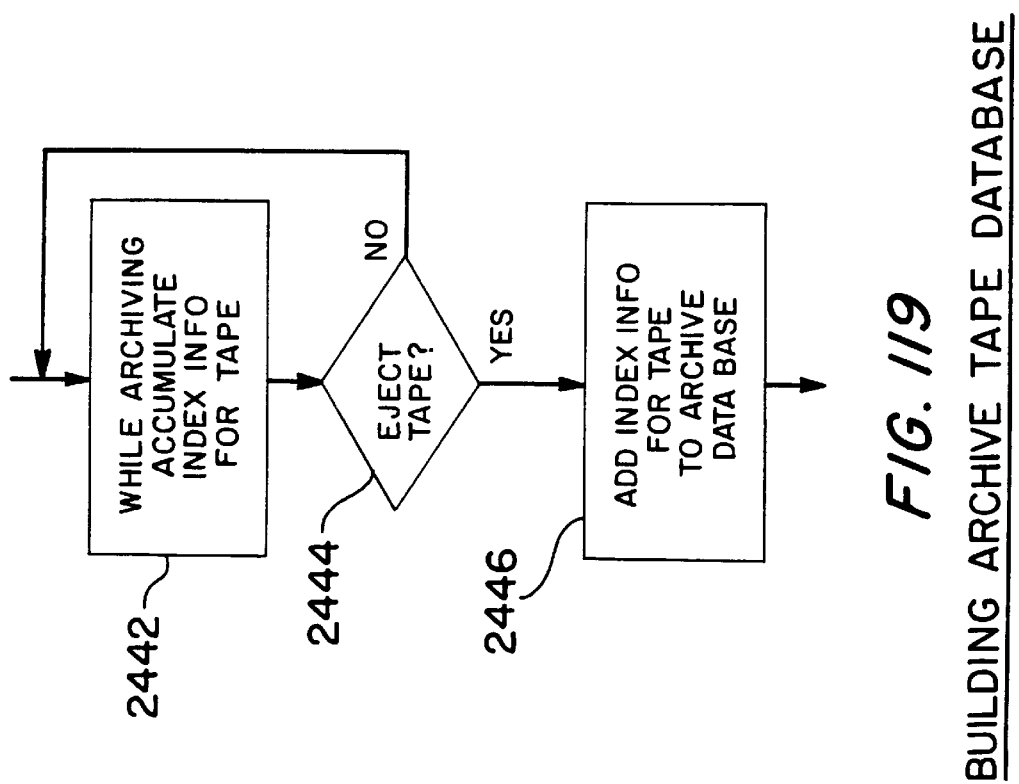

FIG. 119 shows a process for generating a database, to be maintained on the hard disk of the VR/PC unit, for storing index information regarding archiving tapes that have previously been recorded by the VR/PC unit. In FIG. 119 the first step, which is step 2442, calls for accumulating index information for an archiving tape while the archiving is going on. At step 2444, it is indicated that the accumulation of the index information for the archiving tape continues until the archive tape is ejected. At that point, the accumulated index information for the ejected tape is added to the archive database maintained on at least one of the hard disks in the VR/PC unit (step 2446). The user is permitted to access the archive tape database, so that the VR/PC unit can assist the user in managing the video data stored on the archive tapes.

Figure 120:
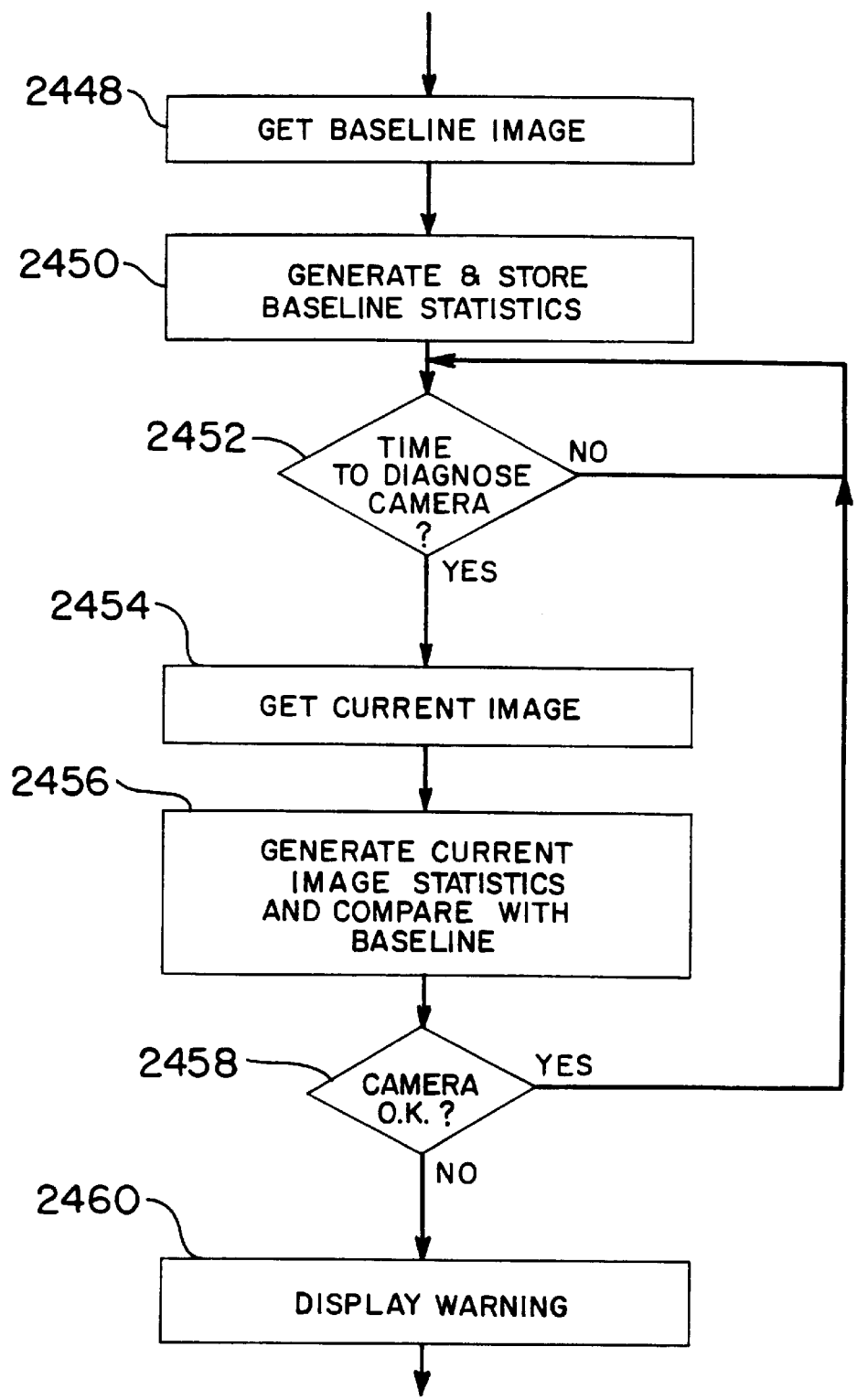

FIG. 120 shows a process whereby the VR/PC unit operates to automatically diagnose the onset of malfunctions in cameras connected to the VR/PC unit. Typical video cameras have limited service life and tend to experience a degradation in function over time. Typical problems encountered in aging video cameras are a loss of focus, and "blooming", i.e. a tendency for a number of pixel locations to generate a brighter output than is actually present in the scene. The process shown in FIG. 20 enables the VR/PC unit to automatically track and diagnose deterioration in camera characteristics over time.

In a first step in FIG. 120, designated as step 2448, an image generated by the camera is captured immediately or soon after the camera is first connected to the VR/PC unit. Following step 2448 is step 2450. At step 2450, a statistical analysis of the data corresponding to the image captured at 2448 is carried out to generate a set of baseline statistics to be used when analyzing subsequently captured images generated by the camera. Preferably, the baseline statistics include one or both of statistics indicative of high-frequency components of the image signal and statistics indicative of a color distribution in the image data. The baseline statistics are then stored on a hard disk within the VR/PC unit.

It is indicated at step 2452 that periodically after generation of the baseline statistics an automatic diagnosis of the camera is to be carried out. For example, the automatic diagnosis process may be carried out at regular intervals, such as weekly or monthly, after the initial installation of the camera. The first step in the automatic diagnosis is step 2454, at which an image currently generated by the camera is captured. Then, at step 2456, statistics corresponding to the baseline statistics are generated from the current image data and are compared with the baseline statistics. Then, as indicated by step 2458, it is determined on the basis of the comparison of the current image statistics with the baseline statistics whether the camera continues to exhibit satisfactory performance. For example, a substantial reduction in the high frequency component of the current image signal, in comparison to the baseline high frequency component statistics, may indicate that the camera no longer exhibits satisfactory focus. Similarly, a substantial shift in the distribution of the color data may indicate that there is excessive blooming in the camera's pickup elements. To avoid false findings of camera malfunctions, it is advisable that the images gathered for diagnosis purposes be generated under the same lighting conditions as for the baseline image. This may be done, for example, by taking both the baseline and subsequent images at night under controlled lighting conditions.

If at step 2458 it is found that there is a substantial change in the image statistics indicating unsatisfactory camera function, then appropriate steps may be taken, such as displaying a warning (step 2460), to indicate that the camera is not functioning properly. Although automatic diagnosis of only a single camera is illustrated in FIG. 120, it is to be appreciated that the process of FIG. 120 may be applied to all cameras connected to the VR/PC unit, with appropriate variations in timing as to the capture of the baseline statistics and subsequent capturing of auto-diagnosis images.

There will now be described, with reference to FIG. 121, a process whereby the VR/PC unit generates data to be used in providing a status information display to a user. An example of such a status display is provided in FIG. 149.

Figure 121:
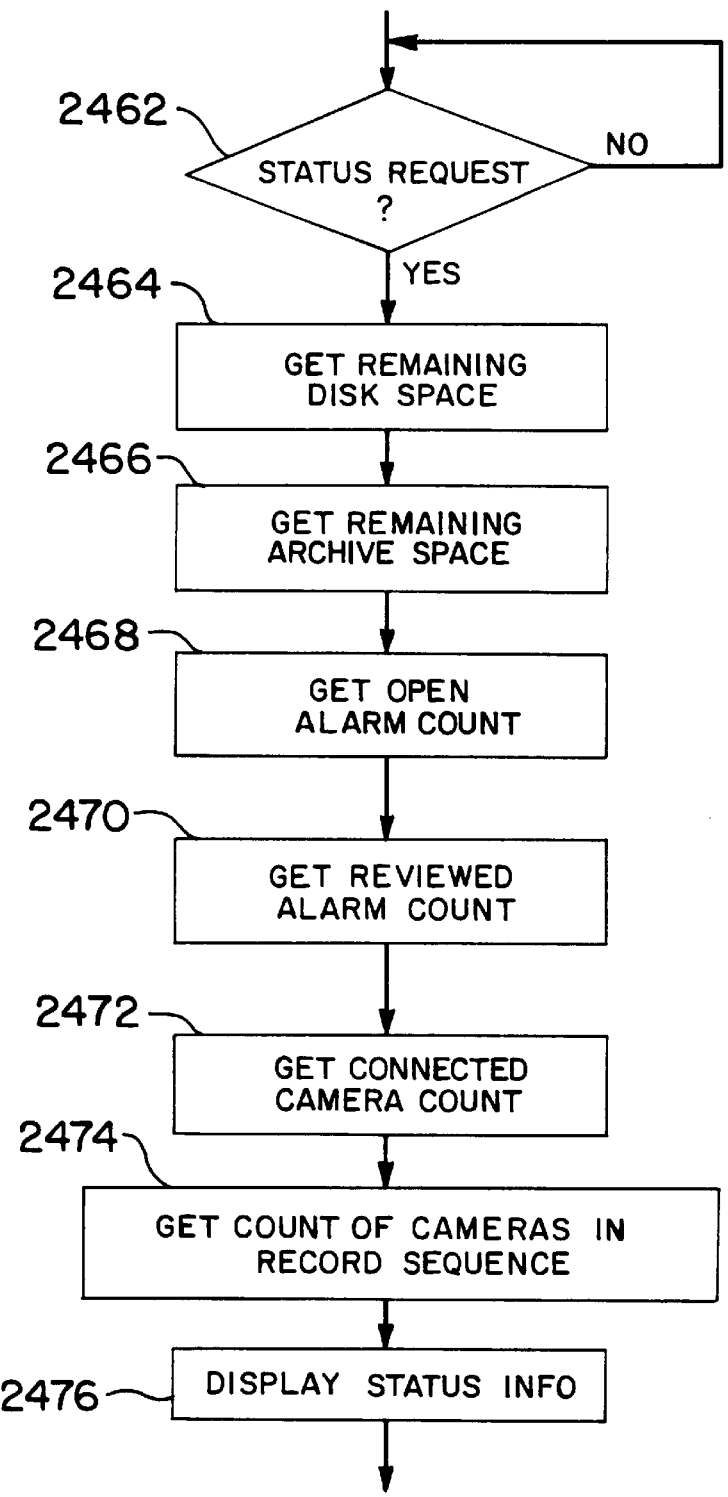

The process of FIG. 121 commences with a step 2462, at which it is determined whether the user has requested that system status information be displayed. The request for the status display may be entered, for example, by actuating the status button 646 provided on the front panel (FIG. 6).

Continuing to refer to FIG. 121, if a status request display is requested, then step 2464 follows step 2462. At step 2464, the motherboard CPU determines how much recording capacity remains unused on the disk drive or disk drives included within the VR/PC unit. Then, at step 2466, it is determined how much unused recording capacity remains on the recording medium (digital audio tape) loaded within the internal archive DAT drive. Next, at step 2468, it is determined how many alarm event conditions have been noted and not reviewed by the user. Following step 2468 is step 2470, which generates a count of alarm event reports that have been reviewed but not deleted. Following step 2470 is step 2472. At step 2472, the motherboard CPU generates a count of the number of cameras connected to the VR/PC unit, and at step 2474, the number of those cameras which are in the active recording sequence are counted. Finally, at step 2476, all of the data gathered at steps 2464 through 2474 is used to generate the status information display screen (FIG. 149).

FIG. 122 illustrates a feature of the VR/PC unit which permits a user to conveniently shift from viewing a reproduced video image stream generated by a first camera at a given time to a reproduced video image stream generated at the same time by a different camera. A first step shown in FIG. 122 is step 2478. At step 2478, an image stream generated at a certain point in time in the past by a first camera is reproduced from the hard disk and displayed on the display monitor. An example of a playback display format, such as is provided in step 2478, is shown in FIG. 12. The screen display of FIG. 12 includes a video image display area 2479, in which the reproduced image generated by a camera (assumed to be camera 1) is shown. For the purposes of this example, it is assumed that the image stream displayed in the area 2479 was generated by camera 1 at 10:00 a.m. on the previous day.

Referring again to FIG. 122, step 2480 follows step 2478. At step 2480, it is determined whether a different camera is selected for playback. If not, the reproduction of the image stream generated on the day before by camera 1 continues (step 2478). However, if the user actuates one of the camera selection buttons 650 (FIG. 6) other than the button corresponding to camera 1, then it is understood at step 2480 that the other camera (say camera 2) has been selected. In that case, step 2482 follows step 2480. At step 2482, the motherboard CPU operates so as to search for, reproduce and display the video image stream generated by camera 2 (the selected camera) at the same time (10:00 on the previous day) that the currently displayed playback video was generated by camera 1. Following step 2482 is step 2484, at which the VR/PC unit causes the display monitor to shift to a split-screen display mode (not shown in FIG. 12), in which the video image streams respectively generated by cameras 1 and 2 at 10:00 a.m. on the previous day are simultaneously displayed.

It should be noted that the camera selection detected at step 2480 may be carried out by using the mouse to actuate one of the virtual camera selection buttons displayed on FIG. 12, as an alternative to actuating the corresponding front panel camera selection button 650.

Figure 123:
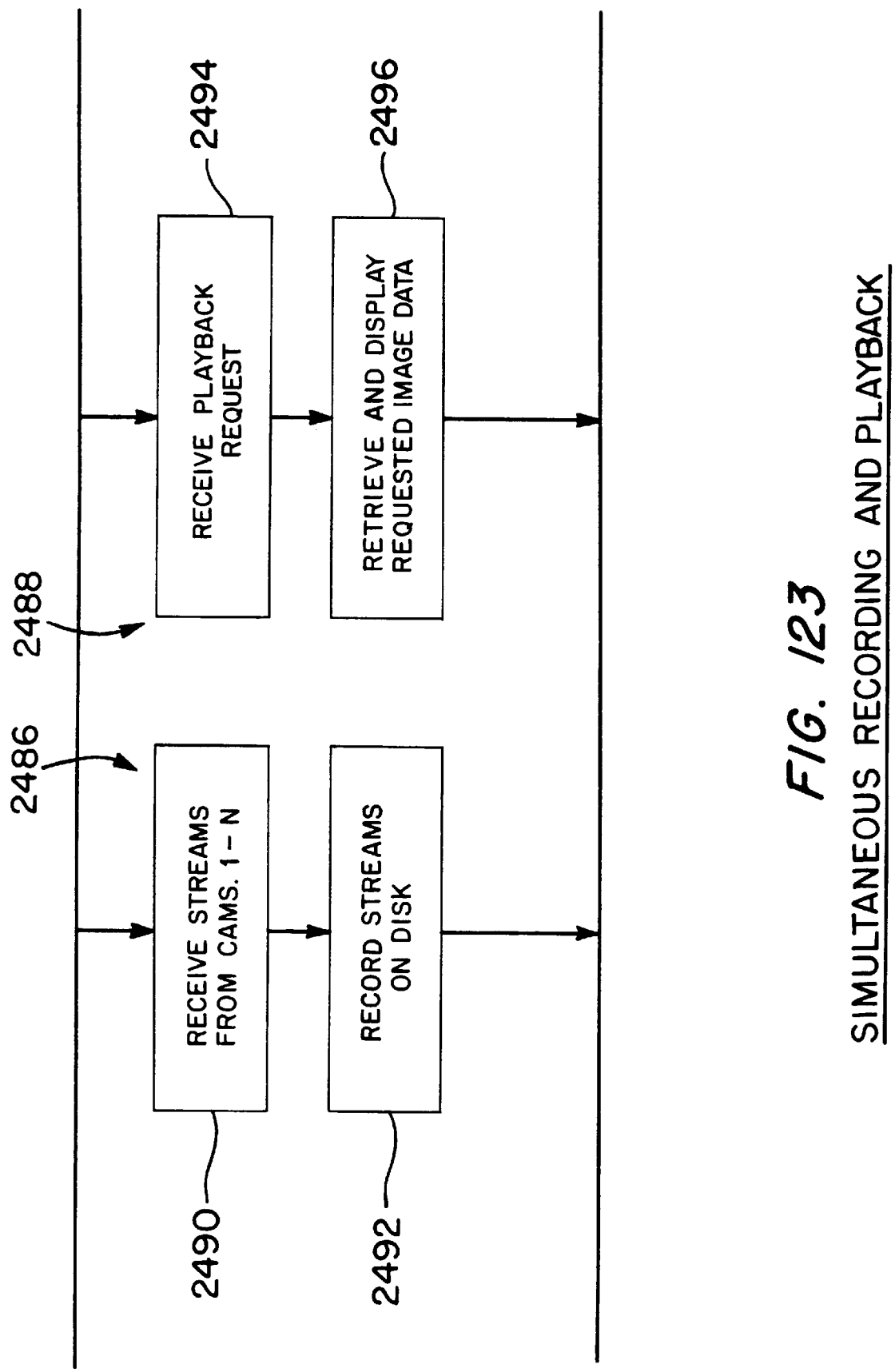

FIG. 123 schematically illustrates operation of the VR/PC unit to simultaneously perform recording and playback operations. FIG. 123 schematically shows contemporaneously maintained control threads 2486 and 2488. Thread 2486 relates to capturing and recording live incoming streams of video signals generated by cameras connected to the VR/PC unit, while thread 2488 is concerned with receiving and complying with user requests to retrieve and playback video data streams stored on the hard disk in VR/PC unit. Implementation of contemporaneous independent control threads is made possible by the multi-tasking nature of the operating system software provided for the motherboard CPU.

Thread 2486 is shown as including steps 2490 and 2492. At step 2490, the streams of video images generated by the cameras connected to the VR/PC unit are sequentially captured in a time-multiplexed fashion, and at step 2492 the resulting sequence of video data fields is recorded on the hard disk.

Playback thread 2488 is shown as including steps 2494 and 2496. At step 2494, the user initiates a request to playback a video data stream that was previously generated by a certain camera at a certain time and recorded on the hard disk. At step 2496, video data corresponding to the requested stream is retrieved from the hard disk and displayed on the display monitor. For example, a display in the format shown in FIG. 12 may be provided. It should be understood that even as the requested reproduced video data stream is shown in the display area 2479 of the screen display of FIG. 12, ongoing recording of live input video streams continues without interruption.

FIG. 124 illustrates in generalized form the feature of simultaneously displaying two different reproduced video image streams. The first step in FIG. 124 is step 2502, which corresponds to step 2478 of FIG. 122. It is then determined, at step 2504 whether the user requests that an additional video stream be reproduced and displayed at the same time as the stream displayed at step 2502. A particular example of step 2504 would be step 2480 in FIG. 122, at which the user requests simultaneous display of a stream generated by a different camera at the same time that the stream displayed at step 2502 was generated. Another possible request that could be made at step 2504 would be requesting simultaneous display of a recorded video image stream generated at a different time by the same camera which generated the image stream reproduced at step 2502.

In any case, when playback of an additional stream is requested at step 2504, step 2506 follows, at which the parameters (camera and time generated) for the requested stream are received or generated. Then, at step 2508, both the image stream displayed at step 2502 and the additional requested stream are simultaneously displayed in a split-screen format.

There will now be described, with reference to FIG. 125, a process whereby indexing data relating to video data fields to be recorded on a hard disk is recorded both on the same hard disk with the video data fields and on a separate hard disk. FIG. 125 includes a first step 2510, at which a sequence of live video data fields is received. The next step, which is step 2512, represents generating indexing data which corresponds to the received video data fields. Then, following step 2512 are steps 2514 and 2516 which are carried out contemporaneously with each other. At step 2514, the incoming video data fields are recorded on a hard disk together with the indexing data generated at step 2512. At step 2516, the same indexing data is recorded on a different hard disk from that on which the video data fields were recorded.

By recording a "shadow" set of index data on the separate hard drive, the index data can be searched on the separate hard drive without impeding ongoing record, playback or archiving operations which require access to the hard drive on which the video data fields are recorded.

FIG. 126 portrays operation of the VR/PC unit to provide pre-alarm buffer storage of an incoming video signal stream at a field rate that is higher than a "permanent" field rate that has been assigned to the video stream. The first step in FIG. 126 is step 2518. At step 2518, an incoming video data stream is received and captured in the form of a sequence of video data fields. It is assumed for the purposes of this example that the video data stream is captured at a rate of about three fields per second.

At step 2520, selected ones of the video data fields captured at step 2518 are recorded at a lower field rate, say one field per second, in a main "permanent recording" area of a hard drive. (It is to be understood that in a preferred embodiment, only video data on the "permanently" recorded part of the hard drive is archived; and the pre-alarm buffered material preferably is not archived unless it is first transferred to the "permanent" part of the hard drive.) Meanwhile, at step 2522, all of the captured data fields are recorded in a ring buffer area on the hard disk drive to provide a recording rate equal to the capture rate, i.e., three fields per second in this example.

Following step 2522 is step 2524, at which it is determined whether an alarm condition has been detected. If so, step 2526 follows, at which a pointer defining the ring buffer area is moved to provide permanent storage of the three-field-per-second data (alternatively, the three-field-per-second data can be copied from the ring buffer area to the main area for permanent storage at step 2526).

At step 2528, recording at the full field rate (assumed to be three fields per second) continues for a predetermined period of time after detection of the alarm condition.

It should be understood that the field rates given in the above discussion of FIG. 126 are exemplary only and are subject to variation, the main point being that at the temporal resolution (field rate) provided at steps 2522 and 2528 is greater than that provided at step 2520.

FIG. 127 represents a generalization of the playback image analysis practices that have been previously been described herein. At a first step in FIG. 127, namely step 2530, video data and/or corresponding indexing data, is retrieved from a recording medium, such as a hard disk. Then, at step 2532, the VR/PC unit analyzes the retrieved data. For example, one or more of the image analysis algorithms described previously or hereafter may be applied. Alternatively, other image analysis algorithms, including other algorithms relating to motion or acceleration of objects represented in the image stream may be applied. The machine analysis applied at step 2532 is not limited to detection of image characteristics, however. For example, the indexing data may be surveyed to determine what camera streams were recorded at a given point of time in the past.

At step 2534, header data, indexing data or the like stored on the hard disk or other recording medium is changed or added to indicate the results of the machine analysis carried out at step 2532.

It is to be recognized that the process presented in FIG. 127 generally contemplates application of a machine analysis to a video database stored on a recording medium, and then updating indexing or header data to indicate the results of the machine analysis.

There will now be discussed, with reference to FIGS. 128(*a*) and 128(*b*), an example of the image processing utilities which have previously been referred to. In particular, these drawings relate to a feature which permits the user to enhance the image contrast in a selected part of the image plane.

FIG. 128(*a*) shows a variable-gain amplifier 808' which may be provided in the front end analog board electronics of FIG. 113 in place of each of the amplifiers 808 shown in FIG. 13. As indicated at 2536 in FIG. 128(*a*), the gain provided by the amplifier 808' is controllable by a control signal which originates from the front end controller DSP 1050.

FIG. 128(*b*) is illustrative of processing which implements the selective contrast enhancement feature. At step 2538, a portion of the image plane is selected for contrast enhancement. Then, at step 2540, a suitable message is sent to the front end electronics to cause each of the variable amplifiers 808' to be operated so as to increase the image contrast (dynamic range) in the selected portion of the image plane.

FIG. 161 is an example of a display screen presented to the user to permit selection of a portion of the image for contrast enhancement. The rectangular drawing element indicated at 2542 is the region of the image plane selected for image enhancement.

EXAMPLES OF USER INTERFACE SCREENS

FIG. 11 is an example of a screen display format provided in the IVIM system for displaying a live video signal currently generated by one of the cameras connected to the VR/PC unit. The screen display format of FIG. 11 includes an upper area 2546 and a lower area 2548. The upper area 2546 includes a video image stream display window 2550. Six mouse-actuatable switch areas 2552 are provided in a horizontal array below the live video display window 2550. As seen from FIG. 11, the mouse-actuatable switch areas 2552 respectively carry the legends "Full Scr" (full screen), "Sch On" (turn on pre-scheduled operating modes), "Utilities", "Archive", "Setup", and "Help".

Actuating the "full screen" switch area causes the two-part display shown in FIG. 11 to be replaced with a display format in which the entire screen area is devoted to the live video image display window. The "scheduling on" switch allows the user to cause the VR/PC unit to enter previously-scheduled operating modes. The "utilities" switch area allows the user to access certain system features, such as transmitting data to other devices, or generating reports of system activities. The "archive" switch area allows the user to access features relating to archiving functions performed by the VR/PC unit. The "setup" switch area allows the user to enter a mode for configuring the VR/PC unit. The "help" switch area provides the user with access to context-sensitive explanatory text displays.

A mock-LED display area 2554 is provided at a lower right hand position in the upper area 2546. A legend "recording" is proximate to the mock-LED 2554. The mock-LED 2554 corresponds to the LED 654 provided on the physical front panel (FIG. 6). The mock-LED 2554 is preferably displayed in a first state (e.g., red) when the VR/PC unit is recording live video signals, and is displayed in a separate condition (e.g., black or dark grey) when no recording is taking place.

If the lower area 2548 of the screen display of FIG. 11 is compared with the front panel layout illustrated in FIG. 6, it will be observed that the lower area 2548 has a layout that corresponds to the layout of the front panel. In particular, mouse-actuatable switch areas are provided at respective positions in the area 2548 corresponding to respective positions of the switches 638, 340, 642, 644, 646, 648, 650, 658 and 660 of the front panel (FIG. 6). The camera selection switch areas of the area 2548 bear the legends "1" through "16", respectively, and correspond to the identically numbered camera selection switches 650 on the physical front panel. Moreover, an "alarms" switch area, indicated at 2556 in FIG. 11, corresponds to the "alarms" -labeled switch 658 on the front panel.

At the right side of the lower area 2548, are provided six switch areas arranged in a two across by three down array and corresponding in location and function to the switches 638, 640, 642, 644, 646, and 648 of the front panel. The switch area corresponding to the front panel switch 638 is overlaid with a single rectangle indicated at 2558, which is representative of the single-window display format to be established by actuating either the switch 638 or the switch area bearing the single rectangle. Similarly, an overlay representing a 2×2 window format is provided at the switch-area corresponding to switch 640, a 3×3 overlay is provided at the switch-area corresponding to switch 642 of the front panel, and a 4×4 overlay is provided at the switch area corresponding to the switch 644 on the front panel. All of the above-mentioned switch-areas of the lower part 2548 of the FIG. 11 screen display are actuatable by manipulating the mouse, and with the same effect as physically pressing the corresponding switch buttons on the front panel. Also included in the area 2548 is a generally circular mouse-actuatable switch area 2560 which bears the legend "play". The circular switch area 2560 corresponds in position as well as function, to the jog-shuttle switch 660 on the front panel. Like the jog-shuttle switch, the switch area 2560 has arrow legends. The region at the arrows of the switch area 2560 is manipulatable by the mouse to provide "rotation" of the switch area 2560 either in a clockwise or counter-clockwise direction. The mouse-actuated rotation of the switch area 2560 has effects that emulate the manual rotation of the jog-shuttle switch 660 of the front panel. The lower area 2548 of the screen display of FIG. 11 also includes mock-LED display regions which emulate in position and function the LEDs 652 and 656 previously discussed with reference to the front panel (FIG. 6).

Another notable feature of the screen display format of FIG. 11 is the alphanumeric character overlays provided in the image display window 2550. The overlays shown in FIG. 11 include date and time information, as well as a legend "live" to make clear to the reader that a live video signal is being provided in the window 2550. A camera identification overlay is provided at a lower left corner of the window 2550.

FIG. 12 shows a display format utilized when the VR/PC unit is operated in a playback mode. The playback mode may be entered by actuating either the play/pause area on the jog-shuttle switch 660 of the front panel, or by mouse-clicking on the "play" legend at the center of the circular switch area 2560 shown in FIG. 11. The screen display format of FIG. 12 is generally similar to that of FIG. 11, and only the differences between those two formats will be discussed. First, it should be understood that the video image stream displayed in the display window 2479 of FIG. 12 represents a previously recorded and currently reproduced image stream, rather than a live, currently-generated image stream.

The switch area features and mock-LED areas in FIG. 12 are the same as those in FIG. 11, except that the switch areas "schedule on", "utilities", "archive" and "setup" of FIG. 11 are replaced with switch areas labeled "exit", "search" and "tools" in the display format of FIG. 12. Actuation of the "exit" switch area in FIG. 12 returns the system to a live-display mode with the format of FIG. 11. Actuating the "search" switch area in FIG. 12 brings up a menu screen display which permits the user to select among video database search functions. The "tools" switch area gives the user access to image processing utilities.

FIG. 129 represents a search dialog screen display which can be called up by the user by actuating the "search" switch-area on the screen display of FIG. 12. A major feature of the search dialog display of FIG. 129 is the selection of tab dialog boxes respectively bearing the legends "date/time", "camera", "alarm" and "tools". In the particular display example shown in FIG. 129, the "data/time" dialog box is uppermost. The other tabbed dialog boxes can be actuated by clicking on the respective tab.

The date/time dialog box has three mouse-actuatable mode selection settings, indicated as "all recorded images", "images between . . . ", and "images within". The first selection implements a video data base search without any time limit. The second selection provides starting and stopping limits to constrain the search period. The third selection limits the search to a given duration prior to and extending up to the present time.

Below the dialog box area is a "result field" which is used to display information identifying images found to match the search criteria. To the right of the dialog box area there is a vertical column of five switch-areas, respectively legended "find", "stop", "play", "close", and "help". Immediately below these switch areas is an icon area in which a "search light" icon is displayed. While a search is being carried out, the search light icon 2562 is moved in an oscillating sweep pattern to indicate to the user that a search is in progress.

Actuation of the "find" search button causes the selected search to be executed. Actuation of the "stop" button causes a search in progress to be stopped. Actuation of the "play"

switch area causes the VR/PC unit to playback a video stream corresponding to a selected item in the result field. Actuation of the "close" switch area returns the user to the playback screen display of FIG. 12. It will be observed in FIG. 129 that the "all recorded images" selection is selected.

FIG. 130 is a display screen similar to that of FIG. 129, but indicating selection of the "images between . . . " option instead of the "all recorded images" option. Also shown in FIG. 130 is a pop-up calendar box which allows the user to set a date to limit the search period. To the left of the pop-up calendar box are user-adjustable time-of-day settings.

FIG. 131 illustrates the search dialog display provided when the "alarm" dialog box is selected. In a left portion of the alarm dialog box, the user may select search criteria relating to alarm events detected by external alarm sensor devices. On the right side of the alarm dialog box, the user may select search criteria based upon whether image analysis algorithms operated at the time that the video data was generated have detected predetermined characteristics that were the subject of the analysis algorithms.

FIG. 132 illustrates the search dialog display screen provided when the camera dialog box has been selected. In the example shown in FIG. 132, a pull-down list of cameras has been actuated to allow the user to specify which camera streams are to be searched.

It is also notable that, in FIG. 132, the results field includes a listing of four matching video data portions which were found in a previous search. The "play" switch area at the right side of the display in 132 is illuminated (by contrast with FIGS. 129–131), to permit the user to playback the video data portions listed in the results field.

In FIG. 133, again the date/time dialog box has been selected. In addition, the first video data portion listed in the results field has been selected and would be played back if the user actuated the "play" switch area.

FIG. 134 is the set up option display screen which is generated in response to user actuation of the "setup" switch area of FIG. 11. The setup option display screen provides the user with four setup options, each accessible through a respective switch area. The options are "name" (applying names to cameras and alarm inputs and outputs), "record" (allowing the user to select recording options), "security" (permitting the user, if authorized, to configure security arrangements for the VR/PC unit), and "login" (permitting the user, if authorized, to add or delete users permitted to log into the VR/PC unit). Also provided are a "close" switch area which causes the screen display to return to the display format of FIG. 11, as well as the customary "help" switch area.

FIG. 135 is an example of the recording options dialog box displayed in response to actuation of the "record" switch area of FIG. 134. The dialog box shown in FIG. 135 permits the user to select three types of options: recording mode, recording quality, and recording rate. The two possible recording modes are "linear" and "circular". In the linear mode, the recording on the hard drive ends when the hard drive storage capacity is exhausted. In the circular recording mode when the end of the hard disk storage area is reached, the next incoming video data is written at the beginning of the hard disk storage area.

The recording quality options are "normal", "super fidelity", and "extended". The three quality options each correspond to different quantization bit rates carried out in the JPEG chip 848 (FIG. 14). Continuing to refer to FIG. 135, the "super fidelity" setting uses, on average, more data bytes to represent each video data field than are used in the "normal" setting, so as to provide enhanced image quality. The "extended" setting uses, on average, fewer data bytes to represent each video data field than the normal setting, providing more efficient use of the hard disk storage capacity, but with somewhat lower image quality.

The recording rate options are implemented via a pull-down list, as shown in FIG. 136. The rate options correspond to different field capture rates, and are indicative of the effective recording duration (2, 6, 12 or 24 hours) provided by the hard disk storage capacity at the respective rate options. Although not indicated by the options presented in FIGS. 135 and 136, the rate and quality settings could also be made on a camera-stream by camera-stream basis. Moreover, the quality settings could be used to adjust compression front-end "block sameness" thresholds and/or reference image frequency rates, instead of or in addition to the JPEG quantization setting adjustment currently driven by the quality setting options. It is also contemplated to display, for each of the quality and rate options, sample video image sequences to indicate to the user what sort of image quality can be expected from each of the quality and rate settings.

FIG. 137 is the login dialog box presented in response to actuation of the "login" switch area on FIG. 134. The dialog box in FIG. 137 invites the user to enter a personal identification number (PIN) utilizing the virtual numeric keypad provided at the right hand side of the dialog box. A backspace switch area 2564 is provided. As each number in the virtual keypad is actuated, an asterisk corresponding to each digit is displayed in the field under the legend "enter PIN code:". The "okay" switch area implements an enter function, at which the point the entered digits are read to determine whether an authorized user is attempting to login.

If the user currently logged in is entitled to reconfigure the unit's security features, then actuation of the "security" switch area in FIG. 134 causes the display screen shown in FIG. 144 to be displayed. The main options shown in the display of FIG. 144 are adding a new user ("add" switch area), changing the features accessible by an existing user ("edit" switch area) and removing an existing user ("delete"). In the field at the left side of the display of FIG. 144, a list of the existing authorized users is provided.

Actuating the "edit" switch area on FIG. 144 provides access to the access privileges display of which a first example is shown on FIG. 138. A scroll-bar provided in a vertical orientation at the lower right side of the display of FIG. 138 permits the user to scroll through the various feature access privilege settings. Setting options shown in FIG. 138 include the ability to override pre-scheduled operating modes ("enable" under "schedule") and configuring the pre-scheduled operating modes themselves ("configure" under "schedule").

FIG. 139 shows another view of the feature access privileges setting options, including options relating to system setup privileges. The setup privileges shown in FIG. 139 correspond to camera-related setup options, selecting analysis algorithms to be applied to incoming video streams, live video display format options, and system security features.

FIG. 140 is the same display as FIG. 139, but indicating the security feature access privileges are being accorded to a particular user. In addition, the illuminated areas to the left of the "cameras" and "analysis tools" feature privileges indicate that those privileges have previously been accorded to the same user.

FIG. 141 represents the same display at another scrolling position relative to the feature access privileges. The privileges shown in FIG. 141 relate to selecting recording mode options ("configure" under "record"), accessing operating systems software files ("maintenance" under "record"), access to video data stored on the hard disk ("enable" under "playback") and access to video signals stored on a conventional externally-connected video cassette recorder, which is not shown ("VCR transcript" under "playback").

Further feature access privileges are shown in FIG. 142, namely the ability to configure event handling modes ("configure" under "events"), and the ability to access reports concerning detected events ("reports" under "events").

Still further feature access privileges are shown in FIG. 143. These relate to retrieving data stored on an archive recording medium ("enable" under "archive") and storage and retrieval of data stored on a hard disk which indexes the contents of archive recording media ("restore" and "library").

In FIG. 145 represents the screen display brought up in response to actuation of the "name" switch area of FIG. 134. In the display screen of FIG. 145, three tabbed dialog boxes are accessible namely "cameras", "alarms in", and "alarms out". In the particular display shown in FIG. 145, the "cameras" dialog box has been selected. The cameras dialog box provides naming fields for each of sixteen cameras. Alphanumeric names may be entered into each of the naming fields utilizing either a keyboard (not shown) connected to the VR/PC unit, or a "virtual keyboard" (not shown) displayed on the display monitor and actuatable by the mouse.

FIG. 146 presents the "alarms out" dialog box accessible at FIG. 145. The alarms out dialog box permits alphanumeric designation of sixteen alarm output signals.

FIG. 147 presents the "alarms in" dialog box which is also accessible at FIG. 145 (or FIG. 146). At FIG. 147, names may be entered to identify respective external alarm sensor devices which generate sixteen incoming alarm detection signals.

FIG. 148 is a screen display that is brought up in response to actuation of the "utilities" switch area of FIG. 1. The options presented to the user in the display of FIG. 148 are transmitting data (including video data) to. an external device, such as a local or master node, creating reports concerning operation of the VR/PC unit, to be printed out on a printer (not shown), and generating signals to control movable cameras connected to the VR/PC unit.

FIG. 149 is a display screen brought up in response to actuation of the "status" switch area of FIGS. 11 and 12. The status data displayed in FIG. 149 is generated by the process discussed above in connection with FIG. 121. FIG. 149 displays data indicative of the remaining storage capacity available on the hard disk or disks, the storage capacity remaining available on a removable archive recording medium, the number of alarm events that have been detected and not yet reviewed by the user, the number of alarm events that have been reviewed but not deleted from the alarm event file, the number of video cameras connected to the VR/PC unit and the number of cameras from which the video streams are currently being recorded.

FIG. 150 is a display screen provided for the purpose of defining a pre-scheduled live video display format. Tabbed dialog boxes accessible by the user at the display screen of FIG. 150 are, respectively, for 2×2, 3×3, 4×4 and "custom" video display window formats. The 2×2 dialog box is shown as being active in FIG. 150. The text "weekend day" shown toward the right at the top of the selected dialog box indicates that the user is defining pre-scheduled operational modes to be automatically carried out during time periods defined as day times on weekends. To the left side of the dialog box, a number of icons are provided, each corresponding to a respective camera connected to the VR/PC unit. To the right side of the selected dialog box is a two by two array of empty boxes, representing the four video display windows in the display format that is being set-up. As shown in FIG. 151, a camera icon may be dragged using a cursor 2566 so that the icon is placed in one of the boxes. Placement of the camera in the box indicates assignment of the corresponding camera video stream for display in the corresponding display window. In the particular instance shown in FIG. 151, the "parking lot" camera stream has been designated for display in the upper left hand window of the 2×2 display format.

FIG. 152 is a display screen provided during scheduling setup operations in order to define which calendar days are to be considered holidays. To the left side of the display in FIG. 152, a calendar display is provided to permit the user to select a particular day of a particular month of a particular year. To the right side of the display in FIG. 152, there is provides a list of the dates which have been designated holidays. Actuation of the "add" switch area in FIG. 152 causes a date selected in the calendar display to be added to the holiday list.

IMAGE ANALYSIS TOOL SETUP SCREENS

FIG. 153 represents a screen display provided to the user to permit the user to set parameters for an image analysis algorithm designated as the "light tool". This algorithm is designed to detect selected changes in illumination in the screen of interest. The screen display in FIG. 153 includes an image display window 2568 in which a static video image is displayed. The static video image is used to define the parameters for the light tool. Displayed within the image is a display element box 2570, which defines the area of the image plane with respect to which the algorithm is to operate. The box 2570 may be dragged from one location to another in the image plane, and may be decreased or increased in size and changed in shape, by cursor manipulation in like manner to manipulation of similar graphic elements in a conventional computer drawing software package. The portion of the image within the box 2570 is displayed in a brighter manner than the balance of the image so as to highlight the area within the box 2570. A circular spot 2572 is within the box 2570. The size of the spot 2572 is indicative of the size of a light spot to be detected if a spot light detection feature of the analysis algorithm is actuated. The spot is preferably displayed in a solid color such as red.

Virtual buttons and switches for selecting features of the algorithm and setting parameters therefore are provided on the right side of the display of FIG. 153. At 2574, the user is permitted to fix the location ("mark") or delete ("erase") the active zone defined by the box 2570. At 2576, the user is permitted to select among three operational modes for the algorithm: detecting a large increase in illumination ("dark to light"), detecting a large decrease in illumination ("light to dark") or detecting a bright spot of light in the active zone ("spot light"). The first option enables the VR/PC unit to determine when lights are turned on, the second to detect when lights are turned off, and the third is intended to detect the presence of a flashlight in a darkened area.

The slide bar at 2578 controls the size of the spot 2572 used as a parameter setting for the spot light operational mode. As the slide bar is manipulated to the left, the size of the spot 2572 is reduced. Manipulating the slide bar to the right causes the spot size to be increased.

Sensitivity setting options for the light tool are provided at 2580. The sensitivity parameters for the light tool constitute the thresholds for determining whether the change over from dark to light or light to dark has taken place, or whether the illuminated area to be detected in the spot light mode is sufficiently bright to constitute an event to be detected. If the "default" switch area is actuated by the user, then threshold settings considered to be optimal by the designers of the VR/PC unit are applied. The sensitivity level can also be adjusted by the user by manipulating the slide bar provided at 2580. Moving the slide bar to the left decreases the sensitivity, which decreases the risk of false alarms, while also increasing the risk that significant events will not be noted. sliding the slide bar to the right increases the sensitivity, thereby reducing the risk that significant events will go unnoted, but also increasing the risk of false alarms. The "ADV" switch area allows the user to access a dialog box in which the various sensitivity parameters are unbundled and can be set separately from each other.

Above the image display window 2568, there is a legend which identifies the type of analysis algorithm being setup as well as the camera to which it is to be applied. Below the window 2568 are switch areas to actuate application of the algorithm to the selected video image stream, or to cancel selection of the analysis algorithm.

FIG. 154 presents a screen display which permits the user to set parameters in connection with a motion detection analysis algorithm. As with the light tool setup screen shown in FIG. 153, the motion detection setup screen of FIG. 154 includes an image display window 2568 and a graphic element box 2570 which defines an area of the image plane within which the motion detection algorithm is to be applied. An upper right portion of the display in FIG. 154, indicated by reference numeral 2582, provides cursor-actuatable features to allow the user to activate, deactivate or remove one or more active zones corresponding to one or more of the graphic image element boxes 2570. The display shown in FIG. 154 also includes a sensitivity control area 2580 corresponding to that of FIG. 153. In regard to the motion detection tool, the sensitivity controls provide thresholds for such factors as the amount of motion detected in the active zone and/or luminance levels.

FIG. 155 presents the setup screen display for use with the above-described perimeter violation detection analysis algorithm. The display of FIG. 155, includes an image display window 2568 as in the other tool setup screen displays just discussed. Other features of the display in FIG. 155, including the graphic image element box 1966 representing the perimeter, the crossing direction arrows 1976 and the object size box 1986, have previously been referred to in connection with the processing algorithm shown in FIGS. 90A–90C. Controls provided at 2584 permit the user to mark or erase the perimeter corresponding to the box 1966. The controls at 2586 select whether the directional arrows 1976 point inwardly, outwardly or in both directions relative to the perimeter. The slide bar at 2588 controls the size of the object box 1986. Manipulating the slide bar 2588 to the left reduces the size of the object box, manipulation in the other direction increases the size of the object box. It should be understood that, as an alternative, the object size box itself could be subject to cursor manipulation so as to be decreased or increased in size, as can be done with drawing elements in conventional computer drawing software packages.

The sensitivity controls 2006 have previously been referred to in connection with FIG. 90D. The sensitivity factors controllable at 2006 may include contrast ratio and degree of confidence in terms of one or more of presence of motion, location of moving object, and size of the moving object.

Although not shown in FIG. 155, it is also contemplated to allow the user to set as a parameter the speed at which an object crosses the perimeter. A graphic element that oscillates at a speed settable by user input may be provided. Such a graphic element may, for example, be similar in appearance to the wand of a musical metronome. The VR/PC unit may be programmed to detect image edges to detect perspectives indicative of depth in the image scene, and to adjust tile-space measures of velocity to take depth into account when estimating the speed of an object. A slide bar control for setting the velocity parameter may be provided in association with the "metronome" element, or in place of the "metronome".

FIG. 156 is the setup screen for the analysis algorithm known as the "museum tool". The museum tool algorithm is intended to permit automatic detection of the removal of an object, such as a painting, a piece of jewelry or the like. As in the other tool setup screens, the screen shown in FIG. 156 includes an image display window 2568. A graphic image element box 2590 defines a zone which is to be monitored by the analysis algorithm. The box 2590 can be changed in width and height or both in order to change the monitored zone. Unless the monitored zone is quite small, a preferred embodiment of the museum tool algorithm calls for defining a number of "hot spots" represented by colored rectangles 2592. When hot spots 2592 are provided, it is only the portions of the image plane corresponding to the hot spots themselves that are actually monitored. The number of hot spots provided depends on how large an area in the image plane is occupied by the monitored zone defined by the box 2590. The number of hot spots may be reduced by the user, but may not be increased, in a preferred embodiment. The purpose of monitoring only the hot spots, rather than the entire monitored zone, is to save memory. In a preferred embodiment of the museum tool, the removal of object is detected by noting differences between the content of tiles located in the hot spots and corresponding tiles in a reference image.

Controls at 2594 permit the user to mark or erase the monitored zone corresponding to the box 2590. Controls at 2594 permit the user to mark or erase hot spots. The user is permitted to reposition hot spots within the monitored area by dragging the hot spots with a cursor.

The control at 2598 allows the user to define for how long the monitored area must be missing or occluded before an event is considered to have occurred.

At 2602, sensitivity controls are provided to set thresholds for factors such as variation in chrominance, numbers of hot spots occluded, or the like.

FIG. 157 is a screen display in a format that is an alternative to the display shown in FIG. 152 for generating a list of holidays. In the format shown in FIG. 157, the calendar selection box is implemented as a pull-down element, and the "set holiday" dialog is one of a number of tabbed dialog boxes including "general", "weekday", "weekend", and "holiday".

FIG. 158 presents the "weekday" dialog accessible at FIG. 157. FIG. 158 provides scheduling of the recording status for sixteen cameras connected to the VR/PC unit. In general, the format of the display in FIG. 158 is a bar chart, with horizontal bars displayed for each of the sixteen cameras. Bars of different colors indicate different operating modes for the camera selected for respective portions of the 24-hour period. The bars can be manipulated, using the cursor so as to stretch or shrink the bar, which has the effect of increasing or decreasing the scheduled period of time for the corresponding operating mode. The available operating mode options for each camera are "active" (ongoing recording), "alarmed" (recording only in the event an alarm condition is detected) and "disabled" (no recording of the camera stream). A pop up element indicated at 2604 states in numeric terms the period of time represented by a selected bar element. The pop up 2604 shown in FIG. 158 corresponds to the bar at camera 7, as shown by the selection indicator 2606. The formats for the "weekend" and "holiday" dialog boxes are like FIG. 158.

FIG. 159 shows the dialog box corresponding to the "general" tab which is visible in FIGS. 157 and 158. The controls at 2608 in FIG. 159 allow the user to select between regular scheduling options and custom schedule options. At 2610, the user is permitted to define for weekdays when the "day-time" and "night-time" periods take place. The controls shown at 2610 are an alternative to the display presented in FIG. 81.

Continuing to refer to FIG. 159, controls provided at 2612 permit the user to define the starting and ending times for weekends, and the controls at 2614 permit the user to define starting and ending times for holidays.

FIG. 160 is a variation on the display screen of FIG. 159. It will seen from the controls 2608 in FIG. 160 that "weekend" and "holiday" have not been selected for custom scheduling. As a result, the weekend and holiday tab dialog boxes shown in FIG. 159 are not presented as options in FIG. 160.

FIG. 161 presents a screen display which permits the user to select and set a parameter for an image processing utility. The display screen of FIG. 161 includes an image display window 2616, for displaying an image which is to be subjected to processing. A box 2542, which has been referred to above, is overlaid at a portion of the window 2616 and defines the portion of the image plane in which a selected processing utility is to be applied. Zoom controls 2618 are provided at an upper right hand portion of the display screen. The zoom controls permit a user to zoom in or out of the portion of the image defined by box 2542, and/or to move the area which is subject to zooming. The switch area marked "1:1" restores the image to an unzoomed condition. The switch area marked "enhance" applies a group of image enhancement processes to the zoomed area, including emphasis of high frequency components, an increase in contrast, normalization of color and intensity distributions, and non-linear interpolation of pixels, instead of linear interpolation. Provided below the controls 2618 are utility selection controls 2620, which permit a user to select from among other image processing utilities in addition to the zoom function. For example, one of the utilities that may be selected using the controls 2620 is the selective contrast enhancement utility previously described with reference to FIGS. 128 (*a*) and (*b*). Other image processing utility options that may be presented to the user include adjustments to brightness, "sharpness" (i.e., the degree to which emphasis is applied to high-frequency components of the image data), and color and/or intensity distributions. A horizontal array of switch areas is provided at the bottom of the display screen. A switch area marked "full scr" switches the screen format of FIG. 161 to a full screen format. The switch area marked "load" causes an image to be retrieved from a floppy disk inserted in the VR/PC unit so that the retrieved image can be displayed in the window 2616. The switch area marked "save" causes the image displayed in the window 2616, including any modifications applied by processing utilities, to be written onto the floppy disk.

The "print" switch area causes the image displayed in window 2616 to be output as hard copy via a printer or to be transmitted as a facsimile. The switch area marked "restore" removes any modifications that resulted from application of processing utilities.

FIG. 162 is a screen display which permits a user to implement a process for discarding video data corresponding to certain parts of the image plane. The display screen of FIG. 162 includes an image display window 2622 for displaying a video image. Polygonal drawing elements such as those indicated at 2624 and 2626 may be formed by the user to define areas in the image plane for which video data need not be stored. Controls relating to the selected areas are provided at 2628. In response to the user's designation of the areas indicated by the polygonal FIGS. 2624 and 2626, the motherboard CPU instructs the front end electronics that corresponding portions of an image plane in the video signals generated by the selected camera are not to be transmitted for storage, thereby achieving more efficient utilization of the disk storage capacity. The feature illustrated in FIG. 162 permits the user to select areas of the image plane which are determined not to be of interest with respect to a particular camera image stream. The areas found not to be of interest may be areas like those indicated in FIG. 162, which are essentially static, or may include areas which include frequent motion (e.g., a highway in the background, or a wind-blown tree) which are also unlikely to provide significant information, although being likely to generate large quantities of data in difference video data fields if not selected for discarding.

FIG. 163 shows a live video display format, similar to that of FIG. 11, except that the live video display window 2550 has been divided into four sub-windows in a 2×2 configuration. In the particular example of the 2×2 configuration shown in FIG. 163, each of two different live input signals is shown in two of the four windows. However, it is contemplated that in the format of FIG. 163, four different live video streams may be displayed simultaneously. In addition, as indicated at 2630, a bright colored box (e.g., in red) is provided in the upper left hand corner of each window to indicate that the image stream in question is being recorded. It should be understood that if an image stream displayed in one of the sub-windows is not being recorded, then the indicator 2630 is not present. Other forms of the record-selection indicator 2630 are also contemplated, including, e.g., a circular indicator positioned at the lower border of the display window.

FIG. 164 is a screen display generated in response to actuation of the "archive" switch area in the display of FIG. 11 (or FIG. 163). Referring to FIG. 164, the user is presented with a choice of two tabbed dialog boxes, corresponding to "archiving" and "searching". The particular example of the display screen shown in FIG. 164 shows the "archiving" dialog as active. The archiving dialog permits the user to select among four modes of archiving operation: "background", in which archiving is carried on continuously in background while other functional operations of the VR/PC unit take place (preferably the archiving background process is lower in priority than either recording or playback operations, as indicated in the above discussion of FIG. 116); "background-silent", which is the same as "background" except that the data relating to archive space is omitted from the status display (FIG. 149); "dedicated-fast", a mode in which no recording or playback operations occur, so that motherboard CPU processing and disk access resources are dedicated to rapidly copying video data from the disk to the archive medium; and "archive off", in which no archiving is taking place.

The archive dialog box also indicates which device is being used for the archiving function; in this case it is the internally installed DAT drive. The switch areas provided in a vertical column at the left side of the screen display in FIG. 164 are analogous to those shown in FIGS. 129–133, but are not operational when the archiving dialog box is selected. Rather, these switch areas may be used in connection with the "searching" dialog box which will be referred to below. Also provided in the format of FIG. 164 is a "search light" icon analogous to the icon 2562 which was discussed above in connection with FIG. 129. In addition, a search-results field is provided at the lower part of the screen display.

FIG. 165 presents an alternative version of the display of FIG. 164. FIG. 165 differs from FIG. 164 in that FIG. 165 offers two additional dialog boxes, respectively tabbed "library" and "customize". In addition, the archiving dialog box of FIG. 165 permits the user to select among a number of internal or external record medium drive devices. Among the selections provided in FIG. 165 is an internally-installed magneto-optical disk drive device.

FIG. 166 presents a screen display which is reached by selecting the "searching" dialog box available at FIG. 164. The searching dialog box shown in FIG. 166 permits the user to define date and time or alarm parameters to be used in searching for video data of interest that has been stored on the currently inserted archive recording medium.

FIG. 167 is a screen display provided when the "library" dialog box is selected at FIG. 165. The purpose of the library dialog box is to access the previously-recorded archive media database which was discussed above in connection with FIG. 119. The user may request viewing of data corresponding to all previously recorded archiving media, or only those recorded within a user-defined time period. The display field provided at the bottom of-the screen display is for displaying the requested information. The "add" switch area permits the user to add to the database an item corresponding to an additional recorded archive medium. The "delete" switch area permits the user. to remove an item from the database. The "details" switch area permits the user to select display of detailed data relating to one of the items in the database. The "reset" switch area permits the user to clear all data from the recorded archive media data base.

The display screen shown in FIG. 168 illustrates the "customized" dialog box available to the user from the screen displays of FIGS. 165 through 167. In the "customized" dialog box, the user is permitted to update a listing of archiving media drive units that have been installed within or connected to the VR/PC unit. Among the types of archive media drive units that are or may be installed, the following are indicated in the screen display of FIG. 168: a digital video disk (DVD) drive, an internal DAT drive, a magneto-optical disk drive, a so-called "jazz" drive (removable hard disk), and a DAT carousal. It is, of course, contemplated that any or all of those types of devices may be connected to the VR/PC unit.

ANALYSIS TOOL SELECTION SCREENS

FIG. 169 is a screen display provided in response to selection of the "tools" dialog box at any one of FIGS. 129 through 133. The purpose of the "tools" dialog box is to permit a user to select for a recorded video stream corresponding to a given camera, an image analysis algorithm to be applied to the image stream. The "tools" dialog box includes a pull-down list 2632 used to select a camera, and another pull-down list 2634, to permit the user to select an image analysis algorithm to be applied to the recorded video stream which was generated by the selected camera. A switch area labeled "setup" allows the user to bring up the tool setup screen display corresponding to the selected analysis algorithm. Examples of tool setup screen displays have previously been discussed, and are shown at FIGS. 153–156. At the lower part of FIG. 169, information indicating previous assignments of analysis tools to recorded camera streams is shown.

FIG. 170 shows a screen display provided when the pull-down menu under "Tool To Apply:" in FIG. 169 is pulled. As seen at 2636, the menu provides the user with several options as to selection of image analysis algorithms, including "motion tool", "perimeter tool", "museum tool" and "light tool". In addition, the user may elect not to have any analysis tool applied during the search. Thus, the screen display of FIG. 170 permits the user to conveniently select for searching purposes from among a plurality of previously-stored image analysis algorithms. As an alternative to the word-listing of the analysis algorithms options shown in FIG. 170, it is also contemplated to user icons representative of the previously-stored analysis algorithms available for selection by the user.

As can be seen from FIGS. 171 and 172, pull-down menus are also presented to the user to permit selection of an analysis algorithm to be applied to live incoming video streams. In the screen display shown in FIG. 171, the analysis algorithms are assigned on a camera-by-camera basis, while even finer "granularity" is provided in FIG. 172, whereby selection of a particular analysis algorithm is not only applicable to a particular camera, but to a particular future time period.

FIG. 173 is an example of a hard copy screen print generated in response to actuation of the "print" switch area shown in FIG. 161. The hard copy print shown in FIG. 173 includes an image 2640, which may be in color, and may represent a zoomed and/or otherwise processed portion of the image shown in the window 2616 of FIG. 161. In addition, as shown at 2642, caption information is provided, indicating times at which the image was generated and printed out, the source of the image, and so forth.

It has previously been mentioned that the preferred video data file format would also accommodate storage on disk with the video data, of contemporaneously generated audio data. One or more microphones (not shown or other sources of audio information could be connected as inputs to the VR/PC unit or a modified version thereof. The audio information, after digitation, would be stored on disk, possibly in association with related video data. The VR/PC unit would have a speaker (not shown), built in or attached as a peripheral, to reproduce in audible form, audio information retrieved from the disk.

It is also contemplated that audio content analysis algorithms ("tools") might be provided in the VR/PC unit to detect audible events such as door openings/closings, footsteps, etc. The audio tools could be operated either "live", or as "search" tools, i.e. by application to audio data retrieved from disk, and may be applied similarly to the video "tools" described above. For example, a live audio tool or tools could be employed to detect events and actuate alarm conditions. Audio tools could be employed in logical combinations with each other and/or with video tools. As one example, detection of footsteps by an audio tool, in the absence of detection of light by a video tool, could actuate an alarm condition. Application of a video tool could be triggered by detection of an audio event, and/or application of an audio tool could be triggered by detection of a video event.

Audio tools preferably would be selectable and configurable in a manner similar to the "video tool kit" features illustrated above at FIGS. 170–172 and 153–156. User-settable parameters to constrain execution of an audio tool might include sound volume, frequency, direction, and so forth. Characteristics of audio surveillance such as low cost, the relatively small quantity of data to be stored, omnidirectionality, and independence from illumination, can in many applications make audio a valuable supplement to, or even replacement for, video surveillance. At the same time, application of the information management philosophies disclosed herein can significantly enhance the usefulness of audio surveillance and the resulting stored data.

It should be understood that the embodiments of the claimed invention disclosed above are to be taken as illustrative, and not limiting. The true spirit and scope of the invention is set forth in the following claims.

What is claimed is:

1. A video information analysis apparatus, comprising:
   storage means for storing a video information data base;
   analysis means for analyzing video information in the data base in accordance with a predetermined analysis algorithm, said predetermined analysis algorithm for assigning to respective portions of said video information analysis scores each indicative of a degree to which the respective portion of said video information represents a predetermined analysis feature, each said analysis score being a value within a predetermined range of values comprising at least three values.

2. A video information analysis apparatus according to claim 1, wherein said range of values comprises at least eight values.

3. A video information analysis apparatus according to claim 2, wherein said range of values comprises at least one hundred values.

4. A video information analysis apparatus according to claim 1, further comprising:
   selection means for selecting a specific one of said range of values; and
   search means for identifying portions of said video information having analysis scores greater than or equal to said selected one of said range of values.

5. A method of operating an apparatus for storing and retrieving video data, the method comprising the steps of:
   storing a plurality of fields of video data on a first hard disk;
   storing index data on said first hard disk. said index data including data indicative of respective times at which said fields of video data were generated and respective locations on said first hard disk at which said fields of video data are stored; and
   storing said index data on a second hard disk;
   wherein said video data stored on said first hard disk includes video data representative of respective streams of video signals generated by a plurality of cameras, and said index data stored on said first and second hard disks includes data indicative of respective cameras by which said fields of video data stored on said first hard disk were generated.

6. A method according to claim 5, further comprising the steps of searching for a desired field of the video data stored on the first hard disk on the basis of index data read out from the second hard disk.

7. A method according to claim 5, further comprising the step of storing on said second hard disk a quantity of video data read out from said first hard disk.

8. A method of operating an apparatus for storing and retrieving video data. the method comprising the steps of:
   storing a plurality of fields of video data on a first hard disk;
   storing index data on said first hard disk. said index data including data indicative of respective times at which said fields of video data were generated and respective locations on said first hard disk at which said fields of video data are stored; and
   storing said index data on a second hard disk;
   wherein said index data stored on said first and second hard disks includes data indicative of characteristics of said video data stored on said first hard disk, said characteristics of said video data having been detected by applying a video data analysis algorithm to said video data.

9. A method according to claim 8, wherein said video data analysis algorithm was applied to said video data before said video data was stored on said first hard disk.

10. A method according to claim 8, wherein said video data analysis algorithm was applied to said video data after said video data was stored on said first hard disk.

11. A video data storage apparatus, comprising:
   a video data source for providing a dynamic stream of video data frames;
   a data memory device for storing the dynamic stream of video data frames provided by the video data source; and
   control means for designating a main portion of said data memory device, said main portion for recording said dynamic stream of video data frames at a first frame rate, said control means also designating a buffer portion of said data memory device, said buffer portion for recording said dynamic stream of video data frames at a second frame rate that is higher than said first frame rate.

12. A video data storage apparatus according to claim 11, wherein said data memory device comprises a hard disk.

13. A video data storage apparatus according to claim 11, further comprising detection means for detecting an alarm condition, and wherein said control means designates said buffer portion of said data memory device by maintaining a pointer indicative of where said buffer portion is located in said data memory device, and said control means responds to detection of said alarm condition by said detection means by changing a value of said pointer, whereby said buffer portion is moved to a new location in said data memory device.

14. A data storage medium on which is stored video data representing a plurality of video image frames, frame identification data indicative of respective times at which said video image frames were generated, and characteristic data indicative of respective characteristics of the video image frames represented by said video data, said respective characteristics having been detected by applying an image analysis algorithm to said video data.

15. A data storage medium according to claim 14, wherein said characteristic data includes first subdata indicative of a type of characteristic represented by said characteristic data, and second subdata indicative of a degree to which a respective video image frame exhibits said type of characteristic represented by said characteristic data.

16. A data storage medium according to claim 14, wherein said image analysis algorithm was applied to said video data before said video data was stored on the storage medium.

17. A data storage medium according to claim 14, wherein said image analysis algorithm was applied to said video data by reading said video data from the storage medium.

18. A data storage medium according to claim 14, wherein said characteristic data includes first characteristic data generated by applying a first image analysis algorithm to said video data, and second characteristic data generated by applying a second image analysis algorithm, different from said first image analysis algorithm, to said video data.

19. A data storage medium according to claim 18, wherein said first image analysis algorithm was applied to said video data before said video data was stored on the storage medium, and said second image analysis algorithm was applied to said video data after reading said video data from the storage medium.

20. A data storage medium according to claim 14, on which is also stored data indicative of an alarm condition detected at a time at which at least one of said video image frames was generated.

21. A data storage medium according to claim 14, on which is also stored data indicative of audio signals generated at times when said video image frames were generated.

22. A data storage medium according to claim 14, wherein said video data represents respective streams of video image frames generated by a plurality of video cameras, and there is also stored on the storage medium data identifying the respective one of said plurality of video cameras which generated each of the video image frames.

23. A data storage medium according to claim 14, comprising a hard disk.

24. A data storage medium according to claim 14, comprising a magnetic tape.

25. A data storage medium according to claim 14, wherein said video data is recorded in a plurality of parallel oblique recording tracks on said magnetic tape.

26. A video information storage apparatus, comprising:
a video camera for generating a stream of dynamic images;
storage means for storing respective video data portions each of which represents an image from said stream of dynamic images, each said video data portion including header data;
means for moving the video camera to change a field of view of the video camera; and
control means for providing control signals to said means for moving to control movement of the video camera;
said control means being connected to said storage means to provide to said storage means signals indicative of times when said control means is causing said camera to be moved;
said storage means responding to said signals provided to said storage means from said control means, by including a motion signal in the header data included in the video data portions corresponding to images generated at said times when said camera is moved, said motion signal indicating that the respective image was taken by said camera when said camera was moving.

27. A video information storage apparatus according to claim 26, further comprising:
means for retrieving the stored video data portions from the storage means;
analysis means for analyzing the retrieved video data portions to detect a predetermined feature in the images represented by the retrieved video data portions, and for generating a detection signal indicative of the detected feature;
means for transmitting the detection signal to the storage means to store the detection signal as an index signal in association with the stored video data portions; and
inhibit means for reading the movement signal included in the header data of respective ones of the stored video data portions and for inhibiting the analysis means from analyzing the respective ones of the stored video data portions.

28. A video information storage apparatus according to claim 27, wherein said index signal is included in the header data corresponding to the stored video data portions with respect to which the predetermined feature was detected by the analysis means.

29. A video information storage apparatus according to claim 27, wherein the predetermined feature detected by said analysis means is a moving object represented by the stream of dynamic images.

30. A method of storing and indexing video information, comprising the steps of:
using a movable video camera to generate a stream of dynamic images;
storing video data representing the stream of dynamic images; and
storing indexing data in association with the stored video data, said stored indexing data including movement data indicating, as to each image represented by the stored video data, whether the respective image was generated at a time when the camera was being moved.

31. A method according to claim 30, further comprising the steps of:
reading the movement data; and
on the basis of the read movement data, selectively analyzing the stored video data to detect a predetermined feature represented by the stored video data.

32. A method of transmitting and displaying video information, comprising the steps of:
receiving a plurality of streams of video information each generated by a respective video camera;
transmitting said plural streams of video information to display means field by field; and
displaying each of said plural streams of video information in a respective display window on a display screen;
wherein said transmitting step includes appending, to each field of each of said plural streams of video information, header data which includes data indicative of the one of said display windows in which the field is to be displayed.

33. A method according to claim 32, wherein the appended header data includes data for identifying the one of said video cameras which generated the field.

34. Apparatus for transmitting and displaying video information, comprising:
means for receiving a plurality of streams of video information each generated by a respective video camera;
display means for simultaneously displaying each of said plural streams of video information in a respective display window on a display screen;
means for appending, to each field of said received plural stream of video information, header data which includes data indicative of the one of said display windows in which the respective field is to be displayed; and means for transmitting the received fields of video information, with the appended header data, to the display means.

35. Apparatus according to claim 34, wherein said means for transmitting includes a multi-bit parallel data bus.

36. Apparatus according to claim 34, wherein the appended header data includes data for identifying the one of said video cameras which generated the field.

37. Apparatus according to claim 34, wherein said display means simultaneously displays four video information streams in respective windows on said display screen.

38. Apparatus according to claim 37, wherein said display means simultaneously displays nine video information streams in respective windows on said display screen.

39. Apparatus according to claim 38, wherein said display means simultaneously displays sixteen video information streams in respective windows on said display screen.

40. A method of storing video information, comprising the steps of:

recording plural fields of video data on a recording medium, each of said fields of video data representing a respective image;

recording on said recording medium, in association with each of said fields of video data, header data including data indicative of a source of the image represented by the respective field;

reproducing from the recording medium the recorded fields of video data;

processing at least one of the header data and the reproduced fields of video data to obtain a processing result; and on the basis of said processing result, recording process result data on said recording medium in the header data for at least one of said reproduced fields of video data.

41. A method according to claim 40, wherein said processing step includes applying a moving image content analysis algorithm to the reproduced fields of video data.

42. A method according to claim 41, wherein said moving image content analysis algorithm is for detecting moving objects represented by the reproduced fields of video data, and said process result is data indicative of detection of a moving object.

43. A method according to claim 40, wherein said recording medium is a hard disk.

44. A method according to claim 40, wherein said header data includes data for identifying a camera which generated the respective field of video data, and data indicative of a time at which the field of video data was generated.

45. Apparatus for storing video data, comprising:

means for recording plural fields of video data on a recording medium, each of said fields of video data representing a respective image;

means for recording on said recording medium, in association with each of said fields of video data, header data including data indicative of a source of the image represented by the respective field;

means for reproducing from the recording medium the recorded fields of video data;

processing means for processing at least one of the header data and the reproduced fields of video data, to generate process result data; and means, responsive to said processing means, for recording the process result data on said recording medium in the header data for at least one of said reproduced fields of video data.

46. Apparatus according to claim 45, wherein said processing means includes analysis means for applying a moving image content analysis algorithm to the reproduced fields of video data.

47. Apparatus according to claim 46, wherein said moving image content analysis algorithm applied by said analysis means is for detecting moving objects represented by the reproduced fields of video data, and said process result data generated by said processing means is data indicative of detection of a moving object.

48. Apparatus according to claim 45, wherein said recording medium is a hard disk.

49. Apparatus according to claim 45, wherein said header data includes data for identifying a camera which generated the respective field of video data, and data indicative of a time at which the field of video data was generated.

50. A method of operating an apparatus for storing and retrieving video data, the method comprising the steps of:

storing a plurality of fields of video data on a first hard disk;

storing index data on said first hard disk. said index data including data indicative of respective times at which said fields of video data were generated and respective locations on said first hard disk at which said fields of video data are stored; and storing said index data on a second hard disk;

wherein said index data stored on said first and second hard disks includes data indicative of alarm conditions detected at times when respective portions of the video data stored on said first hard disk were generated.

51. A video data storage apparatus, comprising:

a video data source for providing a dynamic stream of video data fields;

a data memory device for storing the dynamic stream of video data fields provided by the video data source; and control means for designating a main portion of said data memory device, said main portion for recording said dynamic stream of video data fields at a first field rate, said control means also designating a buffer portion of said data memory device, said buffer portion for recording said dynamic stream of video data fields at a second field rate that is higher than said first field rate.

52. A video data storage apparatus according to claim 51, wherein said data memory device comprises a hard disk.

53. A data storage medium on which is stored video data representing a plurality of video image fields, field identification data indicative of respective times at which said video image fields were generated, and characteristic data indicative of respective characteristics of the video image fields represented by said video data, said respective characteristics having been detected by applying an image analysis algorithm to said video data.

* * * * *

UNITED STATES PATENT AND TRADEMARK OFFICE
CERTIFICATE OF CORRECTION

PATENT NO. : 5,884,042

DATED : March 16, 1999

INVENTOR(S) : Gerhard Josef Winter, et al.

It is certified that error appears in the above-identified patent and that said Letters Patent is hereby corrected as shown below:

Col. 8, line 51, before "in" delete ".".
Col. 10, line 36, delete "102A" and insert --101A --.
Col. 12, line 23, delete "topermit" and insert --to permit --.
Col. 19, line 47, delete "medium" and insert --media --.
Col. 26, line 37, before "form" delete "-".
Col. 27, line 35, delete "number-and" and insert --number and --.
Col. 35, line 58, delete "tile.in" and insert --tile in --.
Col. 87, line 43, after "to" delete ".".

Signed and Sealed this

Fourth Day of April, 2000

Attest:

Q. TODD DICKINSON

*Attesting Officer*     *Director of Patents and Trademarks*